(12) United States Patent
Chiba et al.

(10) Patent No.: US 7,292,378 B2
(45) Date of Patent: Nov. 6, 2007

(54) IMAGE READER

(75) Inventors: Hirotaka Chiba, Kanagawa (JP); Tsugio Noda, Kanagawa (JP); Yoshiro Ishikawa, Kanagawa (JP); Kenichiro Sakai, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 335 days.

(21) Appl. No.: 10/784,876

(22) Filed: Feb. 24, 2004

(65) Prior Publication Data

US 2004/0165232 A1  Aug. 26, 2004

Related U.S. Application Data

(62) Division of application No. 09/351,235, filed on Jul. 9, 1999, now Pat. No. 6,744,537.

(30) Foreign Application Priority Data

Oct. 28, 1998   (JP)   ................................. 10-307666
Apr. 27, 1999   (JP)   ................................. 11-120772

(51) Int. Cl.
*H04N 1/04* (2006.01)
*H04N 1/024* (2006.01)

(52) U.S. Cl. .................. 358/473; 358/474; 358/498

(58) Field of Classification Search ............... 358/473, 358/404, 451, 498, 496, 474, 500, 501, 505, 358/444, 471, 400; 382/312; 345/660, 670, 345/671, 472, 472.1, 472.2, 156, 157, 164, 345/169, 180, 182
See application file for complete search history.

(56) References Cited

U.S. PATENT DOCUMENTS

| | | | |
|---|---|---|---|
| 4,694,353 A |  | 9/1987 | Sato et al. .................. 358/283 |
| 4,819,083 A |  | 4/1989 | Kawai et al. ............... 358/294 |
| 4,866,535 A | * | 9/1989 | Kubota et al. ............. 358/474 |
| RE33,425 E |  | 11/1990 | Nihei ........................ 358/472 |
| 5,163,089 A | * | 11/1992 | Kotani et al. .......... 379/100.02 |
| 5,168,483 A |  | 12/1992 | Oka ........................... 369/13 |
| 5,172,243 A | * | 12/1992 | Hayashi et al. ............ 358/400 |
| 5,278,673 A |  | 1/1994 | Scapa et al. ............... 358/473 |

(Continued)

FOREIGN PATENT DOCUMENTS

EP   0 370 475 A2   5/1990

(Continued)

OTHER PUBLICATIONS

European Search Report dated Jun. 20, 2003.

(Continued)

*Primary Examiner*—Jerome Grant
(74) *Attorney, Agent, or Firm*—Kratz, Quintos & Hanson, LLP

(57) ABSTRACT

The image reader according to the present invention comprises a housing having substantially a box-shape and having an image reading surface contacting a document, a document detecting section provided to this image reading surface for detecting a document P, and an image reading section for reading an image on the document when the document P is detected by the document detecting section 105. This image reader enables improvement in convenience for users, operability, and adaptability for handling, and also it is small in size.

24 Claims, 116 Drawing Sheets

U.S. PATENT DOCUMENTS

| | | | |
|---|---|---|---|
| 5,280,348 A | | 1/1994 | Honma et al. ............... 358/500 |
| 5,355,146 A | * | 10/1994 | Chiu et al. .................. 345/156 |
| 5,764,382 A | * | 6/1998 | Shiraishi .................... 358/496 |
| 5,878,005 A | | 3/1999 | Tonegawa ................ 369/44.27 |
| 6,002,124 A | * | 12/1999 | Bohn et al. ............. 250/208.1 |
| 6,066,857 A | * | 5/2000 | Fantone et al. ............. 250/566 |
| 6,292,272 B1 | * | 9/2001 | Okauchi et al. ............ 358/471 |
| 6,298,176 B2 | * | 10/2001 | Longacre et al. ........... 382/313 |
| 6,392,761 B1 | * | 5/2002 | Suzuki et al. .............. 358/473 |
| 6,542,262 B1 | | 4/2003 | Tachibana .................. 358/487 |
| 6,744,537 B1 | * | 6/2004 | Chiba et al. ................ 358/473 |

FOREIGN PATENT DOCUMENTS

| | | | |
|---|---|---|---|
| EP | 0 899 584 A2 | | 3/1999 |
| JP | 60-191 966 | | 9/1985 |
| JP | 61-16671 | * | 1/1986 |
| JP | 61-150564 | * | 7/1986 |
| JP | 62-115970 | * | 5/1987 |
| JP | 63-30064 | * | 2/1988 |
| JP | 63-128864 | * | 6/1988 |
| JP | 63-128865 | * | 6/1988 |
| JP | 63-181563 | * | 7/1988 |
| JP | 63-204864 | * | 8/1988 |
| JP | 63-266961 | * | 11/1988 |
| JP | 63-292760 | * | 11/1988 |
| JP | 63-292761 | * | 11/1988 |
| JP | 61-67365 | * | 4/1996 |
| JP | 9-194 075 | | 7/1997 |
| JP | HEI 10-15679 | | 1/1998 |
| JP | HEI 10-122577 | | 5/1998 |
| JP | 11-86014 | | 3/1999 |
| WO | 95/02889 | | 1/1995 |
| WO | 97/01827 | | 1/1997 |
| WO | 99/05635 | | 2/1999 |

OTHER PUBLICATIONS

"HP CapShare 910 Information Appliance Helps Workers Fax or E-mail from the Road"—Sep. 11, 1998.

H. Kamada et al.—"High-Speed, High-Accuracy Document Recognition Method . . . ", *Technical Report of IEICE PRMU* 96-205.

* cited by examiner

FIG.38
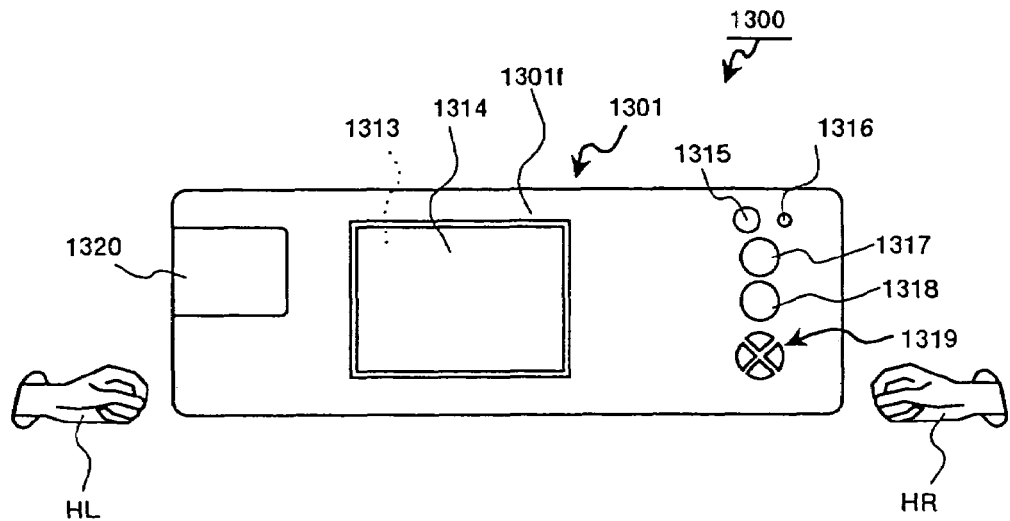
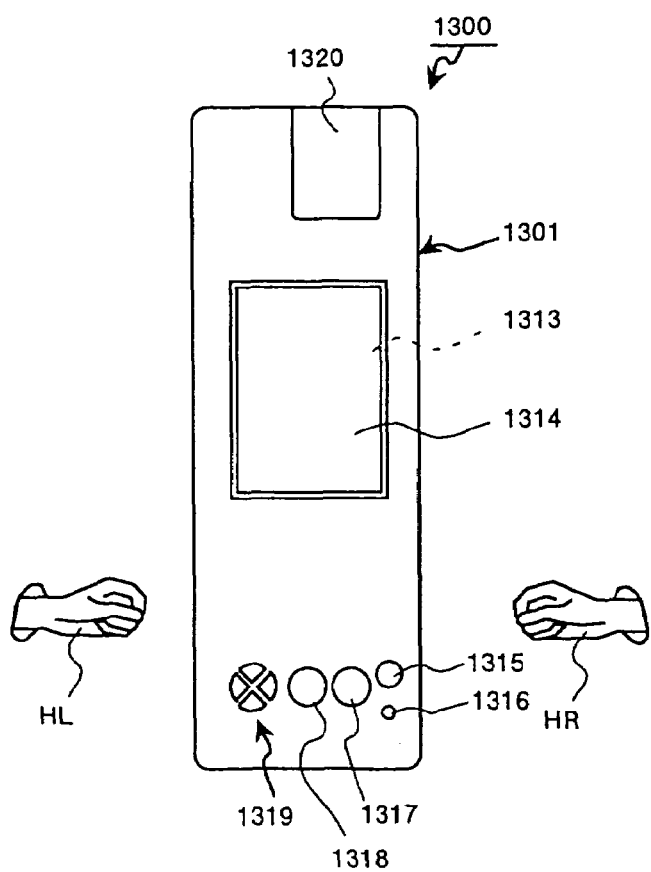

FIG.39
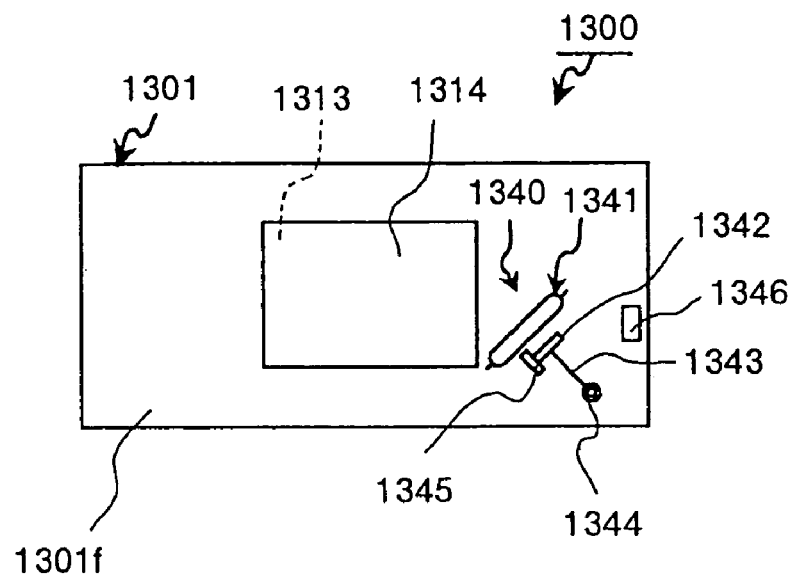
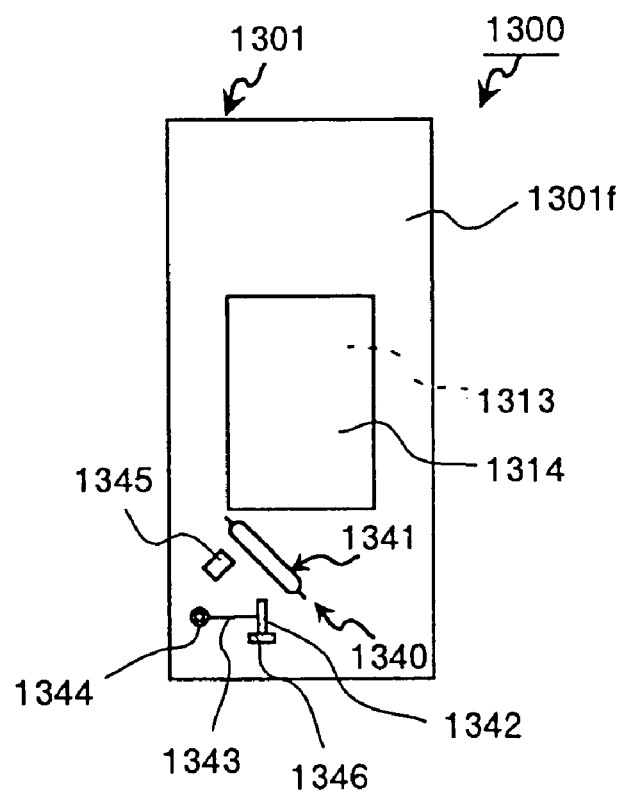

HORIZONTAL DISPLAY

VERTICAL DISPLAY

FIG.68
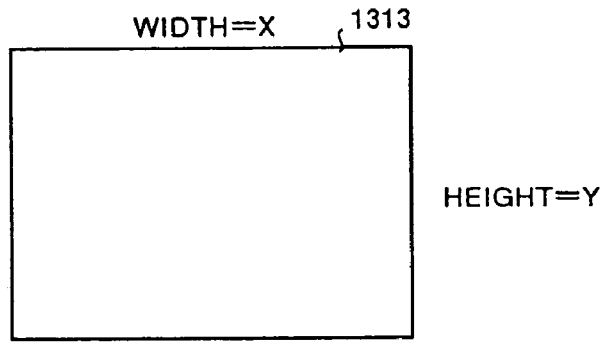
SIZE OF THE DISPLAY SECTION
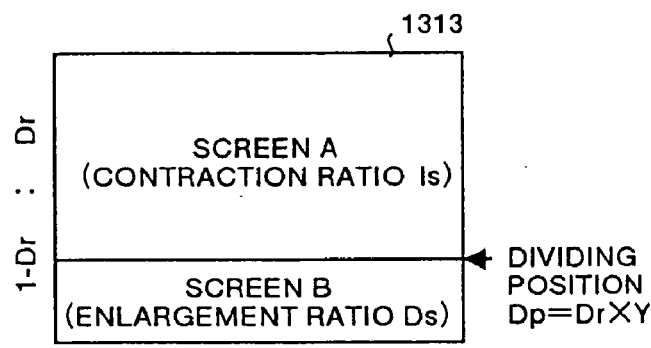
DIVISION IN THE HORIZONTAL DIRECTION
: Df=0, Dm=0
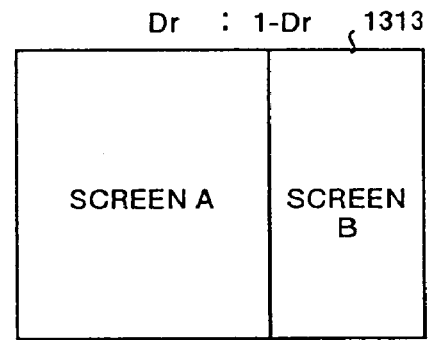
DIVISION IN THE VERTICAL DIRECTION
: Df=1, Dm=0
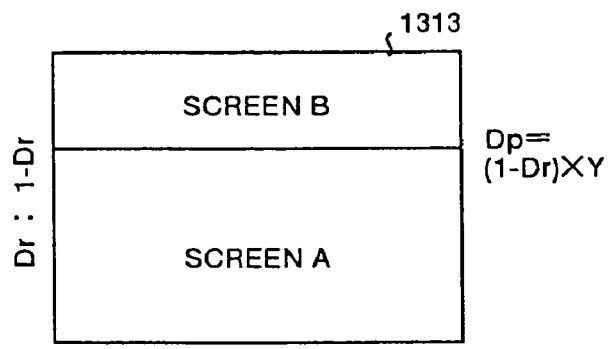
DIVISION IN THE HORIZONTAL DIRECTION
: Df=0, Dm=1
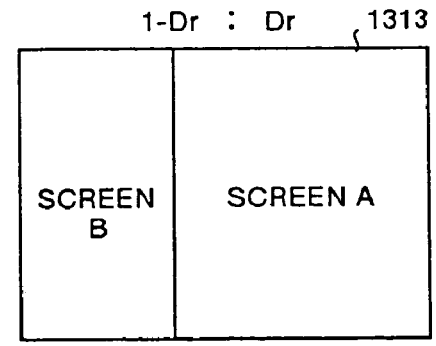
DIVISION IN THE VERTICAL DIRECTION
: Df=1, Dm=1

SCREEN SWITCHING IN THE HORIZONTAL DIVISION MODE

SCREEN SWITCHING IN THE VERTICAL DIVISION MODE

FIG.101
DISTURBING LIGHT ABSENT,
POSITION OR DEVICE IN SPACE
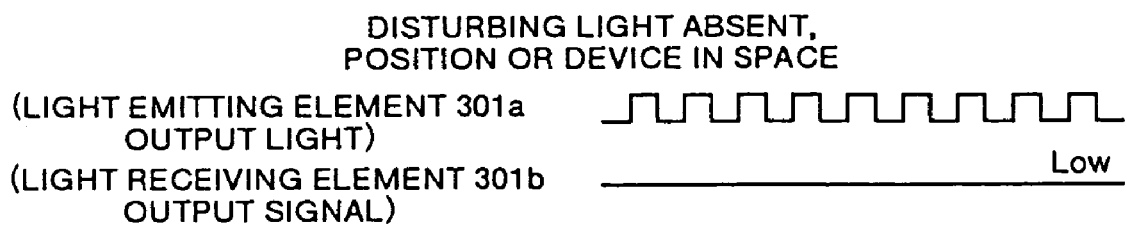
DISTURBING LIGHT ABSENT,
POSITION OR DEVICE ON DOCUMENT
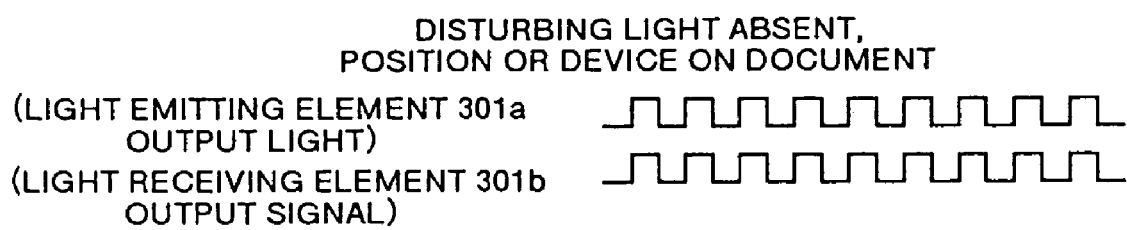
DISTURBING LIGHT ABSENT,
POSITION OR DEVICE IN SPACE
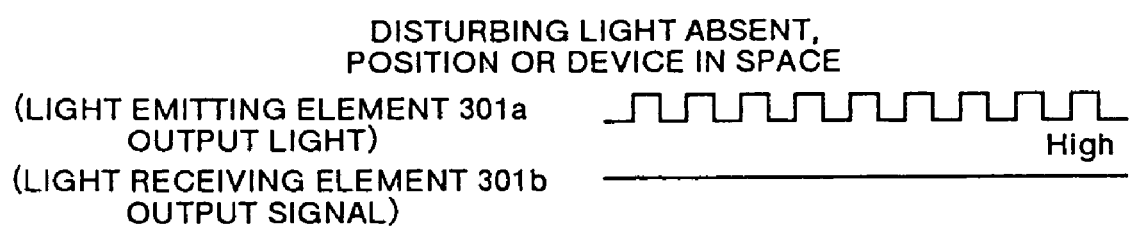
DISTURBING LIGHT ABSENT,
POSITION OR DEVICE ON DOCUMENT
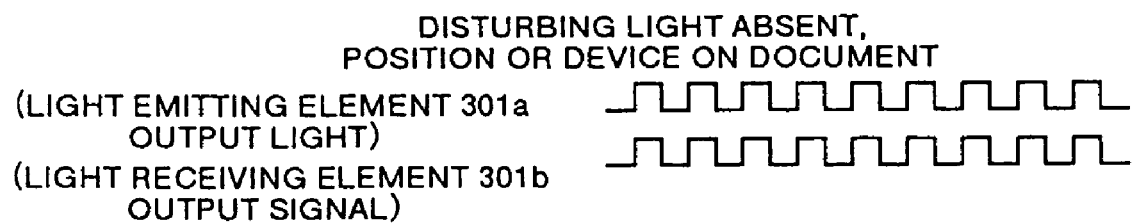

FIG.103
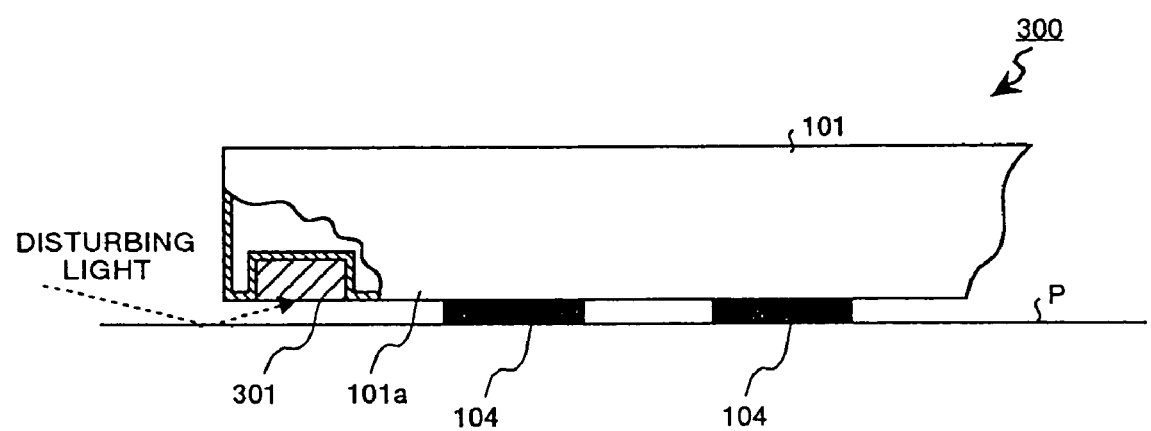
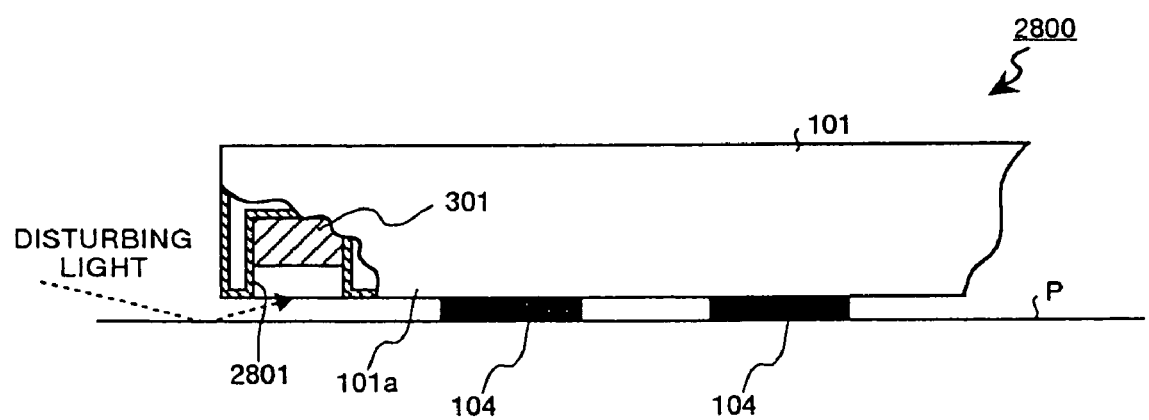

IMAGE READER

CROSS-REFERENCE TO RELATED APPLICATION

This application is a divisional application of Ser. No. 09/351,235, filed Jul. 9, 1999, now U.S. Pat. No. 6,744,537 which is hereby incorporated by reference.

FIELD OF THE INVENTION

The present invention relates to an image reader which can advantageously be used for reading an image on a medium by means of manual operations.

BACKGROUND OF THE INVENTION

An image reader is used as a device for optically reading an image on a medium. The image readers can largely be classified into three types of a flat bed type, a sheet feed type, and a handy type. The flat bed and the sheet feed type of image readers are stand-alone devices on which a document is set and read. On the other hand, the handy type of image reader has a smaller size as compared to the other two types described above, so that this type of image reader can easily be connected to a laptop computer or a PDA (Personal Digital Assistant). In the handy type of image reader, because a document is manually scanned, it is necessary to specify a position for start of reading (read start position) and give instructions for start and end of reading to the device. Conventionally it is necessary to set the image reader at the read start position and press operation switch provided on a housing thereof.

FIG. 110 is a perspective view showing appearance of an image reader 1 based on the conventional technology as described above. The image reader shown in this figure comprises a slender box-shaped housing 2, an operation switch 3 provided on a top surface of the housing 2, and a cable 4. In this image reader 1, when an image on a document P placed under an image reading surface 2a is to be read, the housing 2 is set at the read start position and the operation switch 3 is pressed to indicate a read start position. While pressing down the operation switch start of reading (read start) is instructed by manually moving the image reader in the direction V (the scanning direction) indicated by an arrow, and the image is read. When the image reader is moved to an end of reading position (read end position) and the operation switch 3 is pressed again the reading is stopped.

FIG. 111 is a perspective view showing appearance of another image reader 10 based on the conventional technology. The image reader 10 comprises a housing 11 having an image reading surface 11a, an interface card 12 connected to an insertion port 15a of a main system of the device 15, and an image reading section 13 for reading an image. In the image reader 10 having the configuration as described above, by connecting the image reader 10 via the interface card 12 to the main system 15, image data read by the image reading section 13 can be sent to the main system. Also in the conventional technology, in addition to the configuration as described above in which the image reader 10 is connected to the main system 15 via the interface card 12 as shown in FIG. 111, there is known an image reader as shown in FIG. 112 having a configuration in which a connector 21 attached to an end of a cable 22 is connected to the interface card 12.

In the image reader based on the conventional technology as described above, image is read based on the flow chart shown in FIG. 113. In step TA1 shown in this figure, a user gives an instruction for read start by contacting the image reader to a document and then pressing an operation key (for instance, the operation switch 3 shown in FIG. 110). In step TA2, image data for several lines is read from one line on the document, and a threshold value for digitizing (conditions for reading) used for digitizing image data is decided based on the color of characters and the color of the background.

In step TA3, an operation for reading an image on the document is started, image data read as described above is compared with the threshold value, and monochrome image data is generated. The threshold value for digitizing is decided each time the document is read. The operation sequence as described above is employed because it is necessary to generate sharp monochrome image data by deciding a threshold value corresponding to a quality of the paper used.

Further in the image readers based on the conventional technology as described above, in order to downsize the device and reduce power consumption various types of measures are taken such as use of a compact and low power consumption microprocessor having a high processing speed or the like. In such image readers, after the image data is read, a sequence of operations for post-processing comprising correction of an inclination of an image, contraction of corrected image data, recording and storage of the contracted image data is executed. When the sequence of operations for post-processing is finished, the next image read processing is performed.

FIG. 114 is a block diagram showing configuration of the image reader based on the conventional technology. A read instructing section 30 issues an instruction for reading an image on a document to a read control section 31. The read control section 31 gives an instruction for reading an image on the document to an image reading section 32 upon input of the instruction for read start from the read instructing section 30 as a trigger, and also gives an instruction for starting an operation for writing (storing) image data as a result of reading by the image reading section 32 to a buffer memory 33. Further, the read control section 31 gives an instruction for starting an operation of reading image data from the buffer memory 33 to a data processing section 34 when image data write in the buffer memory 33 is finished. The data processing section 34 reads out image data from the buffer memory 33 upon an instruction from the read control section 31 described above, and executes the sequence of operations for post-processing as described above to the image data. The image data having been subjected to the post-processing by the data processing section 34 is stored in the data storing section 35.

Operations of the image reader is explained with reference to FIG. 115 and FIG. 116. In step TB1 shown in FIG. 115, the read control section 31 determines whether an instruction for read start has been issued from the read instructing section 30 or not, and when it is determined that the instruction has not been issued ("No"), the read control section 31 repeats the same operation for determination. When an instruction for read start is issued at the point of time t1 shown in FIG. 116, the read control section 31 determines in step TB1 that start of reading has been instructed ("Yes"), and shifts the processing to step TB2.

In step TB2, the read control section 31 outputs a reading start signal shown in FIG. 116 to the image reading section 32 as well as to the buffer memory 33. With this operation, an image on a document is read by the image reading section 32, and the data obtained as a result of reading is written as shown in FIG. 116 in the buffer memory 33. When the operation for writing the image data for a specified number of lines is finished at a time point ta, the read control section 31 reports completion of the operation for writing image data to the data processing section 34. With this operation, the data processing section 34 reads out the image data stored in the buffer memory 33 as shown in FIG. 116 in step TB3.

The data processing section 34 executes the sequence of operations for post-processing described above with respect to the data. Then the data processing section 34 reports to the read control section 31 that the sequence of operations for post-processing has been executed. Then in step TB1, the read control section 31 determines whether an instruction for read start has been issued from the read instructing section 30 or not. As described above, in the image reader based on the conventional technology it is clearly understood from FIG. 116 that, after image data is written in the buffer memory 33 the image data is read out from the buffer memory 33. Namely, in the image reader based on the conventional technology, write processing and read processing are executed serially.

In the image readers based on the conventional technology as described above, however, as shown in FIG. 110, after the image reader 1 is set at a read start position on a document P, read start is started once by pressing the operation switch 3, image is read by scanning the document P with the help of the image reader, and the operation switch is pressed again when terminating the operation for reading an image, and thus the troublesome switch operations are required.

Further, in the image reader based on the conventional technology as described above, the operation switch is repeatedly pressed many times during an operation for reading an image according to specifications of the device, which requires a user to carry out very troublesome operations. Thus, in the image readers based on the conventional technology as described above, a user is required to operate the operation switch many times when reading an image, so that operability and adaptability to practical operations are rather low. Further, differences in user interfaces and troublesome switch operations are very disadvantage us to the user.

Further, in the examples shown in FIG. 111 and FIG. 112, a place for connection of the image reader 10 may be restricted based on a place (insertion port) in the main system 15 for loading the interface 12, and the cable 22 disturbs smooth operation when the image reader 20 and the main system 15 are connected to each other, so that operability and adaptability to practical use is very poor. Further, in the image readers based on the conventional technology as shown in FIG. 111, the specific main system 15 is required, so that downsizing of the device is very difficult.

Further, in the image readers based on the conventional technology, there is the problem that, when fluctuation in read values generated due to non-uniformity of sensitivity of sensors or difference of light sources is very larger, a read image gets disadvantageously degraded. In addition, in the image readers based on the conventional technology as described above, a user can read (scan) an image in any direction and a degree of freedom in the operation is high, but sometimes the image may be a rotated one or a mirrored one in some scanning directions, which is very inconvenient.

In the image readers based on the conventional technology as described above, as described with reference to FIG. 113, it is a requirement for obtaining clear monochrome image data that an instruction for starting an operation for reading an image is given in the state where the image reader is placed on a document. In the image readers based on the conventional technology, however, if an instruction for starting an operation for reading an image is given in a state where the image reader is not placed on a document, in other words in a state where the image reader is held by hands, the space (a place where there is only air and no document or the like) is read. In such a cases, read image data is completely different from the image on a document as an object to be read, so that the threshold value decided according to the image data is not a correct value. When the image data is digitized by using such a threshold value, it is inevitable that the quality of read image gets disadvantageously degraded.

Further, in the image reader described with reference to FIG. 114, write processing and read processing are executed serially as shown in FIG. 116. A time interval from a point of time when an operation for reading an image is finished (time ta) until a point of time when the image reader is ready for a next operation for reading an image (time t2) extends from several seconds up to several tens seconds. Because of this feature, when several images are to be read, a user must wait for several to several tens seconds after an operation for reading of one image is executed until the image reader is ready for an operation for reading of the next image. Namely in the image readers based on the conventional technology, a plurality of images can not be read continuously, so that adaptability to practical use is very low.

SUMMARY OF THE INVENTION

The present invention was made to solve the problems as described above, and it is an object of the present invention to provide an image reader with improved operability for users and higher adaptability to practical use and allowing further downsizing and obtain images having a higher quality.

To achieve the objects as described above, the present invention provides an image reader for optically reading an image on a medium by means of manual operations comprising a housing having an image reading surface coming in contact with the medium when reading an image; a medium detecting unit provided on the image reading surface for detecting the medium; and an image reading unit provided on the housing for reading image information of the medium according to a result of detection by the medium detecting unit.

With the above invention, when the housing is placed on the medium by a user so that the image reading surface directly contacts the medium, the medium is detected by the medium detecting unit. With this, the image reading unit starts an operation of reading the image information from the medium. When the user separates the housing from the medium, the medium is not detected by the medium detecting unit, so that the image reading unit terminates an operation of reading of the image.

The present invention provides an image reader in which the medium detecting unit is a mechanical switch for detecting the medium by mechanically contacting the medium.

With the above invention, when the housing is placed on the medium by a user so that the image reading surface directly contacts the medium, the mechanical switch contacts the medium, and the medium is detected through the mechanical switch. As a result, the image reading unit starts an operation of reading the image information from the medium. When the user separates the housing from the medium, the medium is not detected by the mechanical switch, so that the image reading unit terminates an operation of reading of the image.

The present invention provides an image reader in which the medium detecting unit is an optical switch for detecting the medium optically.

With the above invention, when the image reading surface is brought closer to the medium by a user such that the image reading surface almost contacts the medium, the medium is detected in a not-contacted state by the optical switch. As a result, the image reading unit starts an operation of reading the image information from the medium. When the user separates the housing from the medium, the medium is not optically detected by the optical switch, so that the image reading unit terminates the operation of reading of the image.

The present invention provides a image reader in which the optical switch comprises a light emitting unit for emitting light in a direction opposite to the image reading surface of the housing, and a light receiving unit provided near the light emitting unit for detecting the medium according to a quantity of received light.

With the above invention, when the housing is brought closer to the medium by a user such that the image reading surface almost contacts the medium, light emitted by the light emitting unit is reflected by the medium and the reflected light is received by the light receiving unit. As a result, the medium is detected by the light receiving unit in a non-contact state. With this, the image reading unit starts an operation of reading image information from the medium. When the user separates the housing from the medium, light is not received by the light receiving unit, so that the image reading unit terminates the operation of reading of the image.

The present invention provides an image reader comprising a roller rotatably provided on the image reading surface of the housing, and first and second auxiliary rollers rotatably provided on the image reading surface of the housing so that the first and second auxiliary rollers hold the other roller therebetween.

With the above invention, when the housing is placed on a medium by a user such that the image reading surface contacts the medium, the housing is supported at three point by the roller and the first and second auxiliary rollers.

The present invention provides an image reader comprising a read control unit for recognizing start and end of image reading according to a result of detection by the medium detecting unit and controlling the image reading unit according to a result of recognition.

With the above invention, start and end of an operation of reading of an image is automatically recognized by the read control unit according to a result of determination by the medium detecting unit, and the image reading unit is controlled according to a result of this recognition.

The present invention provides an image reader having an auxiliary image reader for optically reading an image on the medium by means of manual operations and comprising an interface unit with various types of auxiliary image reader each having a different reading size connectable thereto, in which the read control unit processes a result of reading by the auxiliary image reader when the auxiliary image reader is connected to the interface unit.

With the above invention, when the auxiliary image reader is connected to the interface unit, the read control unit processes a result of reading a document having a different size read by the auxiliary image reader.

The present invention provides an image reader comprising a power supply unit for intermittently supplying power to the medium detecting unit, while image is not being read, according to a result of recognition by the read control unit.

With the above invention, the power supply unit intermittently supplies a power to the medium detecting unit according to a result of recognition by the read control unit while an image is not being read.

The present invention provides an image reader for optically reading an image on a medium by means of manual operations comprising a housing having an image reading surface coning in contact with the medium when reading an image, a displacement detecting unit for detecting a displacement of the housing, and an image reading unit provided on the housing for reading the image information of the medium according to a result of detection by the displacement detecting unit.

With the above invention, when the housing is placed on the medium by a user such that the image reading surface contacts the medium and when the housing is moved, the displacement computing section computes the displacement from the rotation of the roller. With this, the image reading unit starts an operation for reading the image information from the medium. When the user separates the housing from the medium, the medium is not detected by the displacement detecting unit, so that the image reading unit terminates the operation of reading of the image.

The present invention provides an image reader, in which the displacement detecting unit comprises a roller rotatably provided on the image reading surface of the housing, and a displacement computing section for computing a displacement of the housing from the rotation of the roller.

With the above invention, when the housing is placed on the medium by a user such that the image reading surface contacts the medium and then the housing is moved in the scanning direction, the rollers rotate, and the displacement computing section computes the displacement from the rotation of the roller. With this, the image reading unit starts an operation for reading the image information from the medium. When the user separates the housing from the medium, the medium is not detected by the displacement detecting unit, so that the image reading unit terminates the operation of reading of the image.

The present invention provides an image reader comprising first and second auxiliary rollers rotatably provided on the image reading surface of the housing so that the first and second auxiliary rollers hold the other roller therebetween.

With the above invention, when the housing is placed on a medium by a user such that the image reading surface contacts the medium, the housing is supported at three points by the roller and the first and second auxiliary rollers.

The present invention provides an image reader comprising a read control unit for recognizing start and end of image reading according to a result of detection by the displacement detecting unit and controlling the image reading unit according to a result of recognition.

With the above invention, start and end of an operation of reading an image is automatically recognized by the read control section according to a result of detection by the displacement detecting unit, and the read control section is controlled according to a result of this recognition.

The present invention provides an image reader comprising an interface unit for optically reading an image on the medium by means of manual operations with various types of auxiliary image reader each having a different reading size connectable thereto, in which the read control unit processes a result of reading by the auxiliary image reader when the auxiliary image reader is connected to the interface unit.

With the above invention, when the auxiliary image reader is connected to the interface unit, the read control section processes a result of reading a document having a different size read by the auxiliary image reader.

The present invention provides an image reader comprising a power supply unit for intermittently supplying power to the displacement detecting unit, when image is not being read, according to a result of recognition by the read control unit.

With the above invention, the power supply unit intermittently supplies power to the displacement detecting unit when an operation of reading of an image is not being formed.

The present invention provides an image reader for optically reading an image on a medium by means of manual operations comprising a housing having an image reading surface coming in contact with the medium when reading an image, a medium detecting unit provided on the image reading surface for detecting the medium, a displacement detecting unit for detecting a displacement of the housing, and an image reading unit provided on the housing for reading the image information of the medium according to both a result of detection by the medium detecting unit and a result of detection by the displacement detecting unit.

With the above invention, when the housing is placed on the medium by a user such that the image reading surface contacts the medium, the medium is detected by the medium detecting unit. When the housing is moved, displacement is detected by the displacement detecting unit is detected. Then the image reading unit starts reading image information on the medium. When the user separates the housing from the medium, the medium is not detected by the medium detecting unit, and also a displacement is not detected by the displacement detecting unit, so that the image reading unit terminates an operation of reading of the image.

The present invention provides an image reader in which the medium detecting unit is a mechanical switching unit for detecting the medium by mechanically contacting the medium.

With the above invention, when a user places the housing on the medium such that the image reading surface contacts the medium, the mechanically switching unit contacts the medium, and the medium is detected by the mechanical switch. The image reading unit starts an operation for reading the image information on the medium according to both a result of detection by the mechanical switch and a result of detection of a displacement. When the user separates the housing from the medium, the medium is not detected by the mechanical switch, and also a displacement is not detected by the displacement detecting unit, so that the image-reading unit terminates the operation of reading of the image.

The present invention provides an image reader in which the medium detecting unit is an optical switch for optically detecting the medium.

With the above invention, when a user places the housing on a medium such that the image reading surface contact the medium, this medium is detected by the optical switch. When the housing is moved, a displacement is detected by the displacement detecting unit. Then the image reading unit start an operation of reading the image information on the medium. When the user separates the housing from the medium, the medium is not detected by the optical switch, and also the displacement is not detected by the displacement detecting section, so that the image reading unit terminates the operation of reading of the image.

The present invention provides an image reader, in which the optical switch comprises a light emitting unit for emitting light in a direction opposite to the image reading surface of the housing, and a light receiving unit provided near the light emitting unit for detecting the medium according to a quantity of received light.

With the above invention, when a user places the housing on a medium such that the image reading surface contacts the medium, the medium is detected by the light receiving unit. When the housing is moved, a displacement is detected by the displacement detecting unit. Then the image reading unit starts an operation of reading the image information on the medium. When the user separates the housing from the medium, light is not received by the light receiving unit, and also the displacement is not detected by the displacement detecting unit, so that the image reading unit terminates the operation of reading of the image.

The present invention provides an image reader, in which the displacement detecting unit comprises a roller rotatably provided on the image reading surface of the housing, and a displacement computing section for computing a displacement of the housing from the rotation of the roller.

With the above invention, when a user places the housing on a medium such that the image reading surface contact the medium and when the housing is moved by the user in the scanning direction, the rollers rotate and the displacement computing section computes a displacement from the rotation of the rollers. With this, the image reading unit starts an operation of reading the image information on the medium. When the user separates the housing from the medium, the medium is not detected by the displacement detecting section, so that the unit terminates an operation of reading of the image.

The present invention provides an image reader comprising first and second auxiliary rollers rotatably provided on the image reading surface of the housing so that the first and second auxiliary rollers hold the other roller therebetween.

With the above invention, when a user places the housing on a medium such that the image reading surface contacts the medium, the housing is supported at three points by the roller and the first and second auxiliary rollers.

The present invention provides an image reader comprising a read control unit for recognizing start and end of image reading according to both a result of detection by the medium detecting unit and a result of detection by the displacement detecting unit and controlling the image reading unit according to the result of recognition.

With the above invention, the image reading unit starts or terminates an operation of reading of the image according to both a result of detection by the medium detecting unit and that by the displacement detecting unit. And, the image reading unit is controlled according to a result of the recognition. The present invention provides an image reader comprising an interface unit with various types of auxiliary image reader each having a different reading size connectable there to, in which the image control unit processes a result of reading by the auxiliary image reader when the auxiliary image reader is connected to the interface unit.

With the above invention, when the auxiliary image reader is connected to the interface unit, the read control unit processes a result of an operation for reading a document having a different size read by the auxiliary image reader. The present invention provides an image reader comprising a power supply unit for intermittently supplying power to the medium detecting unit as well as to the displacement detecting unit while image is not being read.

With the above invention, when an operation of reading of the image is not being performed according to a result of recognition by the read control unit, the power supply unit intermittently supplies power to the medium detecting unit as well as to the displacement detecting unit.

The present invention provides an image reader comprising a memory for storing a result of reading corresponding to a plurality of images by the image reading unit as image data therein.

With the above invention, a result of an operation of reading of a plurality of images by the image reading unit is stored as image data.

The present invention provides an image reader in which the memory is provided on a board in a layered form. With the above invention, the memory is provided in a layered form, which enables downsizing of the device.

The present invention provides an image reader, in which the memory is detachably provided.

With the above invention, the memory can be connected to or disconnected from the housing. Accordingly, the memory can be used as a memory for other devices.

The present invention provides an image reader comprising a reporting unit for reporting a storage state in the memory. With the above invention, a storing state in the memory is reported by the reporting unit.

The present invention provides an image reader comprising a communicating unit which works as a communication interface between the memory and an external device with the external device capable of accessing the memory connectable thereto.

With the above invention, when an external device is connected, the external device can access the memory using the interface function of the communicating unit.

The present invention provides an image reader comprising a transmitting unit with an external device connectable thereto for transmitting a result of reading by the image reading unit as image data to the external device.

With the above invention, when an external device is connected thereto, image data is transmitted to the external device by the transmitting unit.

The present invention provides an image reader comprising a display unit provided on an operating surface of the housing for displaying an image according to a result of reading by the image reading unit.

With the above invention, an image obtained as a result of an operation of reading of the image by the image reading unit is displayed on the display unit.

The present invention provides an image reader, in which the display unit is provided in a vertical posture with respect to a reading surface of the image reading unit.

With the above invention, the display unit is provided in a posture vertical with respect to a reading surface of the image reading unit, so that a user can perform an operation of reading an image while visually checking the image displayed by the display unit.

The present invention provides an image reader comprising an angle adjusting unit for freely adjusting an angle of a display surface of the display unit.

With the above invention, an angle of the display surface of the display unit can freely be adjusted through the angle adjusting unit.

The present invention provides an image reader, in which the display unit is provided at a central position of the operating surface.

With the above invention, the display unit is provided at a central position of the operating surface, so that a user can perform an operation of reading of the image while visually checking the image displayed by the display unit at a position best suited for visual check by the user.

The present invention provides an image reader comprising a protection cover for covering the display unit.

With the above invention, a protection cover protects the display unit from dirt or shock, so that the life of the display unit can be prolonged.

The present invention provides an image reader, in which the protection cover is made from a transparent material.

With the above invention, the protection cover is made from a transparent material, so that display on the display unit can be checked through the protection cover.

The present invention provides an image reader, in which the protection cover is detachably provided.

With the above invention, the protection cover can freely be attached to or detached from the image reader.

The present invention provides an image reader comprising a support provided between the protection cover and the housing for foldably supporting the protection cover.

With the above invention, the protection cover is supported by the support, so that the protection cover can freely be set on or removed from the display unit according to the necessity.

The present invention provides an image reader comprising an operating section provided near one edge of the operating surface of the housing and used for an inputting operation.

With the above invention, a user operates an operating section provided at one edge section of an operating surface of the housing holding the housing.

The present invention provides an image reader comprising a instructing unit for indicating a direction when an image is to be displayed on the display of the display unit, and a display control unit for controlling the displaying direction of the image on the display unit according to contents of an instruction from the instructing unit.

With the above invention, the display control unit controls a displaying direction of the image on the display unit according to contents of an instruction from the instructing unit.

The present invention provides an image reader, in which the instructing unit is an inclination detecting unit for detecting the inclination of the housing.

With the above invention, the instructing unit is an inclination detecting unit for detecting the inclination of the housing, and the display control unit controls displaying direction on the display unit according to a result of detection by the inclination detecting unit.

The present invention provides an image reader, in which the instructing unit is an operating unit operated by a user.

With the above invention, the display control unit controls a displaying direction of the image on the display unit according to a displaying direction indicated by the operating unit.

The present invention provides an image reader comprising a display control unit for dividing an image displayed by the display unit with a ratio of N:M (N+M=1) and displaying each of the divided images with a different contraction ratio or enlargement ratio.

With the above invention, an image is divided at a ratio of N:M (N+M=1) on the display of the display unit, and each of the divided images is displayed on the display unit with a different contraction ratio or an enlargement ratio.

The present invention provides an image reader comprising a display control unit for displaying a whole or a portion of an image with the same, contracted or enlarged size as compared to the size of the original image displayed by the display unit by overlapping on other image(s).

With the above invention, a whole or a portion of an image with the same size or contracted or enlarged size as compared to the size of the original image can be displayed by the display control unit by overlapping on other image(s).

The present invention provides an image reader comprising a display control unit for displaying in an array of a plurality of whole images or a portion of the image with the same, contracted or enlarged size as compared to the size of the original image displayed by the display unit.

With the above invention, a plurality of whole images or a portion of the image with the same size or contracted or enlarged size as compared to the original size of the image are displayed in an arrayed form by the display control unit.

The present invention provides an image reader comprising a display control unit for displaying an arbitrary area of a document image with an enlarged or a contracted size as compared to the size of original image displayed by the display unit.

With the above invention, an arbitrary area of a document image can freely be displayed on the display unit in an arrayed form with an enlarged or a contracted size.

The present invention provides an image reader comprising a display control unit for displaying in an array of images each having the same size as that of the original image displayed by the display unit but rotated or inverted in a plurality of directions, a selecting unit for selecting a properly oriented one image from the displayed rotated or inverted images, and a right posture correcting unit for converting a right posture of the original image of the image selected by the selecting unit.

With the above invention, when a properly oriented image is selected from rotated or mirrored images, the right posture correcting unit executes conversion applied to an original image of the selected image to the selected image.

The present invention provides an image reader comprising a text portion determining unit for determining a test portion of the image, a rotation direction detecting unit for detecting a direction of rotation of an image from a character image for the text portion determined by the text portion determining unit, and a display control unit for displaying the image as a properly oriented image on the display of the display unit according to a result of detection by the rotation direction detecting unit.

With the above invention, after a text portion in an image is determined by the text portion determining unit, a rotation direction of the image is detected from a character image in the text portion by the rotation direction detecting unit. And then, the image is displayed in properly oriented fashion on the display unit according to a result of detection by the rotation direction detecting unit.

The present invention provides an image reader comprising a classifying unit for classifying a plurality of images read by the image reading unit according to prespecified items for classification, a selecting unit for selecting any of the items for classification, and a display control unit for displaying the images corresponding to the item for classification selected by the selecting unit.

With the above invention, a plurality of images read by the image reading unit are classified according to specified classification items by the classifying unit. Then an image corresponding to a classification item selected by the selecting unit is displayed on the display unit.

The present invention comprises a digitizing unit for digitizing a result of reading by generating a threshold value for digitizing according to a result of reading by the image reading unit.

With the above invention, a threshold value for digitizing is generated by the digitizing unit according to a result of an operation of reading of the image by the image reading unit, and the digitizing is automatically executed with respect to a result of image read.

The present invention provides an image reader, in which, when holding the image reader, an action point of grasping fingers is at a position lower than a center of gravity of the image reader and at the same time a height of the action point is smaller than a width of the housing.

With the above invention, when the image reader is held by a user and used for scanning a document, moment acting in the direction of inclination is small, so that the device can be held stably even during movement thereof.

The present invention provides an image reader for optically reading an image on a medium by means of manual operations comprising a reading unit for optically reading the image according to prespecified conditions for reading, a read start detecting unit for detecting start of reading of the image on the medium, and a read condition deciding unit for deciding the conditions for reading when start of reading of the image is detected by the read start detecting unit.

With the above invention, when start of an operation of reading of the image is detected by the read start detecting unit, the read condition deciding unit decides a read condition such as a threshold value for digitizing the image. Because an operation for reading an image on the medium has been started, the read condition is decided according to an image on the medium. The reading unit optically reads an image according to the read condition. Therefore, the space is never decided as a read condition like in the conventional technology, and always a read condition is decided according to an image on the medium, so that a high quality image can always be obtained.

The present invention provides an image reader, in which the read start detecting unit detects start of reading of the image by checking whether the medium is present or not.

With the above invention, the read start detecting unit detects start of an operation of reading of the image by detecting presence of a medium. With this operation, the read condition deciding unit decided a read condition according to a result of an operation for reading an image on the medium. The reading unit optically reads the image according to the read condition. Therefore, different from the conventional technology, the space is never decided as a surface to be read, and always a read condition is decided according to an image on the medium, so that a high quality image can always be obtained. Further, the user is not required to give an instruction for starting the operation of reading of the image like in the conventional technology, so that convenience in actual use and operability are improved.

The present invention provides an image reader, in which the read start detecting unit detects start of reading of the image by detecting a displacement of the medium.

With the above invention, when an operation for reading an image is started, the displacement is read by the read start detecting unit. When start of an operation for reading an image is detected by the read start detecting unit, a read condition is decided by the read condition deciding condition according to a result of the operation for reading an image on the medium. Then, an image is optically read by the reading unit according to the read condition. Therefore, the space is never read as a surface to be read like in the conventional technology, and a read condition is decided always according to an image on the medium, so that a high quality image can always be obtained. Further, the user is not required to give an instruction for starting an operation of reading of the image each time, so that convenience in actual use and operability are improved.

The present invention provides an image reader, in which the read start detecting unit detects start of reading of the image by detecting presence of the medium and a displacement thereof on the medium.

With the above invention, the read start detecting unit detects start of an operation of reading of the image by detecting both presence of a medium and a displacement on the medium. Then a read condition is decided by the read condition deciding unit according to a result of the operation of reading of the image on the medium, and an image is optically read by the reading unit according to the read condition. Therefore, a read condition is never decided by recognizing the space as a surface to be read like in the conventional technology, and a read condition is always read according to the image on the image reading condition, so that a high quality image can always be obtained. Further, star of an operation for reading an image is detected according to a result of detection of both presence of a medium and a displacement on the medium, so that a frequency of malfunctions is reduced as compared to a case where start of an operation of reading of the image is detected according to a result of detection of any one of the two events described above.

The present invention provides an image reader, in which the read start detecting unit invalidates a result of detection of start of reading of the image when the displacement is less than a prespecified threshold value.

With the above invention, when a minute displacement due to vibration is detected, if the amount vibration is less than the threshold value, a result of detection of start of an operation of reading of the image is invalidated. In other words, a read condition is not decided until the displacement surpasses a threshold value, so that malfunctions due to influence of vibrations can be prevented.

The present invention provides an image reader, in which the read start detecting unit invalidates a result of detection of start of reading of the image when the displacement detected within a prespecified period of time is less than a prespecified threshold value.

With the above invention, when a minute displacement due to influence of vibration is detected within a specified period of time, when the displacement amount of vibration is less than a threshold value, a result of detection of an operation for reading an image is invalidated. In other words, even if vibration is generated, a result of detection of read start is invalidated once for each specified period of time, so that an accumulated value of displacement due to vibrations is reset, and malfunctions due to accumulation of displacements erroneously detected due to vibrations can be prevented. Accordingly, reliability and convenience in actual operation is improved.

The present invention provides an image reader for optically reading an image on a medium by means of manual operations comprising a read instructing unit for instructing start and end of reading of the image, an image reading unit for reading the image, an image memory for storing a plurality of image data, and a read control unit for making the image reading unit start reading of an image and also making the image memory store the image data therein.

With the above invention, when an instruction for starting an operation for reading an image is issued from the read instructing unit, an operation of reading of the image by the image reading unit is started under control by the read control unit, and data for a plurality of images is stored in the image memory. Therefore, an operation of reading image data is started simultaneously when an instruction for starting an operation for reading an image is issued, so that an image can be read at arbitrary timing without waiting, and hence convenience in actual operation is improved. Further, the image memory stores a data for a plurality of images, so that when data less than the capacity of the memory is stored, data for additional images can be written in an empty storage area. Thus, an operation of reading of the image can be executed without any delay.

The present invention provides an image reader, in which the image memory stores the image data read by the image reading unit and reads the stored image data concurrently.

With the above invention, in the image memory, storage of data for an image read by the image reading unit and an operation for reading a stored image are executed concurrently, so that data for a read image can be stored in an empty storage area even while an operation for reading out data for a stored image is being performed, and an operation for reading images can be executed continuously. Therefore, convenience in actual use can substantially be improved.

The present invention provides an image reader, in which the read control unit restores control for enabling acceptance of an instruction for start of a next operation for reading immediately after an instruction for end of reading is received from the read instructing unit.

With the above invention, when an instruction for terminating an operation of reading of the image is given and an operation for reading an image is terminated once, control is provided so that a next instruction for starting an operation for reading an image is given. Thus, an operation of reading of the images can be executed repeatedly, so that convenience in actual operations are improved.

The present invention provides an image reader, in which the read instructing unit instructs start and end of reading according to detection of the medium.

With the above invention, an instruction for start and end of an operation of reading of the image is given from the read instructing unit according to a result of detection of a medium. Thus, when the device is placed on the medium, the placement is automatically considered as an instruction for starting an operation of reading of the image, and when the device is separated from the medium, the operation of reading of the image is automatically terminated. Therefore, an operation of reading of the image is automatically started or terminated without requiring a user to give an instruction each time, so that convenience in actual operations is improved.

The present invention provides an image reader for optically reading an image on a medium by means of manual operations comprising, a housing having an image reading unit coming in contact with the medium when reading an image, a medium detecting unit provided on an image reading surface of the housing for detecting the medium, a control processing unit for providing controls over the medium detecting unit so that detection of the medium can normally be performed according to environments and conditions for reading an image and processing a result of detection by the image detecting unit, and an image reading unit for reading the image information of the medium according to the result of detection processed by the control processing unit.

With the above invention, the control processing unit executes processing under control by and in response to a result of detection by the medium detecting unit, so that the medium can be detected even in environment where or under conditions that there is an external disturbance otherwise disabling detection of the medium with the reliability improved.

The present invention provides an image reader, in which the medium detecting unit comprises a light emitting element and a light receiving element each for optically reading a medium, and the control processing unit selects whether the medium detecting unit is to be used or not according to environment and conditions for reading an image.

With the above invention, when disturbing light is present around the light emitting element or the light receiving element, output from the light receiving element is saturated so that the medium can not be detected. However, the control processing unit inhibits use of the medium detecting unit so that other unit can selectively be used in place of the medium detecting unit, so that the situation where medium detection is completely disabled can be evaded.

The present invention provides an image reader, in which the medium detecting unit comprises a light emitting element and a light receiving element each for optically detecting a medium, and the control processing unit controls power supply to the light emitting element according to environment and conditions for reading an image.

With the above invention, when there is disturbing light around the light receiving element or the light receiving element, the control processing unit stops power supply to the light emitting element so that an output signal from the light receiving element can be set in a low level when the light receiving element is moved to a position close to the medium. Accordingly, the situation in which detection of a medium is completely disabled can be evaded by controlling power supply to the light emitting element according to environment and conditions, so that the reliability is improved.

The present invention provides an image reader, in which the medium detecting unit comprises a light emitting element and a light receiving element each for optically detecting a medium, and the control processing unit provides pulse drive control for the light emitting element.

With the above invention, when the light emitting element is pulse-driven, pulsating light is emitted from the light emitting element hence the light received by the light receiving element is pulsatory, so that the light can easily be differentiated from the disturbing light. Because of this feature, by pulse-driving the light emitting element with the control processing unit, even in an environment where there is disturbing light, whether the device is on the medium or not can clearly be detected.

The present invention provides an image reader, in which there are provided a plurality of the medium detecting units, the control processing unit determines that the medium has been detected when each of the plurality of medium detecting units detects the medium simultaneously, and the image reading unit reads image information of the medium according to a result of detection by the control processing unit.

With the above invention, there are provided a plurality of medium detecting units, and reliability of the medium detecting units can be improved with a frequency of malfunctions due to disturbing light reduced by computing AND of a result of detection by each medium detecting unit.

The present invention provides an image reader, in which there are provided a plurality of the medium detecting units, the control processing unit determines that the medium has been detected when any one of the plurality of medium detecting units detects the medium, and the image reading unit reads image information of the medium according to a result of detection by the control processing unit.

With the above invention, there are provided a plurality of medium detecting units and OR of a result of detection by each medium detecting unit is computed, so that output from several medium detecting units each disabled to detect a medium are ignored and a frequency of malfunctions can be reduced.

The present invention provides an image reader, in which there are provided a plurality of image detecting units and the image reader comprises a changing unit for freely changing a method of using a result of detection by the plurality of medium detecting units in the control processing unit.

With the above invention, a method of using a result of detection by each of a plurality of medium detecting units is changed according to a difference of a factor for external disturbance causing a malfunction, but the control method can be changed by the changing unit according to an environment for use or conditions for use thereof, so that an operation for reading an image can be executed without being affected by external disturbance with the reliability improved.

The present invention provides an image reader, in which the medium detecting unit consists of a photoelectric switch for detecting the medium optically or a mechanical switch for detecting the medium mechanically.

With the above invention, necessary measures can be taken against external disturbance by using a mechanical switch or a photoelectric switch each based on a different principle of detection as a medium detecting unit, so that an operation of reading of the image can be executed without being affected by external disturbance.

The present invention provides an image reader, in which the control processing unit determines that the medium has been detected when both of the photoelectric switch and the mechanical switch detect the medium.

With the above invention, a mechanical switch and a photoelectric switch each based on a different principle of detection is concurrently used as the medium detecting unit and reliability in detection can be improved by computing AND of a result of each medium detecting unit.

The present invention provides an image reader, in which the control processing unit determines that the medium has been detected when one of the photoelectric switch or the mechanical switch detects the medium.

With the above invention, a mechanical switch and a photoelectric switch based on different principles of detection are concurrently used each as the medium detecting unit, and by computing OR of a result of detection by each medium detecting unit, even if detection by the photoelectric switch is disabled due to external disturbance, the medium can be detected by the mechanical switch, so that the reliability in detection is improved.

The present invention provides an image reader comprising a priority deciding unit for deciding and giving a preference to any one of the result of detection by the photoelectric switch or the mechanical switch in order to execute the control processing in the control processing unit.

With the above invention, a mechanical switch and a photoelectric switch based on different principles of detection are used concurrently each as the medium detecting unit, and a result of detection by one of them is preferentially employed according to an environment or conditions for use thereof, so that the reliability in detection can be improved.

The present invention provides an image reader, in which the medium detecting unit detects the medium optically and a wall is provided around the medium detecting unit.

With the above invention, the medium detecting unit is not mounted on a surface of the housing, but is provided inside the housing with walls provided around the medium detecting unit, so that a quantity of disturbing light directly entering into the medium detecting unit is reduced and hence a frequency of malfunctions reduced.

The present invention provides an image reader, in which the medium detecting unit consists of a plurality of mechanical switches each for discretely detecting the medium mechanically, the control processing unit determines that the medium has been detected when each of the plurality of mechanical switches detects the medium simultaneously, and an image reading unit reads image information of the medium according to a result of detection by the control processing unit.

With the above invention, there are a plurality of mechanical switches each as the medium detecting unit and AND of a result of detection by each medium detecting unit is computed, so that reliability of the reading medium detecting unit is improved and hence a frequency of malfunctions due to a step or the like in the medium can be reduced.

The present invention provides an image reader, in which the medium detecting unit consists of a plurality mechanical switches each for discretely detecting the medium mechanically, the control processing unit determines that the medium has been detected when any one of the plurality of mechanical switches detects the medium, and the image reading unit reads image information of the medium according to a result of detection by the control processing unit.

With the above invention, there are a plurality of mechanical switches each as the medium detecting unit and OR of a result of detection by each medium detecting unit is computed, so that, when the medium is shorter than the body of the device, a result of detection by several mechanical switches can be neglected during detection of the medium, so that a frequency of malfunction can be reduced.

The present invention provides an image reader comprising a changing unit for freely changing a control method in the control processing unit by using a result of detection in each of the plurality of mechanical switches.

With the above invention, a control method using a result of detection by each of a plurality of mechanical switches is changed according to a difference in a factor for external disturbance causing malfunction, and the control method can freely be changed according to an environment and conditions for use thereof, so that detection of a medium can normally be executed without being affected by the external disturbance.

The present invention provides an image reader, in which the medium detecting unit comprises a moving member including a main roller rotating on the medium when reading an image and capable of freely moving in the housing, and a movement detecting unit for detecting movement of the moving member.

When a photoelectric switch is used as the medium detecting unit malfunction may be caused due to disturbing light or the like. On the other hand, when a mechanical switch is used, the mechanical switch always comes in contact with the medium, so that the mechanical switch may be broken or worn out. However, in the invention the medium detecting unit comprises a moving member and a movement detecting, so that only a roller section near the main roller contacts the medium when reading an image, so that wearing or breakage of the image reader can be pre-vented. The main roller supports the substantially entire range to be read, so that, even if a step or the like is present in the medium, an operation of reading of the image is not affected by the irregularity.

The present invention provides an image reader, in which the medium detecting unit comprises a moving member including an auxiliary roller rotating on the medium when reading an image and capable of freely moving in the housing, and a movement detecting unit for detecting movement of the moving member.

With the above invention, the medium detecting unit comprising a moving member and a movement detecting unit is used, and only the roller section near the auxiliary roller contacts the medium when reading an image, so that wearing and breakage of the image reader can be prevented. Also the auxiliary roller supports almost entire range to be read, so that, even if there is a step or the like in the medium, an operation for reading an image is not affected by the irregularity. Further, precision in assembly of the auxiliary roller may be lower as compared to that in assembly of the main roller, and accordingly the cost can be reduced as compared to that when the main roller is used.

Other objects and features of this invention will become apparent from the following description with reference to the accompanying drawings.

BRIEF DESCRIPTION OF THE DRAWINGS

FIG. 38 is a view showing an example of use of the image reader 1300 according to Embodiment 13;

FIG. 39 is a front view showing general configuration of an inclination detecting section 1340 in the image reader 1300 according to Embodiment 13;

FIG. 68 is a view showing a method of dividing a screen in the image reader 1300 according to Embodiment 13;

FIG. 68 is a view showing a method of dividing a screen in the image reader 1300 according to Embodiment 13;

FIG. 101 is a view showing operations of the image reader 2600 according to Embodiment 22;

FIG. 103 is a partially cut side view showing configuration of an image reader 2800 according to Embodiment 24 of the present invention;

DESCRIPTION OF THE PREFERRED EMBODIMENTS

Detailed description is made hereinafter for embodiments of the image reader according to the present invention with reference to the related drawings.

Figure 1:
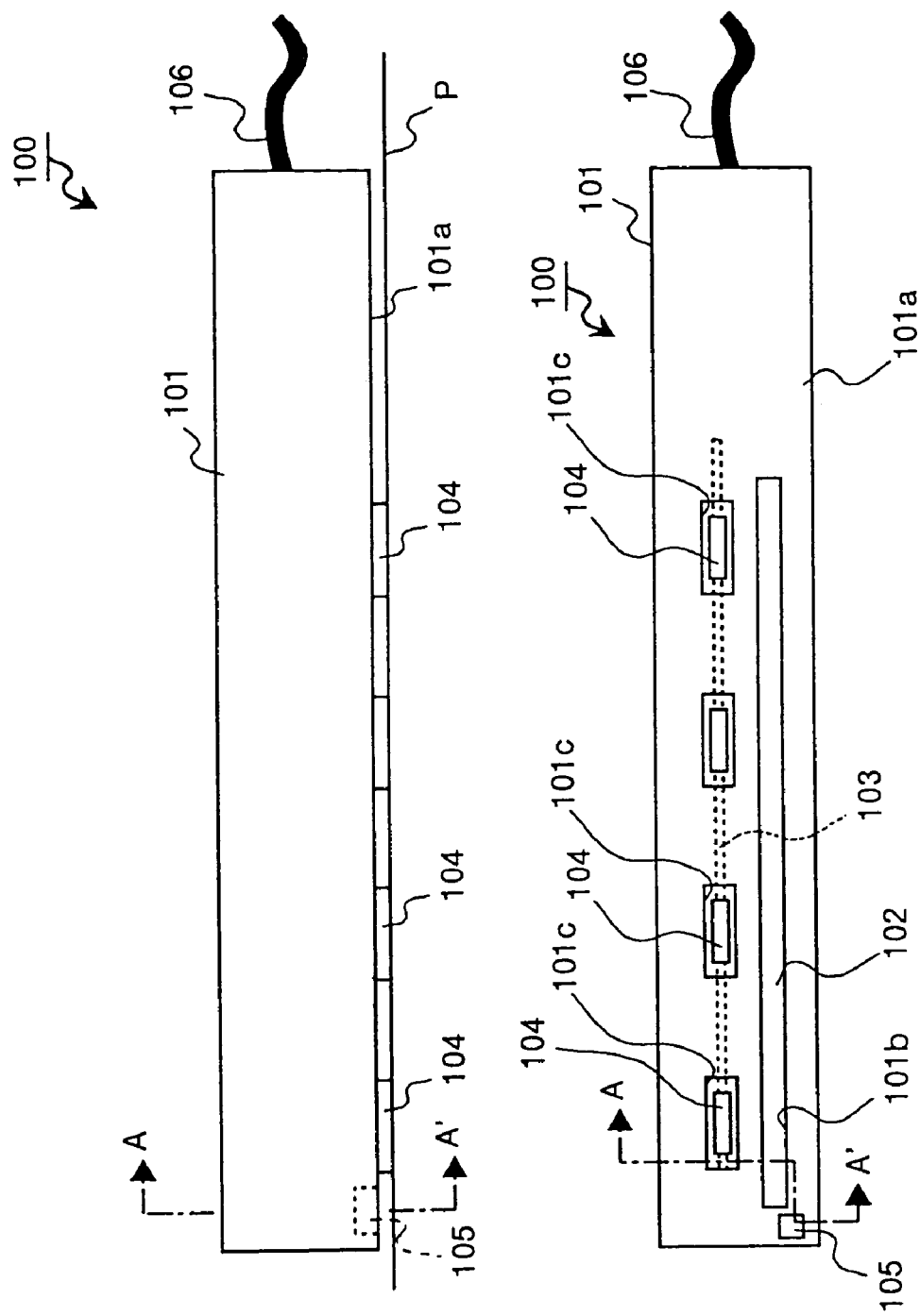
FIG. 1 is a view showing appearance and configuration of an image reader 100 according to Embodiment 1 of the present invention.

An image reader 100 according to Embodiment 1 of the present invention will be described with reference to FIG. 1 to FIG. 4. FIG. 1 shows a front view (top figure) and a rear view (bottom figure) of the image reader 100 according to Embodiment 1 of the present invention.

The image reader 100 shown in FIG. 1 is a device for optically and successively inputting images for a plurality of lines line by line when held by a user and slid along a surface of a document P (a medium) located under the image reader 100. In the from view of image reader 100 shown in FIG. 1, a housing 101 is made from synthetic resin and has a rectangular form. Various types of components such as a data processing section 112A and scanner section 111 each described afterwards are accommodated therein. A rear surface of this housing is an image reading surface 101a, and is contacted to and slid along a surface of the document P.

In the image reading surface of the housing 101 shown in the rear view in FIG. 1, an image reading window 101b is formed along a long edge thereof in the longitudinal direction, and plays a role as an irradiation port for reflected light to the document P and also a role as an inlet port for the reflected light reflected on the document P. A width of this image reading window 101b in the longitudinal direction corresponds to an image reading width of the image reader 100 to the document P, and the width is slightly larger than the width of the document P (105 mm) with the size A6 (105 mm×148 mm).

A transparent protection cover 102 is attached to and covers the image reading window 101b. The cover 102 protects components (not shown) of an optical system provided inside the housing 101, and also prevents dust or other foreign materials from coming inside of the housing 101. Rectangular holes 101c, 101c, . . . are provided at a specified clearance therebetween along another long edge of the housing 101 in parallel to the image reading window 101b.

A shaft 103 is pivotably supported by a support not shown herein so that the shaft can freely rotate inside the housing 101 and is provided along the rectangular holes 101c, 101c, . . . . Rollers 104, 104 . . . are provided in correspondence to the rectangular holes 104c, 104C . . . and penetrate the shaft 103 at a specified gap therebetween. Namely the rollers 104, 104 . . . are rotated in correlation to each other by the shaft 103.

These rollers 104, 104 . . . are provided in such a way that the rollers slightly project from the image reading surface 101a to the side of document P as shown in the front view in FIG. 1, and when the document P slide over the rollers, the rollers rotate with the shaft 103.

As shown in the rear view in FIG. 1, an image detecting section 105 is provided near the image reading window 101b on the image reading surface 101a. When the image reader 100 is at the position where the image reading surface 101a is closer to the document P, the document detecting section 105 detects the document P located under the image reader 100.

Figure 2:
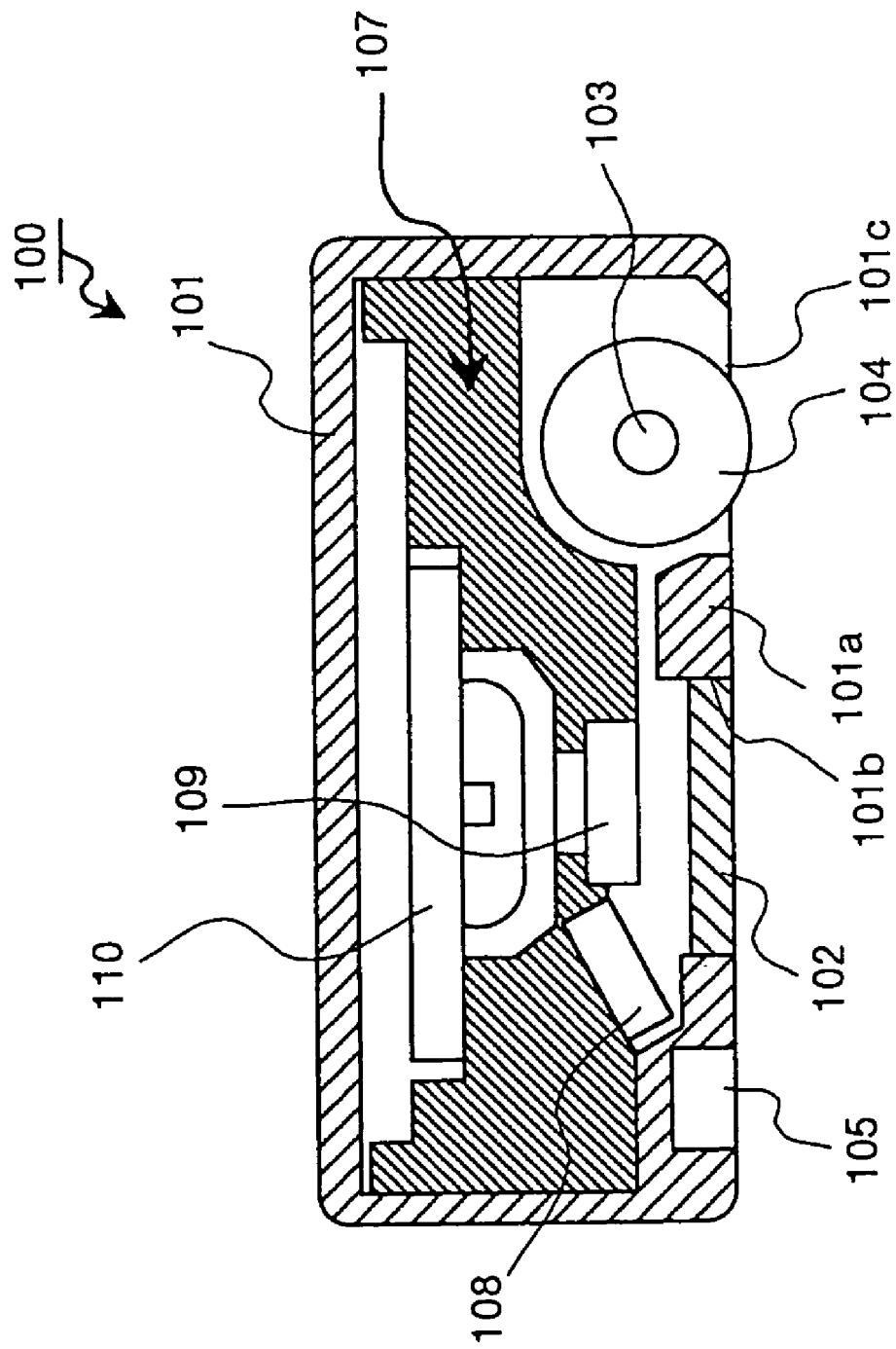
FIG. 2 is a cross-sectional view showing the image reader 100 taken along line A-A' shown in FIG. 1.

Next description is made for internal configuration of the image reader 100 of FIG. 1 with reference to FIG. 2. FIG. 2 is a cross-sectional view showing a cross section taken along the line A-A' in FIG. 1. In this view, the same reference numerals are assigned to corresponding sections in FIG. 1, and description thereof is omitted herein.

In FIG. 2, an image reading section 107 is an optical system provided inside the housing 101 and comprises a light source 108, a lens 109, and an image sensor 110. The light source 108 is provided near and diagonally above the image reading window 101b (transparent protection cover 102), and irradiates light via the transparent protection cover 102 onto the document P (Refer to FIG. 1). As this light source 108, for instance, a light emitting diode or a cooled cathode tube may be used.

The lens 109 is provided diagonally above the image reading window 101b (transparent protection cover 102), and collects the light emitted from the light source 108 and reflected by the document P via the transparent protection cover 102.

An image sensor 110 is a line sensor comprising a plurality of image sensors (for instance, CCD (Charge-Coupled Device)) one-dimensionally arrayed in a linear state along the image reading window 101b, and reads image data for one line on the document P (Refer to FIG. 1). This image sensor 110 is provided above the lens 109, converts the reflected light collected by the lens 109 to an electric signal, and outputs the electric signal as image data by one line.

Figure 3:
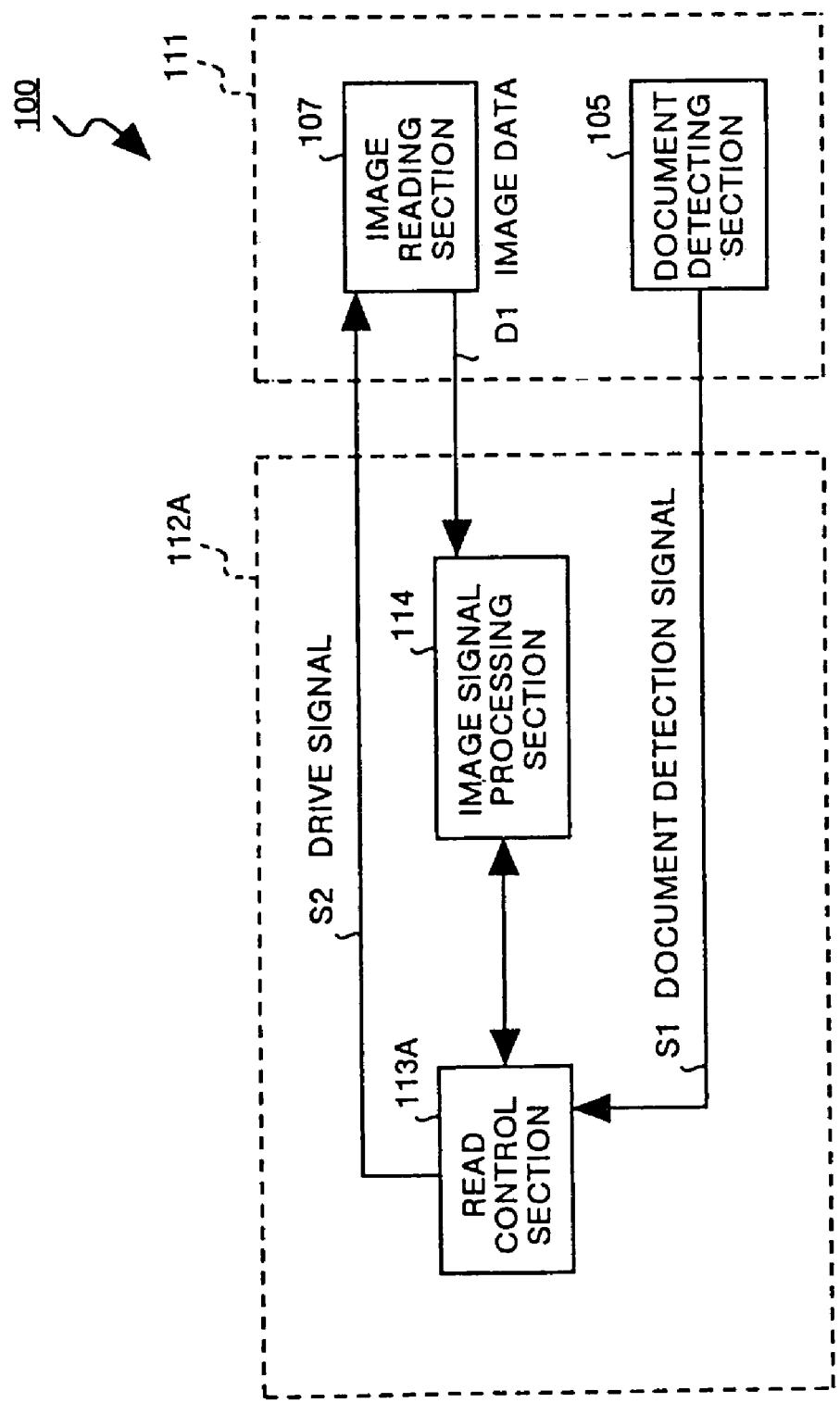
FIG. 3 is a block diagram showing electric configuration of the image reader 100 according to Embodiment 1.

FIG. 3 is a block diagram showing electric configuration of the image reader 100 according to Embodiment 1 described above. In this figure, the same reference numerals are assigned to components corresponding to those in FIG. 1 and FIG. 2. As shown, the image reader 100 comprises a scanner section 111 and a data processing section 112A.

In the scanner section 111, the image reading section 107 (Refer to FIG. 2) successively reads images each for one line on a document P according to a drive signal S2 inputted at a specified time interval from a read control section 113A described later as a trigger, and output the images as image data D1. When the document detecting section 105 (Refer to FIG. 2) detects the document P it outputs a document detection signal S1 as a result of detection.

In the data processing section 112A, an image signal processing section 114 compares the image data D1 (analog data) inputted from the image reading section 107 with a threshold value, and executes digitizing or other processing to the image data D1. The read control section 113A outputs a drive signal S2 for driving and controlling the image reading section 107 according to a document detection signal S1 as a trigger, and provides controls such as reading image data D1 having been subjected to processing by the image signal processing section 114.

Next, operations of the image reader 100 according to Embodiment 1 of the present invention will be described with reference to a flow chart shown in FIG. 4. When a power switch not shown is turned ON in a state where the image reader 100 (document detecting section 105) of FIG. 1 is not placed near the document P, the read control section 113A of FIG. 3 performs the processing in step SA1 (Refer to FIG. 4) where a number of lines to be read as image data is specified (set), and then the processing shifts to step SA2.

Herein the phrase of "a number of lines" indicates a number of lines on the document P in a direction in which the image reader 100 is moved (described as scanning direction). Multiplication of the number of lines by a width of the image reading window 101b in the longitudinal direction provides an area in which an image can be read with the image reader 100.

In step SA2, the image control section 113A determines whether a document P is detected by the document detecting section 105 or not, in other words, whether the document detection signal S1 is inputted from the document detecting section 105 or not. At this stage, as the document detecting section 105 shown in FIG. 1 is not located near the document P and the document detection signal S1 is not outputted from the document detecting section 105, the read control section 113A recognizes a result of determination in step SA2 as "No", and repeats the same determination.

Then the user places the image reader 100 on the document P in such a way that the image reading surface 101a contacts the document P in a state where the user is grasping the image reader 100 as shown in FIG. 1. As the document detecting section 105 and document P are get closer to each other, a document detection signal S1 is outputted from the document detecting section 105 to the read control section 113A.

With this, the read control section 113A recognizes a result of determination in step SA2 as "Yes", and system control shifts to step SA3. In step SA3, the read control section 113A successively outputs a drive signal S2 at a specified interval to the image reading section 107. Thus, each time the drive signal S2 is inputted from the image reading section 107, image data D1 for one line on the document P is outputted to an image signal processing section 114, and the image data D1 is digitized by the image signal processing section 114 and then is inputted into the read control section 113A.

With this operation, in step SA3, the read control section 113A reads the inputted image data D1 for one line. Herein the user slides the image reader 100 in the scanning direction. The rollers 104, 104, . . . rotate due to a frictional force between the document P shown in FIG. 1 and the rollers 104, 104, . . . Accordingly, the user can smoothly slide the image reader 100 in the scanning direction because the rollers 104, 104, . . . rotate. During this sliding operation, each time the drive signal S2 is inputted, image data D1 for one line is successively inputted from the image reading section 107 via the image signal processing section 114 to the read control section 113A. Thus, a scanning operation is executed.

Then in step SA3, when the read control section 113A reads the image data D1 for one line the system control shifted to step SA4 where the document detecting section 105 determines whether the document P has been detected or not. Herein, while the image reader 104 is sliding over the document P, in other words, while the scanning operation is being executed, as the document detecting section 105 is located at a position close to the document P, the document detection signal S1 is outputted from the document detecting section 105 to the read control section 113A.

In this case, a scanning operation is being performed, and the document detection signal S1 is being inputted from the document detecting section 105 to the read control section 113A, so that the read control section 113A recognizes a result of determination in step SA4 as "Yes" and the system control shifts to step SA5. In step SA5, the read control section 113A determines whether image data D1 for a specified number of lines has been read in step SA1 or not. In this case, if a total number of lines corresponding to the read image data D1 is less than a specified number, the read control section 113A recognizes a result of determination in step SA5 as "No" and the system control is returned to step SA3. The read control section 113A repeats the sequence of operations described above. Then in step SA3, the operating sequence for reading image data D1 for a second line and one is executed. Then in step SA5, when a number of lines corresponding to the read data D1 reaches a specified number, the read control section 113A recognizes a result of determination as "Yes", and terminates the operation of reading of the image.

During the scanning operation described above, when the user separates and takes the image reader 100 (document detecting section 105) away from the document P to terminate the operation for reading an image, output of the document detection signal S1 from the document detecting section 105 is stopped. With this, the read control section recognizes a result of determination in step SA4 as "No", and terminates the operation of reading of the image.

As described above, with the image reader 100 according to Embodiment 1 of the present invention described above, the read control section 113A determines whether reading has been started or terminated or not according to a result of detection by the document detecting section 105 (document detection signal S1). Thus, it is not required for a user to operates a switch for giving instructions for starting or terminating an operation of reading of the image like in the conventional technology, so that convenience in use is improved.

Detailed description was made for the image reader 100 according to Embodiment 1 of the present invention, but configuration of the image reader 100 is not limited to that described above, and modifications and changes in a design of the image reader within a gist of the present invention are included in the present invention. For instance, in the image reader 100 according to Embodiment 1 described above, as shown in FIG. 1, the document detecting section 105 is attached at a position near the image reading window 101b, but the configuration is not limited to this one, and the image reading window 101b may be provided at any position on the image reading surface 101a. In brief, the any position is allowable on the condition that the image reading window and the document detecting section 105 are in the same plain (image reading surface 101a).

The image reader 100 according to Embodiment 1 described above is connected via the cable 106 shown in FIG. 1 to a computer (not shown), so that the image reader 100 functions as a peripheral device for the computer. However, the image reader 100 may be of a stand-alone type.

Figure 4:
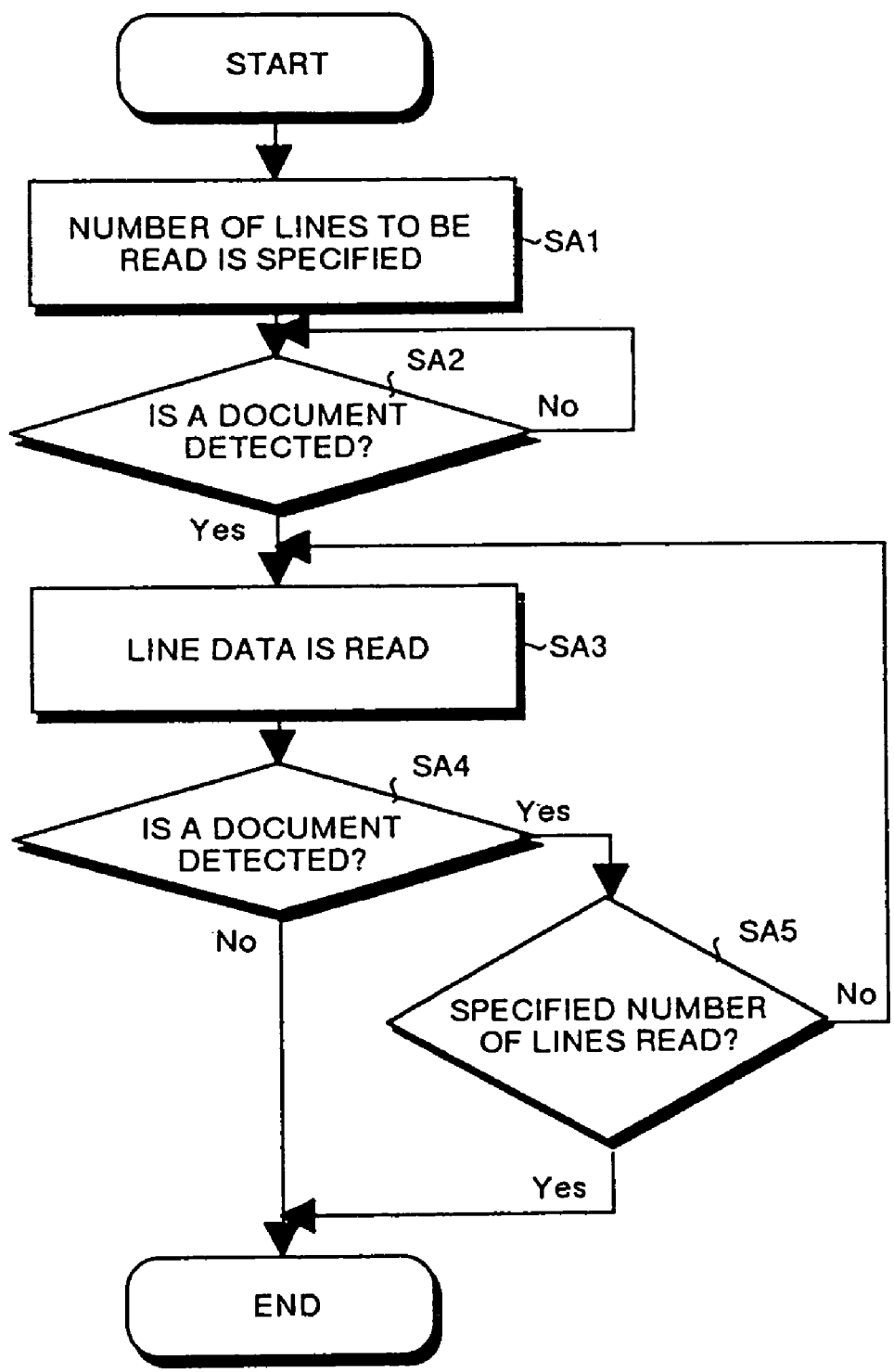
FIG. 4 is a flow chart showing operations of the image reader 100 according to Embodiment 1.
Figure 5:
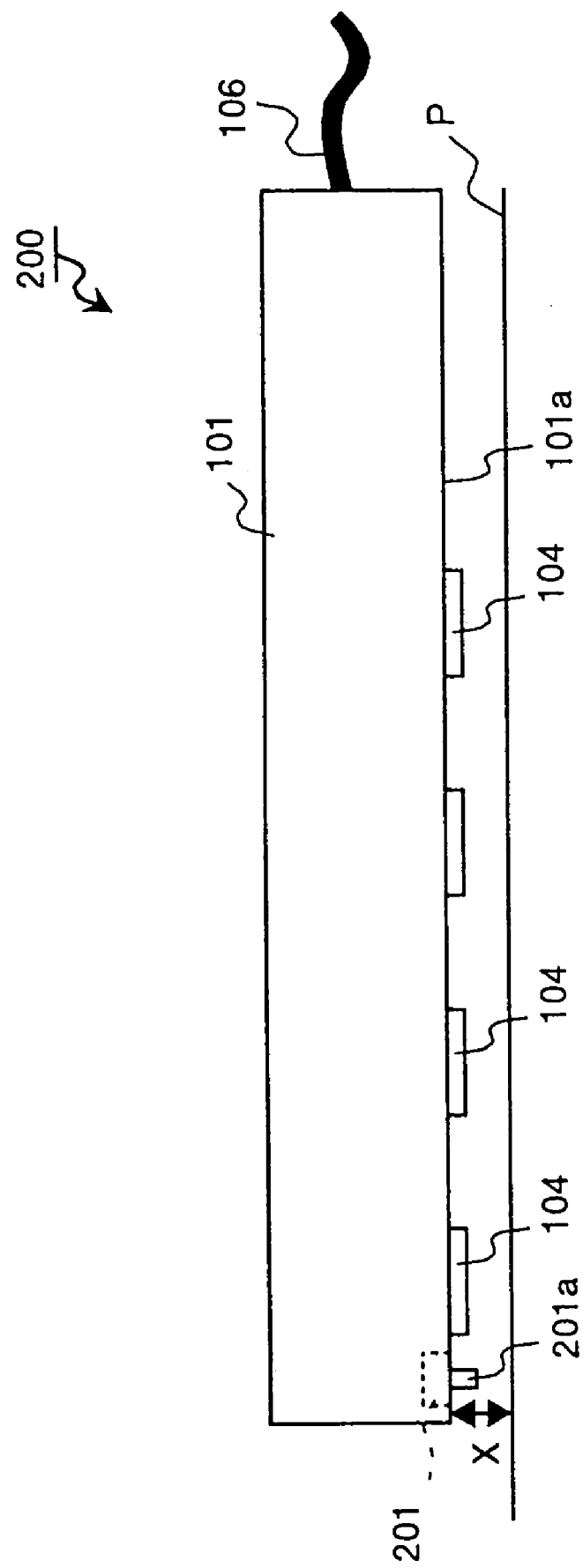
FIG. 5 is a side view showing appearance and configuration of an image reader 200 according to Embodiment 2 of the present invention.
Figure 6:
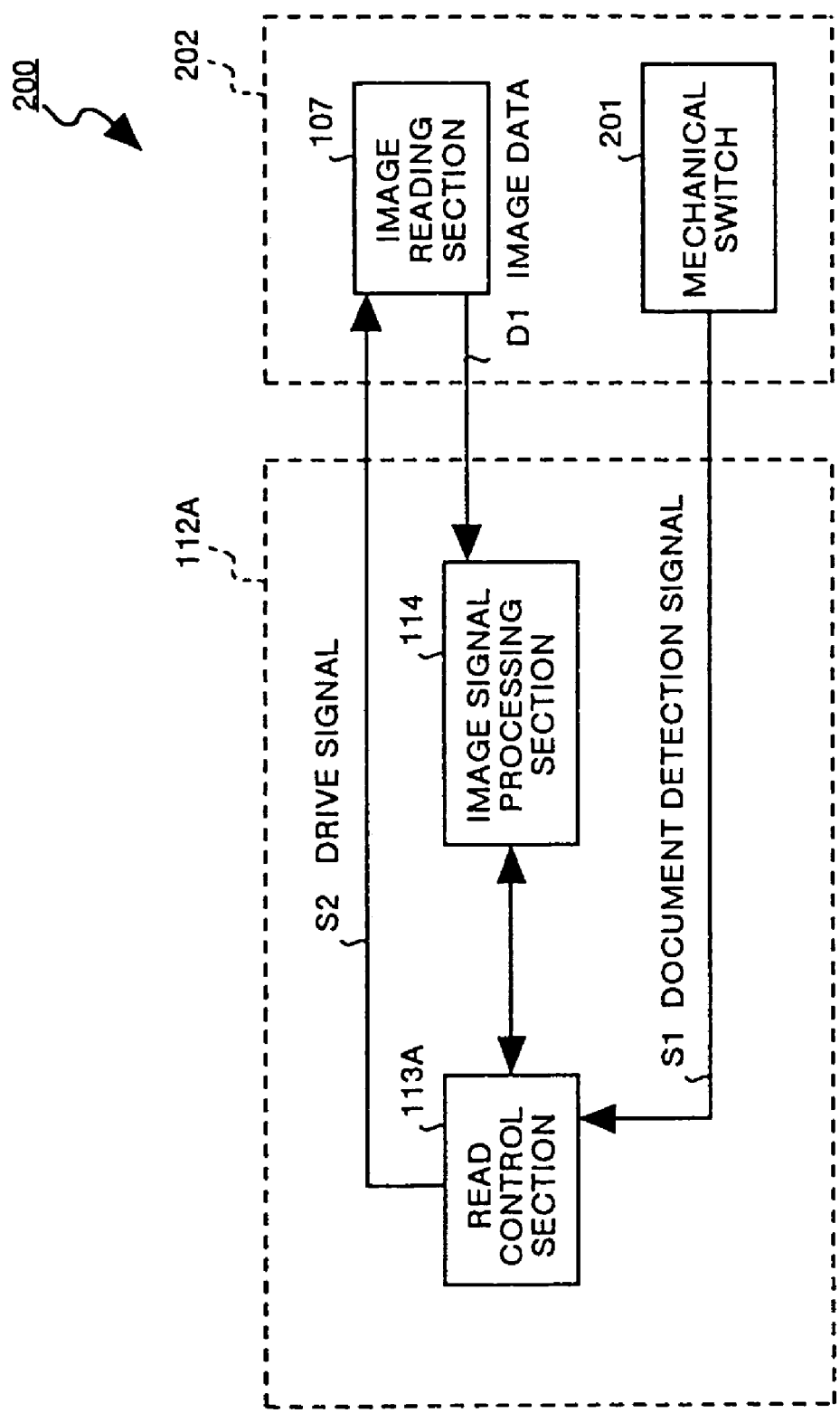
FIG. 6 is a block diagram showing electric configuration of the image reader 200 according to Embodiment 2.

Description is made for an image reader 200 according to Embodiment 2 of the present invention with reference to FIG. 4 to FIG. 6. FIG. 5 is a side view showing appearance and configuration of the image reader 200 according to Embodiment 2. In this figure, the same reference numerals are assigned to components corresponding to those in FIG. 1, and description thereof is omitted herein. In FIG. 5, a mechanical switch 201 is used in place of the document detecting section 105 shown in FIG. 1.

The mechanical switch 201 is attached to the image reading window 101a, and has a knob 201a capable of reciprocally moving in a direction perpendicular to the direction of the image reading surface 101a (in the direction indicated by arrow X in the figure). This mechanical switch 201 detects a document P like the document detecting section 105 (Refer to FIG. 1), and performs the operation mechanically. Namely, when the 201a comes in contact with the document P and a displacement (movement) thereof due to a repulsive force from the document P in the direction indicated by arrow X exceeds a threshold value, the mechanical switch 201 outputs a document detection signal S1 (Refer to FIG. 6).

FIG. 6 is a block diagram showing electric configuration of the image reader 200 according to Embodiment 2, and in this figure, the same reference numerals are assigned to components corresponding to those in FIG. 3 and FIG. 5. In FIG. 6, a scanner section 202 is provided in place of the scanner section 111 shown in FIG. 3.

In this scanner section 202, the mechanical switch 201 (Refer to FIG. 5) is provided in place of the document detecting section 105 shown in FIG. 3. This mechanical switch 201 outputs a document detection signal S1 to the read control section 113A when a displacement of the movable piece 201a (Refer to FIG. 5) exceeds the threshold value.

Description is made for operations of the image reader 200 according to Embodiment 2 described above with reference to FIG. 4. In FIG. 5, in a state where the image reader 200 (mechanical switch 201) is not located near the document P, when a power switch not shown is turned ON, the read control section 113A shown in FIG. 6 performs the processing in step SA1 (Refer to FIG. 4) where a number of lines for image data to be read is specifies (sets), and then the system control shifts to step SA2.

In step SA2, the read control section 113A determines whether a document P is detected by the mechanical switch 201 or not by checking whether the document detection signal S1 has been received from the mechanical switch 201 or not. At this stage, the knob 201a of the mechanical switch 201 shown in FIG. 5 does not come in contact with the document P, and hence the document detection signal S1 is not outputted from the mechanical switch 201. Thus, the read control section 113A recognizes a result of determination in step SA2 as "No", and repeats the same determination.

It is assumed herein that a user is grasping the image reader 200 shown in FIG. 5 for reading an image as described above and has placed the image reader 200 on the document P so that the image reading surface 101a contacts the document P. With this, as the knob 201a of the mechanical switch 201 contacts the document P and receives a repulsive force from the document P, the knob 201a moves in the upward direction (direction X) as shown in the figure. When a displacement of the knob 201a exceeds a threshold value, the document detection signal S1 is outputted from the mechanical switch 201 shown in FIG. 6 to the read control section 113A.

With this, the read control section 113A recognizes a result of determination in step SA2 as "Yes", shifts the system control to step SA3, and successively outputs a drive signal S2 at a specified interval to the image reading section 107. In this step and on, as described above, each time the drive signal S2 is inputted, image data D1 for one line on the document P is outputted to the image signal processing section 114. With this operation, the read control section 113A reads the image data D1 having been digitized by the image signal processing section 114.

When the user slides the image reader 200 in the scanning direction, image data D1 for one line is successively inputted from the image reading section 107 via the image signal processing section 114 into the read control section 113A. Thus, a scanning is performed. In step SA4, the read control section 113A determines whether the document P has been detected by the mechanical switch 201 or not, and in this case, it is determined that the document detection signal S1 has been inputted from the mechanical switch 201, and the read control section 113A recognizes a result of determination as "Yes" and system control is shifted to SA5. Thus, the read control section 113A repeats the process described above.

When the user separates the image reader 200 from the document P to terminate the operation of reading of the image during the scanning operation described above, as a repulsive force from the document P acting on the knob 201a of the mechanical switch 201 becomes zero, the knob 201a returns to its initial position. As a result, the mechanical switch 201 stops the output of the document detection signal S1, so that the read control section 113A recognizes a result of determination in step SA4 as "No", and terminates the operation of reading of the image.

As described above, with the image reader 200 according to Embodiment 2, the mechanical switch 201 is provided, and the read-control section 113A determines start and end of reading according to a result of detection by this mechanical switch 201 (document detection signal S1). Thus, a user is not required to operate a switch for giving an instruction for starting and termination an operation for reading an image, so that convenience in practical use can be improved in the same manner as the image reader 100 according to Embodiment 1 of the present invention.

With the image reader 200 according to Embodiment 2 described above, in addition to the effects described above, there is provided an effect that a malfunction due to influence by electric noises does not occur because the mechanical switch 201 for detecting a document P with a mechanical system is used. Because of this feature, with the image reader 200 according to Embodiment 2, precision in detection of a document P with the mechanical switch 201 is very high, so that undesirable movement of paper does not occur and precision in reading an image can be improved.

Further with the image reader 200 according to Embodiment 2 described above, the mechanical switch 201 which acts mechanically is employed, so that a control circuit for controlling operations thereof is not required and the cost can be reduced.

Detailed description was made above for the image reader 200 according to Embodiment 2 of the present invention, but configuration of the image reader according to the present invention is not limited to Embodiment 2, and modifications and changes in its design within a gist of the present invention are included in this invention. In Embodiment 2 above, the mechanical switch 201 having the knob 201a was described as a unit for detecting a document P in the image reader 200 according to Embodiment 2, but configuration is not limited to this one, and any type of detecting unit may be used on the condition that it can detect a document P by means of mechanical operations.

With the image reader 200 according to Embodiment 2 described above, like the image reader 100 according to Embodiment 1, the mechanical switch 201 shown in FIG. 5 may be provided at any position so long as the position is within the image reading surface 101a.

Figure 7:
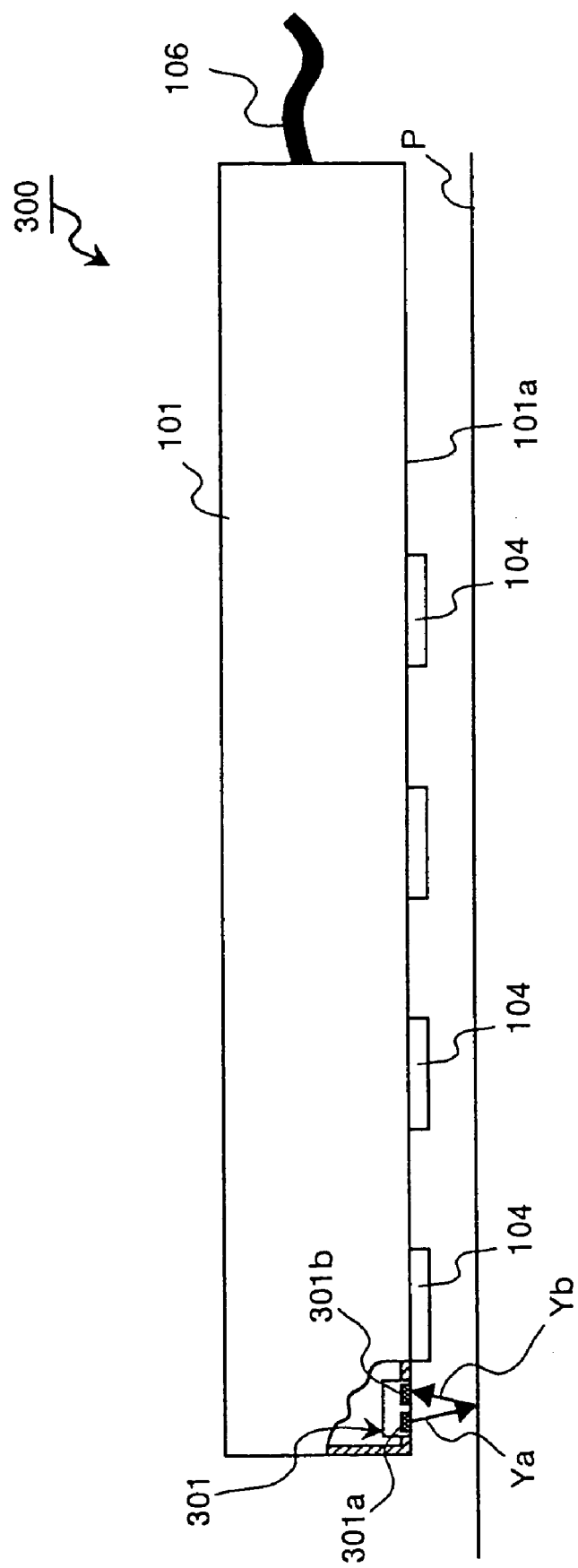
FIG. 7 is a partially cut side view showing appearance and configuration of an image reader 300 according to Embodiment 3 of the present invention.

An image reader 300 according to Embodiment 3 of the present invention will be described with reference to FIG. 4 and FIG. 7 to FIG. 9. FIG. 7 is a partially-cut side view showing appearance and configuration of the image reader 300 according to Embodiment 3. In this figure, the same reference numerals are assigned to components corresponding to those in FIG. 1, and description thereof is omitted herein. In FIG. 7, a photoelectric switch 301 is provided in place of the document detecting section 105 shown in FIG. 1.

The photoelectric switch 301 is a photo-interrupter attached to the image reading surface 101a and optically detects the document P. This photoelectric switch 301 comprises a light emitting element 301a for emitting light Ya in a forward direction (towards the direction of the document P shown in the figure), and a light receiving element 301b for receiving light (reflected light Yb in the figure).

Figure 8:
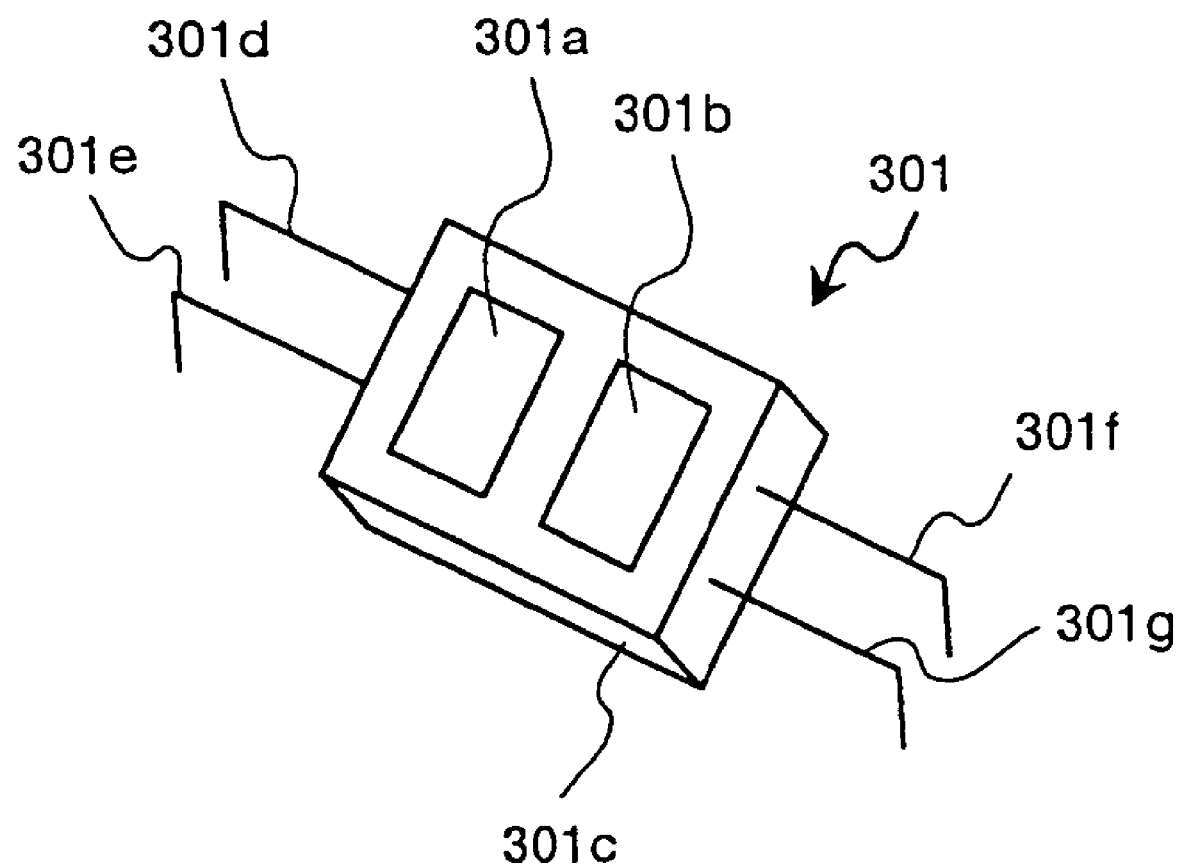
FIG. 8 is a perspective view showing appearance and configuration of the photoelectric switch 301 shown in FIG. 7.

Next, configuration of the photoelectric switch 301 will be described with reference to FIG. 8. In the photoelectric switch 301 shown in this figure, the light emitting element 301a and light receiving element 301b are located adjacent to each other, and are integrated into a package 301c. Dimension of this photoelectric switch 30 are, for instance, 3 mm (in the lateral direction)×4 mm (in the longitudinal direction)×2 mm (thickness).

The light emitting element is, for instance, an infrared light emitting diode, and emits light Ya as described above. On the other hand, the light receiving element 301b is, for instance a photo-register, and receives the entering light and outputs a light signal S4 corresponding to amplitude of the received light (Refer to FIG. 9).

Herein the light receiving element 301b is an element for receiving the reflected light Yb from the document P (reflecting surface) as shown in FIG. 7, and a level of the received light signal S4 reaches a peak value when a distance between a surface of the light emitting element 301a (or the light receiving element 301b) and the document P (reflecting surface) is 1 mm. The level of the signal S4 decreases as the distance between the element 301a and the document P increases.

Connector 301d and a connector 301e are connected to an anode and a cathode of the light receiving element 301a respectively, further a connector 301f and a connector 301g are connected to an emitter and a collector of the light receiving element 301b.

Figure 9:
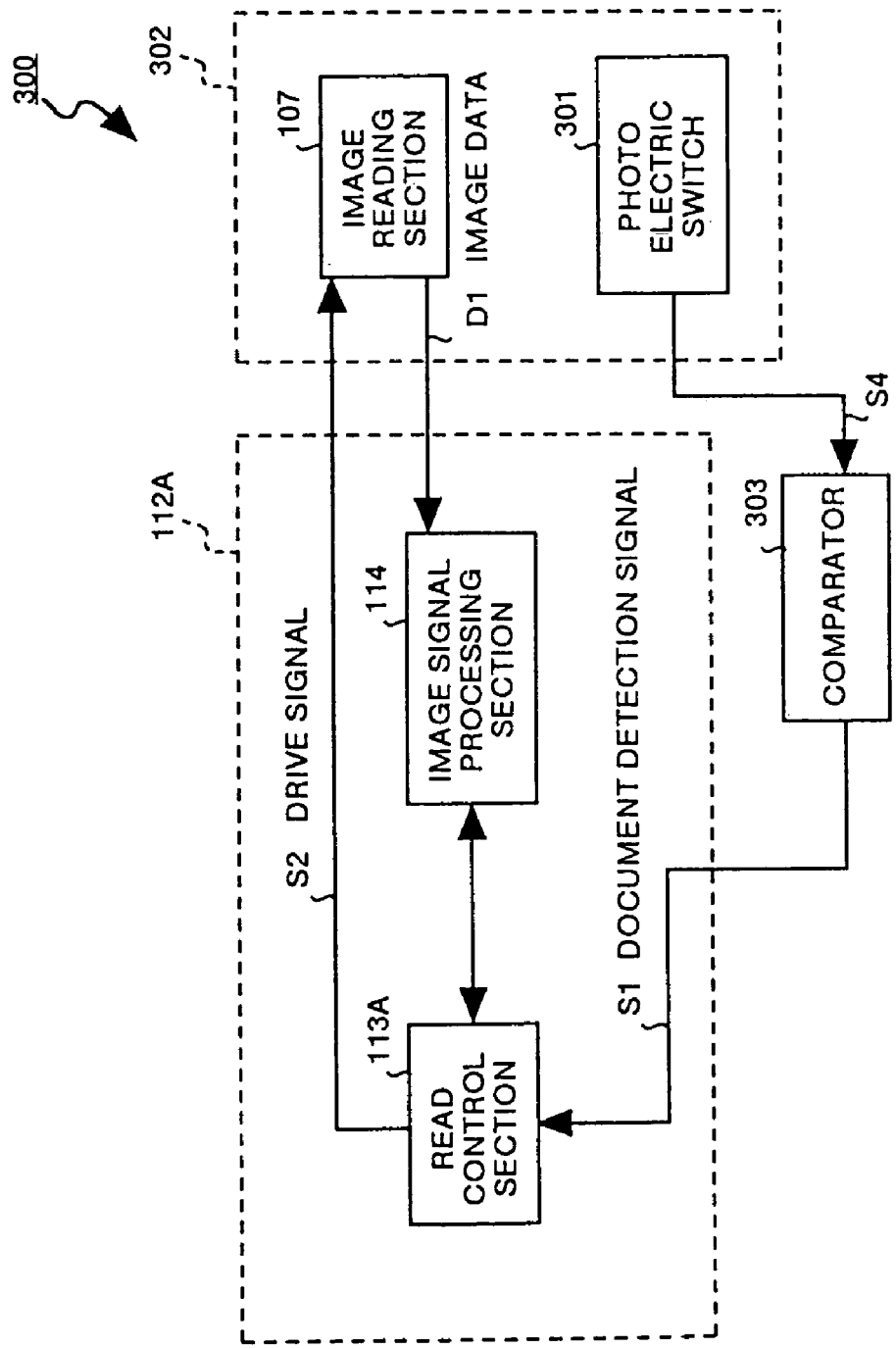
FIG. 9 is a block diagram showing electric configuration of the image reader 300 according to Embodiment 3.

FIG. 9 is a block diagram showing electric configuration of the image reader 300 according to Embodiment 3 described above. In this view, the same reference numerals are assigned to components corresponding to those in FIG. 3 and FIG. 7. In FIG. 9, a scanner section 302 is provided in place of the scanner section 111 shown in FIG. 3. In this scanner section 302, a photoelectric switch 301 is provided in place of the document detecting section 105 shown in FIG. 3. In addition, in FIG. 9, a comparator 303 is newly provided.

In FIG. 9, the photoelectric switch 301 outputs the light signal S4 corresponding to intensity of the light received by the light receiving element 301b (Refer to FIG. 7). The comparator 303 is provided between the photoelectric switch 301 and the read control section 113A, and compares a preset threshold value to a level of the received light signal S4 inputted from the photoelectric switch 301. Herein the threshold value corresponds to a distance enabling reading of an image read by the image reader 300 (described as image read enabling distance).

The comparator 303 outputs a document detection signal S1 indicating that the document P has been detected to the read control section 113A when a level of the light signal S4 is less than the threshold value, and stops output of the document detecting signal S1.

Operations of the image reader 300 according to Embodiment 3 will be described while referring to FIG. 4. In FIG. 7, in a state where the image reader 300 (photoelectric switch 301) is not located at a position close to the document P), when a power switch not shown herein is turned ON, the read control section 113A shown in FIG. 9 shifts the system control to step SA1 (Refer to FIG. 4) where a number of lines for image data to be read like in the operation is specified (set), and then the system control is shifted to step SA2.

In step SA2, the read control section 113A determines whether a document P has been detected by the photoelectric switch 301 or not by checking whether the document detection signal S1 has been inputted from the comparator 303 or not. In this case, if and when a distance between the photoelectric switch 300 shown in FIG. 7 and the document P is more than the image read enabling distance described above, the reflected light Yb obtained by reflecting the light Ya emitted from the light emitting element 301a on the reflecting surface enters into the light receiving element 301b in a very small quantity (or does not enter at all).

Accordingly, in this case, even if the light signal S4 is received from the photoelectric switch 301 shown in FIG. 9, as the level of the light signal S4 is less than the threshold value, the comparator 303 does not output the document detection signal S1 to the read control section 301. Therefore, the read control section 113A determines that the document P is not detected by the photoelectric switch 301, recognizes a result of determination in step SA2 as "No", and repeats the same operation for determination.

Then the user places the image reader 300 on the document P in such a way that the image reading surface 101a contacts the document P in a state where the user is grasping the image reader 300 shown in FIG. 7 like in the operation described above. With this operation, a distance between the photoelectric switch 301 (to be precise the light emitting element 301a and the light receiving element 301b) and the document P decreases gradually, so that a quantity of the light Ya reflected from the document P becomes larger, and as a result, a quantity of light entering onto the light receiving element 301b increases.

When the image reading surface 101a (photoelectric switch 301) is brought closer to the document P, the level of the light signal S4 outputted from the photoelectric switch 301 shown in FIG. 9 increases, so that a level of the received light signal S4 surpasses the threshold value in the comparator 303.

With this, the document detection signal S1 is outputted from the read control section 113A and the read control section 113A recognizes a result of determination in step SA2 as "Yes", and the system control shifts to step SA3.

In step SA3, the read control section 113A successively outputs a drive signal S2 to the image reading section 107 at a specified interval like in the operation described above. In this step and on, like in the operation described above, each time a drive signal S2 is inputted from the image reading section 107, image data D1 for one line on the document P is outputted to the image signal processing section 114. With this, an image for one line on the document P having been subjected to processing by the image signal processing section 114 is successively read by the read control section 113A as the image data D1.

When the image reader 300 is slid by a user in the scanning direction, image data D1 for one line is successively inputted from the image reading section 107 via the image signal processing section 114 to the read control section 113A, thus a scanning is performed.

In step SA4, the read control section 113A determines whether the document P has been detected by the photoelectric switch 301 or not, and in this case, the read control section 113A determines that the document detection signal S1 has been inputted from the comparator 303, recognizes a result of determination as "Yes" and the system control is shifted to step SA5. Then, the read control section 113A repeats the process described above.

During the scanning, if a user separates the image reader 300 from the document P and takes it away to terminate the operation for reading an image, as a distance between the image reading surface 101a (to be precise the photoelectric switch 301) and the document P increases, so that a quantity of light Yb entering onto the light receiving element 301b relatively decreases.

When the level of the light signal S4 outputted from the photoelectric switch 301 shown in FIG. 9 becomes lower than the threshold value, the comparator 303 stops the output of the document detection signal S1. With this operation, the read control section 113A determines that the document P is not detected by the photoelectric switch 301, recognizes a result of determination in step SA4 as "No", and terminates the operation of reading of the image.

As described above, with the image reader 300 according to Embodiment 3 described above, the photoelectric switch 301 and comparator 303 are provided to compare a level of the light signal S4 to a threshold value, and start and end of reading is determined by the read control section 113A according to a result of comparison. Thus, different from an image reader based on the conventional technology, a user is not required to operate a switch for giving instructions for starting or terminating an operation of reading of the image, so that convenience in practical use can be improved in the same manner as the image reader 100 according to Embodiment 1 described above.

With the image reader 300 according to Embodiment 3 described above, in addition to the effect described above, presence of a document P is detected using the photoelectric switch 301 by not contacting the document, so that degradation due to friction with the document P does not occur.

Accordingly, with the image reader 300 according to Embodiment 3 described above, the image reader 300 does not directly contact the document P, so that life of the components (photoelectric switch 301) is prolonged. In addition, with the image reader 300 according to Embodiment 3, during a scanning operation, the photoelectric switch 301 is not affected by the irregularities on a surface of the document P so that an error in the read image does not occur. Thus, precision in image reading can be improved.

Detailed description was made above for the image reader 300 according to Embodiment 3, but configuration of the image reader according to the present invention is not limited to this one, and modifications and changes within a gist of the present invention are included in the present invention. For instance, in the image reader 300 according to Embodiment 3 described above, a document P is detected by using the photoelectric switch 301 (photo-interrupter), but the configuration is not limited to this one, and any type of switch may be used on the condition that it can optically detect a document P.

Figure 10:
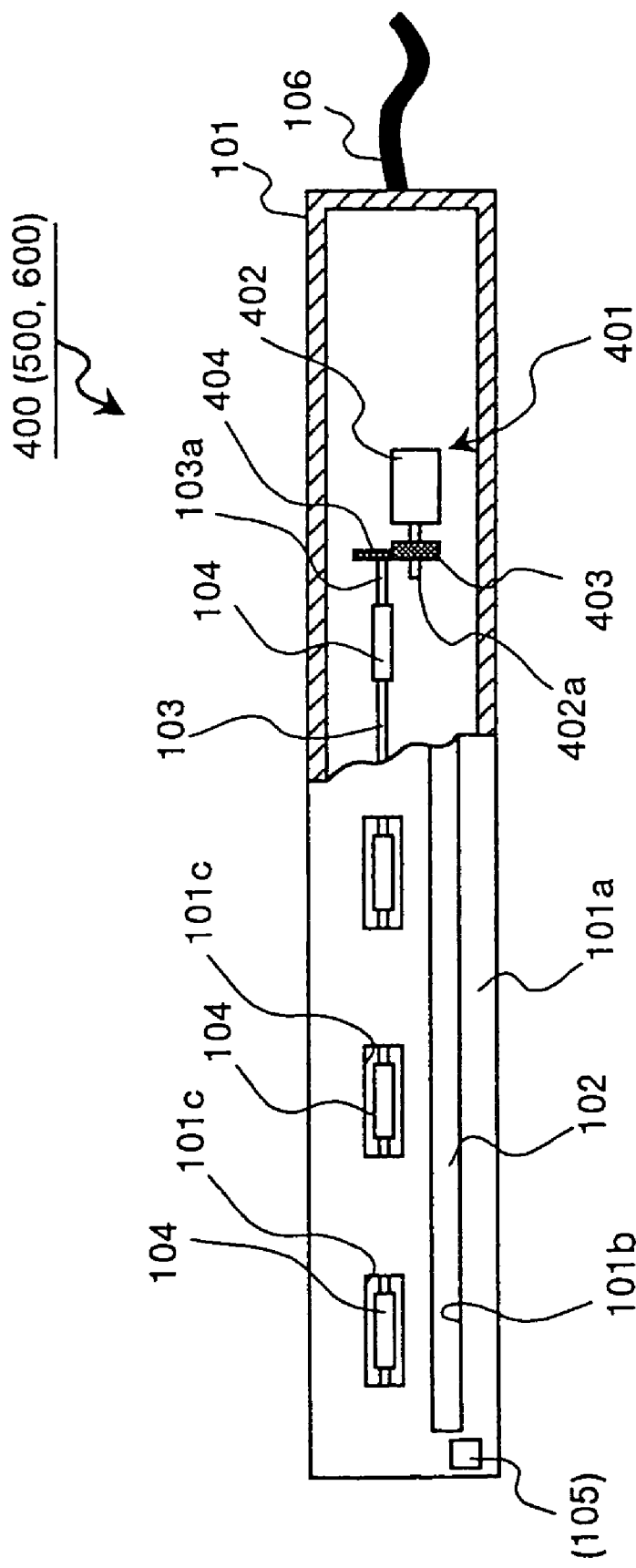
FIG. 10 is a partially cut flat view showing appearance and configuration of an image reader 400 and image reader 500 according to Embodiment 4 of the present invention.

An image reader 400 according to Embodiment 4 of the present invention will be described with reference to FIG. 10 to FIG. 12. FIG. 10 is a partially cut plan view showing appearance and configuration of the image reader 400 according to Embodiment 4. In this figure, the same reference numerals are assigned to components corresponding to those in the rear view in FIG. 1, and description thereof is omitted herein. In FIG. 10, a displacement detecting section 401 is newly provided therein. It is assumed that the document detecting section 105 shown in the figure is not provided in the image reader 400 according to Embodiment 4.

The displacement detecting section 401 is provided inside the housing 101 in the right side of the figure, and detects the rotation of a roller 104, in other words, a displacement of the image reader 400 during the scanning operation. The displacement detecting section 401 comprises a rotary encoder 402, gears 403 and 404.

The rotary encoder 402 is an incremental type of optical encoder which optically detects an angle of rotation has high resolution and is not affected by noise. This rotary encoder 402 comprises an input shaft 402a rotatably provided therein, a rotary plate with slits formed in the radius direction for passing light which rotates together with the input shaft 402a, and a light emitting element for irradiating light onto the rotary plate, and a light receiving element for receiving the light passing through the slit of the rotary plate.

In the rotary encoder 402, when the input shaft 402a rotates, the rotary plate rotates in response thereto, and when a slit of the rotary plate is located at a specified position, the light passing through that slit is received by the light receiving element so that an angle of rotation of the input shaft 402a can be detected from the position of the slit.

In the image reader 400 according to Embodiment 4, the rotary encoder 402 is used for detecting an angle of rotation of the input shaft 402a as a displacement of the image reader 400. The gear 403 is attached to the end of the input shaft 402a. The gear 404 is attached to one end 103a of a shaft 103 so as to engage with the gear 403. Namely, the torque of the roller 104 is transferred to the input shaft 402a of the rotary encoder 402 through the shaft 103, gear 403, and gear 404.

Figure 11:
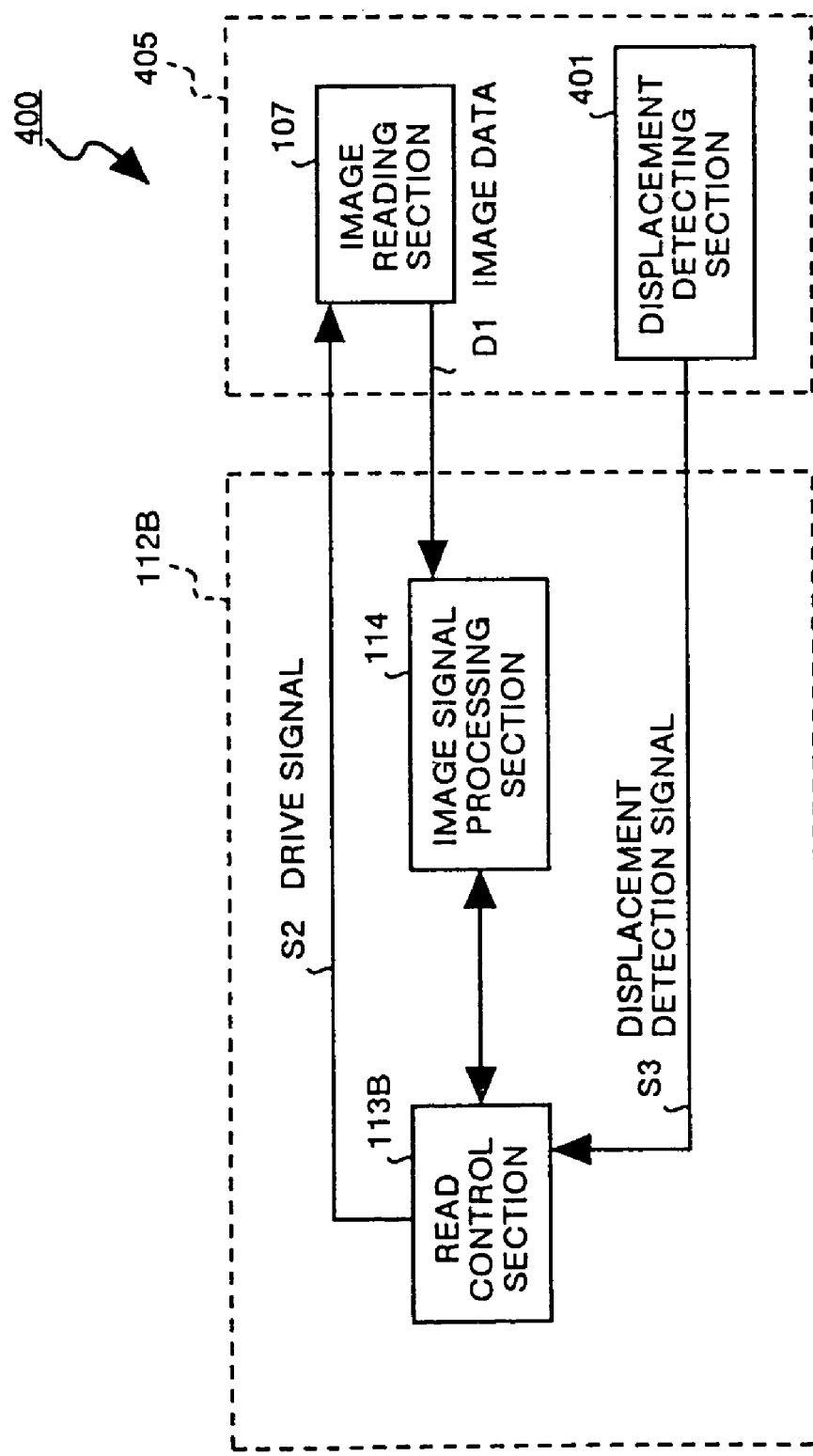
FIG. 11 is a block diagram showing electric configuration of the image reader 400 according to Embodiment 4.
Figure 12:
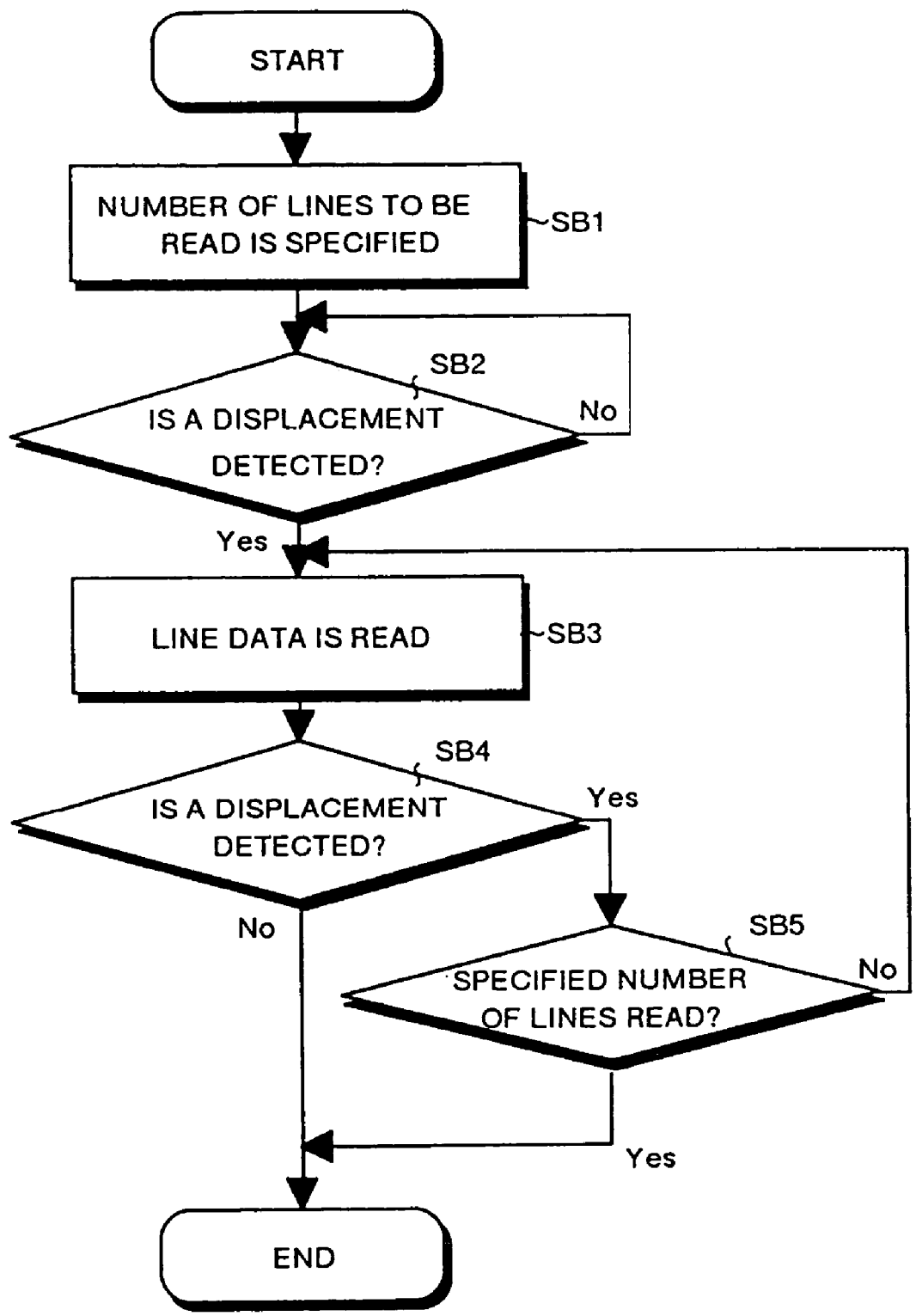
FIG. 12 is a flow chart showing operations of the image reader 400 according to Embodiment 4.

FIG. 11 is a block diagram showing electric configuration of the image reader 400 according to Embodiment 4. In this figure, the same reference numerals are assigned to components corresponding to those in FIG. 3 and FIG. 10, and description thereof is omitted herein. In FIG. 11, a data processing section 112B and a scanner section 405 are provided in place of the data processing section 112A and scanner section 111 shown in FIG. 3.

Further, provided in the data processing section 112B and scanner section 405 are a read control section 113B and a displacement detecting section 401 in place of the read control section 113A and document detecting section 105.

The displacement detecting section 401 shown in FIG. 11 outputs, when the image reader 400 is moved along the document not shown herein during the scanning and when the displacement reaches a specified value, a 1-pulse displacement detection signal S3 to the read control section 113B. The read control section 113B provides controls for image reading by detecting the document (not shown herein) according to the displacement detection signal S3 and outputs a drive signal S2 to the image reading section 107 according to the result of detection.

Next, operations of the image reader 400 according to Embodiment 4 of the present invention will be described while referring to a flow chart shown in FIG. 12. In FIG. 10, when a power switch not shown is turned ON in a state where the image reader 400 is not placed near the document not shown, the read control section 113B shown in FIG. 11 shifts the system control to step SB1 (Refer to FIG. 12) where a number of lines as image data is specified (set) by performing the same operation as that in step, SA1 (Refer to FIG. 4), then system control shifts to step SB2.

In step SB2, the image control section 113B determines whether a displacement of the image reader 400 has been detected or not according to whether a displacement detection signal S3 has been inputted from the displacement detecting section 401 or not. Namely, in step SB2, it is determined whether the document (not shown) has been detected or not according to whether a displacement detection signal S3 has been inputted or not.

In this case, as the image reader 400 is moved in a scanning direction in a state where the roller 104 does not contact the document, no signal is outputted from the displacement detecting section 401. Therefore, the read control section 113B recognizes a result of determination in step SB2 as "No", and repeats the same determination.

Then the user places the image reader 400 on the document in such a way that the image reading surface 101a contacts the document under the same situation as that shown in FIG. 1 in a state where the user is grasping the image reader 400 as shown in FIG. 10 by performing the same operation as described above in order to read an image thereon. With this, the rollers 104, 104, . . . contact the document.

Then, when the user slides the image reader 400 along the document in the scanning direction, the rollers 104, 104, are rotated due to a frictional force that acts between the rollers and the document (not shown). The torque of the rollers 104, 104, . . . is transferred to the input shaft 402a through the shaft 103, gears 404 and 403, and the input shaft 402a is rotated in response to the rotation of the rollers 104, 104, . . . .

When an angle of rotation of the roller 104 (input shaft 402a) reaches a specified angle, in other words, when a displacement of the image reader 400 in the scanning direction reaches to a specified value, a 1-pulse displacement detection signal S3 is outputted from the displacement detecting section 401 shown in FIG. 11.

The read control section 113B determines that the document has been detected and recognizes a result of determination in step SB2 as "Yes" and the system control is shifted to step SB3. In step SB3, the read control section 113B successively outputs a drive signal S2 at a specified interval to the image reading section 107 in the same manner as that in step SA3 (Refer to FIG. 4).

After the step and on, by performing the same operation as described above, each time the drive signal S2 is inputted, image data D1 for one line on the document is outputted from the image reading section 107 to an image signal processing section 114, and with this operation the read control section 113B successively reads in the image for one line on the document having been subjected to the processing by the image signal processing section 114 as the image data D1.

Then the user slides the image reader 400 in the scanning direction, and image data D1 for one line is successively inputted from the image reading section 107 via the image signal processing section 114 to the read control section 113B. Thus, a scanning is executed. During this sliding operation, each time the image reader 400 is moved by a specified displacement, a 1-pulse displacement detection signal S3 is outputted from the displacement detecting section 401. Herein an output cycle of the displacement detection signal S3 corresponds to a speed at which the image reader 400 is moved, so that when the speed is higher the cycle is shorter, while the cycle is longer when the speed is lower.

Then in step SB4, the read control section 113B detects a displacement (presence or absence of the document) of the image reader 400 according to the displacement detection signal S3 in the same manner as that in step SB2. However, in this step SB4, the read control section 113B compares an elapsed time since the previous displacement detection signal S3 is inputted to a time as a prespecified threshold value and makes determination according to a result of the comparison.

More specifically, the read control section 113B determines, when the elapsed time is less than the time as a threshold value, that the displacement (document) has been detected and recognizes a result of determination in step SB4 as "Yes" and shifts the system control to step SB5. On the other hand, the read control section 113B determines, when the elapsed time exceeds the time as a threshold value, that the displacement is not detected, namely that the image reader 400 stands still and recognizes a result of determination in step SB4 as "No", and terminates the operation for reading an image.

Herein, in step SB4, the reason why a comparison is made between an elapsed time and a time as a threshold value and why a determination is made according to a result of the comparison is because there may be a case where the user temporarily stops the scanning operation. Even if the movement of the image reader 400 is temporarily stopped during the scanning operation and restarted again under the condition that the time for which the movement was suspended is less than the threshold value then the image reading can be continued without interruption.

In this case, assuming that the image reader 400 is continuously moving along the document (not shown) and the elapsed time since the previous displacement detection signal S3 is inputted is less than the time as a threshold value, the read control section 113B recognizes a result of determination in step SB4 as "Yes", and the system control shifts to step SB5.

In step SB5, the read control section 113B determines whether the image data D1 for the number of lines specified (set) in step SB1 has been read or not in the same manner as that in step SA5 (Refer to FIG. 4). In this case, when it is determined that the total number of lines in the read image data D1 is less than the specified number of lines, the read control section 113B recognizes a result of determination in step SB5 as "No" and the system control is returned to step SB3. The read control section 113B repeats the sequence of operations described above. Then, in step SB3, the reading operation of the image data D1 for the second line and on is executed.

Herein, in step SB5, when a number of lines corresponding to the read image data D1 reaches a specified number of lines, the read control section 113B recognized a result of determination as "Yes", and terminates the operation of reading of the image.

During the scanning operation described above, when a user separates and takes away the image reader 400 (rollers 104, 104, . . . ) from the document (not shown) to terminate the operation for reading an image, the rotation of the rollers 104, 104, . . . is stopped. In response to this, the rotation of the shaft 103, gears 404 and 403, and input shaft 402a is stopped. With this, a displacement detection signal S3 is not outputted hereinafter from the displacement detecting section 401 shown in FIG. 11.

Therefore, in step SB4, when the elapsed time since the previous displacement detection signal S3 is inputted exceeds the time as a threshold value, the read control section 113B recognizes a result of determination as "No", and terminates the scanning operation.

As described above, with the image reader 400 according to Embodiment 4, the displacement detecting section 401 is provided therein and the read control section 113B determines start and end of reading according to a displacement detection signal S3 outputted from this displacement detecting section 401. Thus it is not required for a user to operate a switch for giving instructions for starting or terminating an operation of reading of the image like in the conventional technology, therefore convenience in practical use can be improved in the same manner as in the image reader 100 according to Embodiment 1.

Although the image reader 400 according to Embodiment 4 of the present invention has been described in detail, the specific configuration is not limited to Embodiment 4 but it is clear that all modifications and alternative constructions which fairly fall within the basic teaching herein are included in the present invention. The description has assumed the case where the incremental type of optical rotary encoder 402 shown in FIG. 10 is used in the image reader 400 according to Embodiment 4, but the type of the encoder is not limited to the above type and an incremental type of magnetic rotary encoder may be used as the rotary encoder 402.

The incremental type of magnetic rotary encoder 402 comprises a rotary plate with a magnetic substance magnetized on its circumference attached thereto and an MR (magnetic resistance element) sensor located at a position close to the rotary plate with a resistance value thereof varied according to variation in a magnetic field due to the magnetic substance. In addition, the incremental type of magnetic rotary encoder 402 has characteristics such that the encoder is small in size as well as light in weight, excellent in environmental resistance, and has a long life and a high-response frequency. Therefore, when a incremental type of magnetic rotary encoder 402 is used, it is advantageous that the device can be downsized and becomes light-weighted.

An image reader 500 according to Embodiment 5 of the present invention will be described with reference to FIG. 10, FIG. 13 and FIG. 14. The image reader 500 according to Embodiment 5 has the same basic appearance and configuration as that of the image reader 400 shown in FIG. 10, however, a document detecting section 105 (Refer to rear view in FIG. 1) is provided in the image reading surface 101a shown in this figure.

Figure 13:
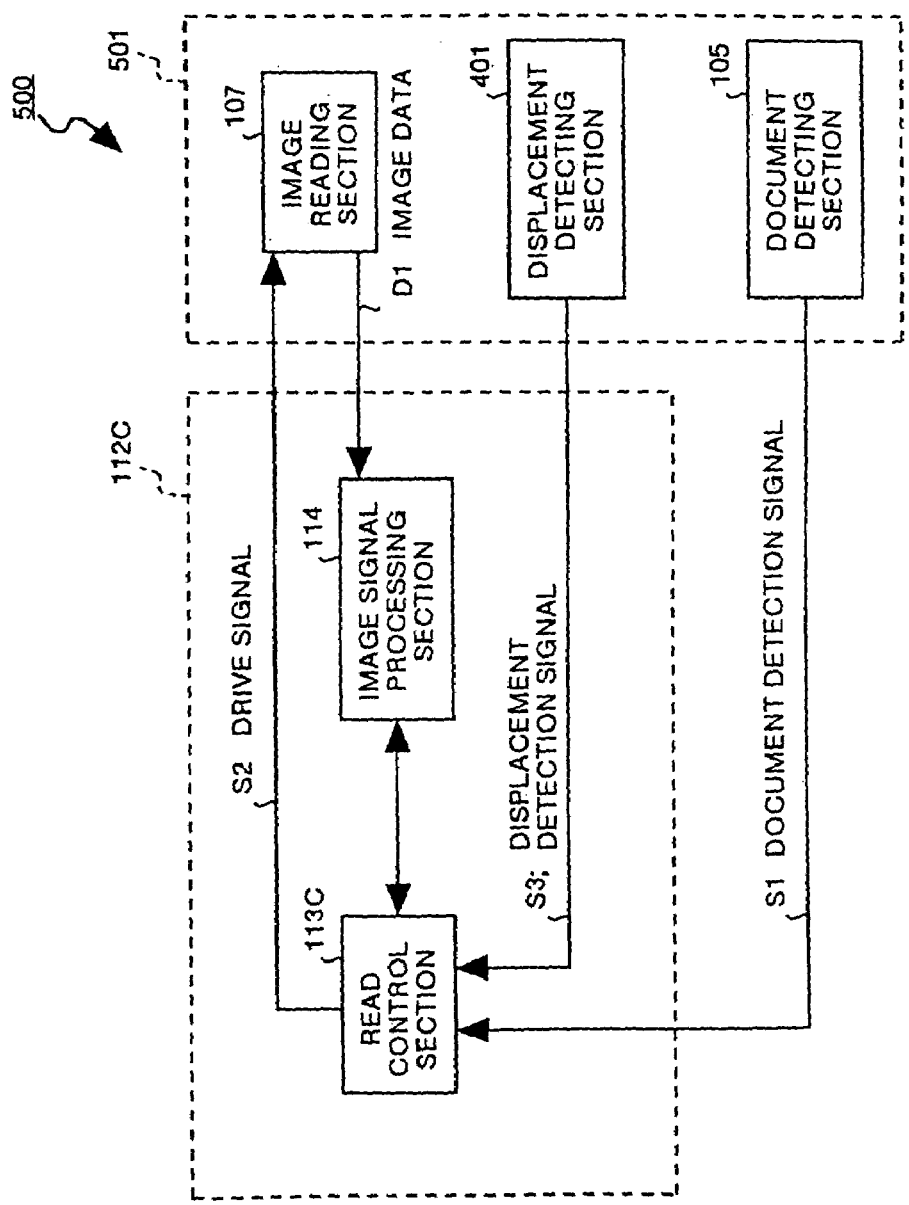
FIG. 13 is a block diagram showing electric configuration of an image reader 500 according to Embodiment 5 of the present invention.
Figure 14:
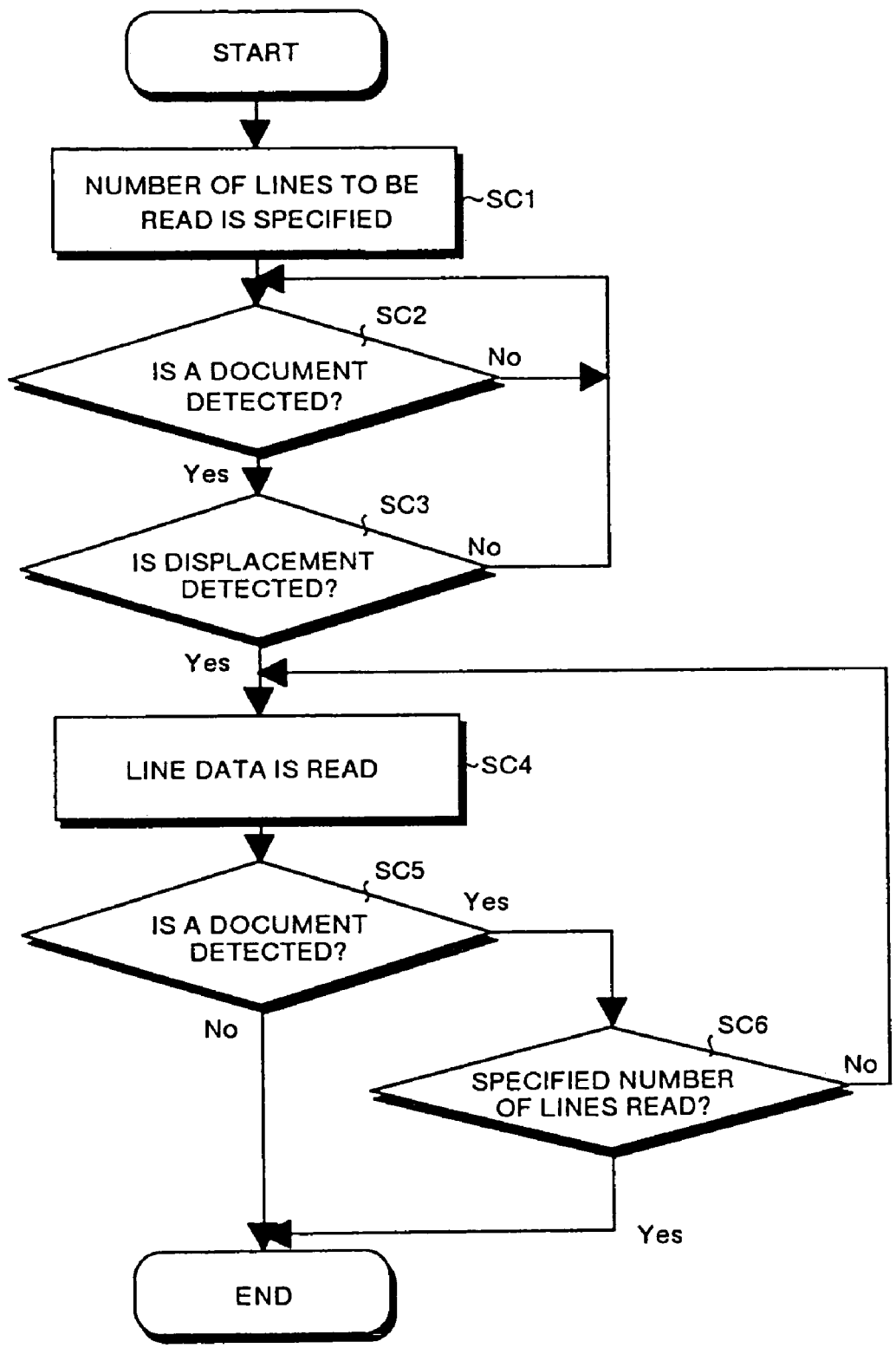
FIG. 14 is a flow chart showing operations of the image reader 500 according to Embodiment 5.

FIG. 13 is a block diagram showing electric configuration of the image reader 500 according to Embodiment 5. In this figure, the same reference numerals are assigned to components corresponding to those in FIG. 11, and description thereof is omitted herein. In FIG. 13, a data processing section 112C and a scanner section 501 are provided in place of the data processing section 112B and scanner section 405 shown in FIG. 11.

In addition, in the data processing section 112C shown in FIG. 13, a read control section 113C is provided in place of the read control section 113B shown in FIG. 11, and a document detecting section 105 (Refer to FIG. 10) is provided anew in the scanner section 501.

The read control section 113C shown in FIG. 13 recognizes start and end of image reading for a document (not shown) according to both a document detection signal S1 inputted from the document detecting section 105 and a displacement detection signal S3 inputted from the displacement detecting section 401. Operation of the read control section 113C will be described later in detail.

Next, operation of the image reader 500 according to Embodiment 5 will be described while referring to a flow chart shown in FIG. 14. In FIG. 10, when a power switch not shown is turned ON in a state where the image reader 500 (document detecting section 105) is not placed near the document (not shown), the read control section 113C shown in FIG. 13 shifts the system control to step SC1 (Refer to FIG. 14), where a number of lines to be read as image data is specified (set) by performing the same operation as that in step SA1 (Refer to FIG. 4), and then the system control shifts to step SC2.

In step SC2, the image control section 113C determines whether a document has been detected by the document detecting section 105 or not, in other words, whether a document detection signal S1 has been inputted from the document detecting section 105 or not. In this case, as the document detecting section 105 shown in FIG. 10 is not located near the document, no document detection signal S1 is not outputted from the document detecting section 105. Therefore, the read control section 113C recognizes a result of determination in step SC2 as "No", and repeats the same determination.

Then the user places the image reader 500 on the document in such a way that the image reading surface 101a contacts in a state where the user is grasping the image reader 500 as shown in FIG. 10 in order to read an image thereon. With this, as the document detecting section 105 is close to the document, a document detection signal S1 is outputted from the document detecting section 105 to the read control section 113C.

The read control section 113C recognizes a result of determination in step SC2 as "Yes" and the system control is shifted to step SC3. In step SC3, the image control section 113C determines whether a displacement of the image reader 500 has been detected or not according to whether a displacement detection signal S3 has been inputted from the displacement detecting section 401 or not by performing the same operation as that in step SB2 (Refer to FIG. 12). When a result of this determination is "No", the system control returns to step SC2, and the read control section 113A repeats the sequence of operations described above.

Namely, in step SC3, it is determined whether the document (not shown) has been detected or not according to whether a displacement detection signal S3 has been inputted or not after the document detection signal S1 has been inputted.

Then the user contacts the image reading surface 101a to the document under the same situation as that shown in the front view of FIG. 1, in a state where the user is grasping the image reader 500 as shown in FIG. 10 by performing the same operation as described above, and slides the reader along the document in the scanning direction to read an image thereon.

With this operation, the rollers 104, 104, . . . are rotated due to a frictional force that acts between the rollers and the document (not shown), and in response to the rotation, the input shaft 402a is rotated in the same manner as described above. Then, when an angle of rotation of the roller 104 (input shaft 402a) reaches a specified angle, in other words, when a displacement of the image reader 500 in the scanning direction reaches a specified value, a 1-pulse displacement detection signal S3 is outputted from the displacement detecting section 401 shown in FIG. 13.

With this feature, the read control section 113C recognizes a result of determination in step SC3 as "Yes" and the system control is shifted to step SC4. In step SC4, the read control section 113C successively outputs a drive signal S2 at a specified interval to the image reading section 107. As a result, by performing the same operation as described above, each time the drive signal S2 is inputted, image data D1 for one line on the document is outputted from the image reading section 107 to the image signal processing section 114. Then in step SC4, the read control section 113C reads in the image data D1 for one line having been subjected to the processing by the image signal processing section 114 and inputted thereto. Thus, a scanning is executed.

Then, in step SC5, the read control section 113C determines whether the document has been detected by the document detecting section 105 or not. Herein, when the image reader 500 slides the document, as the document detecting section 105 is located near the document a document detection signal S1 is outputted from the document detecting section 105 to the read control section 113C.

This indicates that scanning is being carried out, and as a document detection signal S1 is inputted from the document detecting section 105 to the read control section 113C, the read control section 113C recognizes a result of determination in step SC5 as "Yes" and the system control is shifted to step SC5. In step SC6, the read control section 113C determines whether the image data D1 for a number of lines specified (set) in step SC1 has been read or not by performing the same operation as that in step SA5 (Refer to FIG. 4). Namely, the read control section 113C returns the system control to step SC4 when the result of determination is "No", and repeats the sequence of operations described above. The read control section 113C terminates the scanning operation when the result of determination is "Yes".

During the scanning operation described above, when a user separates and takes away the image reader 500 (document detecting section 105) from the document to terminate the operation for reading an image, output of the document detection signal S1 from the document detecting section 105 is stopped, so that the read control section 113C recognizes a result of determination in step SC5 as "No", and terminates the operation for reading an image.

As described above, with the image reader 500 according to Embodiment 5 of the present invention described above, the read control section 113C recognizes start and end of image read using both the document detecting section 105 and the displacement detecting section 401. Thus, it is not required for a user to operate a switch for giving instructions for starting or terminating an operation of reading of the image like in the conventional technology, therefore convenience in practical use can be improved is the same manner as that of the image readers 100 and 400 according to Embodiments 1 and 4.

Especially, with the image reader 500 according to Embodiment 5 of the present invention described above, a condition for starting the reading of the image is specified based on an AND condition in which it is detected whether both the document detection signal S1 from the document detecting section 105 and a displacement detection signal S3 has been inputted from the displacement detecting section 401 or not, so that following malfunction assumable in the image reader 100 according to Embodiment 1 and the image reader 400 according to Embodiment 4 respectively can be prevented and precision of image reading can resultantly be improved.

Namely, in the image reader 100 according to Embodiment 1 described above, as reading of the image is started when the a document detection signal S1 is inputted from the document detecting section 105, even if the document detecting section 105 is located near any substance other than the document P (Refer to FIG. 1A) by mistake or without noticing, reading of the image is disadvantageously started.

On the contrary, in the image reader 500 according to Embodiment 5 described above, even if the document detecting section 105 happens to be located near any substance other than a desired document, reading of an image is not started unless a displacement detection signal S3 is outputted from the displacement detecting section 401 due to movement of the image reader 500, therefore the malfunction described above can be avoided.

While in the image reader 400 according to Embodiment 4 described above, as reading of the image is started when the displacement detection signal S3 is inputted from the displacement detecting section 401, even if the roller 104 slides along a substance other than the document reading of the image is started.

On the contrary, in the image reader 500 according to Embodiment 5 described above, even if the roller 104 slides along a substance other than the document, reading of an image is not started unless a document detection signal S1 is inputted from the document detecting section 105, therefore the malfunction can also be avoided.

Although the image reader 500 according to Embodiment 5 of the present invention has been described in detail, the specific configuration is not limited to Embodiment 5 but it is clear that all modifications and alternative constructions which fairly fall within the basic teaching herein are included in the present invention. For example, in the image reader 500 according to Embodiment 5, the description has assumed the case where end of image reading is determined according to whether a document detection signal S1 has been inputted or not in step SC5 shown in FIG. 14, but end of image read may be determined according to a displacement detection signal S3 by performing the same operation as that in step SB4 (Refer to FIG. 12) in place of the document detection signal S1.

In addition, although the description has assumed the case, in the image reader 500 according to Embodiment 5, where the document detecting section 105 (Refer to FIG. 13) detects a document, the detection is not limited to the above mentioned detection, but the mechanical switch 201 (Refer to FIG. 6) or the photoelectric switch 301 (Refer to FIG. 9) may be used to detect a document in place of the document detecting section 105.

Figure 15:
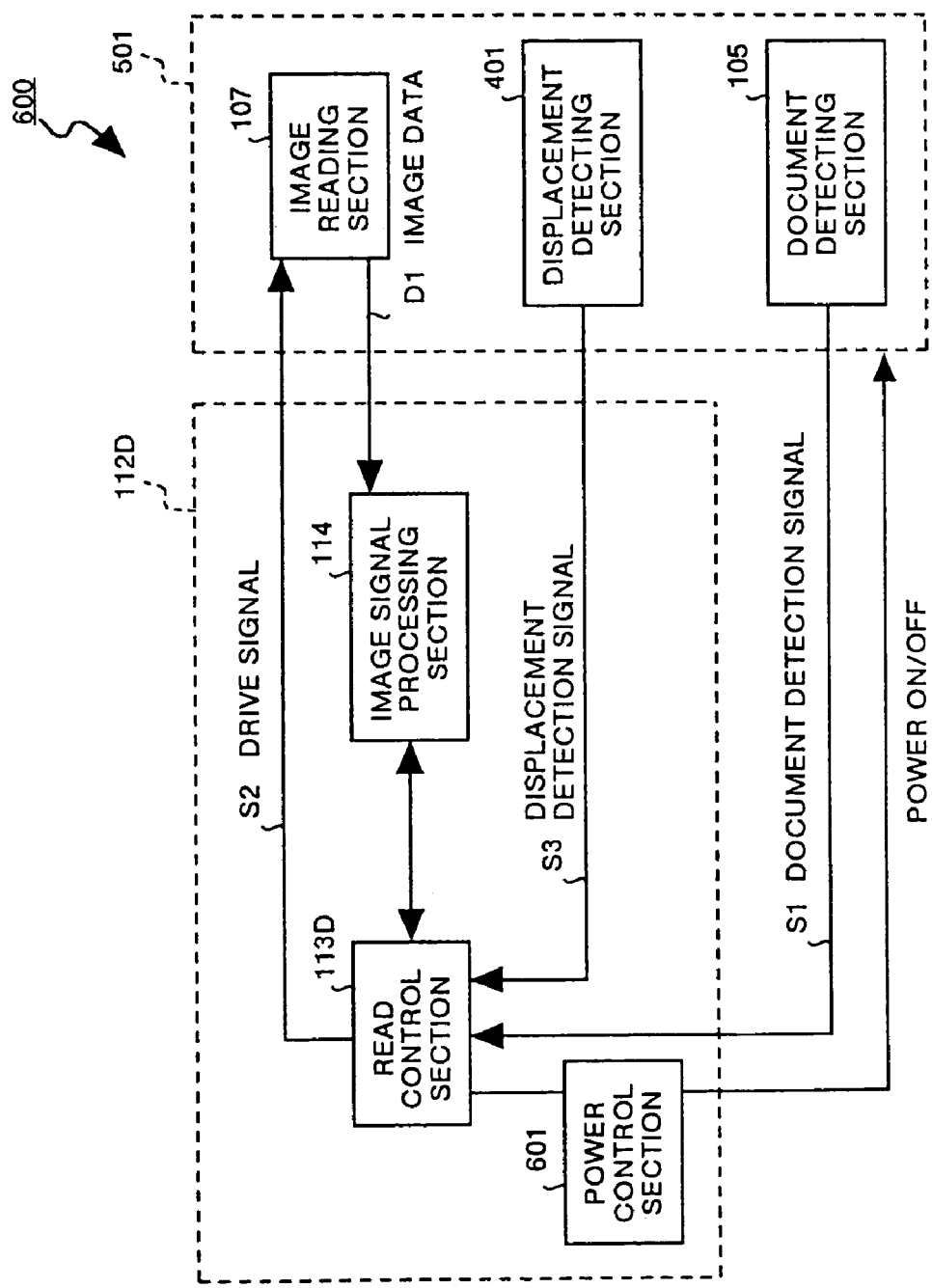
FIG. 15 is a block diagram showing electric configuration of an image reader 600 according to Embodiment 6 of the present invention.
Figure 16:
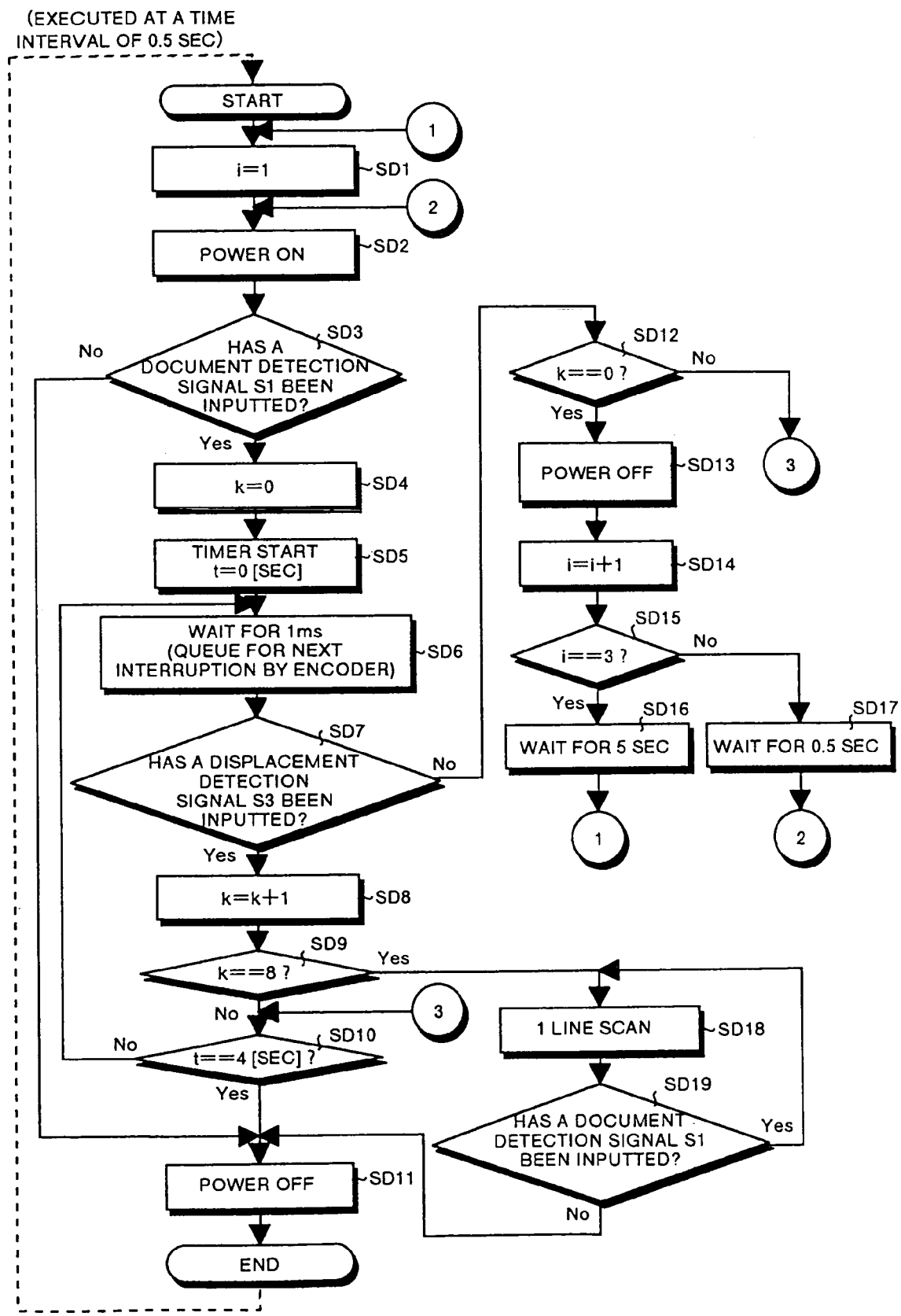
FIG. 16 is a flow chart showing operations of the image reader 600 according to Embodiment 6.

Description is made for an image reader 600 according to Embodiment 6 of the present invention with reference to FIG. 10, FIG. 15 and FIG. 16. FIG. 15 is a block diagram showing electric configuration of the image reader 600 according to Embodiment 6. In this figure, the same reference numerals are assigned to components corresponding to those in FIG. 13, and description thereof is omitted herein. In FIG. 15, a data processing section 112D is provided in place of the data processing section 112C shown in FIG. 13. The appearance and configuration of the image reader 600 according to Embodiment 6 is the same as that of the image reader 500 shown in FIG. 10.

Further, in the data processing section 112D, a read control section 113D is provided in place of the read control section 113C shown in FIG. 13, and a power control section 601 is also provided anew therein. Added to the read control section 113D is a function of reporting to the power control section 601 as to whether a document detection signal S1 and a displacement detection signal S3 have been inputted or not although the operation of reading an image (scanning operation) is the same as that in the above mentioned read control section 113C (Refer to FIG. 13).

The power control section 601 controls power supply to each section (the document detecting section 105, image reading section 107, and displacement detecting section 401) of a scanner section 501 according to an input state of a document detection signal S1 and a displacement detection signal S3 in the read control section 113D. Herein an internal timer for counting a time is incorporated in the power control section 601.

More specifically, the power control section 601 provides, during standby for reading an image (scanning) since a power switch (not shown) is turned ON until a document detection signal S1 is inputted into the read control section 113D, controls for intermittent power supply for intermittently supplying power at intervals of, for instance, 0.5 sec to each section (the document detecting section 105, image reading section 107, and displacement detecting section 401) of the scanner section 501.

Furthermore, the power control section 601 provides, during standby for reading an image (scanning) since input of the document detection signal S1 in the read control section 113D is terminated until a document detection signal S1 is inputted therein again, controls for intermittent power supply for intermittently supplying power at intervals of, for instance, 0.5 sec to each section (the document detecting section 105, image reading section 107, and displacement detecting section 401) of the scanner section 501. Namely, during controls for intermittent power supply described above, ON/OFF is repeated such that the power is ON for 0.5 sec and the power is OFF for the next 0.5 sec.

In addition, the power control section 601 provides, during the operation of reading of the image (scanning) since an image read start signal is inputted from the read control section 113D until an image read end signal is inputted therefrom, controls for continuous power supply for continuously supplying power to each section of the scanner section 501.

Herein, the reason why the controls for intermittent power supply and the controls for continuous power supply are performed by the power control section 601 is because unnecessary power consumption is reduced in a time period other than the time a document is detected only when the document detecting section 105 and image reading section 107 are actually used.

Next description is made for power supply control in the image reader 600 according to Embodiment 6 with reference to a flow chart shown in FIG. 16. In FIG. 15, when a power switch not shown is turned ON in a state where the image reader 600 (document detecting section 105) is not placed near the document (not shown), the power control section 601 shifts the system control to step SD1 shown in FIG. 16, substitutes "1" in an internal parameter i, and shifts the system control to step SD2.

In step SD2, the power control section 601 turns the power ON by starting power supply to each section (the document detecting section 105, image reading section 107, and displacement detecting section 401) of the scanner section 501, and then the system control shifts to step SD3.

In step SD3, the power control section 601 determines whether a document detection signal S1 has been inputted in the read control section 113D or not, in other words, whether a document (not shown) has been detected by the document detecting section 105 and an operation of reading of the image has been started or not. In this case, assuming that the document detection signal S1 has not been inputted in the read control section 113D, the power control section 601 recognizes a result of determination in step SD3 as "No" and the system control is shifted to step SD11.

In step SD11, the power control section 601 recognizes that the operation of reading of the image has not been started, and turns the power OFF by terminating power supply to each section (the document detecting section 105, image reading section 107, and displacement detecting section 401) of the scanner section 501. Thus, the power consumption in each section of the scanner 501 because zero. In addition, the power control section 601 provides controls for turning the power OFF in step SD11, and at the same time starts to count a time by the internal timer (not shown).

Then, when it is recognized by a result of counting the time by the internal timer that 0.5 sec has passed since the power is tuned OFF in step SD11, the power control section 601 executes again the sequence of operation in step SD11 and substitutes "1" in the internal parameter i after shifting the system control to step SD2. In step SD2, the power control section 601 again supplies power to each section of the scanner section 501 by performing the same operation as described above, and the system control shifts to step SD3.

In step SD3, the power control section 601 determines whether a document detection signal S1 has been inputted in the read control section 113D or not. Assuming that the result of this determination is "No", the system control shifts to step SD11, and the power control section 601 terminates power supply to each section of the scanner section 501 as described above, and executes again the sequence of operation in step SD1 after 0.5 sec of standby time passes. Then, the power control section 601 provides controls for intermittent power supply for intermittently supplying power at intervals of 0.5 sec to each section of the scanner section 501 until a document detection signal S1 is inputted into the read control section 113D in step SD3.

Herein, when a user places the document detecting section 105 near the document (not shown) in order to perform the operation of reading of the image, a document detection signal S1 is outputted from the document detecting section 105 to the read control section 113D. With this, the power control section 601 recognizes a result of determination in step SD3 as "Yes" and system control is shifted to step SD4.

In step SD4, the power control section 601 substitutes "0" in the internal parameter k, and then the system control shifts to step SD5. In step SD5, the power control section 601 makes the internal timer start counting a time and system control is shifted to step SD6. In step SD6, the power control section 601 waits (standby) for 1 ms, and then the system control shifts to step SD7.

In step SD7, the power control section 601 determines whether a displacement detection signal S3 has been inputted into the read control section 113D or not. In this case, assuming that the displacement detection signal S3 is not inputted into the read control section 113D because the image reader 600 is standing still, the power control section 601 recognizes a result of determination in step SD7 as "No" and the system control is shifted to step SD12. Namely, in this case, the image reader 600 is not being moved along the document in the scanning direction by the user.

In step SD12, the power control section 601 determines whether the internal parameter k is "0" or not, and recognizes, as the internal parameter k is zero in this case, a result of determination as "Yes" and the system control is shifted to step SD13. In step SD13, the power control section 601 turns the power OFF by stopping power supply to each section of the scanner section 501, and then the system control shifts to step SD14.

Namely, in this case, as a result of determination that image reading is not started because the image reader 600 has been stopped for more than a specified period of time since the power switch (not shown) of the image reader 600 is turned ON, power supply to each section of the scanner section 501 is stopped.

Then, in step SD14, the power control section 601 increments the internal parameter i (=1) by 1 to "2" and the system control is shifted to step SD15. In step SD15, the power control section 601 determines whether the internal parameter i is "3" or not. In other words, in step SD15, it is determined whether the period of time the image reader 600 is stopped exceeds a specified period of time or not. In this case, as the internal parameter i is 2, the power control section 601 recognizes a result of determination in step SD15 as "No" and the system control is shifted to step SD17.

In step SD17, the power control section 601 waits (standby) for 0.5 sec and the system control is returned to step SD2. In step SD2, power is again supplied to each section of the scanner section 501 and the system control is shifted to step SD3. Some, sequence of operations described above is repeated.

On the other hand, when the internal parameter i is "3" in step SD15, the power control section 601 recognizes a result of determination as "Yes" and the system control returned to step SD1, substitutes "1" again in the internal parameter i, and repeats the sequence of operations described above. However, the power control section 601 is waits for 5 sec in step SD16 before the system control returned to step SD1. This waiting indicates a state where the image reader 600 is being placed on the document surface for a while without performing scanning of the document.

Then, when the user slides image reader 600 along the document in a scanning direction for more than a specified distance displacement in a state where the rollers 104, 104, . . . shown in FIG. 10 contact the document by performing the same operation as described above, a 1-pulse displacement detection signal S3 is outputted from the displacement detecting section 401 shown in FIG. 15 to the read control section 113D.

With this operation, the power control section 601 recognizes a result of determination in step SD7 as "Yes" through the sequence of operations described above and the system control is shifted to step SD8. In step SD8, the power control section 601 increments the internal parameter k (k=0 in this case) by 1 and the system control is shifted to step SD9. In step SD9, the power control section 601 determines whether internal parameter k is "8" or not. As the internal parameter k is "1" in this case, the power control section 601 recognizes a result of determination as "No" and the system control is shifted to step SD10.

In step SD10, the power control section 601 determines whether a result of counting a time (t) by the internal timer reaches 4 sec or not, and assuming that the result of counting a time (t) by the timer is less than 4 sec in this case, the power control section 601 recognizes a result of determination in step SD10 as "No" and the system control is returned to step SD6. Then, the sequence of operations described above are repeated.

Herein, in step SD8, assuming that the internal parameter k is "8", the power control section 601 recognizes a result of determination in the next step SD9 as "Yes" and the system control is shifted to step SD18. In step SD18, the power control section 601 reports a result of determination in step SD9 to the read control section 113D and then the system control is shifted to step SD19.

With this operation, the read control section 113D starts output of a drive signal S2 to the image reading section 107 by performing the same operation as described above, and reads in digitized image data D1 inputted via the image signal processing section 114 from the image reading section 107 by one line, thus the operation of reading an image (one-line scanning) is executed.

In step SD19, the power control section 601 determines whether a document detection signal S1 has been inputted in the read control section 113D or not by performing the same operation as that in step SD3. In this case, assuming that the operation of reading an image has been continued and so the document detection signal S1 has been inputted in the read control section 113D, the power control section 601 recognizes a result of determination in step SD19 as "Yes" with the system control is returned to step SD18 where 1-line scanning operation is continued.

While the result of determination in step SD19 is recognized as "Yes" as described above, in other words, while the operation of reading an image is continuously performed, power is continuously supplied to each section of the scanner section 501 under the control by the power control section 601, thus controls for continuous power supply is executed.

Herein, when the user separates the image reader 600 from the document to terminate the operation of reading an image, output of a document detection signal S1 from the document detecting section 105 is stopped. With this operation, the power control section 601 recognizes a result of determination in step SD19 as "No" and the system control is shifted to step SD11. In step SD11, the power control section 601 stops power supply to each section of the scanner section 501 for 0.5 sec and the system control is returned again to step SD1. Then, the sequence of operations described above are repeated.

On the other hand, in step SD10, when the result of counting a time (t) by the internal timer reaches 4 sec, the power control section 601 recognizes a result of determination as "Yes" and the system control is shifted to step SD11. In step SD11, the power control section 601 stops power supply to each section of the scanner section 501, and the system control returns again to step SD1 after a 0.5 sec standby time.

As described above, with the image reader 600 according to Embodiment 6, the power control section 601 is provided therein so that control for power supply to the scanner section 501 is switched from the control for intermittent power supply to the control for continuous power supply or from the control for continuous power supply to the control for intermittent power supply according to the state of image reading. Therefore, power consumption can be reduced as compared to the case where power is continuously supplied to the scanner section 501 for all the time.

Especially, when a battery such as an enclosed nickel-cadmium battery, an alkaline battery, a lithium-ion battery or a manganese battery is used as a power supply, a period for ensuring an operation of the image reader 600 can be extended.

Although the image reader 600 according to Embodiment 6 of the present invention has been described in detail, the specific configuration is not limited to Embodiment 6 but it is clear that all modifications and alternative constructions which fairly fall within the basic teaching herein are included in the present invention. For example, in Embodiment 6 described above, although the description has assumed the case where the power control section 601 shown in FIG. 15 is provided in the image reader 500 according to Embodiment 5 to reduce power consumption, this power control section 601 may also be applied in the above mentioned image readers 100 to 400 according to Embodiments 1 to 4 respectively.

Figure 17:
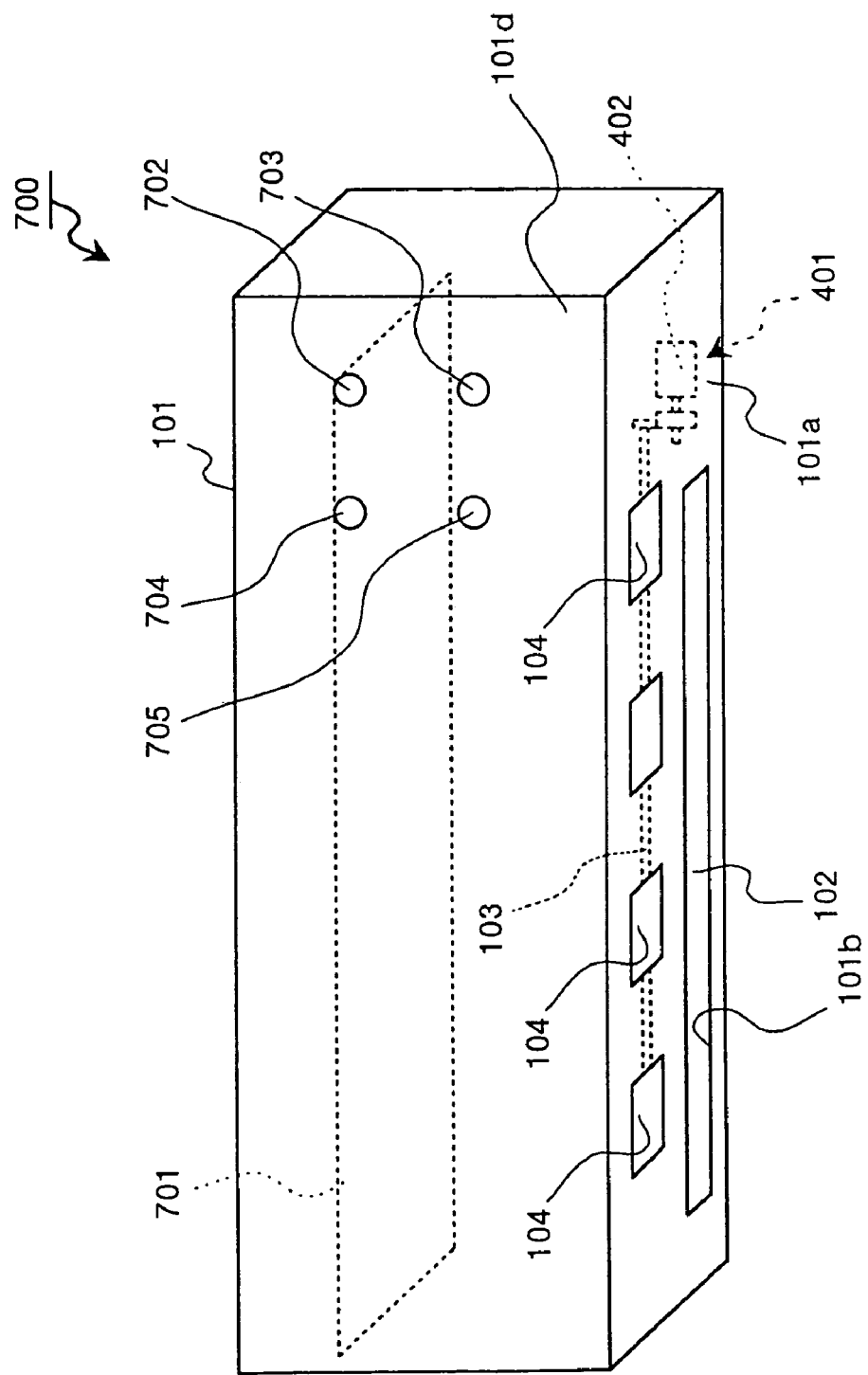
FIG. 17 is a perspective view showing appearance and configuration of an image reader 700 according to Embodiment 7 of the present invention.

An image reader 700 according to Embodiment 7 of the present invention will be described with reference to FIG. 17 to FIG. 20. FIG. 17 is a perspective view showing appearance and configuration of the image reader 700 according to Embodiment 7. In this figure, the same reference numerals are assigned to components corresponding to those in the image reader 400 according to Embodiment 4 shown in FIG. 10, and description thereof is omitted herein.

In FIG. 17, an image data memory 701 is incorporated inside the housing 101 and stores therein the digitized image data D1 (Refer to FIG. 19) described above. The image data memory 701 has, assuming that an image read-out during the operation of reading an image one time is set to one sheet, a storage capacity sufficient enough to store a plurality sheets of image data therein.

Herein, the image data memory 701 includes a non-volatile (or volatile) semiconductor memory and a magnetic disk unit or the like. The semiconductor memory may be a DRAM (Dynamic Random Access Memory), an EEPROM (Electrically Erasable and Programmable Read Only Memory), and a (NAND or NOR type) flash memory or the like. When a semiconductor memory is used, the image data memory 701 with a plurality of semiconductor memories layered is used to make a packaging space smaller.

An LED (Light Emitting Diode) 702 indicates the ON/OFF state of the power. Namely, the LED 702 is lit when the power is ON, and is switched off when the power is OFF. An LED 703 is an element emitting green or red light, and indicates a state of an empty space in the image data memory 701. Namely, the LED 703 emits a green light when there is an empty space in the image data memory 701, in other words, when data can be stored therein, while the LED 703 emits a red light when there is no empty space in the image data memory 701, in other words, when data can not be stored therein. The user can recognize whether the image data memory 701 is in a state where data can be stored therein or not by checking a color of the light from the LED 703.

An operation switch 704 is provided on an operating surface 101d orthogonal to the image reading surface 101a in the housing 101 and is operated by the user to switch the power ON/OFF. Namely, the operation switch 704 is pressed by the user once when the power is to be switched from OFF to ON, while is pressed once more when the power is to be switched from ON to OFF.

An operation switch 705 is provided in the lower side from the operation switch 704 on the operating surface 101d in the figure, and is operated by the user when instructions for start of image reading and for termination of image reading are to be issued. Namely, the operation switch 705 is pressed once by the user when start of image reading is to be instructed, while is pressed once more when termination of the image reading is to be instructed. However, the instruction for start of image reading and instruction for termination of image reading by the operation switch 705 may be carried out by the medium detecting unit such as the document detecting section 105 and the photoelectric switch.

Figure 18:
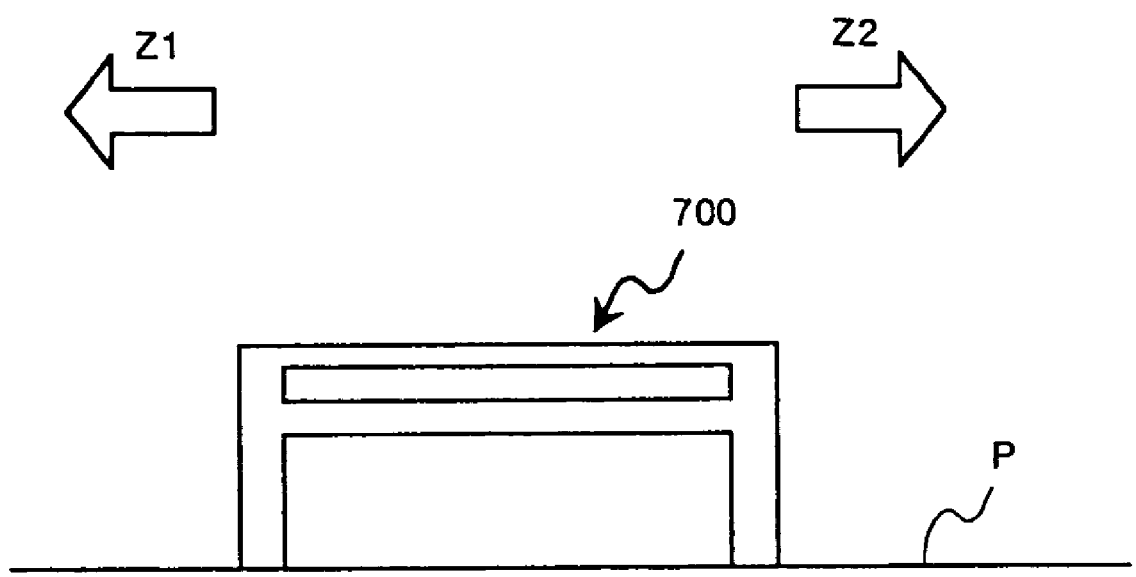
FIG. 18 is a general side view showing a control method when an image is read with the image reader 700 according to Embodiment 7.

At the time of reading of an image, the image reader 700 shown in FIG. 17 is slid in the scanning direction (in the direction indicated by the arrow Z1 or Z2 in the FIG. 18) in a state where the user is grasping the image reader 700 so that the image reading surface 101a (Refer to FIG. 17) thereof contacts the document P as shown in FIG. 18.

Figure 19:
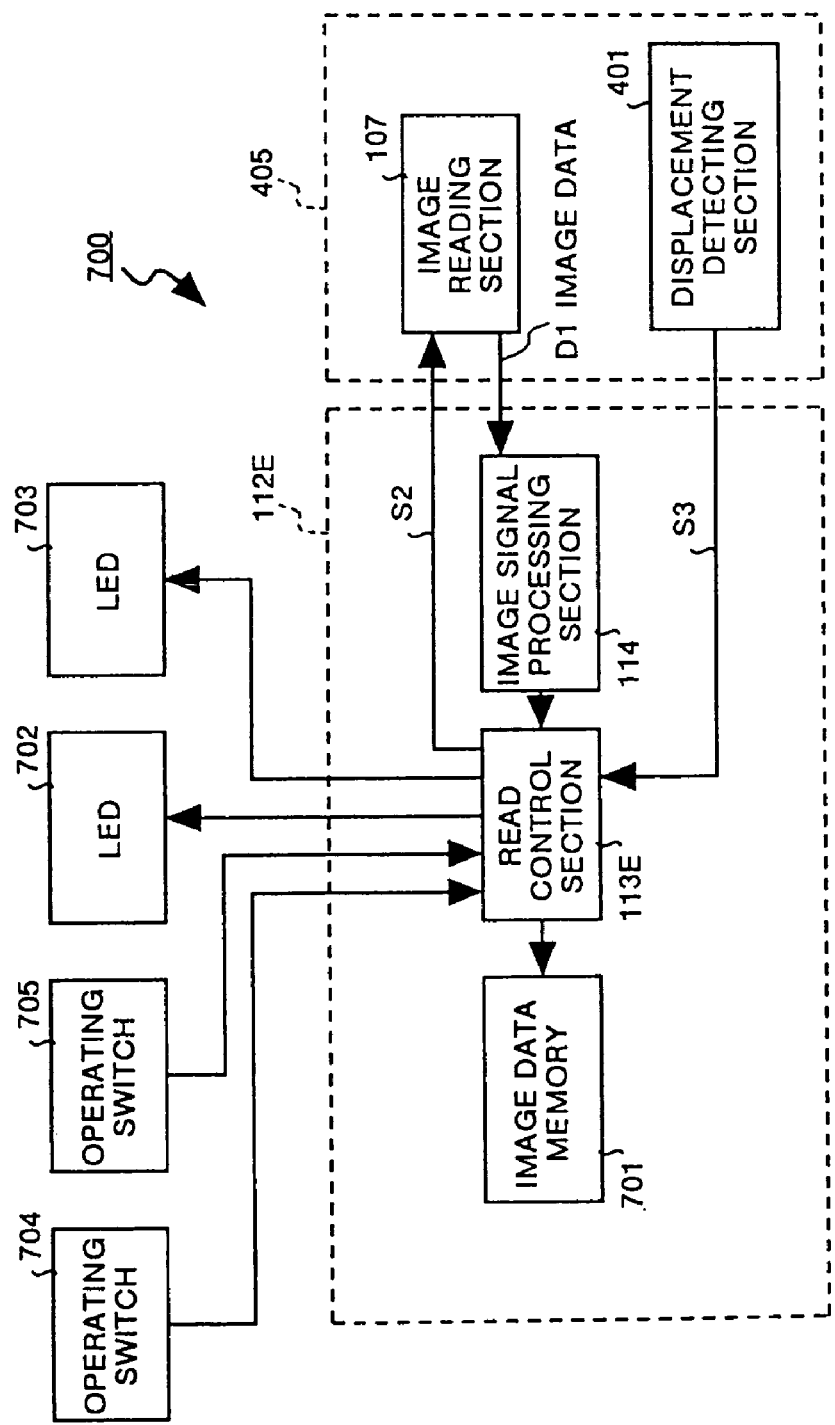
FIG. 19 is a block diagram showing electric configuration of the image reader 700 according to Embodiment 7.

FIG. 19 is a block diagram showing electric configuration of the image reader 700 according to Embodiment 7. In this figure, the same reference numerals are assigned to components corresponding to those in FIG. 11 and FIG. 17, and description thereof is omitted herein. In FIG. 19, a data processing section 112E is provided in place of the data processing section 112B shown in FIG. 11, and also the LEDs 702, 703, operation switch 704, and operation switch 705 are provided therein anew. In addition, in the data processing section 112E shown in FIG. 19, a read control section 113E is provided in place of the read control section 113B shown in FIG. 11.

The read control section 113E shown in FIG. 19 provides controls for reading in the image reading section 107, writing to the image data memory 701, and lighting of the LED 702 and LED 703. In addition, the read control section 113E has a buffer memory (not shown) for temporarily holding the image data D1 for one line digitized by the image signal processing section 114. The operation of the read control section 113E in detail will be described later.

Next, operations of the image reader 700 according to Embodiment 7 of the present invention will be described with reference to time charts shown in FIG. 20. Herein, a displacement detection signal S3 is a signal outputted from the displacement detecting section 401 shown in FIG. 19, which is outputted as a 1-pulse signal when the rotation of the roller 104 shown in FIG. 17, in other words, a displacement of the image reader 700 in the scanning direction reaches a specified value.

A drive signal S2 is a 1-pulse signal successively outputted from the read control section 113E to the image reader 700 for each driving cycle after the operation switch 704 is pressed. The image data D1 is data for one line of the document (not shown) read by the image reading section 107, and reference numerals "1" to "9" shown in the figure indicates image data D1 in the first line to ninth line.

Figure 20:
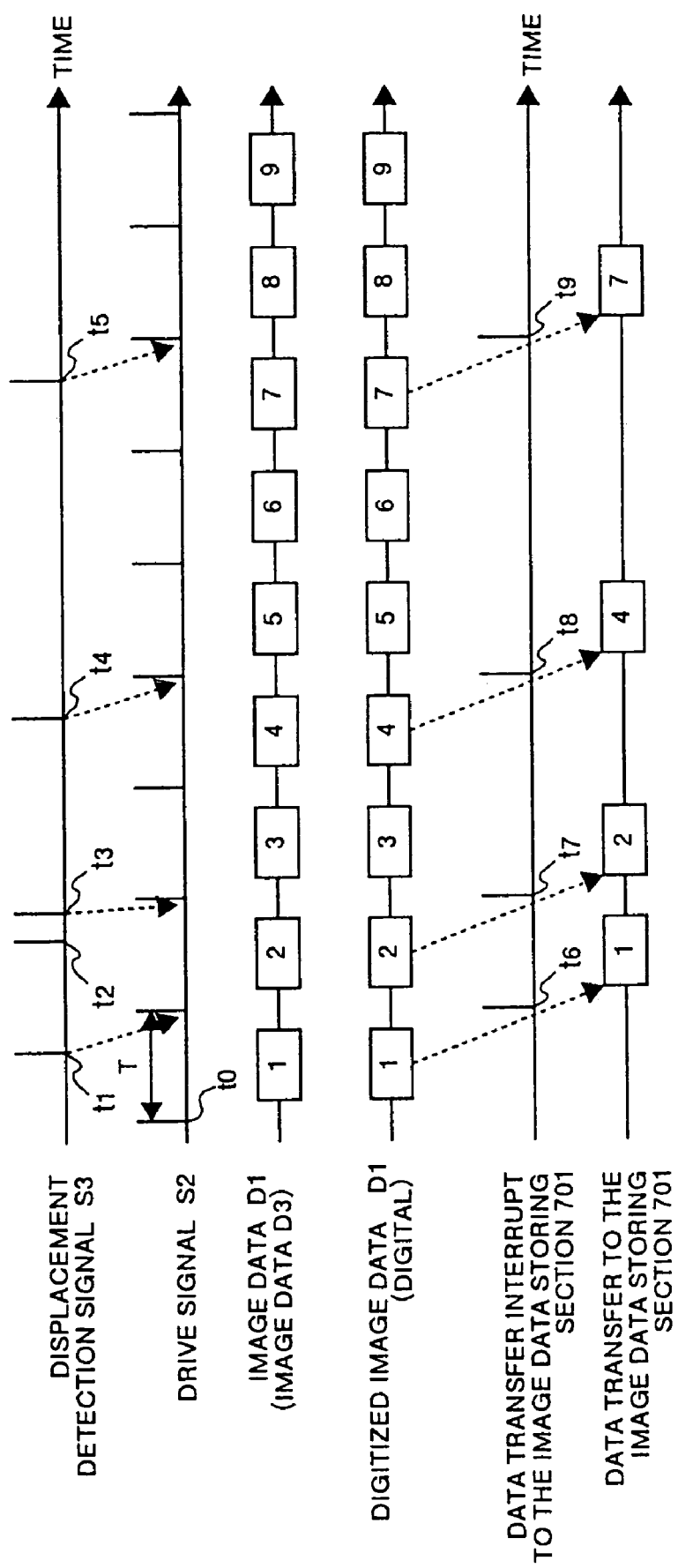
FIG. 20 is a time chart showing operations of the image reader 700 according to Embodiment 7.

Furthermore, the digitized image data D1 shown in FIG. 20 is data digitized by the image signal processing section 114, and reference numerals "1" to "9" shown in the figure correspond to "1" to "9" shown for image data D1.

When the image is read, the user, at first, places the image reader 700 at a start position of reading on a document P shown in FIG. 18 so that the image reading surface 101a (Refer to FIG. 17) thereof contacts the document P. With this operation, the rollers 104, 104, . . . shown in FIG. 17 come in contact with to the document P.

Then, the user presses the operation switch 704 once to turn the power ON. With this operation, an ON signal is outputted from the operation switch 704 shown in FIG. 19 to the read control section 113E, and power is supplied to each section of the device. Then, the read control section 113E accesses the image data memory 701 to check an empty space, and when there is an empty space, the LED 703 is made to emit green light, and when there is no empty space, the LED 703 is made to emit red light. In this case, it is assumed that there is an empty space in the image data memory 701, therefore, the LED 703 is made to emit green light.

Then, the read control section 113E starts output of a drive signal S2 to the image reading section 107 at time t0 shown in FIG. 20, and monitors whether a displacement detecting signal S3 has been inputted or not within the driving cycle T since the drive signal S2 has been outputted. With this operation, the image reading section 107 is driven, an image for one line on the document P is read, and image data D1 in the first line is outputted to the image signal processing section 114.

Then, the image data D1 in the first line is digitized by the image signal processing section 114, and inputted into the read control section 113E. With this operation, the read control section 113E holds the image data D1 in the first line in the buffer memory until image data D1 in the next line (a second line in this case) is inputted therein.

The user starts a scanning operation by pressing the operation switch 705 and sliding the image reader 700 shown in FIG. 18 being grasped by the user along the document P in the direction indicated by the arrow Z2. With this operation, the rollers 104, 104, . . . (Refer to FIG. 17) rotate due to a frictional force that acts between the rollers and the document P, which makes an input shaft of the rotary encoder 402 shown in FIG. 17 rotated and driven through the operation described above, and detection of a displacement of the image reader 700 is started. Then, at time t1 shown in FIG. 20, when a displacement detection signal S3 is inputted from the displacement detecting section 401 to the read control section 113E, the read control section 113E recognizes that the image reader 700 has moved by a portion corresponding to one line, and performs interrupt processing indicating data transfer to the image data memory 701 when the next drive signal S2 is outputted at time t6. Namely, the read control section 113E reads the image data D1 in the first line digitized at time t6 from the buffer memory (not shown), and transfers the data to the image data memory 701. With this operation, the digitized image data D1 in the first line is stored in the image data memory 701.

After the step and on, image data D1 in the second line and on is outputted to the image signal processing section 114 each time a drive signal S2 is inputted, in other words, for each driving cycle T, and the read control section 113E updates the previous digitized image data D1 stored in the memory buffer to newly inputted and digitized image data D1 each time the image data D1 digitized by the image signal processing section 114 is inputted by one line.

The read control section 113E monitors whether the displacement detection signal S3 has been inputted within the driving cycle T, and transfers, by processing an interrupt as data transfer when the signal is inputted, the digitized image data D1 for one line stored in the buffer memory to the image data memory 701.

In the examples shown in FIG. 20, interrupt processing as data transfer is executed at time t7, time t8, and time t9, the digitized image data D1 corresponding to the second line, fourth line, and seventh line is transferred to the image data memory 701. Through the operation described above, the digitized image data D1 is successively stored in the image data memory 701 by one line.

Herein, in the example shown in FIG. 20, the displacement detecting signal S3 is inputted twice in total at time t2 and time t3 within one driving cycle T. This type of phenomenon occurs when the image reader 700 is moved at a speed exceeding the image reading speed of the image reader 700. In this case, the read control section 113E executes interrupt processing as data transfer with the displacement detection signal S3 inputted at time t3 as a trigger.

On the other hand, a phenomenon that a displacement detection signal S3 is not inputted within one driving cycle T occurs when a movement speed of the image reader 700 is very low or the image reader 700 is stopped. In those cases, the read control section 113E executes only updating of the previously inputted and digitized image data D1 stored in the buffer memory to digitize image data D1 newly inputted, however, does not transfer the data to the image data memory 701.

Then, assuming that the image reader 700 shown in FIG. 18 is slid from the read start position to the read end position along the document P, the user presses the operation switch 705 shown in FIG. 19 once to terminate the operation of reading an image. With this operation, the read control section 113E recognizes that the image reading operation has been terminated, and terminates the processing of data transfer to the image data memory 701. As a result, digitized image data D1 for a plurality of lines obtained in a first operation of reading an image is stored in the image data memory 701 as image data for a first document P.

After the step and on, when the operation switch 705 is pressed again, the second operation of reading an image is executed by performing the same operation as described above, and digitized image data D1 for a plurality of lines obtained in a second operation of reading an image is stored in the image data memory 701 as image data for a second document P.

During the operation of reading of an image, the read control section 113E monitors the empty space in the image data memory 701. Therefore, when the empty space is run out, the read control section 113E provides controls so that the color of emitted light from the LED 703 is switched from green to red. With this operation, the user recognizes that there is no empty space in the image data memory 701, in other words, an image reading operation can not be performed.

As described above, with the image reader 700 according to Embodiment 7 of the present invention, as the image data memory 701 is provided therein to store digitized image data D1 therein, the image reader 700 can be realized as a standalone device not requiring connection to other computer through a cable when images are to be read.

Therefore, with the image reader 700 according to Embodiment 7 described above, the trouble that the cable is a nuisance at the time of reading an image like in the conventional technology is eliminated, so that adaptability for handling and operability can be improved.

Furthermore, with the image reader 700 according to Embodiment 7 described above, as the configuration for realizing a standalone type is employed, the device can be downsized as compared to the conventional type of image reader with a main body of a computer integrated thereto.

In addition, with the image reader 700 according to Embodiment 7 described above, when the image data memory 701 is formed as a multilayered structure, the packaging space can be made smaller, which allows the device to further be downsized by that minimized portion.

As the image reader 700 has configuration in which the digitized image data D1 corresponding to a document P is stored in the image data memory 701, a plurality sheets of images can continuously be read in one operation of reading an image, which allows adaptability for handling by a user to further be enhanced.

In addition, with the image reader 700 according to Embodiment 7 described above, by switching a color of light emitted by the LED 703, data for the empty space in the image data memory 701 is reported to the user, therefore it is possible to prevent a wasteful operation of reading of an image although there is no empty space in the image data memory 701, which allows adaptability for handling by a user to further be enhanced.

Although the image reader 700 according to Embodiment 7 of the present invention has been described in detail, the specific configuration is not limited to the embodiment but it is clear that all modifications and alternative constructions which fairly fall within the basic teaching herein are included in the present invention. For example, in the image reader 700 according to Embodiment 7 described above, although the description has assumed the case where the digitized image data D1 is successively stored in the image data memory 701 one line by one line by the read control section 113E at the time of data transfer, image data D1 for a plurality of lines may be transferred at a time.

In this case, a large-capacity memory capable of holding image data D1 for a plurality of lines may be used as a buffer memory for the read control section 113E. When the memory is configured as described above, the time required for data transfer can be reduced as compared to successive transfer of the data for one line, so that processing speed can be made higher, which allows throughput of the device to be improved.

In the image reader 700 according to Embodiment 7 described above, although the description has assumed the case where the LED 703 is used and information on the empty space in the image data memory 701 is reported to a user, information on an empty space may be reported by a sound unit such as a beeper in place of the LED 703. In this case, as a report is made with sound, information on an empty space in the image data memory 701 can be reported to a user without fail even if the user is looking at something else or some other occasions.

Furthermore, the image reader 700 according to Embodiment 7 described above may have a sound unit such as a beeper provided therein in addition to the LED 703. In this case, as sound is generated by the beeper in addition to light by the LED 703, information on an empty space in the image data memory 701 can further surely be reported to the user.

In addition, in the image reader 700 according to Embodiment 7 described above, although the EEPROM and (NAND or NOR type) flash memory have been described as one example of the image data memory. 701, any type of the image data memory 701 may be employed on condition that it can store therein digital data.

Figure 21:
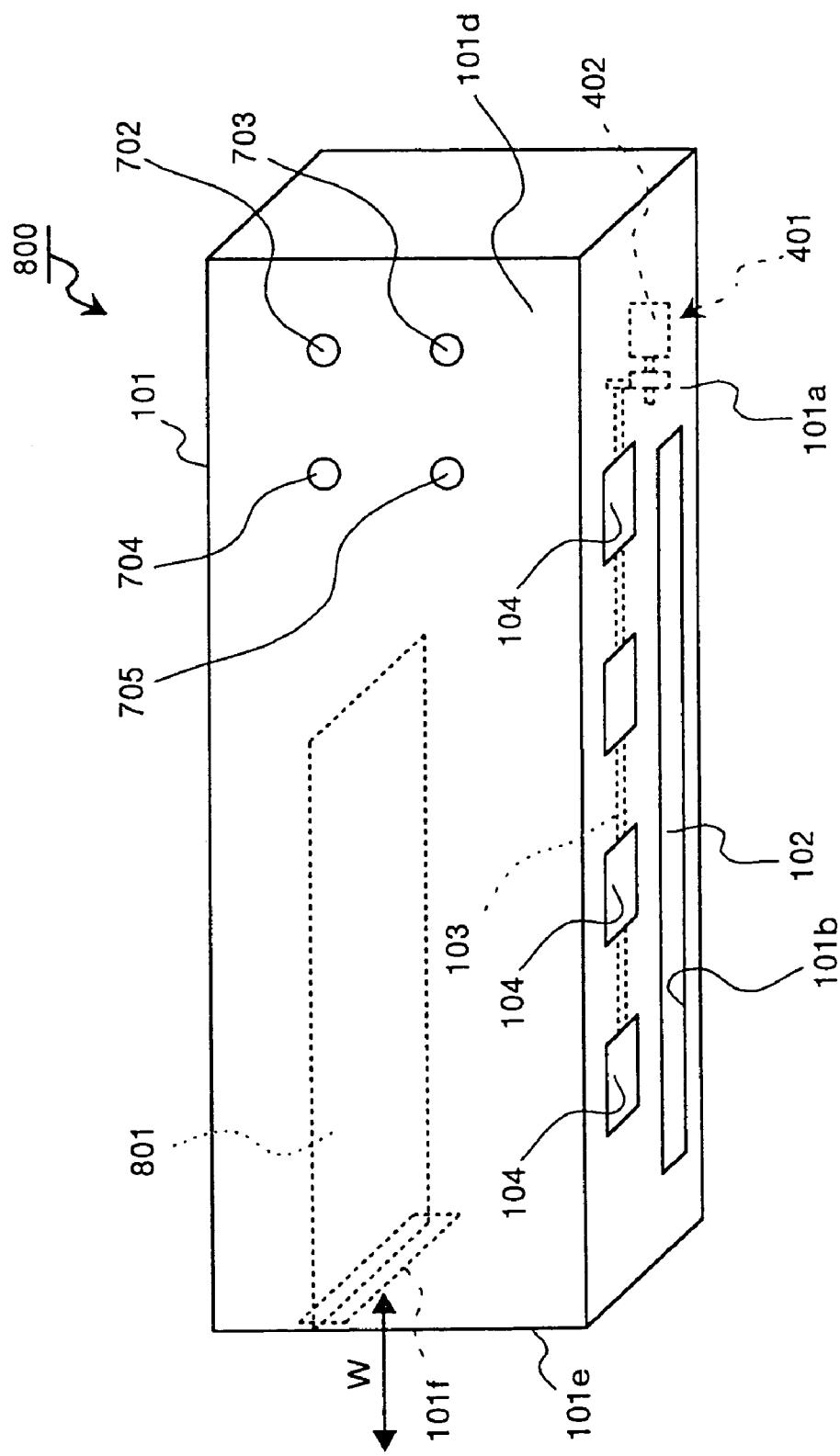
FIG. 21 is a perspective view showing appearance and configuration of an image reader 800 according to Embodiment 8.

An image reader 800 according to Embodiment 8 of the present invention will be described with reference to FIG. 21 and FIG. 22. FIG. 21 is a perspective view showing appearance and configuration of the image reader 800 according to Embodiment 8. In this figure, the same reference numerals are assigned to components corresponding to those in FIG. 17, and description thereof is omitted herein. In FIG. 21, an image data memory 801 is provided in place of the image data memory 701 shown in FIG. 17.

On a left side face 101e of the housing 101 shown in FIG. 21, a slit-shaped insertion port 101f is formed in parallel to the image reading surface 101a. The image data memory 801 is detachably provided on the image reader 800, and is, for instance, a memory card comprising the non-volatile semiconductor memory. Digitized image data D1 is stored in this image data memory 801 like in the image data memory 701 (Refer to FIG. 17).

Assuming that one sheet of image read when an operation of reading of an image is executed once is, the image data memory 801 has an adequate storage capacity for storing image data for a plurality of sheets therein. Further, the image data memory 801 has an interface for an external device such as a computer not shown herein and can be connected to the external device.

Figure 22:
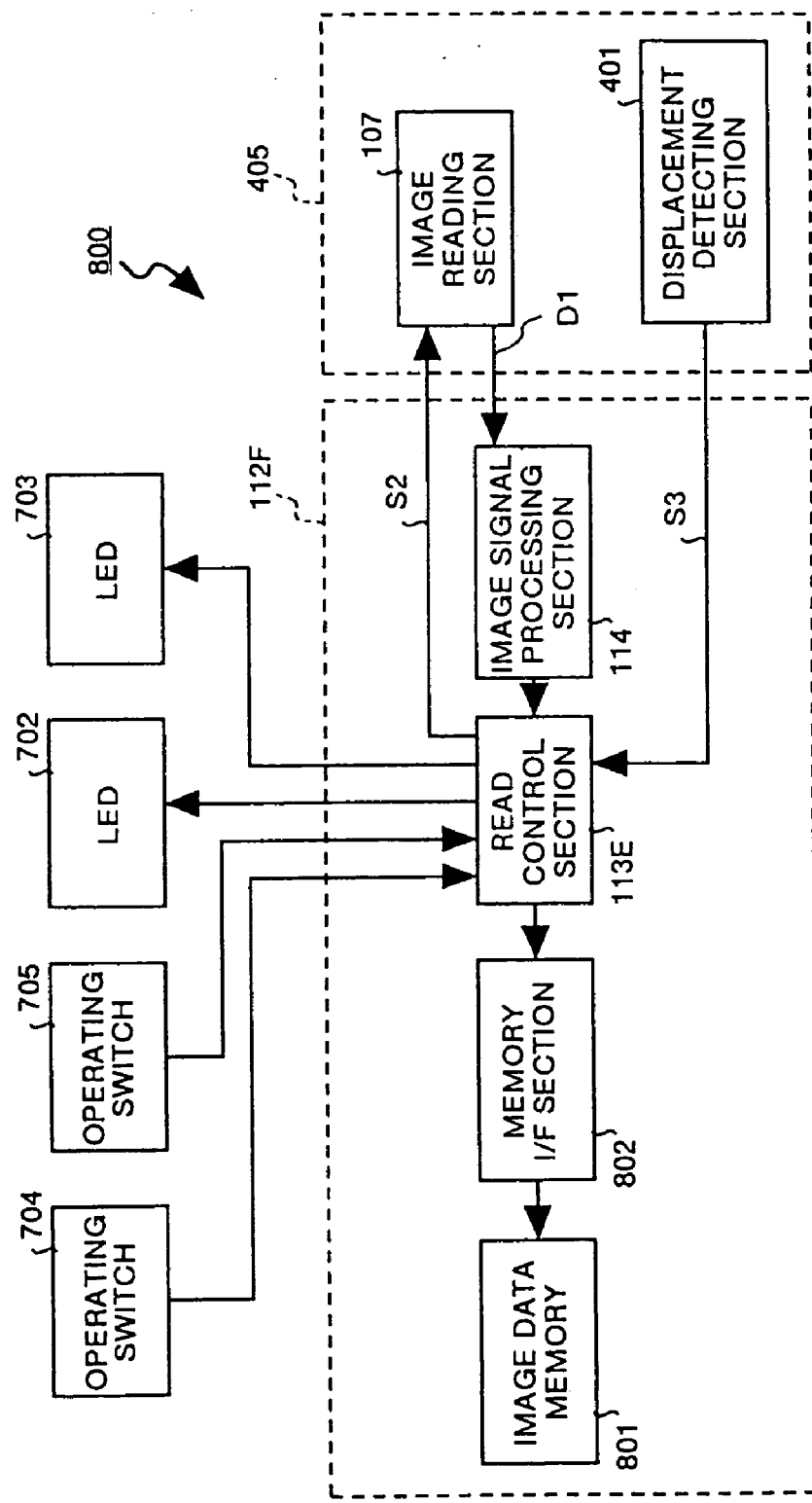
FIG. 22 is a block diagram showing electric configuration of the image reader 800 according to Embodiment 8.

FIG. 22 is a block diagram showing electric configuration of the image reader 800 according to Embodiment 8 described above. In this figure, the same reference numerals are assigned to components corresponding to those in FIG. 19 and FIG. 20, and description thereof is omitted herein. In this figure, a data processing section 112F is provided in place of the data processing section 112E shown in FIG. 19, and in this data processing section 112F a memory I/F section 802 is provided.

The memory I/F (interface) section 802 shown in FIG. 22 plays a role of an interface between the image data memory 801 and the read control section 113E, and also pays a role of a connector for connection of the image data memory 801.

Operations of the image reader 800 according to Embodiment 8 are described below. It should be noted that, as operations of the image reader 800 according to Embodiment 8 are the same as those of the image reader 700 according to Embodiment 7, detailed description thereof is omitted herein.

For the reason described above, description is made below mainly for the processing for transferring data from the read control section 113E to the image data memory 801. In FIG. 21, a user inserts the image data memory 801 into the insertion port 101f for performing an operation for reading an image. With this operation, the image data memory 801 shown in FIG. 22 is electrically connected via the memory I/F section 802 to the read control section 113E, and image data write is enabled.

When the operation for reading an image described above is executed in this state, the operation described above is executed and digitized image data D1 is stored in a buffer memory of the read control section 113E. When a displacement detection signal S3 is inputted, the read control section 113E transfers the digitized image data D1, like in the operation described above, via the memory I/F section 802 to the image data memory 801. With this operation, the digitized image data D1 is stored in the image data memory 801. With this, digitized image data D1 corresponding to a plurality sheets of image is stored in the image data memory 801 through the operation described above.

When the operation for reading an image is finished, a user takes out the image data memory 801 from the insertion port 101f shown in FIG. 21, and connects the image data memory 801 to an interface connecting section for an external device such as a computer not shown herein. Thus, the digitized image data D1 corresponding to a plurality of images stored in the image data memory 801 is read by the external device. The external device displays the images on a display section (not shown) according to the read image data D1.

As described above, with the image reader 800 according to Embodiment 8, the detachable image data memory 801 is further provided in the image reader 800 according to Embodiment 7 described above. Thus, digitized image data D1 stored in the image data memory 801 can be used in an external device (not shown), so that the data can be shared by both the image reader 800 and an external device which improves the image reader's adaptability for various purposes.

Detailed description was made above for the image reader 800 according to Embodiment 8 above, but configuration of an image reader according to the present invention is not limited to this one, and modifications and changes in its design within a gist of the present invention are included in the present invention. For instance, with the image reader 800 according to Embodiment 8 described above, a memory card is used as the image data memory 801, but any type of portable medium (to be precise a drive for the disk) may be used. A floppy disk (to be precise a drive for the medium), an optical disk (to be precise a drive for the medium) or the like may be used as this image data memory 801.

Figure 23:
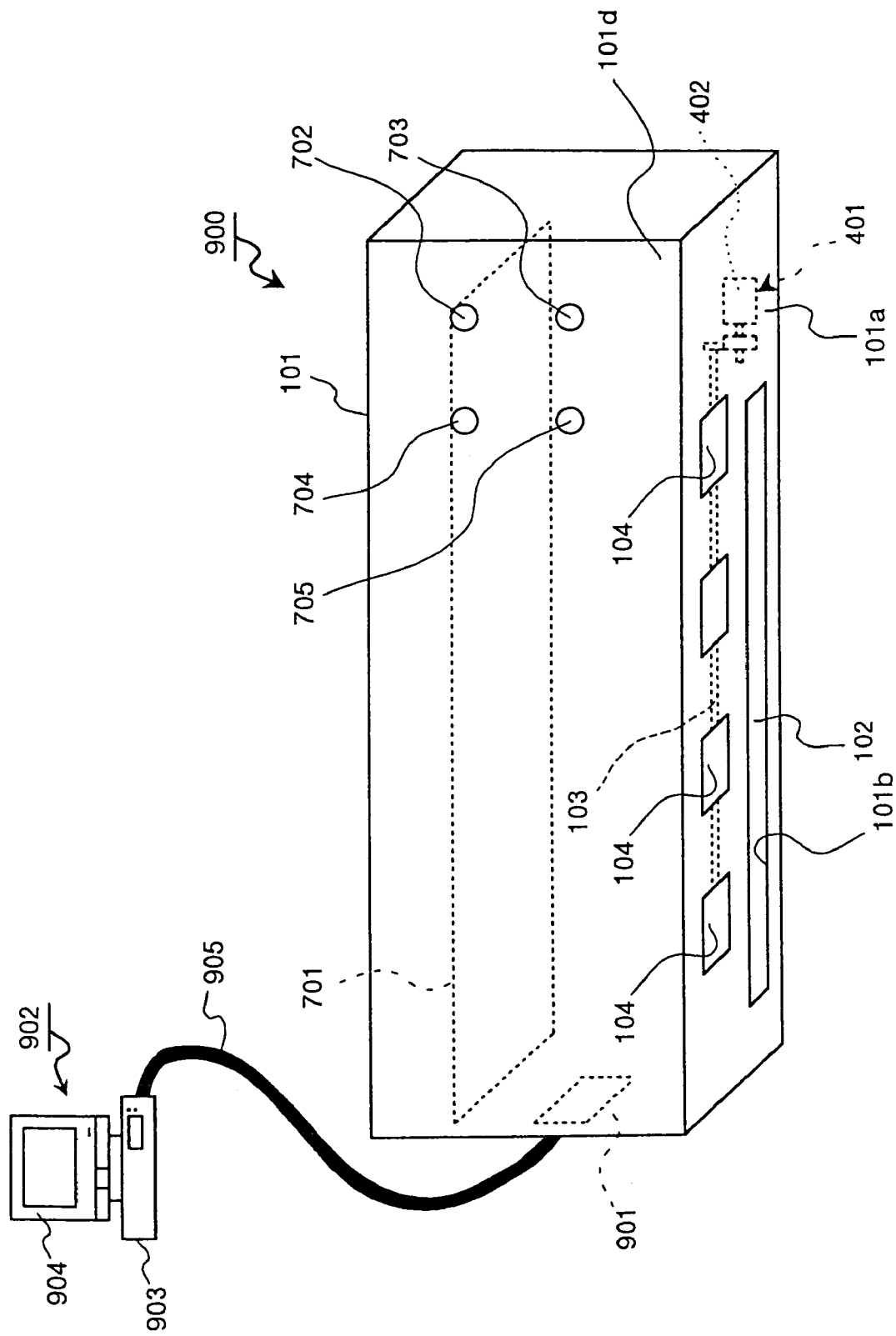
FIG. 23 is a perspective view showing appearance and configuration of an image reader 900 according to Embodiment 9 of the present invention.

An image reader according to Embodiment 9 of the present invention will be described with reference to FIG. 23 and FIG. 24. FIG. 23 is a perspective view showing appearance and configuration of the image reader 900 according to Embodiment 9. In this figure, the same reference numerals are assigned to components corresponding to those in FIG. 17.

In FIG. 23, a computer system 902 comprising a communication control section 901, a computer 903, and a display 904, and a cable 905 are provided as new components. With the image reader 900 according to Embodiment 9, the image data memory 701 can be used as an external storage device for the computer 903.

In the computer system shown in FIG. 23, the computer 903 comprises a CPU (Central Processing Unit) for controlling various sections in the system, a communication control section for controlling communications with external devices, a storage device for storing various types of data therein, and an input device such as a keyboard used for inputting data or instructions for operations and a mouse (not shown), and has the function for processing images. The display 904 is connected to the computer 903, and displays various types of images and characters.

In the image reader 900, the communication control section 901 is incorporated in the housing 101, and is connected via the cable 905 to a communication control section (not shown) of the computer 903. This cable has connectors at both ends thereof for connection, and can disconnectably be connected to the communication control section of the computer 903 and to the communication control section 901 with these connectors. The communication control section 901 provides controls over data communication with the computer 903 through the cable 905.

Figure 24:
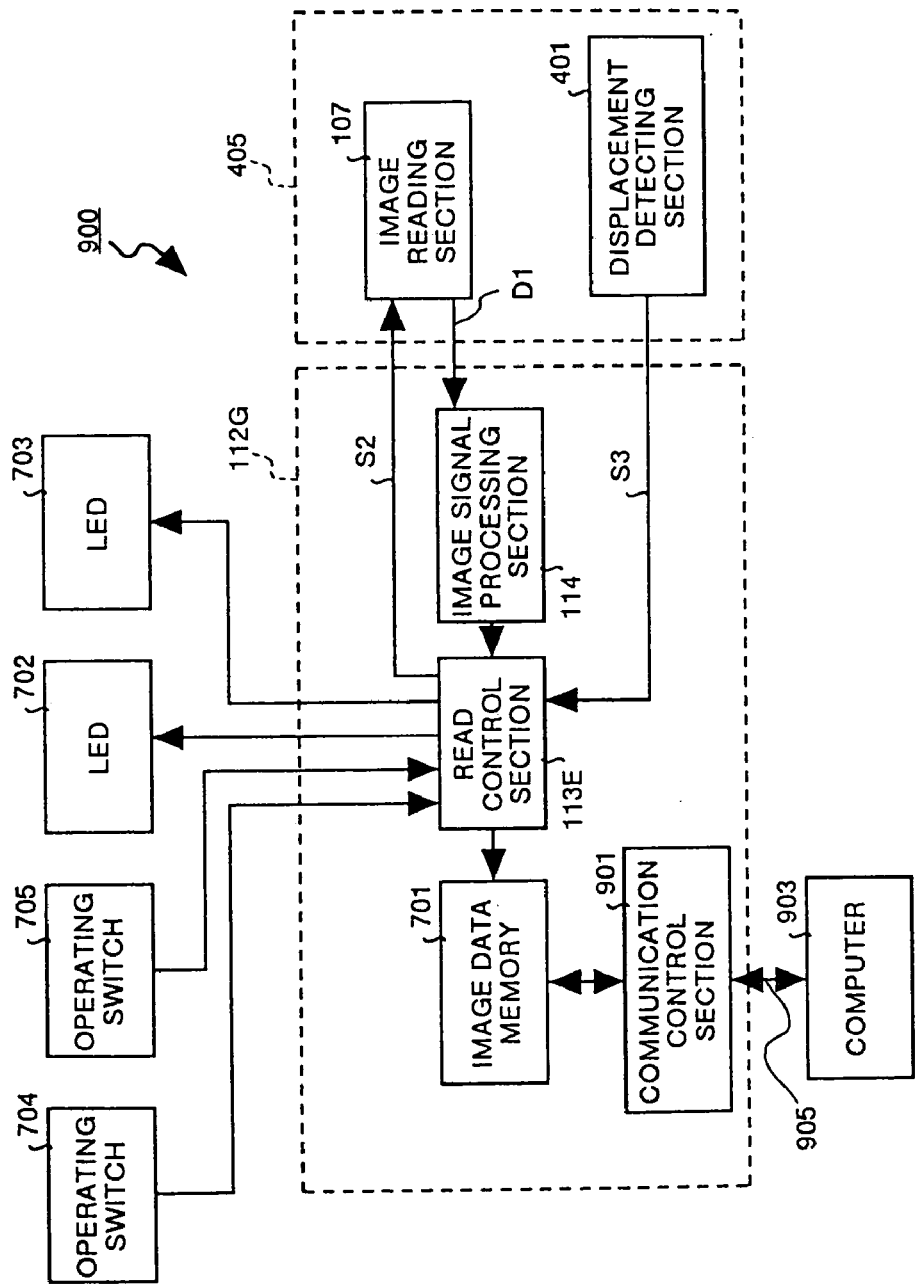
FIG. 24 is a block diagram showing electric configuration of the image reader 900 according to Embodiment 9.

FIG. 24 is a block diagram showing electric configuration of the image reader 900 according to Embodiment 9 described above. In this figure, the same reference numerals are assigned to components corresponding to those in FIG. 19 and FIG. 23. In FIG. 24, a data processing section 112G is provided in place of the data processing section 112E shown in FIG. 19, and in this data processing section 112G, a communication control section 901 is provided as an additional component. In this figure, the communication control section 901 is connected to the image data memory 701 as well as to a communication control section (not shown) of the computer 903, and plays a role as a communication interface for enabling access (data read, write, deletion) to the image data memory 701 from a CPU (not shown) of the computer 903.

Next description is made for operations of the image reader 900 according to Embodiment 9 described above. As operations of the image reader 900 are the same as those of the image reader 700 according to Embodiment 700 described above, so that description thereof is omitted herein.

Description is made for an operation for accessing the image data memory 701 from the computer 903. In FIG. 24, it is assumed that digitized image data D1 corresponding to a plurality of images is stored through the operation for reading an image.

In this state, a user connects the communication control section 901 of the image reader 900 through the cable 905 to a communication control section (now shown) to the computer 903. With this, initial communication is executed between the communication control section 901 and a communication control section of the computer 903 according to a specified communication protocol, and a CPU of the computer 903 recognizes the image data memory 701 as an external storage device via the cable 905 and communication control section 901.

When a user inputs a read command from a keyboard (now shown) of the computer 903, the CPU accesses via a communication control section (not shown), cable 905, and communication control section 901 to the image data memory 701 to read out digitized image data D1 stored in the image data memory 701. Then the CPU stores the image data D1 in a storage device of the CPU itself, or executes data processing such as displaying of an image on the display 904 according to the image data D1.

When a user inputs a write command from the keyboard (not shown), the CPU accesses via the communication control section (not shown), cable 905, and communication control section 901 to the image data memory 701 like in the operation for reading an image described above, and writes the image data stored in the storage device of the CPU itself in the image data memory 701. With this, the image data stored in the computer 903 is written, in addition to the image data D1 read by the image reading section 107, in the image data memory 701.

Further when a user inputs a data delete command from the keyboard (not shown), the CPU accesses the image data memory 701 via the above-described route and deletes image data specified by the user from the digitized image data D1 stored in the image data memory 701.

As described above, with the image reader 900 according to Embodiment 9 described above, the communication control section 901 is provided so that an external device (computer 903) can access the image data memory 701, and because of this configuration, the image data memory 701 can be used as an external storage device for the external device. Therefore, with the image reader 900 according to Embodiment 9, in addition to use as a stand-alone type of device, the image reader can be used as a peripheral device for an external device, so that its adaptability to various applications can be improved.

Detailed description was made above to the image reader 900 according to Embodiment 9 of the present invention, but configuration of the present invention is not limited to that in Embodiment 9, and modifications and changes in design thereof within a gist of the present invention are included in the present invention. Description of Embodiment 9 above assumes a case where data communication is executed through a cable 905, but data communications may be executed by means of radio communications. The radio communications available for this purpose includes microwave communications, optical communications, infrared ray communications or the like. When the microwave communications is employed, an antenna and a transmitter/receiver for transmitting and receiving microwaves are provided in place of the communication control section 901 shown in FIG. 24, and a similar antenna and transmitter/receiver may also be provided in the side of the computer 903. With this configuration, the computer 903 and image data memory 701 are connected to each other through a microwave line.

When the optical communications is employed, a light transmitter/receive having a light emitting element for emitting light and a light receiving element for receiving light is provided in place of the communication control section 901 shown in FIG. 4, and a similar light transmitter/receiver may be provided in the side of computer 903. With this configuration, the computer 903 and image data memory 701 are connected to each other through an optical line.

Further when the infrared ray communication is employed, the configuration is allowable in which, like in the case of optical communications described above, an infrared-ray transmitter/receiver for transmitting and receiving infrared rays is provided in place of the communication control section 901 and a similar infrared-ray transmitter/receiver may be provided also in the side of computer 903. With this configuration, the computer 903 and image data memory 701 are connected to each other through a infrared ray line.

In addition, in Embodiment 9 described above, the configuration is allowable in which the image data memory 801 and memory I/F section 802 are provided in place of the image data memory 701 shown in FIG. 24. In this case, it is required only to connect the communication control section 901 shown in FIG. 24 to the image data memory 801, and in addition to the effects described above, the effects provided by the image reader 801 according to Embodiment 8 can also be provided.

Figure 25:
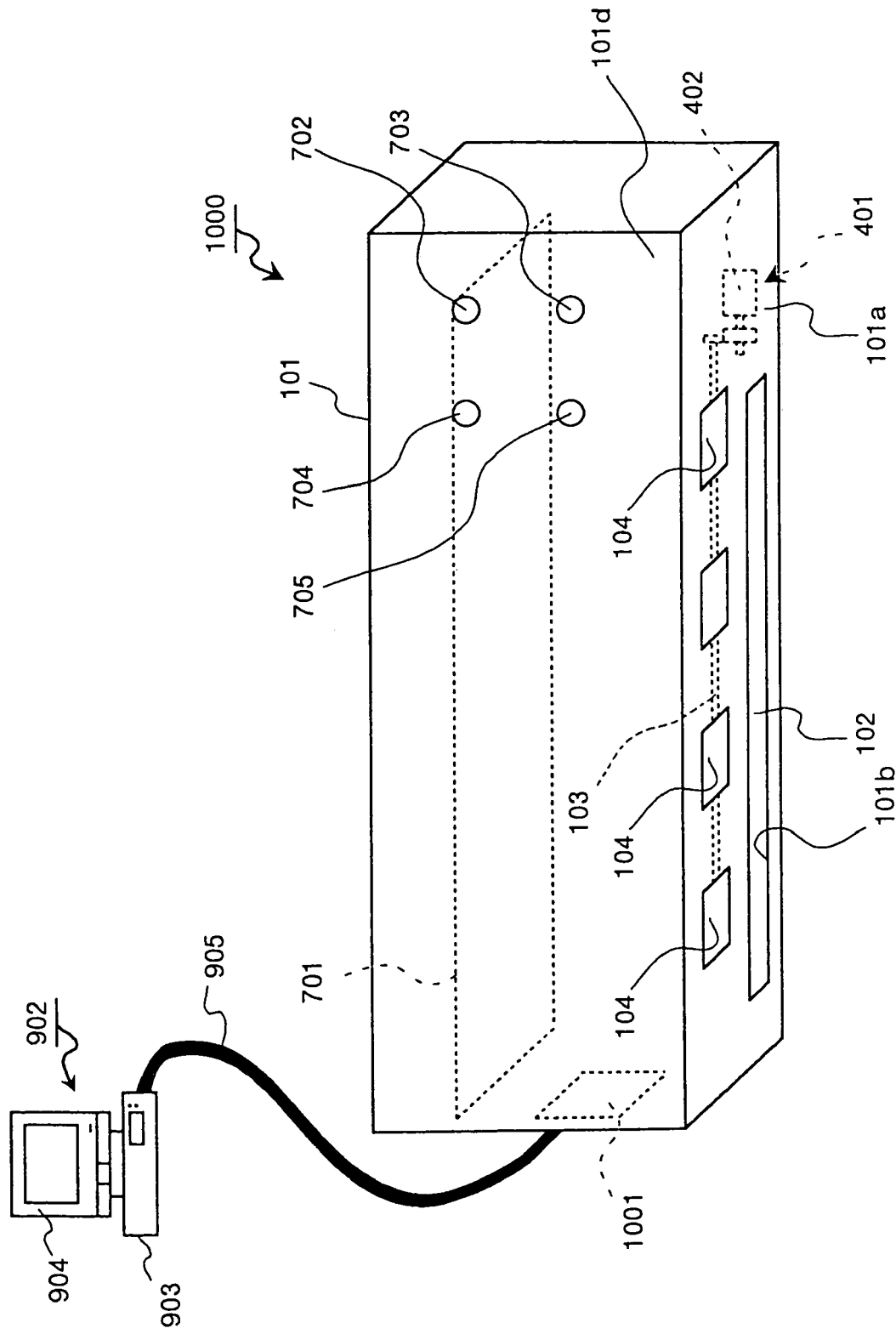
FIG. 25 is a perspective view showing appearance and configuration of an image reader 1000 according to Embodiment 10 of the present invention.

An image reader 1000 according to Embodiment 10 of the present invention will be described with reference to FIG. 25 and FIG. 26. FIG. 25 is a perspective view showing appearance and configuration of the image reader 1000 according to Embodiment 10. In this figure, the same reference numerals are assigned to components corresponding to those in FIG. 23, and description thereof is omitted herein. In FIG. 25, a scanner connecting section 1001 is provided in place of the communication control section 901 shown in FIG. 23. The image reader 1000 according to Embodiment 10 is used as an external image reader (external scanner) for the computer 903.

In the computer system 902 shown in FIG. 25, the computer 903 has a scanner connecting section for connection of the external image reader in addition to the CPU, communication control section, storage device, and input device.

In the image reader 1000, the scanner connecting section 1001 is incorporated in the housing 101, and is connected to a scanner connecting section (not shown) of the computer 903 via the cable 905. This cable 905 has connectors at both ends thereof for connection like in Embodiment 9 described above, and with the connectors, the cable 905 can be connected to a scanner connecting section of the computer 903 as well as to the scanner connecting section 1001. Also the scanner connecting section 1001 functions as an interface for data communications with a scanner connecting section (not shown) of the computer 903 via the cable 905.

Figure 26:
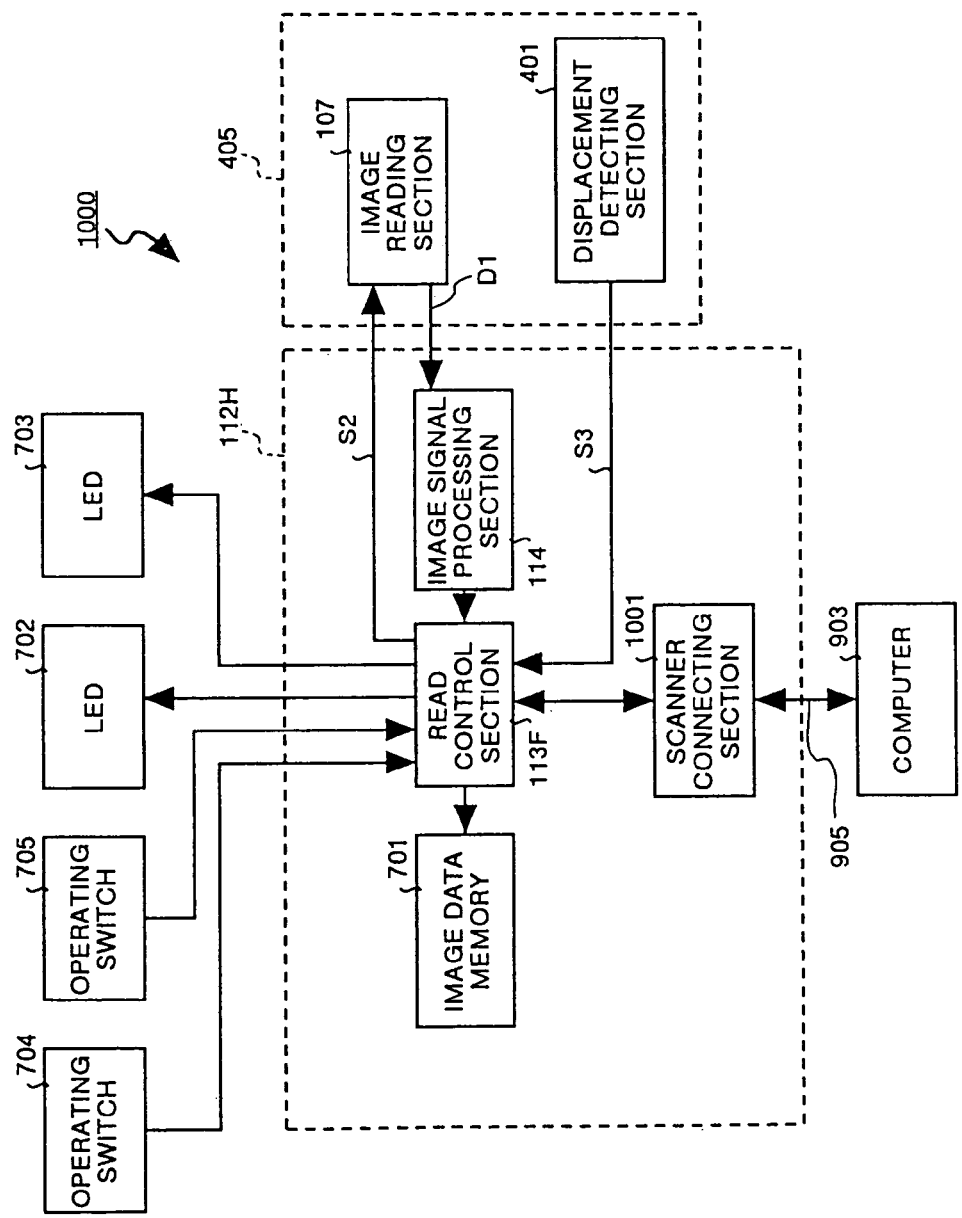
FIG. 26 is a block diagram showing electric configuration of the image reader 1000 according to Embodiment 10.

FIG. 26 is a block diagram showing electric configuration of the image reader 1000 according to Embodiment 10. In this figure, the same reference numerals are assigned to components corresponding to those in FIG. 19 and FIG. 25, and description thereof is omitted herein. In FIG. 26, a data processing section 112H is provided in place of the data processing section 112E shown in FIG. 19. In this data processing section 112H, a read control section 113F is provided in place of the read control section 113E shown in FIG. 19, and also a scanner connecting section 1001 is provided as a new component.

The scanner connecting section 1001 is connected to the read control section 113F and is also connected to a scanner connecting section (not shown) of the computer 903 via the cable 905, and transfers data via the cable 905 to the computer 903 under controls by the read control section 113F when reading an image. Operations of the read control section 113F are the same as those of the read control section 113E shown in FIG. 19, but has additional functions. One of the additional function is an internal transfer function for transferring read image data (digitized image data D1) to the image data memory 701, and the other additional function is an external transfer function for transferring the image data to an external device.

Herein as a mode for switching between the external transfer function and external transfer function, there are a local switching mode by switching the operating switch 705 and a remote switching mode performed from the computer 903. In the local switching mode, the read control section 113F recognizes that the internal transfer function has been selected when the operating switch 705 is pressed two times successively, and when the operating switch 705 is again pressed two times successively, the read control section 113F recognizes that the external transfer function has been selected.

On the other hand, in the remote switching mode, when a user inputs an external transfer command for selecting the external transfer function from the keyboard described above (not shown) and the external transfer command is inputted via the cable 905 and scanner connecting section 1001, the read control section 113F recognizes that the external transfer function has been selected.

Next, for operations of the image reader 1000 according to Embodiment 10 will be described. Herein, operations of the image reader 100 according to Embodiment 10 for reading an image are the same as those of the image reader 701 according to Embodiment 7 for reading an image, and description thereof is omitted herein.

Description is made herein mainly for the internal transfer function and external function described above. In FIG. 25, when a user uses the image reader 1000 as a stand-alone type (portable type) of scanner device, the user places the image reader 1000 with the cable 905 not connected to the scanner connecting section 1001, like in a case of the image reader 700 according to Embodiment 7 described above, at a read start position on a document not shown herein so that the image reading surface 101a comes in contact with the document. With this the rollers 104, 104, . . . contact the document.

Then the user presses the operating switch 704 and turns the power ON, and then presses the operating switch 705 twice successively to select the internal transfer function. With this, the read control section 113F shown in FIG. 26 recognized that the internal transfer function has been selected.

When the operating switch 705 is pressed once by the user and the image reader 1000 is slid on the document, an image on the document is read, and image data D1 for one line is successively outputted from the image reading section 107 to the image signal processing section 114. With this operation, the image data D1 is digitized by the image signal processing section 114 and is inputted into the read control section 113F. It should be noted herein that an instruction for starting an operation for reading an image and an instruction for terminating an operation for reading an image given by operating the operating switch 705 above may be issued by a medium detecting unit such as the document detecting section 105 in the embodiment described above or a photoelectric switch.

In this case, as the internal transfer function has been selected by a user, the read control section 113F temporally stores the inputted digitized image data D1 in a buffer memory. Then the read control section 113F internally transfers the digitized image data D1 stored in the buffer memory to the image data memory 701 each time a displacement detection signal S3 is inputted. With this operation, the digitized image data D1 is stored in the image data memory 701.

On the other hand, when the image reader 1000 is used as an external (stand-alone type) scanner device for the computer 903, the user connects connectors at both ends of the cable 905 to the scanner connecting section 1001 of the image reader 1000 and the scanner connecting section (not shown) of the computer 903 respectively. With this operation, a CPU of the computer 903 recognizes the image reader 1000 as an external scanner device via the scanner connecting section (not shown) cable 905 and scanner connecting section 1001.

Then the user places the image reader 1000 at a read start position on the document now shown so that the image reading surface 101a contacts the document, and presses the operating switch 705 twice successively to select the external transfer function. With this operation, the transfer function is switched from the internal transfer function to the external transfer function, and the read control section 113F shown in FIG. 26 recognizes that the external function has been selected.

When the operating switch 705 is pressed by the user once and the image reader 1000 is slid on the document an operation for reading an image on the document is performed and image data D1 for one line is outputted from the image reading surface 107 to the image signal processing section 114 successively. The image data D1 is digitized by the image signal processing section 114 and is inputted into the read control section 113F. The read control section 13F temporally stores the inputted digitized image data D1 in a buffer memory. When the displacement detection signal S3 is inputted, as the external transfer function has been selected, the read control section 113F externally transfers the digitized image data D1 stored in the buffer memory via the scanner connecting section 1001, cable 905, and a scanner connecting section (not shown) of the computer 903 to a CPU of the computer 903 without transferring the image data D1 to the image data memory 701.

With this operation, the CPU of the computer 903 performs various types of data processing such as storing the inputted digitized image data D1 inputted from the image reader 1000 as an external scanner device in a storage device of the CPU itself, or displaying an image corresponding to the image data D1 on the display unit 904.

When the external transfer function is to be selected in the remote switching mode, the user connects the image reader 1000 via the cable 905 to the computer 903, presses the operating switch 704 once, and then inputs an external transfer command from a keyboard (not shown) of the computer 903. With this operation, the external transfer command is inputted via a scanner connecting section (not shown) of the computer 903, cable 905, and scanner connecting section 1001 into the read control section 113F, and the read control section 113F recognizes that the external transfer function has been selected.

As described above, with the image reader 1000 according to Embodiment 10 described above, the scanner connecting section 1001 is provided and is connected to the computer 903 via the cable 905, and the internal transfer function and external transfer function can freely be selected. Thus, the image reader 1000 can be used as both a portable device and a stand-alone device, so that, the user can use the image reader 1000 in either way according to an application. Therefore, with the image reader 1000 according to Embodiment 10, convenience in practical use can be improved, and also its adaptability to various purposes can be enhanced.

Detailed description was made for the image reader 1000 according to Embodiment 10 of the present invention, but configuration of the present invention is not limited to that in Embodiment 10, and modifications and changes in its design within a gist of the present invention are included in the present invention. For instance, description of the image reader 1000 according to Embodiment 10 above assumes a case where switching between the internal transfer function and external transfer function is executed by a user by means of switching operations or command input from a keyboard, but a configuration is allowable in which the read control section 113F automatically recognizes which of the external transfer function and internal transfer function has been selected according to a connection state of the cable 905 to the scanner connecting section 1001.

More specifically, the read control section 113F monitors whether the cable 905 is connected to the scanner connecting section 1001 or not. When the read control section 113F recognizes that the cable 905 is connected to the scanner connecting section 1001, it automatically recognizes that the external transfer function has been selected. When the read control section 113F recognizes that the cable 905 is not connected to the scanner connecting section 1001, it automatically recognizes that the internal transfer function has been selected.

Accordingly, when the read control section 133F has the automatically recognizing function as described above, a user is not required to operate a switch, nor to input a command from a keyboard, so that convenience in use is further improved. Further, with the image reader 1000 according to Embodiment 10, a configuration is allowable in which the image data memory 801 and memory I/F section 802 shown in FIG. 22 are provided in place of the image data memory 701 shown in FIG. 26. In this case, the same effects as those provided by the image reader 800 according to Embodiment 8 can be obtained in addition to the effects described above.

Figure 27:
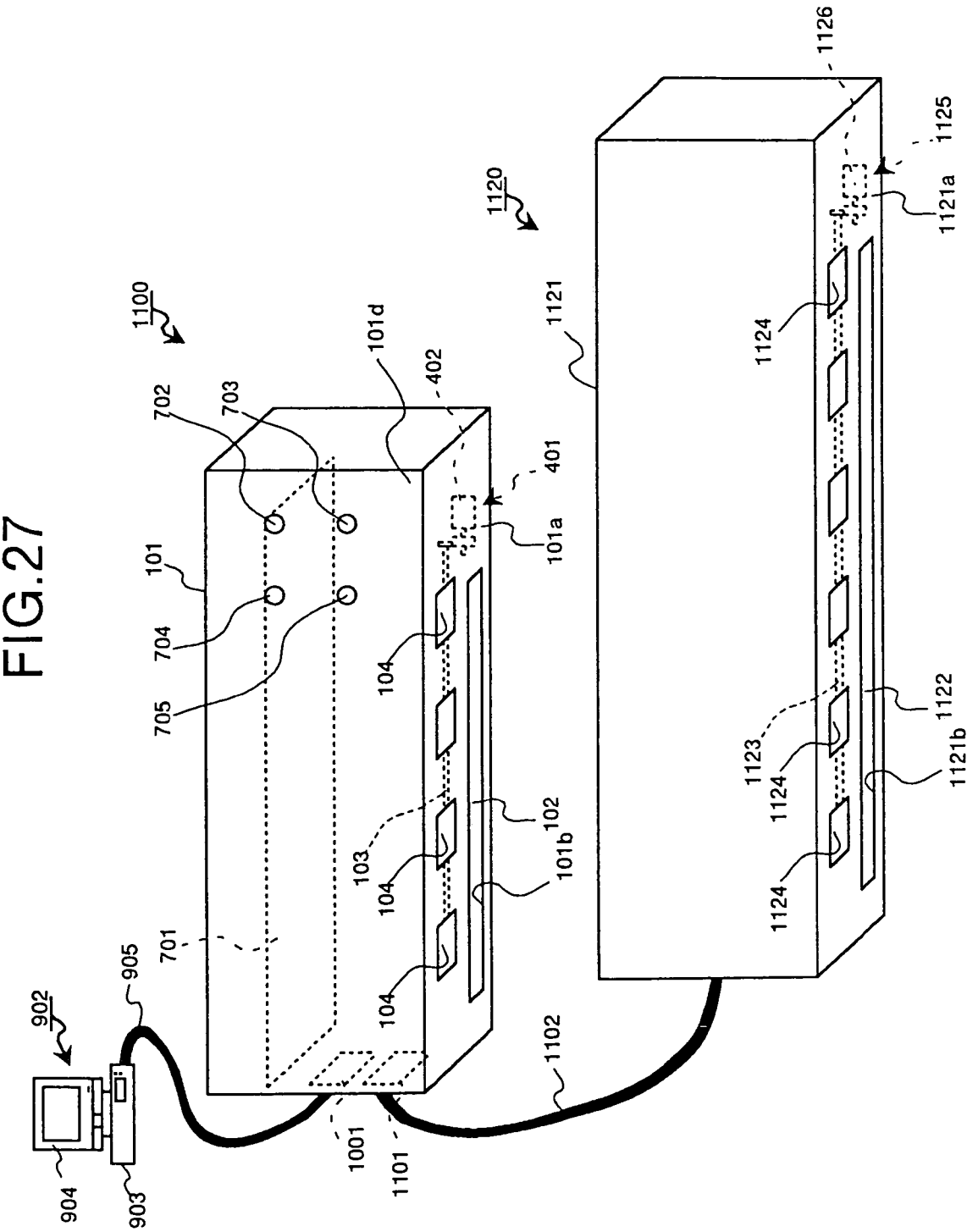
FIG. 27 is a perspective view showing configuration of an image reader 1100 according to Embodiment 11 of the present invention and an auxiliary image reader 1120 used in the same.

An image reader 1100 according to Embodiment 11 of the present invention is described with reference to FIG. 27 and FIG. 28. FIG. 27 is a perspective view showing appearance and configuration of an image reader 1100 according to Embodiment 11 as well as of an auxiliary image reader 1120 used in the image reader 1100. In this figure, the same reference numerals are assigned to components corresponding to those in FIG. 25, and description thereof is omitted herein. In FIG. 27, an external driving section 1101, an auxiliary image reader 1120, and a cable 1102 are provided as new components.

In FIG. 27, the image reader 1100 reads a image on a document having the size A6 (105 mm in the lateral direction×148 mm in the longitudinal direction). In contrast, the auxiliary image reader 1120 reads an image on a document having a different size from that readable with the image reader 1100 (size A6), for instance a document having size A4 (210 mm in the lateral direction×296 mm in the longitudinal direction). In other words, the auxiliary image reader 1120 is used for reading an image on a document having a size which can not be read by the image reader 1100.

The auxiliary image reader 1120 has substantially the same appearance and configuration as that of the image reader 1100, however, a width thereof in the lateral direction is larger than that of the image reader 1100. Description is made below for appearance and configuration of the auxiliary image reader 1120.

In the auxiliary image reader 1120, a housing 1121 is made from synthetic resin and has a rectangular shape. Various components such as an image reading section 1127 (Refer to FIG. 28) and a displacement detecting section 1125 are accommodated in the housing 1121. A rear face of this housing 1121 is an image reading surface 1121a, and is slid along a surface of a document, when reading an image thereon, in a state where the image reading surface 1121a is close to or contacted to a surface of the document. The cable 1102 is connected to an electrical component inside the auxiliary image reader 1120.

On the image reading surface 1121a of the housing 1121, an image reading window 1121b is formed along one long edge thereof in the longitudinal direction, and functions as an emitting port for emitting the light onto the document (not shown) and an inlet port of the light reflected from the document. A width of this image reading window 1121b in the longitudinal direction corresponds to a image reading width on a document having the size A4 described above, and for instance, the width is set to a value slightly larger than a width of the A4 size document (210 mm).

Herein an image reading section (Refer to FIG. 28) comprising the same components as those shown in FIG. 2 (alight source, a lens, and an image sensor) is provided inside the housing 1121.

A transparent protection cover 1122 covers the image reading window 1121b and protects optical elements (not shown) provided inside the housing 1121, and prevents dust and other foreign materials from entering inside thereof. A shaft 1123 is rotatably supported by a support body not shown herein inside the housing 1121, and extends along the image reading surface 1121a.

Rollers 1124, 1124, . . . penetrate the shaft 1123 respectively at a specified gap therebetween. A number of rollers 1124 corresponds to size of a document, and in this case the number is larger than that of rollers 104 in the image reader 1100. The rollers 1124, 1124, . . . are rotated by the shaft 1123. Further these rollers 1124, 1124, . . . are so provided that each of the rollers slightly projects from the image reading surface 1121a to the side of a document not shown. The rollers are rotated with the shaft 1123 when slid over the document.

A displacement detecting section 1125 is provided in the right side of the figure showing the housing 1121, and detects the rotation of the rollers 1124, namely a displacement of the auxiliary image reader 1120 during a scanning operation. This displacement detecting section 1125 has a rotary encoder 1126 having the same configuration as that of the rotary encoder 402.

The rotary encoder 1126 is an optical incremental type of encoder for optically detecting the angle of rotation and is mechanically connected to the shaft 1123 with a gear.

On the other hand, in the image reader 1110, the external driving section 1101 is provided on the housing 101, any plays a role of an interface with the auxiliary image reader 1120 and as a connector for the cable 1102.

Figure 28:
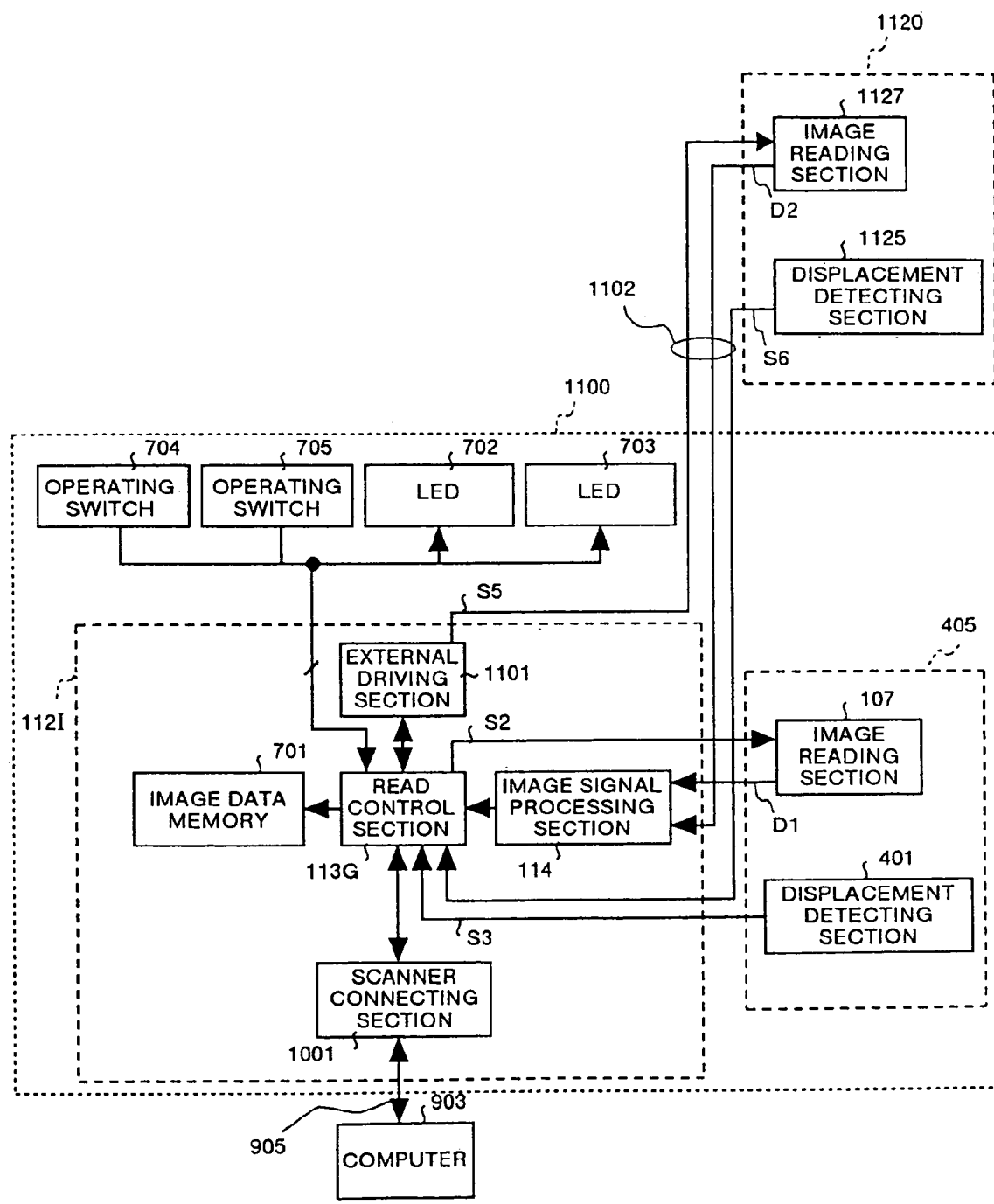
FIG. 28 is a block diagram showing electric configuration of the image reader 1100 according to Embodiment 11 and the auxiliary image reader 1120 used in the same.

FIG. 28 is a block diagram showing electric configuration of the image reader 1100 according to Embodiment 11 described above and the auxiliary image reader 1120 used in the image reader 1100. In this figure, the same reference numerals are assigned to components corresponding to those in FIG. 26 and FIG. 27.

In the image reader 1100 shown in FIG. 28, a data processing section 112I is provided in place of the data processing section 112H shown in FIG. 26. In this data processing section 112I, a read control section 113G is provided in place of the read control section 113F shown in FIG. 26. In FIG. 28, the auxiliary image reader 1120 and cable 1102 are provided as new components.

The basic functions of the read control section 113G shown in FIG. 28 are the same as those of the read control section 113F shown in FIG. 26, but in addition to the basic functions, the read control section 113G has a function for driving and controlling an image reading section 1127 in the auxiliary image reader 1120. Detailed description of the read control section 113G is made later.

The external driving section 1101 has a connector to which the cable 1102 is connected, and when the cable 1102 is connected thereto, a connection signal is outputted to the read control section 113G. The external driving section 1101 outputs, when the cable 1102 is connected thereto, a 1-puse drive signal S5 to the image read section 1127 of the auxiliary image reader 1120 under control by the read control section 113G at a specified time interval. Herein a cycle of the drive signal S5 is a value adapted to the image reading section 1127.

Herein, if the cable 1102 is not connected to the external diving section 1101, the read control section 113G outputs a drive signal S2 to the image reading section 107 of the scanner section 405. When the cable 1102 is connected to the external driving section 1101, the read control section 113G outputs a drive signal S5 via the external driving section 1101 to the image reading section 1127.

In the auxiliary image reader 1120, each time a 1-pulse driving signal S5 is inputted, the image reading section 1127 reads an image for one line like the image reading section 107, and outputs a result of reading as image data D2 via the cable 1102 to the image signal processing section 114. Herein the image data D2 is digitized by the image signal processing section 114, and then is inputted into the read control section 113G. In this step, the read control section 113G temporally stores the digitized image data D2 in a memory buffer (not shown) of its own.

The displacement detecting section 1125 outputs, like the displacement detecting section 401 of the scanner section 405, a 1-pulse displacement detection signal S6 via the cable 1102 to the read control section 113G each time the auxiliary image reader 1120 is moved by a specified distance. The read control section 113G transfers the digitized image data D2 stored in the memory buffer to the image data memory 701 each time the displacement detection signal S6 is inputted like in a case where the displacement detection signal S3 is inputted.

Next, operations of the image reader 1100 and auxiliary reader 1120 according to Embodiment 11 will be described above. Herein, of operations of the image reader 1100, an operation for reading an image is the same as that of the image reader 700 according to Embodiment 7 so that description thereof is omitted herein.

Accordingly, in the following description of operations, of the internal transfer function and external transfer function described in relation to the image reader 1000 according to Embodiment 10 described above, an operation when the auxiliary image reader 1120 is connected to the image reader 1100 is mainly described.

At first, description is made for a case where the image reader 1100 shown in FIG. 27 is used as a stand-alone type (portable type) scanner device and an image on a document having a A4 size is read by using the auxiliary image reader 1120. At first, the user connects the cable 1102 to the external driving section 1101 of the image reader 1100 with a connector.

With this operation, the external driving section 1101 shown in FIG. 28 recognizes that the cable 1102 has been connected, and outputs a result of determination as a connection signal to the read control section 113G. Then the read control section 113G outputs a drive signal S5 via the cable 1102 to the image reading section 1127 of the auxiliary image reader 1120. With this operation, the image reading section 1127 is driven.

Then the user places the image reader 1120 at a read start position of a document having a A4 size not shown herein so that the image reading surface 1121a shown in FIG. 27 contacts the document. With this operation, it is recognized that the rollers 1124, 1124, . . . contact the document. In this case, it is assumed that in the read control section 113G, the internal transfer function described in Embodiment 10 has been selected by the user. In the selected transfer mode, when the operating switch 705 is pressed by the user one and the auxiliary image reader 1120 is slid on the document having a A4 size (not shown), an operation for reading an image on the document is executed, and image data D2 is successively outputted via the cable 1102 to the image signal processing section 114.

With this operation, the image data D2 is digitized by the image signal processing section 114, and is inputted into the read control section 113G. In this case, as the internal transfer function has been selected by the user, the read control section 113G temporally stores the inputted digitized image data D2 in a buffer memory. Then the read control section 113G internally transfers the digitized image data D2 stored in the buffer memory to the image data memory 701 each time the displacement detection signal S6 is inputted. With this operation the digitized image data D2 is stored in the image data memory 701.

Next description is made for operation when the image reader 1100 shown in FIG. 27 is used as an external (portable type) scanner device for the computer 903 and an image on a document having a A4 size is read with the auxiliary image reader 1120.

At first, like in the operation described above, the user connects the connector at the one end of the cable 905 shown in FIG. 27 to a scanner connecting section 1001 of the image reader 1100 and the other connector at the other end of the cable 905 to a scanner connecting section (not shown) of the computer 903. With this, a CPU of the computer 903 recognizes via the scanner connecting section (not shown), cable 905, and scanner connecting section 1001 that the image reader 1100 is an external scanner device.

Then the user connects the cable 1102 to the external driving section 1101 of the image reader 1100. With this, the external driving section shown in FIG. 28 recognizes that the cable 1102 is connected, and then a connection signal is inputted into the read control section 113G.

Then the read control section 113G outputs a drive signal S5 via the cable 1102 to the image reading section 1127 of the auxiliary image reader 1120. With this, the image reading section 1127 is driven.

Then the user places, like in the operation described above, the image reader 1120 at a read start position on a document having a A4 size not shown herein so that the image reading surface 1121a shown in FIG. 27 contacts the document. In this case, it is assumed that, in the read control section 113G, the external transfer function described in Embodiment 10 had been selected by the user.

In the selected mode, when the user presses the operating switch 705 once and slides the auxiliary image reader 1120 on the document having a A4 size (not shown), an operation for reading an image for one line on the document is performed, and image data D2 for one line is successively outputted from the image reading section 1127 via the cable 1120 to the image signal processing section 114. With this operation, the image data D2 is digitized by the image signal processing section 114 and is temporally stored in a memory buffer of the read control section 113G.

When a displacement detection signal S6 is inputted, as the external transfer function has been selected, the read control section 113G externally transfers the digitized image data D2 via the scanner connecting section 1001, cable 905, and the scanner connecting section (not shown) of the computer 903 without transferring the image data D2 to the image data memory 701.

With this operation, the CPU of the computer 903 executes various types of data processing such as storing the image data D2 inputted from the image reader 1100 (or the auxiliary image reader 1120) as an external scanner device) in a storage device of its own or displaying an image corresponding to the image data D2 on the display unit 904.

As described above, with the image reader 1100 according to Embodiment 11 described above, an external driving section 1101 is provided in the image reader 1100 and the auxiliary image reader 1120 capable of reading an image of a document with size different from that readable by the image reader 1100 is connected thereto via the cable 1102, so that images having various sizes can easily be read.

Therefore, with the image reader 1100 according to Embodiment 11 described above, a range of selection of readable sizes is broader, so that convenience in actual use can be improved.

Detailed description was made above for the image reader 1100 according to Embodiment 11 of the present invention, but configuration of the present invention is not limited to that in Embodiment 11, and modifications and changes in its design within a gist of the present invention are included in this invention. For instance, in the image reader 1100 according to Embodiment 11 described above, like in the image reader 1000 according to Embodiment 10, a configuration is allowable in which the read control section 113G automatically recognizes the internal or external transfer function according to whether the cable 905 is connected to the scanner connecting section 1001 or not. With this configuration, a user is not required to perform a switching operation or entry from a keyboard, and convenience for users in use is further improved.

With the image reader 1100 according to Embodiment 11 described above, the image data memory 801 and memory I/F section 802 shown in FIG. 22 may be provided in place of the image data memory 701 shown in FIG. 28. In this case, the same effects as those provided by the image reader 800 according to Embodiment 8 can be obtained in addition to the effects described above.

Figure 29:
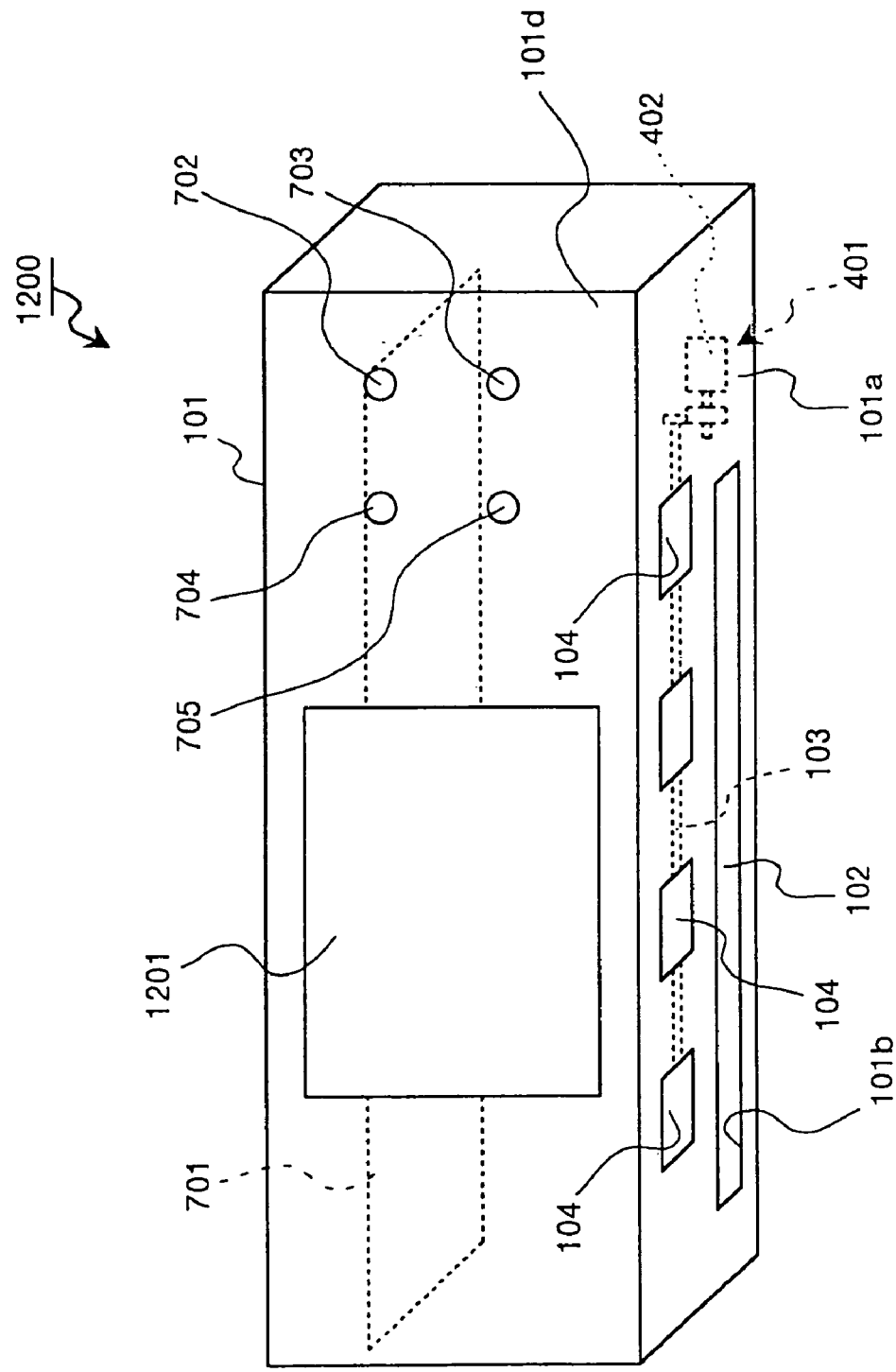
FIG. 29 is a perspective view showing appearance and configuration of an image reader according to Embodiment 12 of the present invention.
Figure 30:
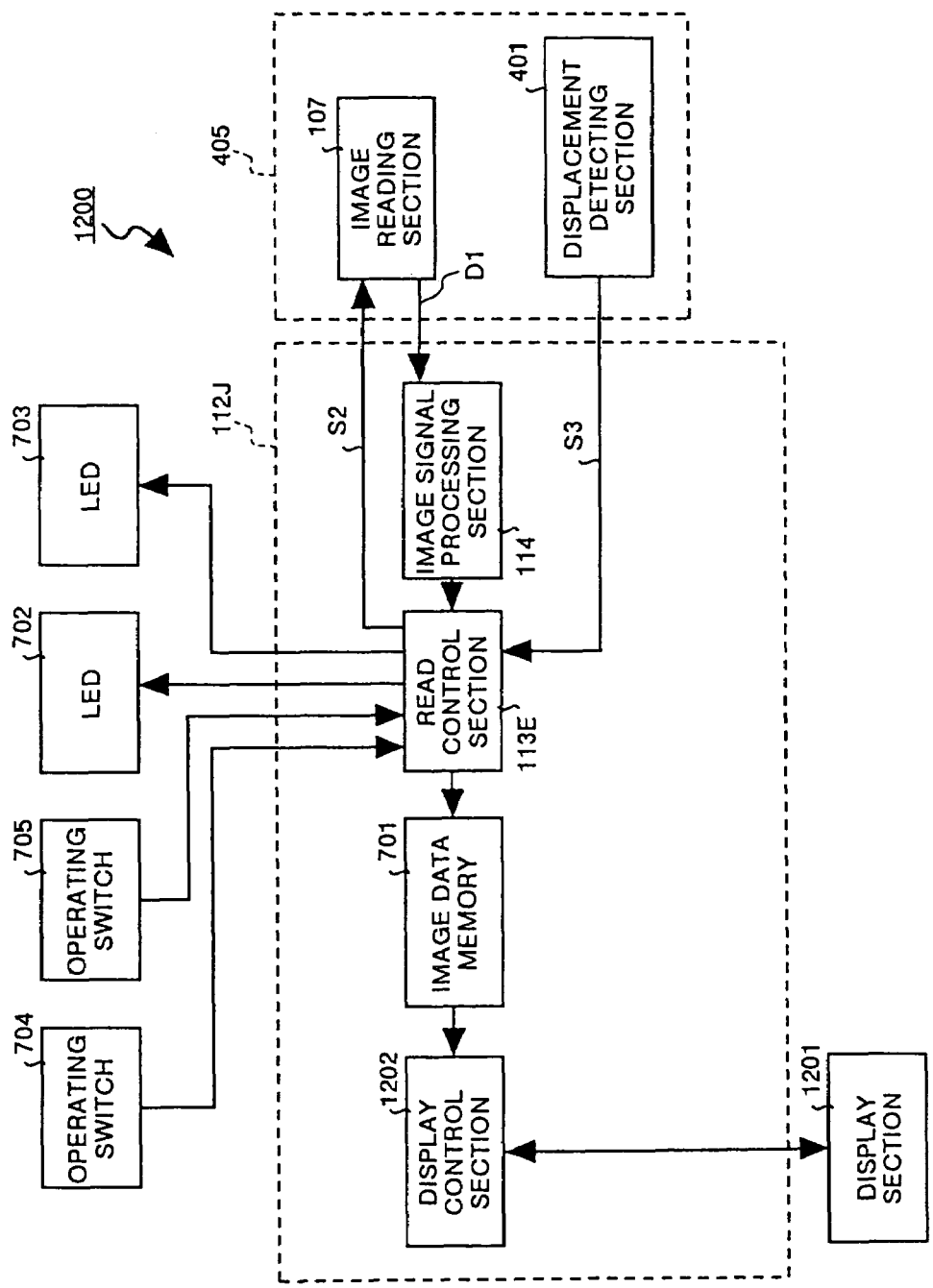
FIG. 30 is a block diagram showing electric configuration of the image reader 1200 according to Embodiment 12.

An image reader 1200 according to Embodiment 12 of the present invention with reference to FIG. 29 and FIG. 30. FIG. 29 is a perspective view showing appearance and configuration of the image reader 1200 according to Embodiment 12. In this figure, the same reference numerals are assigned to components corresponding to those in FIG. 17, and description thereof is omitted herein. In FIG. 29, a display section 1201 is provided as a new component. It should be noted that the image data memory 701 shown in FIG. 27 may not necessarily be perpendicular to the display section 1201 shown in the figure and may it be parallel to the display section 1201.

The display section 1201 is, for instance, a LCD (Liquid Crystal Display), and displays an image read by the image reading section 107 (Refer to FIG. 30). This display section 1201 is an operating surface 101d on the housing 101, and is provided to the left of the operating switches 704 and 705 in the figure. Namely, the display section 1201 is provided at right angles against the image reading surface 101a.

FIG. 30 is a block diagram showing electric configuration of the image reader 1200 according to Embodiment 12 described above. In this figure, the same reference numerals are assigned to components corresponding to those in FIG. 19. In FIG. 30, the data processing section 112J is provided in place of the data processing section 112E shown in FIG. 19. In this data processing section 112J, a display control section 1202 is provided as a new component.

The display control section 1202 shown in FIG. 30 is provided between the display section 1201 and image data memory 701, and provides controls over display by the display section 1201. More specifically, the display control section 1202 reads out the digitized image data D1 stored in the image data memory 701, and generates display image data according to the image data D1. Further, the display control section 1202 supplies the display image data to the display section 1201 to have an image read with the image reading section 107 displayed on the display section.

Next, operations of the image reader 1200 according to Embodiment 12 will be described. When an image is to be read, the user places the image reader 1200 at a read start position on a document so that the image reading surface 101a shown in FIG. 29 comes in contact with the document. With this, the rollers 104, 104, . . . contact the document.

Then the user presses the operating switch 704, and starts a scanning operation holding the image reader 1200 by sliding the image reader 1200 on the document in the scanning direction. With this operation, the rollers 104, 104, . . . are rotate due to a frictional force with the rollers and document. The displacement detecting section 107 successively outputs a displacement detection signal S3 to the read control section 113E according to a displacement, and the image data D1 for one line is outputted from the image reading section 107 to the image signal processing section 114 in response to the drive signal S2.

Then, the image data D1 is digitized by the image signal processing section 114 and then is stored in a buffer memory of the read control section 113E and further transferred to the image data memory 701 each time a displacement detection signal S3 is inputted into the read control section 113E. After this, the operations described above are executed, and the digitized image data D1 corresponding to an image of the document is successively stored in the image data memory 701.

Concurrently with the data write operation to the image data memory 701, the display control section 1202 reads out the image data D1 digitized by the image data memory 701, and successively outputs the image data D1 as display image data to the display section 1201. Then, an image being read currently is displayed on the display section. Accordingly, the user can visually check a display screen of the display section 1201 while performing an operation of reading of the image (moving the image reader 1200).

In the image reader 1200 according to Embodiment 12 described above, even when an operation of reading of the image is not being performed, it is possible to read out the digitized image data D1 stored in the image data memory 701 and have an image corresponding to the image data D1 displayed on the display section 1201 by operating the operating switch 705.

Namely, in a state where an operation of reading of the image with the image reader 1200 is not being performed, when the operating switch 705 is pressed down, the display control section 1202 reads out the digitized image data D1 from the image data memory 701, generates display image data according to the read digitized image data D1, and outputs the display image data to the display section 1201. Thus, the user can check images read in the past on a display screen of the displaying section 1201.

As described above, with the image reader 1200 according to Embodiment 12 described above, the display control section 1202 and display section 1201 are provided, and an image being read currently (or an image read in the past) is displayed on the display section. Thus a user can perform an operation for reading an image while visually checking the image read currently or in the past, and because of this feature, convenience in actual use can be improved. Further with the image reader 1200 according to Embodiment 12, the display section 1201 is provided perpendicular to the image reading surface 101a, so that no trouble occurs during an operation for reading an image.

Detailed operation was made above for the image reader 1200 according to Embodiment 12, but configuration of the present invention is not limited to that in Embodiment 12, and modifications and changes in its design within a gist of the present invention are included in this invention. For instance, description of the image reader 1200 according to Embodiment 12 above assumed a case where an LCD is used as the display section 1201, but any type of display section may be used on the condition that it can display the images. Other examples of this display section 1201 include a plasma display unit.

Also in the image reader 1200 according to Embodiment 12, the image data memory 801 and memory I/F section 802 shown in FIG. 22 may be provided in place of the image data memory 701 shown in FIG. 30. In this case, in addition to the effects as described above, the same effects as those provided by the image reader 800 according to Embodiment 8 can be obtained.

Further, description of the image reader 1200 according to Embodiment 12 assumed a case where various operations are performed by operating the operating switches 704, 705, but the configuration is not limited to this one, and a configuration is allowable in which a touch screen is adhered to a surface of the display section 1201 and various operations are performed by pressing this touch screen. In this case, a menu for selecting the operations is displayed by the display control section 1202 on the display section 1201, and a user performs various operation by touching corresponding portions of the touch screen. With this configuration, a user can select a required operation while visually checking the menu for selection of operations on the display section 1201, so that probability of erroneous input is reduced as compared to that in a case where various operations are performed by operating the operation switches 704, 705.

Further in this configuration, a user can select a required operation by simply pressing a touch screen on the display section, so that convenience in use can further be enhanced. In the image reader 1200 according to Embodiment 12 described above, a case where the display section 1201 is provided on the operating surface 101d as shown in FIG. 29 was described, but configuration is not limited to this one, and the display section 1201 may be provided at any position so long as user can visually check the display position easily.

Further, with the image reader 1200 according to Embodiment 12, as shown in FIG. 29, the display section 1201 is integrated with the housing 101, but the configuration is not limited to this one, and a configuration is allowable in which the control section 1202 and display section 1201 shown in FIG. 30 are provided separately and connected to each other with a cable. In this case, a position for installing the display section 1201 and an angle thereof can freely be adjusted, so that convenience in practical use can further be enhanced.

In addition, with the image reader 1200 according to Embodiment 12 described above, the display section 1201 is provided at a fixed position on the operating surface 101d, but the configuration is not limited to this one, and a configuration is allowable in which a hinge mechanism or the like is provided between the display section 1201 and the operating surface 101d to enable adjustment of an angle of the display section 1201. In this case, an angle of a display screen of the display section 1201 can freely be changed according to the user's needs, so that the display section 1201 can easily be arranged at the most preferable position for the user. Accordingly, convenience for users in practical use can further be enhanced.

Figure 31:
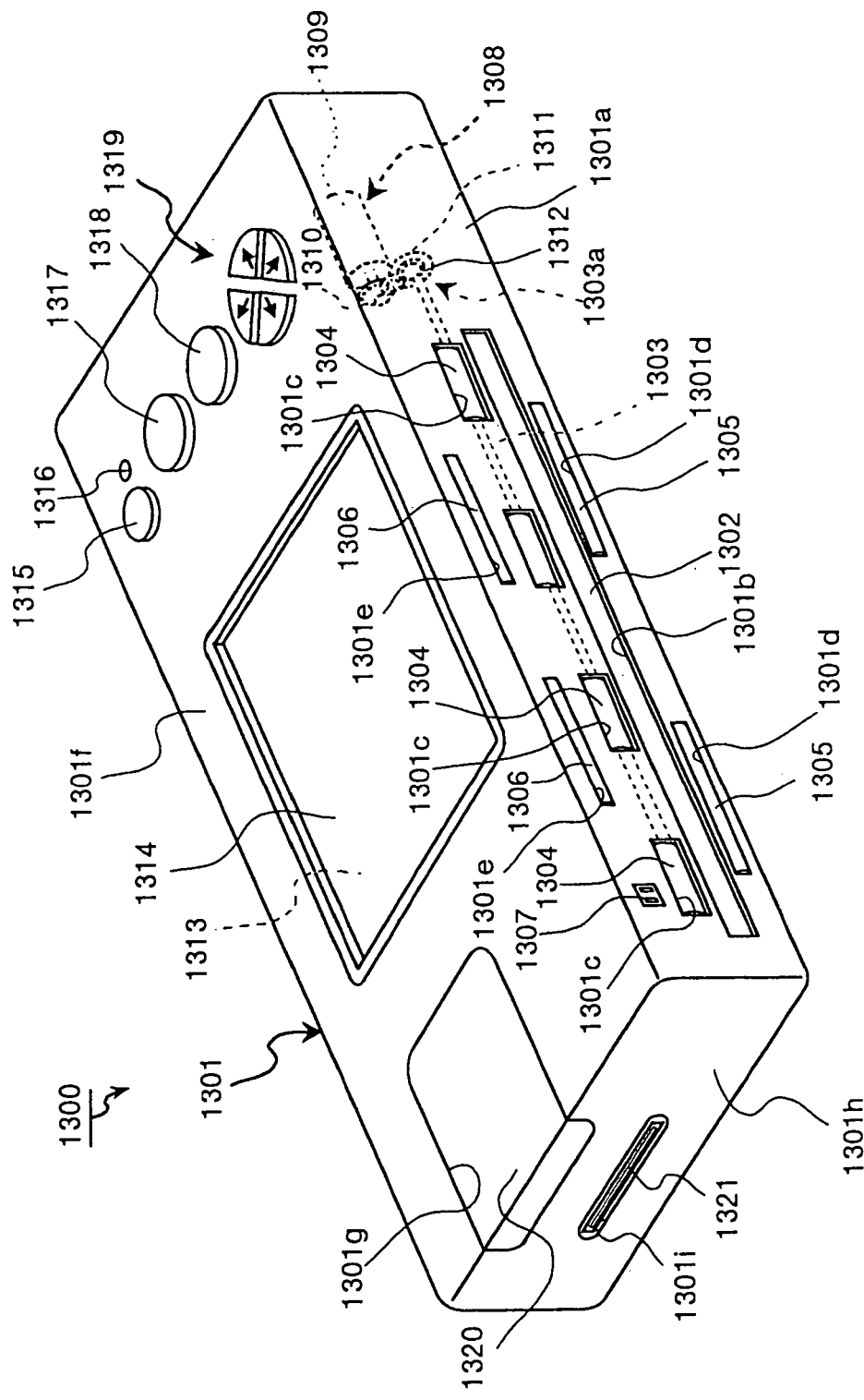
FIG. 31 is a flat perspective view showing appearance and configuration of an image reader 1300 according to Embodiment 13.
Figure 32:
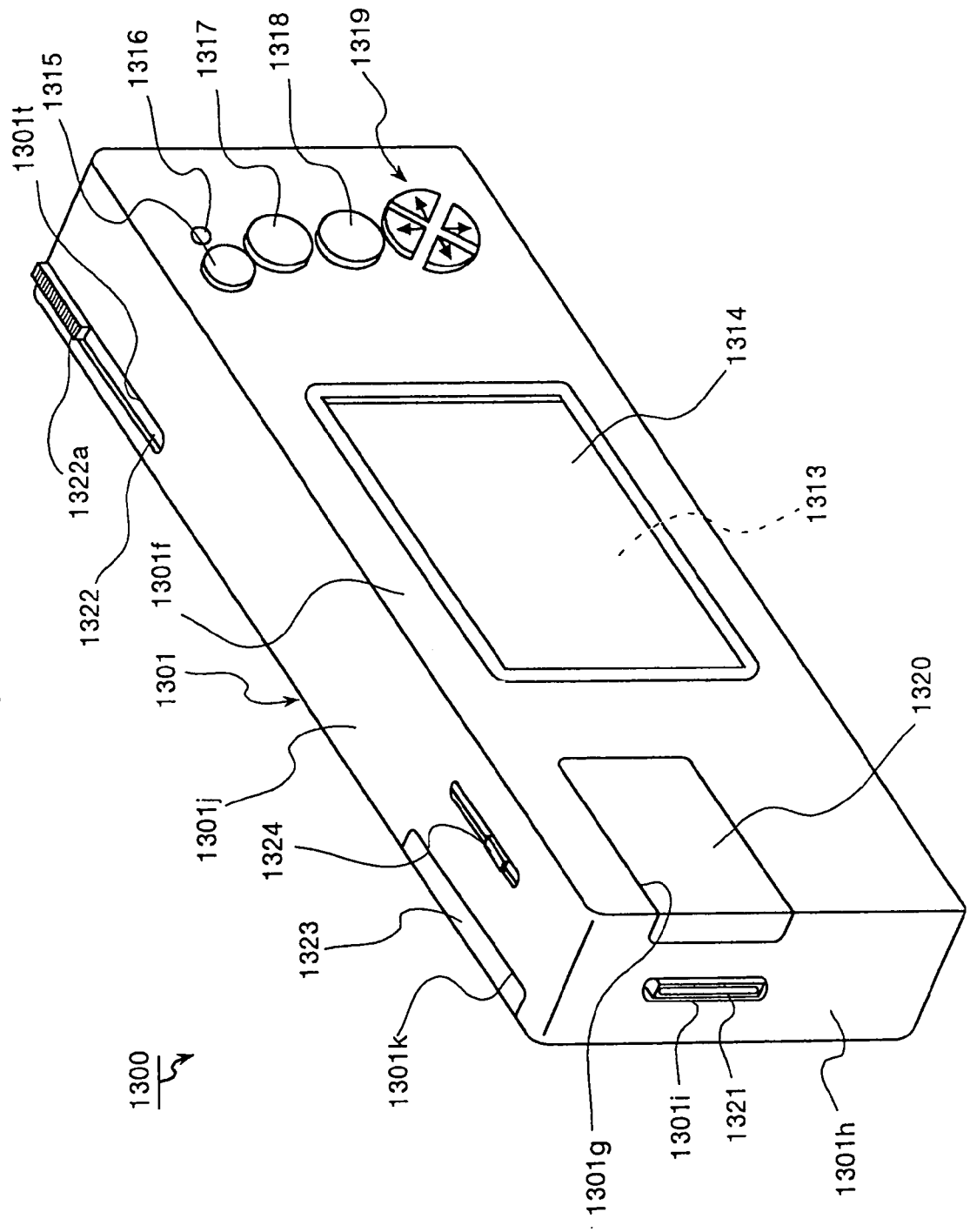
FIG. 32 is an erected perspective view showing appearance and configuration of the image reader 1300 according to Embodiment 13.
Figure 33:
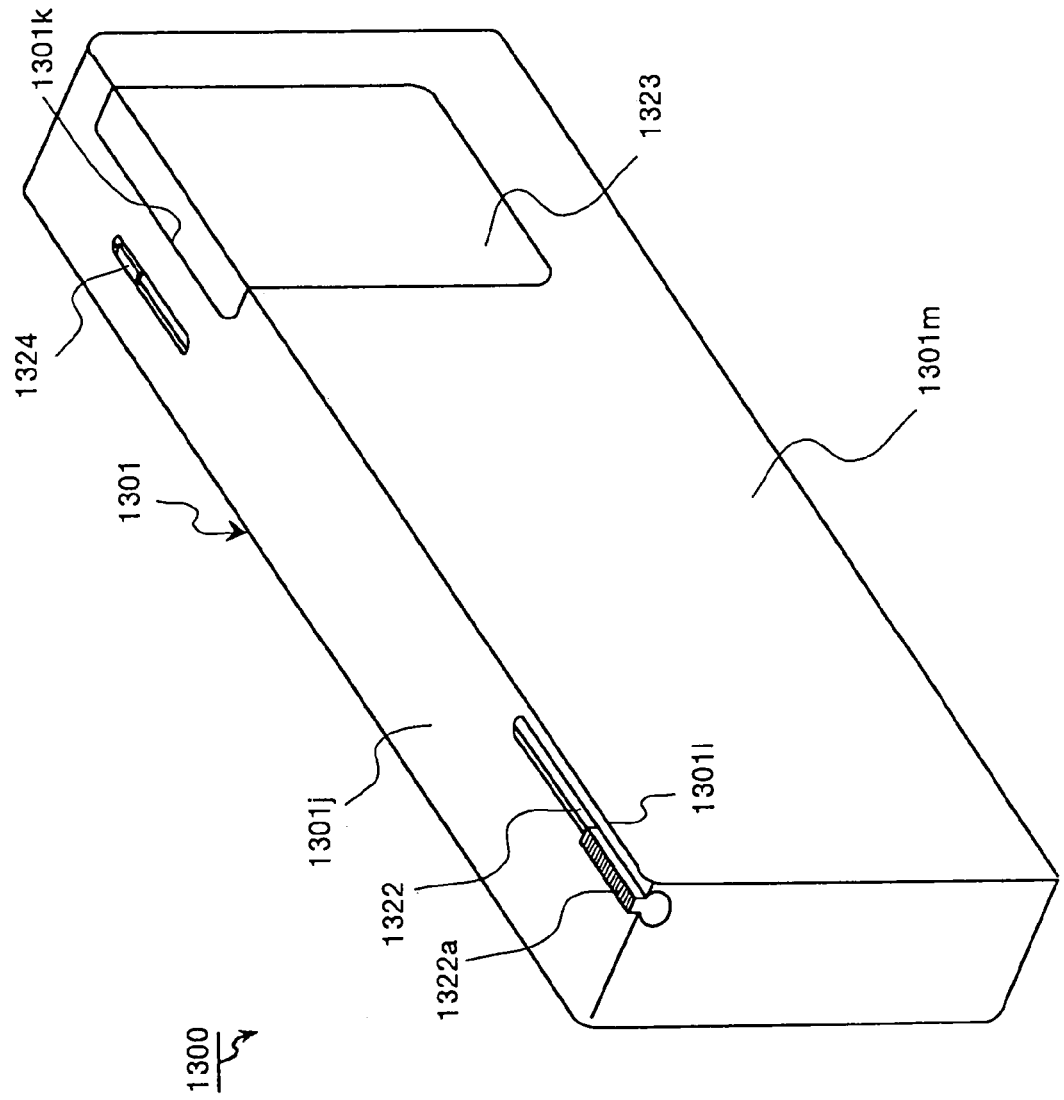
FIG. 33 is a rear perspective view showing appearance and configuration of the image reader 1300 according to Embodiment 13.
Figure 34:
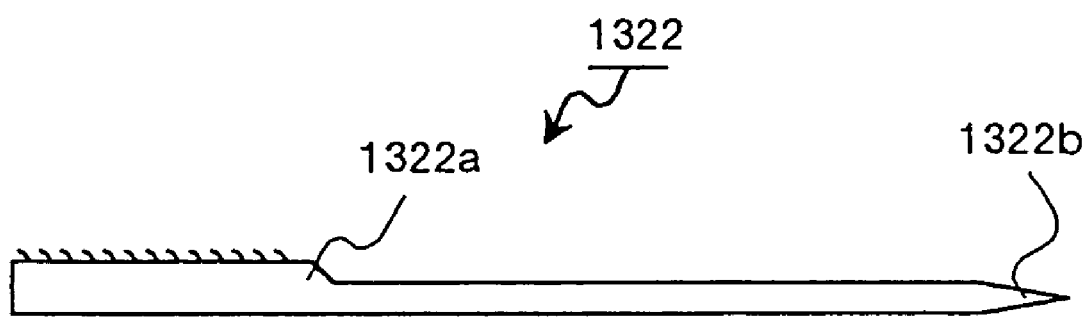
FIG. 34 is a side view showing configuration of a pen 1322 shown in FIG. 32.

Next, An image reader 1300 according to Embodiment 13 of the present invention will be described. At first, description is made for appearance and mechanical configuration of the image reader 1300 according to Embodiment 13 with reference to FIG. 31 to FIG. 43. Herein FIG. 31 is a flat perspective view showing appearance and configuration of the image reader 1300 according to Embodiment 13. FIG. 32 is a erected perspective view showing appearance and configuration of the image reader 1300. FIG. 33 is a rear perspective view showing appearance and configuration of the image reader 1300.

When the image reader 1300 shown in FIG. 31 is held and slid along a surface of a document P with an image reading surface 1301*a* thereof contacting thereto (Refer to FIG. 41), the image reader 1300 optically inputs image data for one line on the document P successively for displaying the read image. The image reader 1300 shown in this figure has a housing 1301 which is made from synthetic resin and has a rectangular shape. Various components including a MPU (Micro Processing Unit), a flash memory 1355, a DRAM 1356 each described later or the like are accommodated in the housing 1301.

A side face of the housing 1301 shown in the figure is an image reading surface 1301*a*, and is slid along a surface of the document P at a position close (or contacted) to the document P when reading an image. On the image reading surface 1301*a* of the housing 1301, an image reading window 1301*b* is formed along one of long edges thereof in the longitudinal direction and plays a role of an emission port for emitting light on the document P and an inlet port for the light reflected from the document P. A length of this image reading window 1301*b* in the longitudinal direction corresponding to an image read width by the image reader 1300 against the document P, and is set, for instance, a value slightly larger than a width of a document P having the A6 size (105 mm in the lateral direction and 148 mm in the longitudinal direction).

A protection cover 1302 covers the image reading window 1301*b*, protects the optical components (not shown) provided inside the housing 1301 and also prevents dusts or other foreign materials from entering into the housing 1301. In the image reading surface 1301*a*, rectangular holes 1301*c*, 1301*c*, . . . are formed along the other long edge thereof in parallel to the image reading window 1301*b* at a specified gap therebetween in the upper section of the image reading window 1301*b*. A shaft 1303 is rotatably provided inside the housing 1301 around a support body (not shown) along the rectangular holes 1301*c*, 1301*c*, . . . . Main rollers 1304, 1304, . . . are provided in correspondence to the rectangular holes 1301*c*, 1301*c*, . . . and penetrate the shaft 1303 at a specified gap therebetween. Namely the main rollers 1304, 1304, are rotated by the shaft 103 correlatively. In the example shown in the figure, in all four main rollers 1304 are provided.

Figure 36:
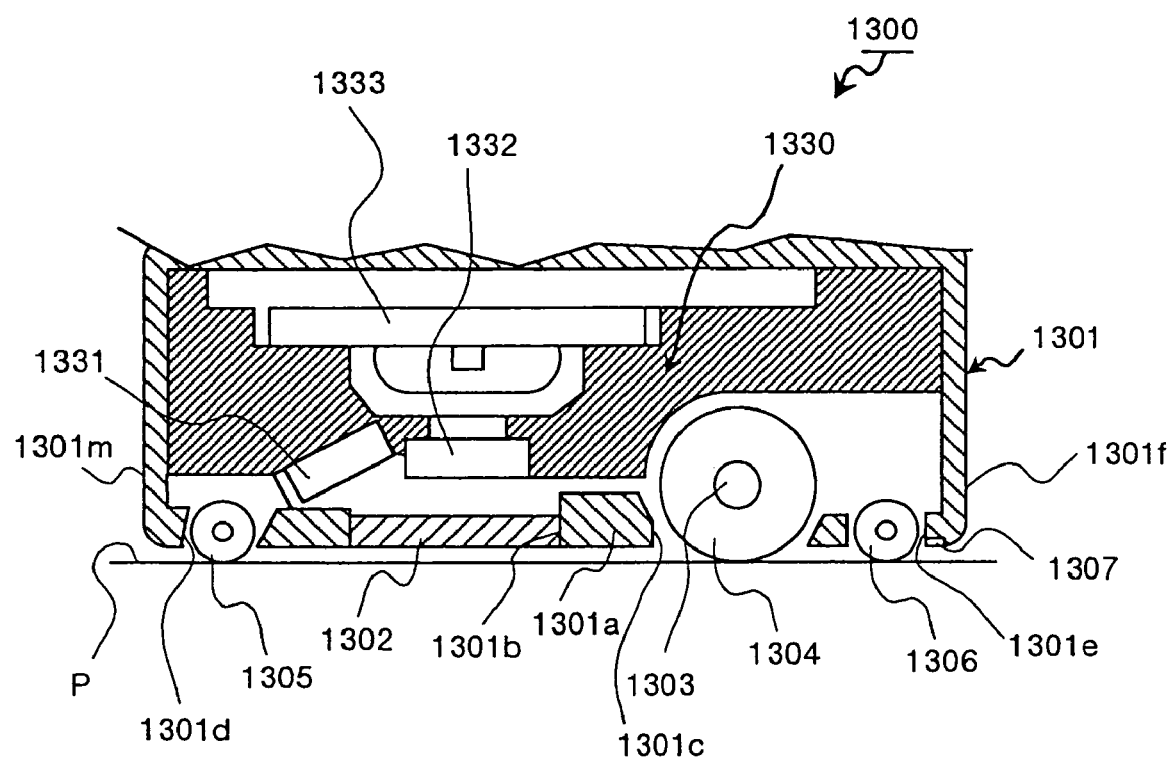
FIG. 36 is a partially cut view showing internal configuration of the image reader 1300 according to Embodiment 13.

The main rollers 1304, 1304, . . . each project slightly from the image reading surface 1301*a* to the side of document P as shown in FIG. 36, and rotate correlatively with the shaft 1303.

In the image reading surface 1301*a*, rectangular holes 1301*d*, 1301*d* are provided along a long edge thereof in parallel to the rectangular holes 1301*c*, 1301*c*, . . . with the image reading window 1301*b* therebetween at a specified gap therebetween in the lower section of the image reading window 1301*b* in the figure. First auxiliary rollers 1305, 1305 are provided in correspondence to the rectangular holes 1301*d*, 1301*d*, and penetrate the shaft not shown at a specified gap therebetween. Namely, each of the first auxiliary rollers 1305, 1305 are rotatably provided. In the example shown in the figure, in all two first auxiliary rollers 1305 are provided.

The first auxiliary rollers 1305, 1305 are so provided that each of them slightly projects from the image reading surface 1301*a* to the side of the document P. When the device is slid on the document P, the first auxiliary rollers 1305, 1305 rotate in correlation with the main roller 1304. In the image reading surface 1301*a*, rectangular holes 1301*e*, 1301*e* are formed along a long edge thereof in parallel to the rectangular holes 1301*d*, 1301*d* with the image reading window 1301*b* therebetween above the main rollers 1304, 1304 each with a specified gap therebetween in the figure.

Second auxiliary rollers 1306, 1306 are provided in correspondence to the rectangular holes 1301*e*, 1301*e*, and penetrate a shaft not shown at a specified gap therebetween respectively. Namely, each of the second auxiliary rollers 1306, 1306 are rotatably provided. In the example shown in the figure, the same number of second rollers 1306 as that of the first auxiliary rollers, namely two second auxiliary rollers 1306 are provided. Also these second auxiliary rollers 1306, 1306 are so provided that each of them slightly projects from the image reading surface 1301*a* to the side of the document P, and when the device is slid on the document P, the second auxiliary rollers 1306, 1306 rotate in correlation to the main roller 1304 as well as to the first auxiliary rollers 1035, 1305, . . . .

Figure 35:
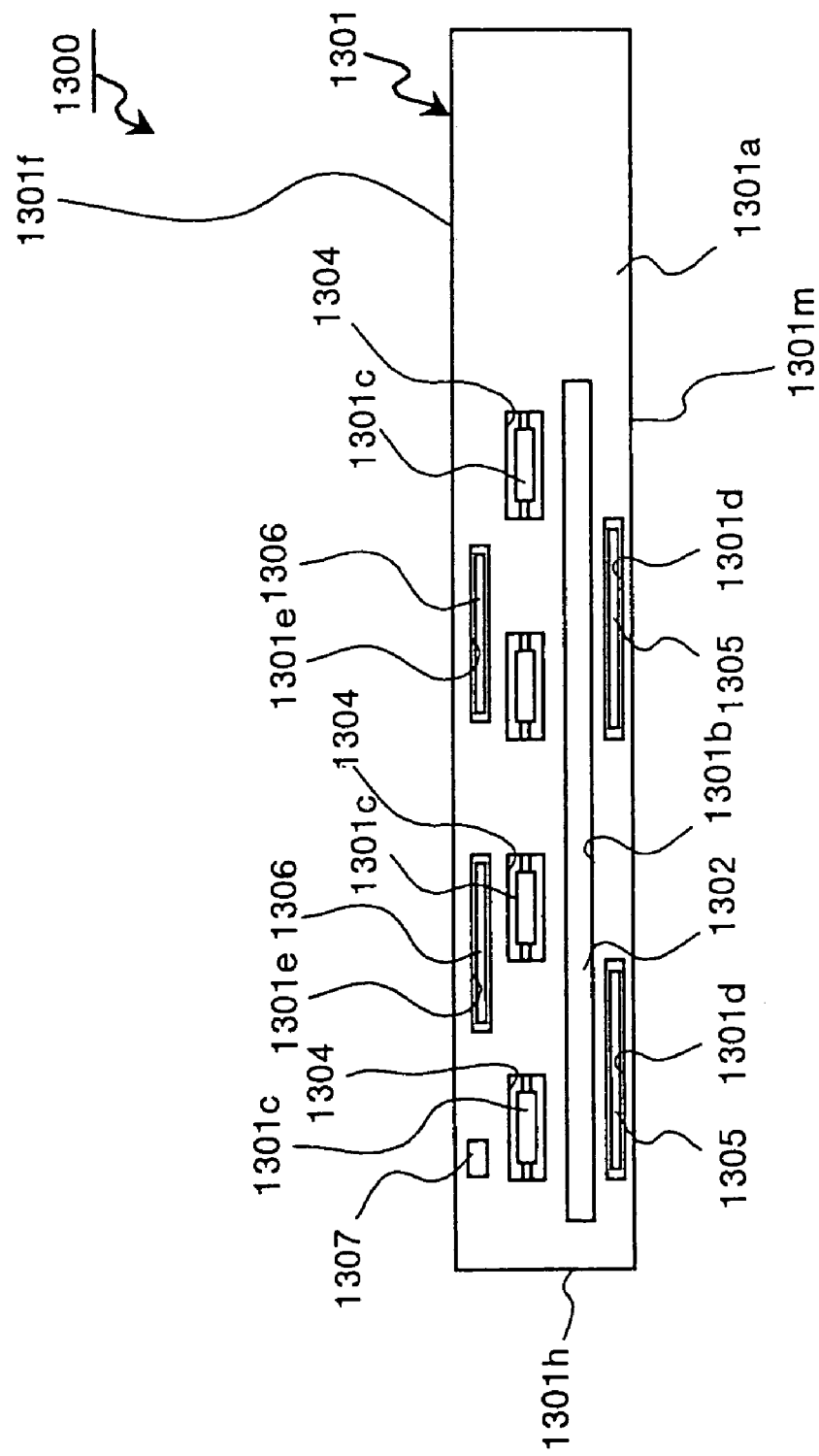
FIG. 35 is a rear view showing appearance and configuration of the image reader 1300 according to Embodiment 13.

As described above, in the image reading surface 1301*a* of the image reader 1300, as shown in FIG. 35, four main rollers 1304, two first auxiliary rollers 1305, and two second auxiliary rollers 1306 are provided in parallel to each other. Further, in the image reader 1300, a three-roller system is employed in which the first auxiliary roller 1305 and the second auxiliary roller 1306 are provided with four main rollers 1304 therebetween.

Figure 41:
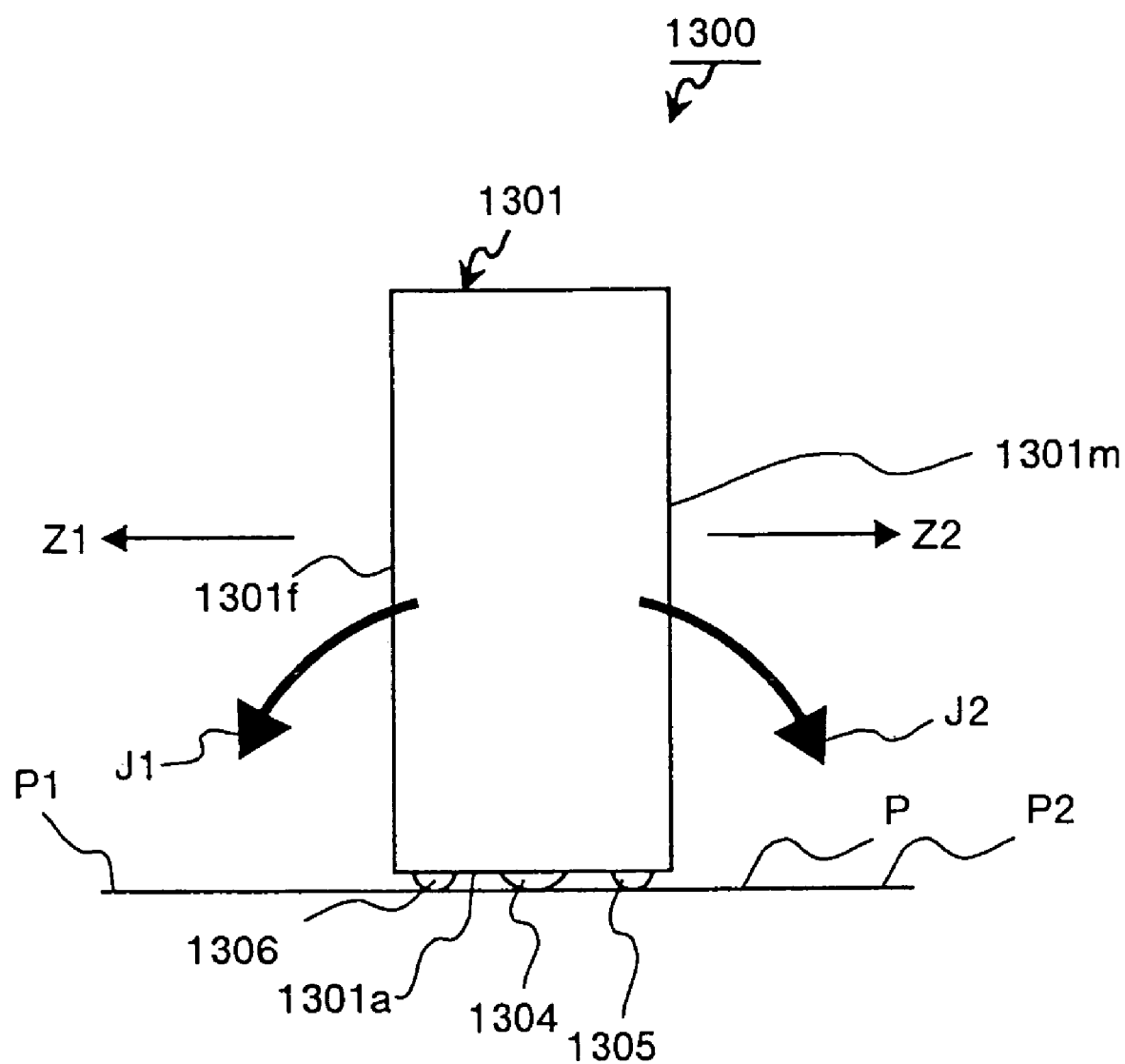
FIG. 41 is a general side view showing an example of use of the image reader 1300 according to Embodiment 13.

Herein description is made for the reason why the three-roller system as described above is employed in the image reader 1300 according to Embodiment 13 of the present invention. At first, a one-roller system in which the first auxiliary roller 1305 and second auxiliary roller 1306 are not provided and only the main roller 1304 is provided in FIG. 41 is described.

In this one-roller system, the image reader 1300 contacts a document P via the main roller 1304 at one point. In this state, when the image reader 1300 is moved from one edge P2 of the document P to the other edge P1 in the direction indicated by arrow Z1 for reading an image, as the image reader 1300 is supported at one point, moment in the direction indicated by arrow J1 (or in the direction indicated by arrow J2 is generated so that the image reader 1300 can easily be inclined. Herein not-preferable influence by the moment becomes more remarkable as a width of the housing 1301 in the moving direction is larger.

Therefore, in the one-roller system, when the image reader 1300 is moved in the direction indicated by arrow in the direction indicated by arrow Z1 (or in the direction indicated by the arrow Z2) a rickety occurs due to generation of moment in the direction indicated by the arrow Z1 (or in the direction indicated by the arrow Z2, so that sometimes not only the convenience is spoiled but also precision in reading becomes lower.

Next, a two-roller system in which the second auxiliary roller 1306 is not provided and the main roller 1304 and first auxiliary roller 1305 are provided is explained with reference to FIG. 41.

In this two-roller system, the image reader 1300 contacts the document P at two points via the main roller 1304 and the first auxiliary roller 1305. In this state, when the image reader 1300 is moved from one edge P1 to the other edge P2 thereof for reading an image in the direction indicated by arrow Z2 in the figure, as the image reader 1300 is supported by the first auxiliary roller 1305 in the side indicated by the arrow Z2, so that movement is not generated in the direction indicated by arrow J2. Therefore, in this case, the image reader 1300 is not inclined, and can perform an operation for reading an image.

However, in the two-roller system described above, when the image reader 1300 is moved in the opposite direction, namely in the direction indicated by arrow Z1, the image reader 1300 is not supported in the side indicated by the arrow Z1, so that the negative effects as described in relation to the one-roller system described above occur.

To solve the problem as described above, the three-roller system in which the image reader 1300 is supported at three points of the main roller 1304, first auxiliary roller 1305, and second auxiliary roller 1306 is employed. In this three-roller system, even when the image reader is moved in the direction indicated by the arrow Z1 (or in the direction indicated by the arrow Z2), the image reader 1300 is supported by the second auxiliary roller 1306 or the first auxiliary roller 1306 (in the direction indicated by the arrow Z2), so that the negative effects as those in the one-roller system or two-roller system described above do not occur.

Returning to FIG. 31, a document detecting section 1307 is attached to a position close to the rectangular hole 1301c on the image reading surface 1301a. When the image reader 1300 is located at a position where the image reading surface 1301a is close to the document P, the document detecting section 1307 detects the document P located under it. This document detecting section 1037 includes such a component as the mechanical switch 201 shown in FIG. 5, or the photoelectric switch 301 shown in FIG. 7. The configuration of the mechanical switch 201 or photoelectric switch 301 has been explained in detail in Embodiment 2 and Embodiment 3.

Herein description is made for internal configuration of the image reader 1300 with reference to FIG. 36. FIG. 36 is a partially cut cross-sectional view showing configuration of the image reader 1300 according to Embodiment 13, and in this figure, the same reference numerals are assigned to components corresponding to those in FIG. 31.

In this figure, an image reading section 1330 is the optical system provided inside the housing 1301, and comprises a light source 1331, a lens 1332, and an image sensor 1333. The light source 1331 is provided diagonally above the image reading window 1301b (transparent protection cover 1302), and emits light through the transparent protection cover 1302. As this light source, a light emitting diode or a cold cathode ray tube may be used.

The lens 1332 is provided above the image reading window 1301b (transparent protection cover 1302), and converges the light emitted from the light source 1331 through the transparent protection cover 1302. The image sensor 1333 comprises a plurality of image sensors (such as a CCDs) arrayed linearly along the image reading window 1301b, and reads image for one line on the document P. This image sensor 1333 provided above the lens 1332 converts the reflected light converged by the lens 1332 to an electric signal and then outputs the electric signal as image data for one line.

Returning to in FIG. 31, the displacement detecting section 1308 is provided inside the housing 1301 in the right side in the figure, and detects the rotation of the main roller 1304, namely a displacement of the image reader 1300 during a scanning operation. This displacement detecting section 1308 comprises a rotary encoder 1309, gears 1310 and 1312.

Figure 37:
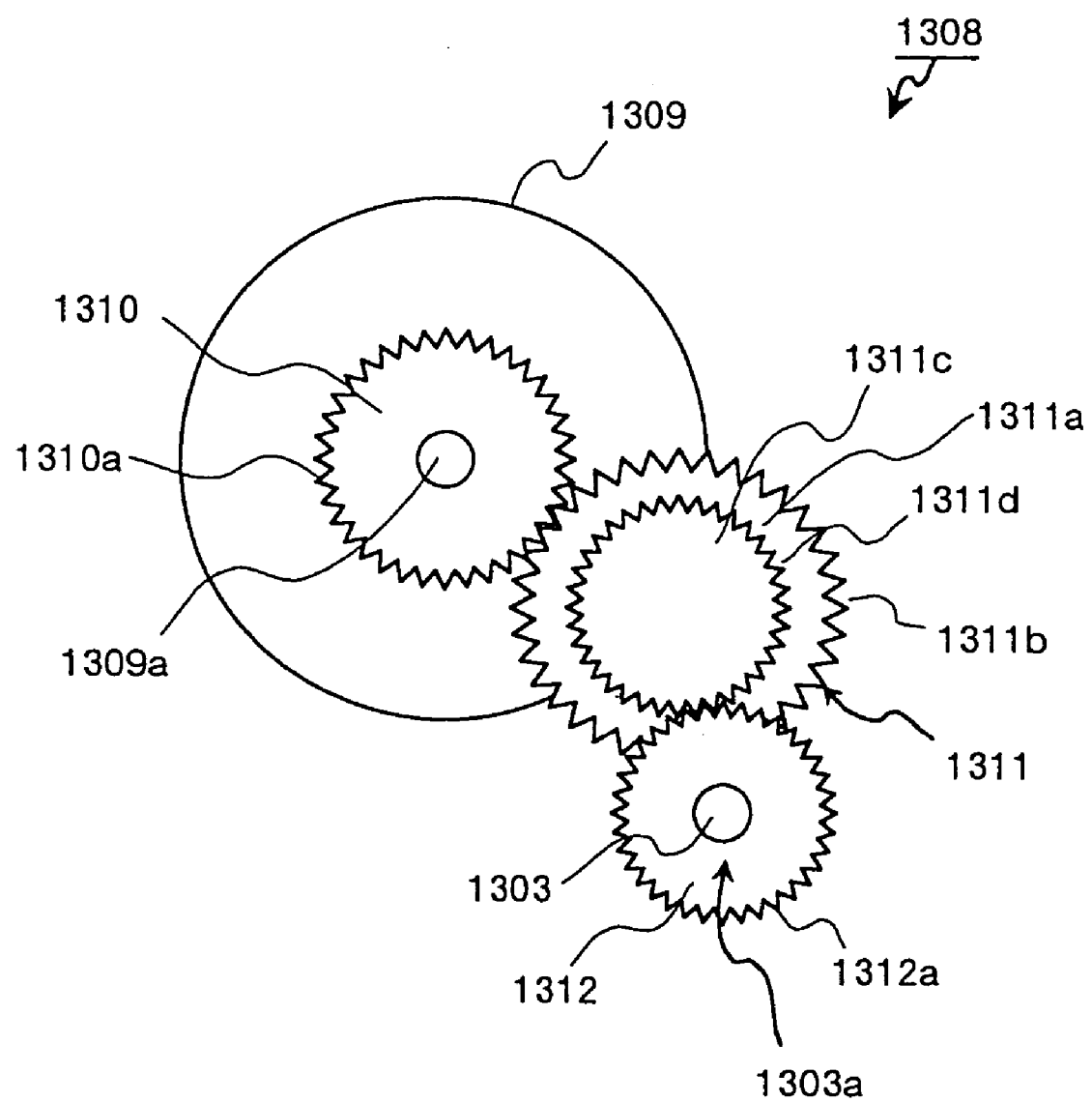
FIG. 37 is an enlarged side view showing appearance and configuration of a displacement detecting section 1308 shown in FIG. 31.

Configuration of the displacement detecting section 1308 is explained with reference to FIG. 37. FIG. 37 is a side view showing appearance and configuration of the displacement detecting section 1308. In this figure, the same reference numerals are assigned to components corresponding to those in FIG. 31. In FIG. 37, the rotary encoder 1309 is an optical incremental type of encoder and has high resolution and high noise resistance.

This rotary encoder 1309 comprises one edge section 1303a rotatably provided, a rotating plate with a slit for transmission of light in the radial direction and rotating together with the one edge section 1303a, a light emitting element for emitting light to the rotating plate, and a light receiving element for receiving light transmitted through the slit of the rotating plate. In this rotary encoder 1309, when an input shaft 1309a rotates, the rotating plate rotates in correlation thereto, and when a slit of the rotating plate is positioned at a specified position, the light transmitting through the slit is received by the light receiving element so that a rotation angle of the input shaft 1309a can be detected.

The gear 1310 has teeth 1310a, and is attached and fixed to the input shaft 1309a of the rotary encoder 1309. A two-step gear 1311 comprises a first gear 1311a and a second gear 1311c having a smaller diameter than that of the first gear 1311a. The two gears are integrated with each other and are rotatably supported by a supporting section not shown. The teeth 1311b of the first gear 1311a and the teeth 1310a of the gear 1310 are engaged with each other. The gear 1312 is attached to one edge section 1303a of the shaft 1303 shown in FIG. 31, and the teeth 1312a are engaged with a teeth 1311d of the second gear 1311. Namely, a torque form of the main roller 1304, 1303, . . . is delivered via the shaft 1303, gear 1312, two-step gear 1311, and gear 1310 to the input shaft 1309a of the rotary encoder 1309.

Figure 52:
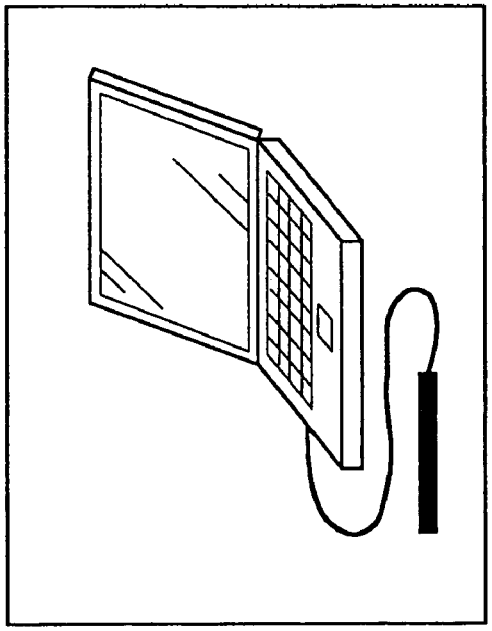
FIG. 52 is a view showing an example of display on the LCD 1313.

Returning to in FIG. 31, the LCD 1313 has a size of 320×240, and can provided displays with four gradations. The LCD 1313 displays an image of a document P read with the image reading section 1330 (Refer to FIG. 36). FIG. 52 shows an example of an image displayed on the LCD 1313. In FIG. 52, the image is displayed on the entire LCD 1313. This LCD 1313 is provided at a substantially central position of an operating surface 1301f of the housing 1301. Namely, the LCD 1313 is provided at a surface perpendicular to the image reading surface 1301a.

A touch screen 1314 is adhered to the LCD 1313 and is utilized to input commands required for various types of operations. This touch screen 1314 enables selection of any item from a group of commands shown on the screen when a user directly touches the touch screen on the LCD 1313. The resistive film system, photoelectric system, capacity system, pressure sensing system or the like may be used as the touch screen 1314. For inputting a command using this touch screen 1314, a pen 1322 shown in FIG. 34 may be used. This pen 1322 is like an ordinary pen, however, has a holding section 1322a as shown in the left side of the figure for holding, and a tip section 1322b as shown in the right side of the figure. The pen 1322 can be held at the holding section 1322a a user presses the touch screen 1314 with the tip section 1322b while visually checking an operating input screen displayed on the LCD 1313 shown in FIG. 31.

Returning to FIG. 31, a power switch 1315 is provided in the right side of the LCD 1313, namely on the operating surface 1301f, and is pressed down when power is to be turned ON or OFF. A reset switch 1316 is provided in the right side of the power switch 1315, and is used for starting operations of the device. A cancel switch 1317 is provided under the power switch 1315 (reset switch 1316), and is uses for canceling various types of operations. A select switch 1318 is provided in the lower side of the cancel switch 1317, and is used for selecting various types of operation.

A four-directional key 1319 is provided under the select switch 1318, and comprises in all four keys; namely a rightward arrow key, a leftward arrow key, upward arrow key, and a downward arrow key. This four-directional key 1319 is pressed when scrolling a screen of the LCD 1313, or when selecting a menu item. In actual operation, the four-directional key 1319 is used in combination with either one or both of the cancel key 1317 and select switch 1318 for inputting commands for various operations or selection. Namely, in the image reader 1300, for input and select commands for various operations, the touch screen 1314 is used in combination with one or more keys including the four-directional key 1319.

The power switch 1315, reset switch 1316, cancel switch 1317, select switch 1318, and four-directional keys 1319 form an operating section, and this operating section is provided in the right side of the LCD 1313 (or the touch screen 1314) as show in the figure.

Herein description is made for a reason why the operating section (power switch 1315 etc.) is provided in the right side of the LCD 1313 (or the touch screen 1314) on the operating surface 1301f with reference to FIG. 38. FIG. 38 in top and bottom shows states where the image reader 1300 is kept in a horizontal and a vertical posture respectively while during using.

As shown in top view in FIG. 38 when a user is a right-handed person, generally the user holds the image reader 1300 with a left hand HL, and operates the operating section including the cancel switch 1317 or the like with the right hand HR. In this case, if the operating section is provided in the right side of the LCD 1313 in the figure, the user can easily operate the operating section. In contrast, as shown in the bottom view in FIG. 38, the operating section (including the cancel switch 1317 or the like) is located in a lower section of the figure, it is easy to hold the image reader 1300 with either one of the right hand HR or the left hand HL and operating the operating section (including the cancel switch 1317 or the like) with fingers of the hand. Namely, the operating section (including the power switch 1315 or the like) is provided in the right side of the LCD 1313 (or the touch screen 1314) on the operating surface 1301f so that operability and convenience in use can be improved.

Returning to FIG. 31, an auxiliary battery 1320 is housed in an engaging section 1301g formed on the operating surface 1301f and functions as an auxiliary power source. A serial I/F section 1321 is inserted into an opening section 1301i formed on a left side face 1301h, and plays a communication interface with an external device. As an example of this serial I/F section 1321, there is an RS232C or a USB interface. A main battery 1323 shown in FIG. 33 is housed in an engaging section 1301k formed on a rear surface 1301m of the image reader 1300, and plays a role of a main power source for the device.

A slide switch 1324 for adjusting a gray scale shown in FIG. 32 is provided on a top surface 1301j, and is used when adjusting a gray scale of display on the LCD 1313. The pen 1322 used for input together with the touch screen 1314 as described above is inserted into an insertion groove 1301t formed on a top surface 1301j thereof and is kept there. Herein basic input operations using the pen 1322 includes tapping, double tapping, and dragging shown in FIG. 54. Tapping is an operation of pressing the touch screen 1314 once with the pen 1322, and double tapping is an operation of pressing twice successively the touch screen 1314. Dragging is an operation of sliding a tip section 1322b of the pen 1322 by a specified distance on the touch screen 1314.

FIG. 39 shows two general configurations of an inclination detecting section provided inside the housing 1301. The inclination detecting section 1340 detects inclination of the image reader 1300, namely whether the image reader 1300 is kept in the horizontal posture or in the vertical posture. The top view in FIG. 39 is a general side view showing a state of the inclination detecting section 1340 when the image reader 1300 is kept in the horizontal posture, and the bottom view is a general side view showing a state of the inclination detecting section 1340 when the image reader 1300 is kept in the vertical posture.

Figure 40:
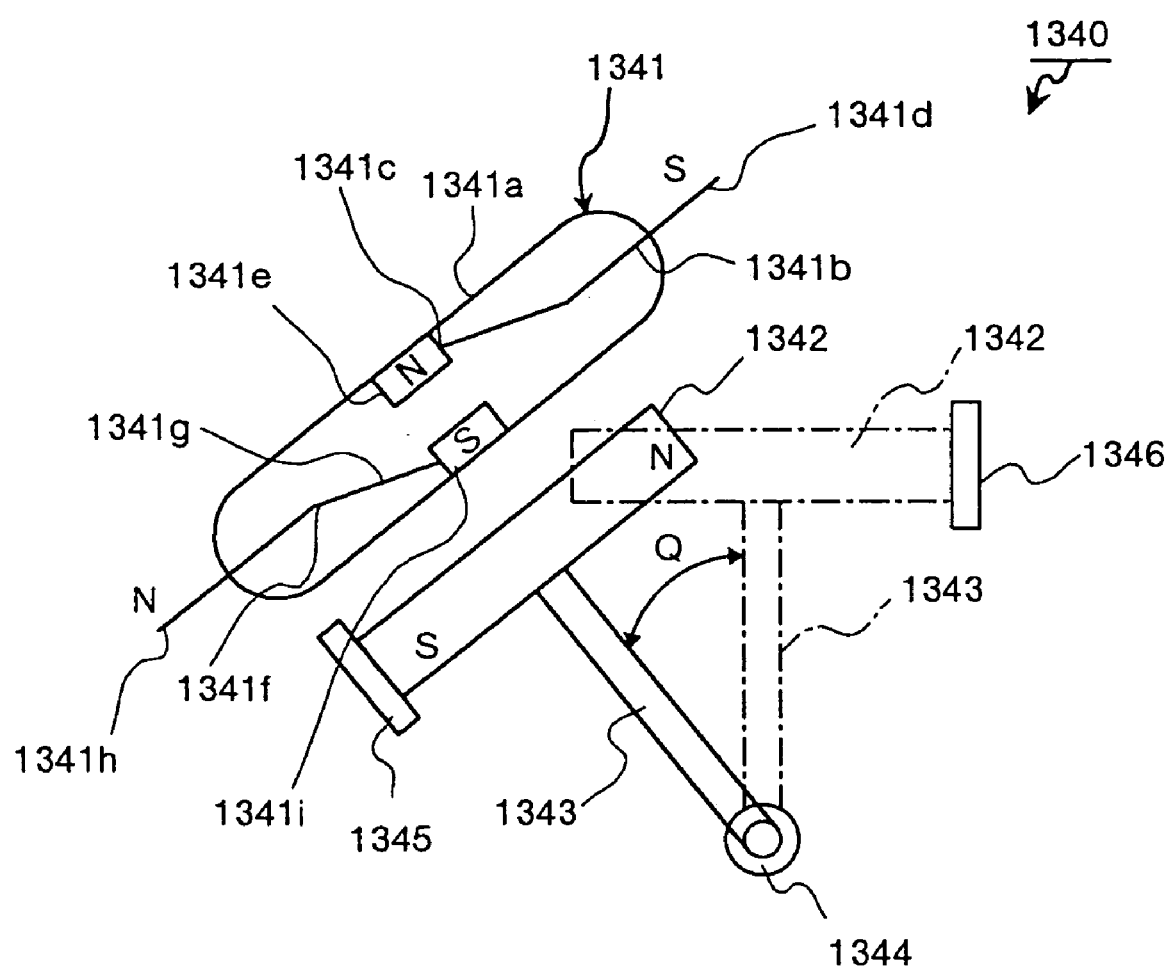
FIG. 40 is an enlarged front view showing configuration of the inclination detecting section 1340 shown in FIG. 39.

Configuration of the inclination detecting section will be described with reference to FIG. 40. In FIG. 40, the same reference numerals are assigned to components corresponding to those in FIG. 39. The inclination detecting section shown in this figure comprises a lead switch 1341, a permanent magnet 1342, a rotary bar 1343, and a rotary shaft 1344. The lead switch 1341 is a magnetism-sensitive switch, and comprises a glass tube 1321a, a first ferromagnetic lead wire 1342b, a first contact point 1341e, a second ferromagnetic lead wire 1342f, and a second contact point 1341i.

In the lead switch 1341 described above, the first ferromagnetic lead wire 1341b and the second ferromagnetic lead wire 1341f are provided along an axial direction of the glass tube 1341a, and comprises a ferromagnetic material formed into a linear shape. One edge section of each of the ferromagnetic lead wires 1341b and 1341f is bent and shielded into the glass tube 1341a so that the two edge sections of these wires are located at positions close to each other. The first contact point 1341e is attached to one edge section of the first ferromagnetic lead wire 1341b while the second contact point 1341i is attached to one edge section 1341g of the second ferromagnetic lead wire 1341f. In this lead switch 1341, when an external magnetic field does not act in the longitudinal direction, the first contact point 1341e and second contact point 1341i are kept at the separated positions from each other due to elastic forces generated by the first ferromagnetic lead wire 1341b and second ferromagnetic lead wire 1341f.

On the other hand, when the external magnetic field acts in the longitudinal direction of the first ferromagnetic lead wire 1341b and the second ferromagnetic lead wire 1341f, polarity of the other edge section 1341d of the first ferromagnetic lead wire 1341b is "S", while that of first contact point 1341 is "N". Similarly, polarity of the other edge section 1341h of the second ferromagnetic lead wire 1341f is "N", and that of the second contact point 1341i is "S". Therefore, when the external magnetic field acts, the first contact point 1341e and second contact 1341i attract and contact each other.

The permanent magnet 1342 is used to load the external magnetic field according to a posture of the image reader 1300, and it is attached to a tip section of the rotary rod 1343 rotatably provided in the direction indicated by arrow Q in the figure. The other edge section of the rotary rod 1343 is attached to the rotary shaft 1344. A first stopper member 1345 is attached to a position near the lead switch 1341, and restricts rotation of the permanent magnet 1342 in the counterclockwise direction in the figure. A second stopper member 1346 is attached to a position close to the lead switch 1341, and restricts rotation of the permanent magnet 1342 in the clockwise direction in the figure.

In FIG. 40, because of restriction by the first stopper member 1345, when the permanent magnet 1342 is located at a position indicated by a solid line, namely when the image reader 1300 is kept in the horizontal posture as shown in top view of FIG. 39, an external magnetic field generated by the permanent magnet 1342 works, and the first contact point 1341*e* and second contact point 1342*i* contact each other.

In FIG. 40, when the permanent magnet 1342 is at a position indicated by a two-dot chain line due to restriction by the second stopper member 1346, namely, when the image reader 1300 is kept in the vertical posture as shown in the bottom view of FIG. 39, the external magnetic field caused by the permanent magnet 1342 does not act, so that the first contact point 1341*e* and second contact point 1341*i* are kept separated from each other.

Figure 42:
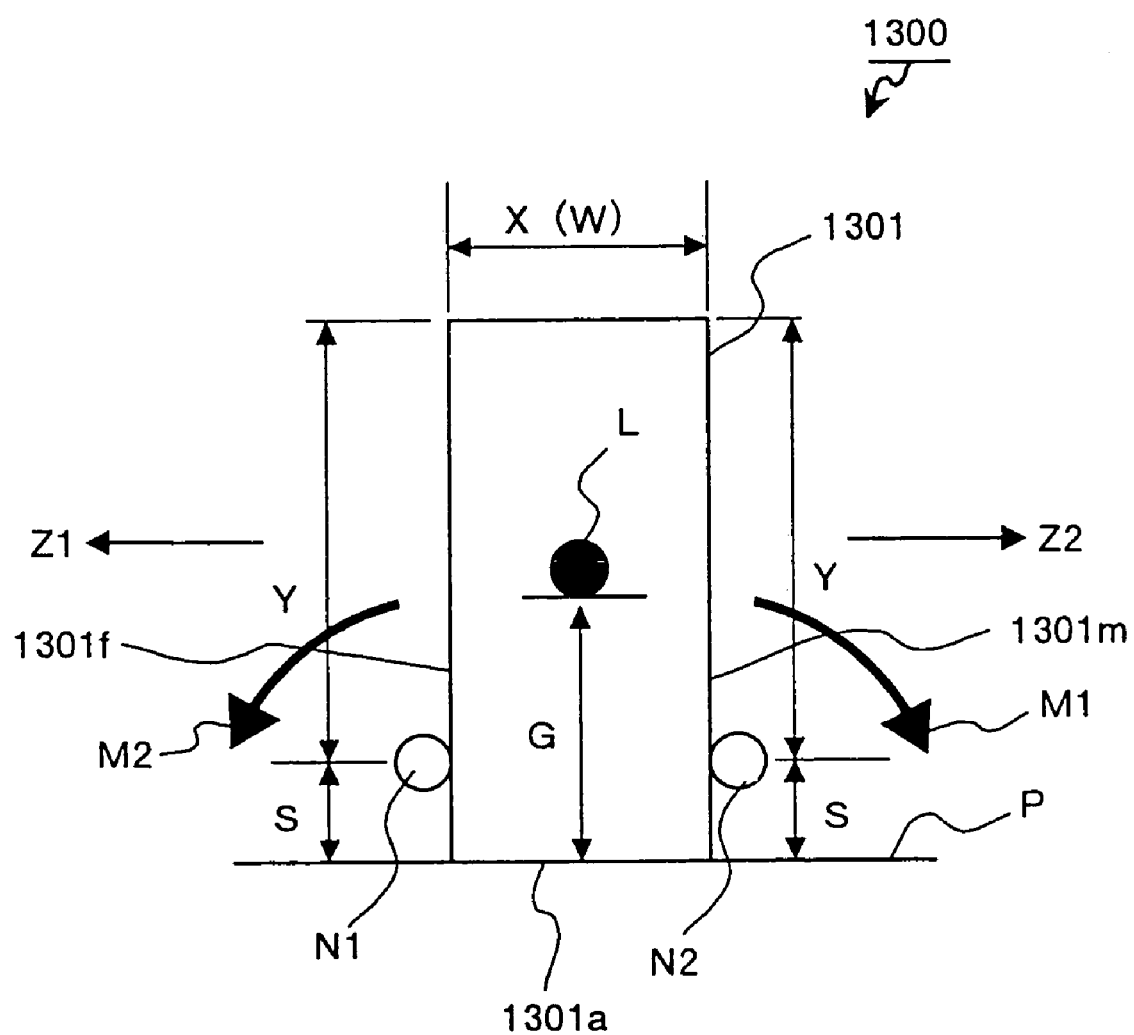
FIG. 42 is a general side view showing size of the image reader 1300 according to Embodiment 13.
Figure 43:
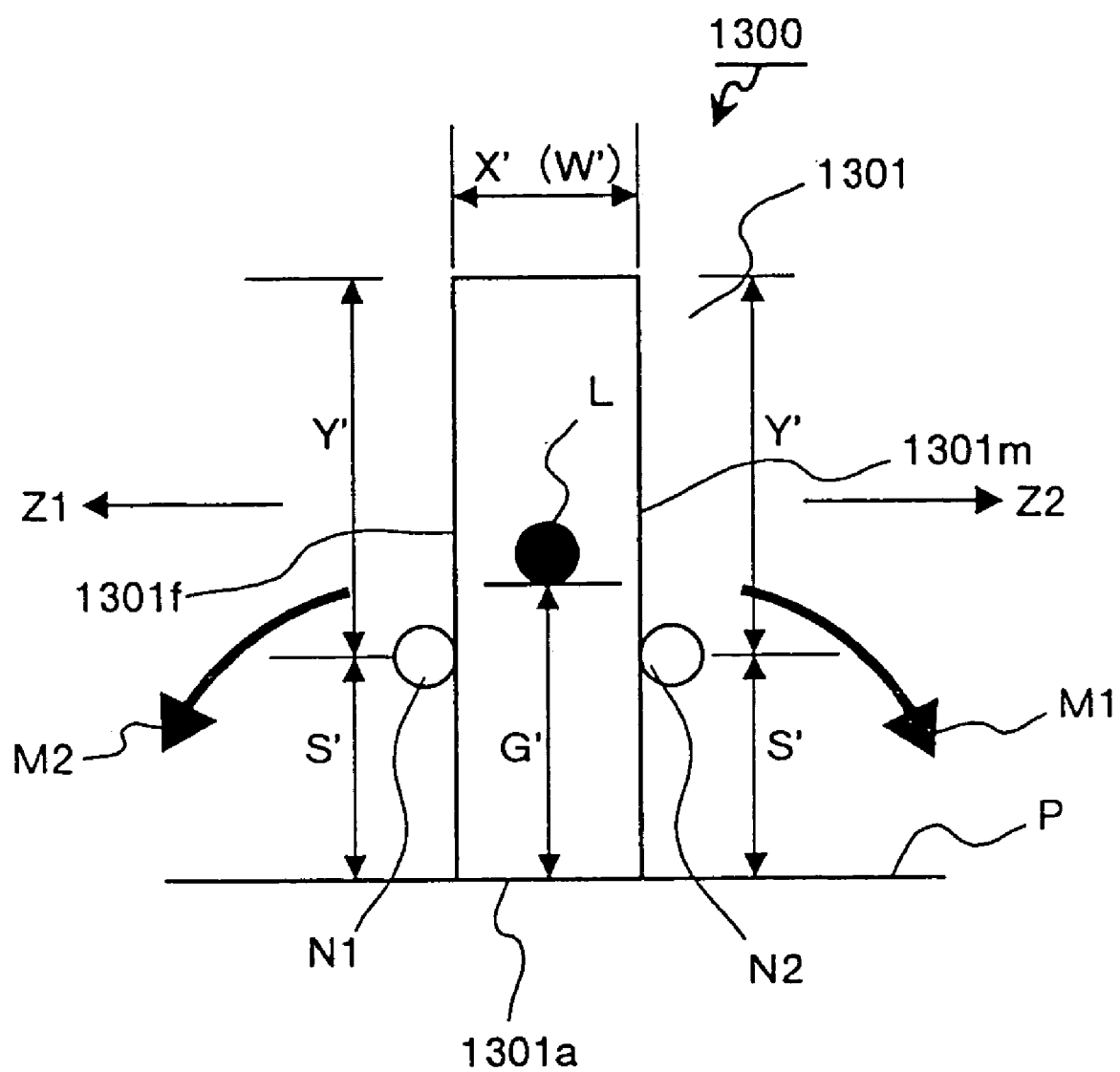
FIG. 43 is a general side view showing size of the image reader 1300 according to Embodiment 13.

Now description is made for a position of a gravity center of the image reader 1300 according to Embodiment 13 with reference to FIG. 42 and FIG. 43. FIG. 42 and FIG. 43 are general side views each explaining a size of (position of a center of gravity) of the image reader 1300 according to Embodiment 13. In these figures, the same reference numerals are assigned to components corresponding to those in FIG. 41.

At first, the image reader 1300 according to Embodiment 13 is designed so that action points N1, N2 are at positions lower than a center of gravity of the image reader 1300 and a height of action point S is smaller than a width W of the image reader 1300. This configuration is employed to make smaller moments in the direction indicated by arrow M1 and in the direction indicated by the arrow M2 generated when the image reader 1300 shown in the figure is moved in the direction indicated by arrow Z1 and in the direction indicated by the arrow Z2 respectively. Namely, the action points N1 and N2 shown in FIG. 42 when a user holds the housing 1301 contacting the user's thumb to an operating surface of the surface 1301*f* of the image reader 1300 and other fingers to a rear surface 1301*m* thereof are at a middle point of a height of the thumb and at a middle point of the other figures respectively.

It should be noted that a distance between a middle point of a thumb of a grown-up person and a middle point of other fingers is around 150 mm. Herein, in the housing 1301, a length X in the width direction and that Y in the height direction are defined. The length X in the width direction is equal to a distance from the operating surface 1301*f* to the rear surface 1301*m*, while the length Y in the height direction is equal to a distance from the action points N1 and N2 up to a top surface of the housing 1301. Further, height of the action point S from a document P up to the action points N1 and N2 is calculated by subtracting the length Y in the height direction from a height of the housing 1301.

In the definition above, when a height of the action points is at a position higher than a center of gravity of the image reader 1300, moment in the direction indicated by arrow M1 or in the direction indicated by arrow M2 in the figure is generated in the image reader 1300 during a scanning operation and the image reader 1300 gets inclined. Therefore, by designing the image reader 1300 in such a way that a form of the cross section thereof satisfies the condition (described as first condition) that the action point N1 and N2 are lower than a center of gravity L, it is possible to prevent inclination of the image reader 1300 due to generation of the moment described above.

Herein assuming that a height of the housing 301 is H, a width of the device is W, a distance between a middle point of thumb to that of other finger is F, and a height of a center of gravity thereof is G, the height S of the action point satisfying the first condition is expressed by the following equation (1):

$$S=((2H+W)-F)/2 \qquad (1)$$

Then by substituting specific values, 67 mm as a height H of the housing, 28 mm as a width W of the device, and 150 mm as a distance F between fingers into the equation (1), 6 mm is obtained as a height S of the action point. Herein, assuming that a height G of a center of gravity is equal to half of the housing height H (H/2) the height G of a center of gravity becomes 33.5 (=67/2) mm. Therefore, when the dimensions as described above are employed, the first condition that the height G of a center of gravity is larger than a height G of the action point (33.5>6) is satisfied, and generation of moment or inclination of the image reader can be prevented. However, even if the first condition above is satisfied, when the dimensions shown in FIG. 43 are employed, moment (or the inclination) is generated. Herein a length X' shown in FIG. 43, a length Y' in the height direction, a width W' of the device, and a height S' of the action point correspond to the length X in the width direction, length Y in the height direction, width W of the device, and height S of the action point shown in FIG. 42.

In the image reader 1300 shown in FIG. 43, dimensions are employed to satisfy the first condition that the height S' of the action point is less than the height G' of a center of gravity, but the height S' of the action point is higher than the width W' of the device so that moment in the direction indicated by arrow M1 or in the direction indicated by arrow M2 is generated. On the contrary, in FIG. 43, when the condition that the height S' of the action point is lower than the width W' of the device (described as the second condition hereinafter) and at the same time the first condition (that the height S' of the action point is smaller than the height G' of a center of gravity) is satisfied, moment (or the inclination) in the direction indicated by arrow M1 or in the direction indicated by arrow M2 is not generated.

Accordingly, the image reader 1300 according to Embodiment 13 of the present invention is designed with dimensions satisfying both the first and second conditions.

Figure 44:
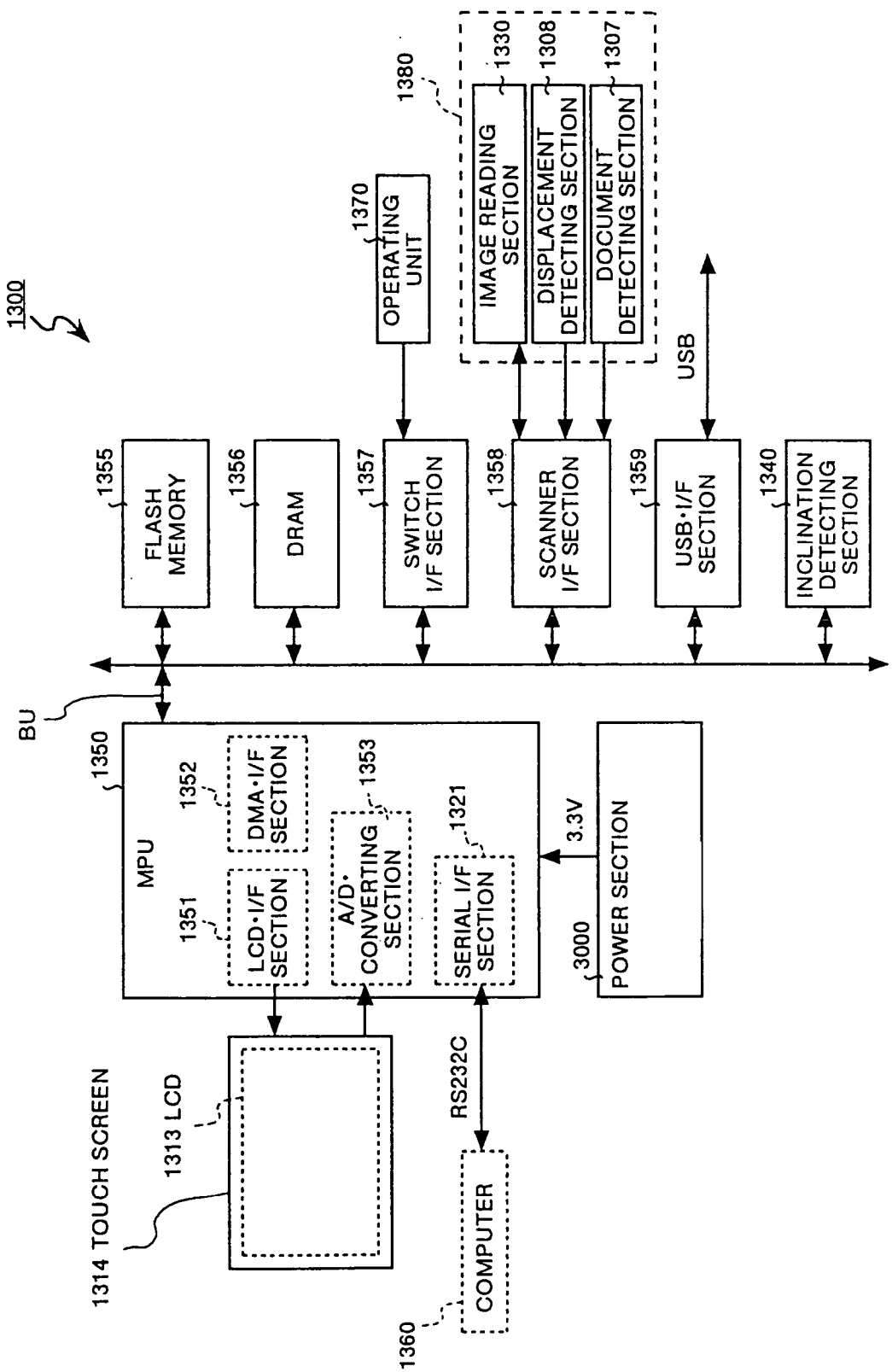
FIG. 44 is a view showing specific circuit configuration of the image reader 1300 according to Embodiment 13.

FIG. 44 is a view showing circuit configuration of the image reader 1300 according to Embodiment 13. In this figure, the same reference numerals are assigned to components corresponding to those in FIG. 31, FIG. 36, and FIG. 39, and description thereof is omitted herein. In this figure, an MPU 1350 executes such operations as controls over image read, controls over image display, processing of image data, transfer of image data. Detailed description of operations of this MPU 1350 is made later. An LCD I/F (interface) section 1351 is an interface between the LCD 1313 (Refer to FIG. 31) and the MPU 1350. A DMA (Direct Memory Access) I/F section 1352 acts as an interface between a DRAM 1356 explained afterward to directly access the DRAM 1356. An A/D converting section 1353 outputs analog data from the touch screen 1314 (Refer to FIG. 31) to digital data, and outputs the digital data to the MPU 1350. This MPU1350 acquires information inputted from the touch screen 1314 according to the digital data.

The serial I/F section 1321 (Refer to FIG. 31) plays the role of an interface between a computer 1360 as an external device and the MPU 1350, and is compatible with, for instance, RS232C. A power section 3000 comprises a main battery 1323 (Refer to FIG. 33) and an auxiliary battery 1320 (Refer to FIG. 31), and supplies a voltage of 3.3 V to each section of the device. A flash memory 1355 stores therein a program to be executed by the MPU 1350. A DRAM 1356 stores therein image data read as described above. The operating unit 1370 comprises a power switch 1315, a reset switch 1316, a select switch 1318, a cancel switch 1317, and a four-directional instructing keys 1319 each shown in FIG. 31. A scanner I/F section 1358 plays the role of an interface via the buss BU between the scanner section 1380 and MPU 1350.

The scanner 1380 comprises an image reading section 1330 (Refer to FIG. 36), a displacement detecting section 1308 (Refer to FIG. 31), and a document detecting section 1307 (Refer to FIG. 36). An USB (Universal Serial Bus) I/F section 1359 functions as a communication interface between an USB-compatible external device and the MPU 1350. The bus BUS connects the MPU 1350 to each section (flash memory 1355, DRAM 1356, switch I/F section 1357, scanner I/F section 1358, USB I/F section 1359, and inclination detecting section 1340 (Refer to FIG. 39)).

Figure 45:
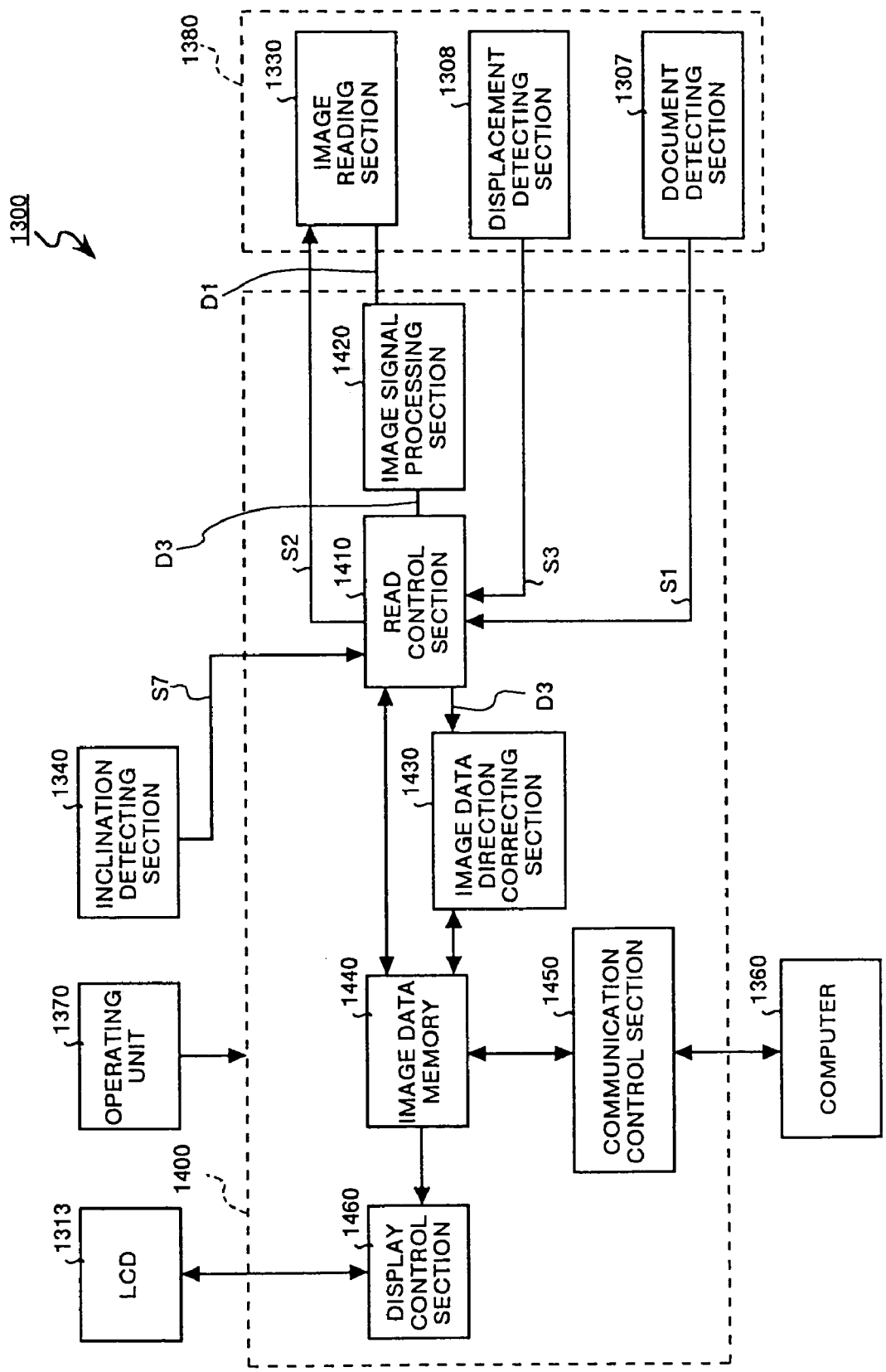
FIG. 45 is a block diagram showing electric configuration of the image reader 1300 according to Embodiment 1300.

FIG. 45 is a block diagram showing electric configuration of the image reader 1300 according to Embodiment 13 of the present invention which shows the functions of the MPU 1350 and DRAM 1356 or the like shown in FIG. 44. In FIG. 45, the same reference numerals are assigned to components corresponding to those in FIG. 44.

Figure 46:
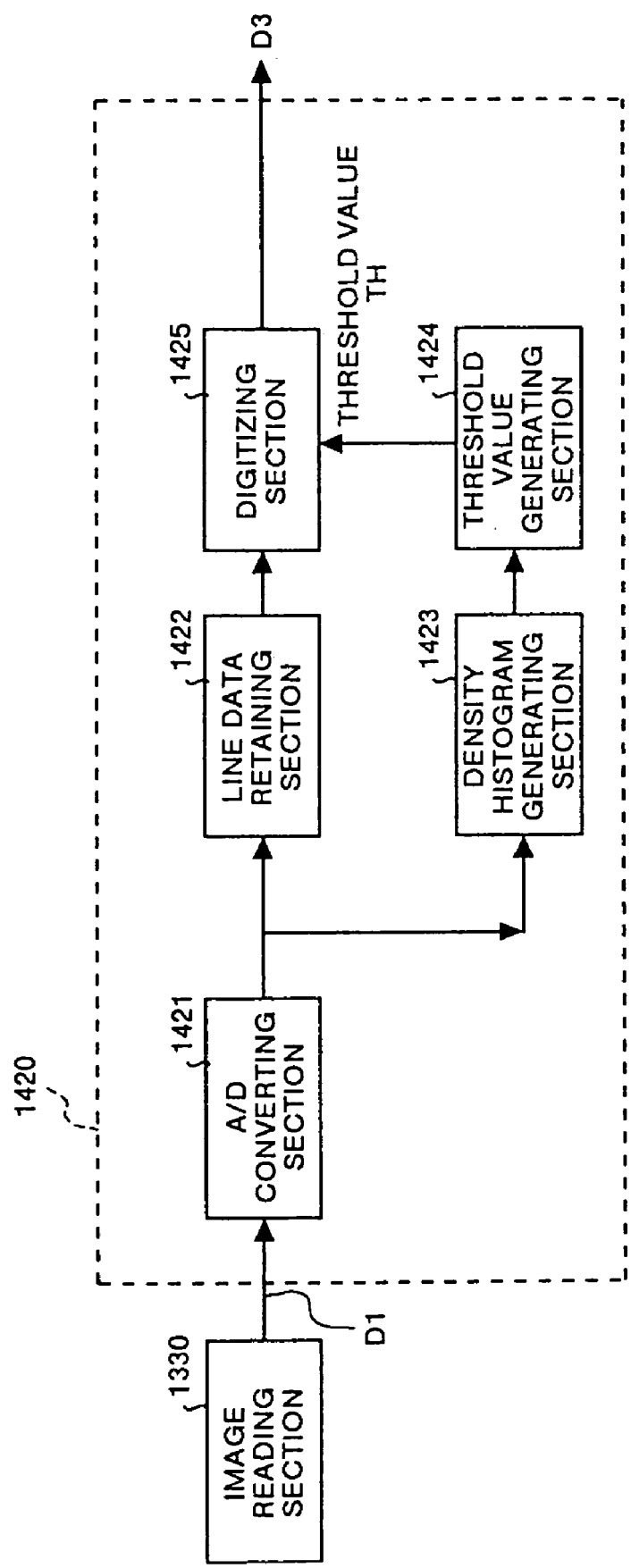
FIG. 46 is a block diagram showing configuration of an image signal processing section 1420 shown in FIG. 45.

In a scanner section 1380 shown in the FIG. 45, the image reading section 1330 (Refer to FIG. 36) successively reads image data D1 for one line according to a drive signal S2 inputted at a specified cycle from a read control section 1410 described later as a trigger. When the document P shown in FIG. 36 is detected, the document detecting section 1307 outputs a document detection signal S1 as a result of detection to the read control section 1410. The displacement detecting section 1308 outputs, when the image reader 1300 is moved on the document not shown herein during a scanning operation, a one-pulse displacement detection signal S3 to the read control section 1410 when the displacement reaches a specified value. In the data processing section 1400, an image signal processing section 1420 digitizes image data D1 (analog data) inputted from the image reading section 1330, and outputs the image data as digitized image data D3 to the read control section 1410. FIG. 46 is a block diagram showing configuration of the image signal processing section 1420.

In FIG. 46, the A/D converting section 1421 converts the image data D1 (analog data) inputted from the image reading section 1330 (Refer to FIG. 45) to digital data. Herein in the A/D converting section 1421, if 8-bit data is to be treated, "a value of "255" is given to the digital data when the read image is white, while a value of "0" is given to the digital data when the read image is black. A line data retaining section 1422 temporally retains the digital data for one line. A density histogram generating section 1423 generates a density histogram for each pixel according to output data (digital data) from the A/D converting section 1421. The density histogram is generated according to image data D1 corresponding to a header line read with the image reading section 1330.

A threshold value generating section 1424 computes a peak value for a white color and a peak value for a black color according to the density histogram generated by the density histogram generating section 1423. Also the threshold value generating section 1424 computes a threshold value TH between the peak value for a white color and a peak value for the black color, and sends the threshold value to a digitizing section 1425. The digitizing section 1425 compares the threshold value TH with the digital data stored in the line data retaining section 1422, and digitizes the digital data. Further, the digitizing section 1425 outputs a result of digitizing as digitized image data D3 to the read control section 1410 shown in FIG. 45 line by line.

The read control section 1410 outputs a drive signal S2 for driving the image reading section 1330 according to the document detecting signal S1 as a trigger, and provides controls for reading the digitized image data D3 inputted from the image signal processing section 1420. More specifically, the read control section 1410 provides control over such operations as read control in the image reading section 1330 or write control to the image data memory 1440. The read control section 410 has a buffer memory (not shown) for temporally storing the image data D3 digitized by the image signal processing section 1420. Detailed operations of this read control section 1410 will be explained later.

When the image reader 1300 is kept in the horizontal posture as shown in the top view of FIG. 39, as the permanent magnet 1342 is present at a position indicated by a solid line in FIG. 40 and the first contact point 1341e and second contact point 1341i are contacted to each other, the image reader 1300 outputs an inclination detection signal S7 to the read control section 1410.

On the other hand, when the image reader 1300 is kept in the vertical posture as shown in the bottom view of FIG. 39, as the permanent magnet 1342 is present at a position indicated by a two-dot chain line in FIG. 40 and the first contact point 1341e and second contact point 1341i are separated from each other, the inclination detecting section 1340 does not output the inclination detecting signal S7. Namely, the read control section 1410 shown in FIG. 45 recognizes inclination (posture) of the image reader 1300 by checking whether the inclination detection signal S7 has been inputted or not. In other words, when the inclination detection signal S7 is inputted, the read control section 1410 recognizes that the image reader 1300 is kept in the horizontal posture (Refer to FIG. 39), and when the inclination detection signal S7 is not inputted, the read control section 1410 recognizes that the image reader 1300 is in the vertical posture (Refer to FIG. 39).

Figure 48:
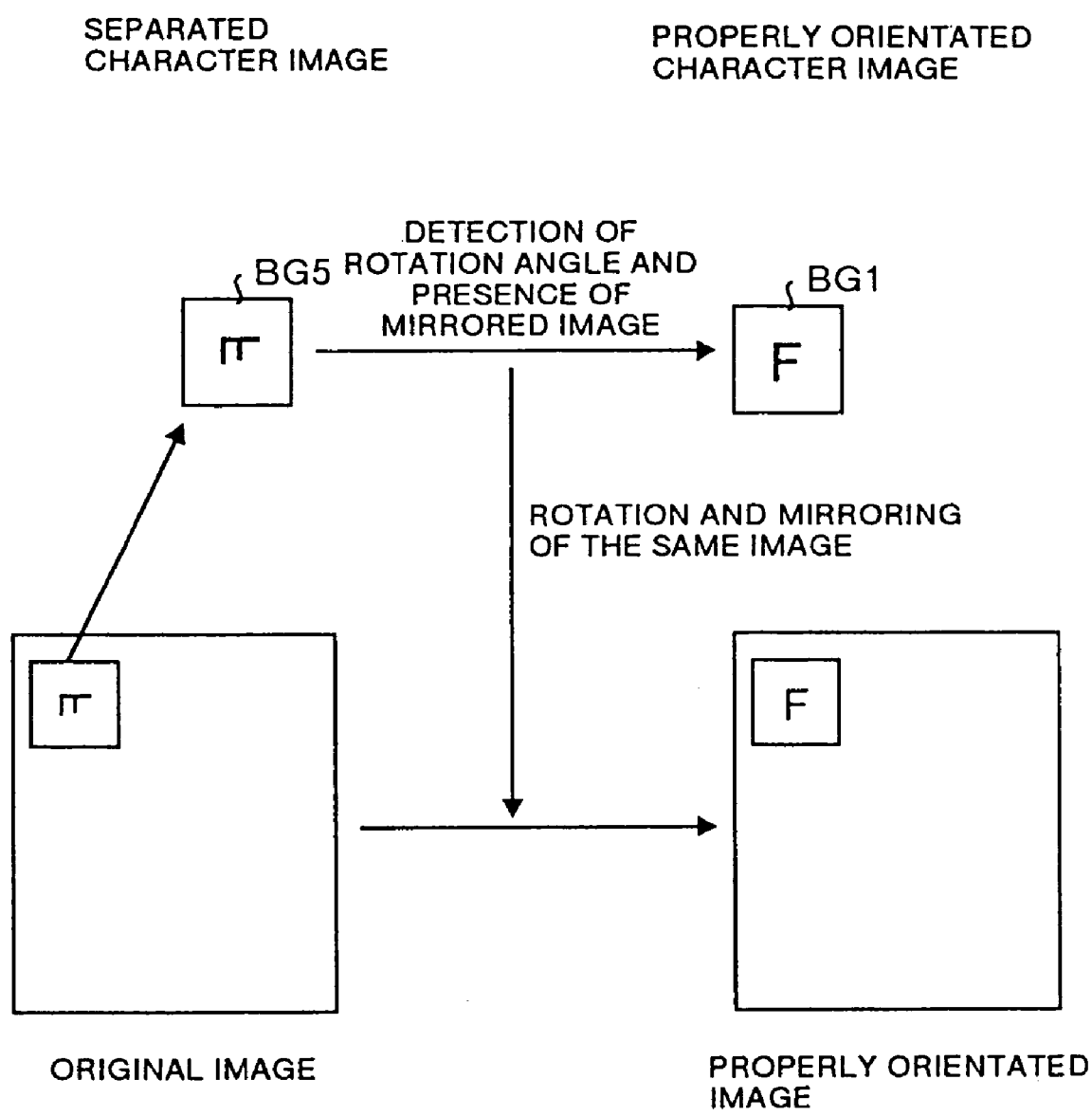
FIG. 48 is a view showing operations for correction by the image data direction correcting section 1430 shown in FIG. 45.

As shown in FIG. 48 the image data direction correcting section 1430 separates one piece (or a plurality pieces) of character image from an image obtained from the digitized image data D3, and checks a rotation angle or mirror inversion of the image to obtain an image in the correct direction.

Figure 47:
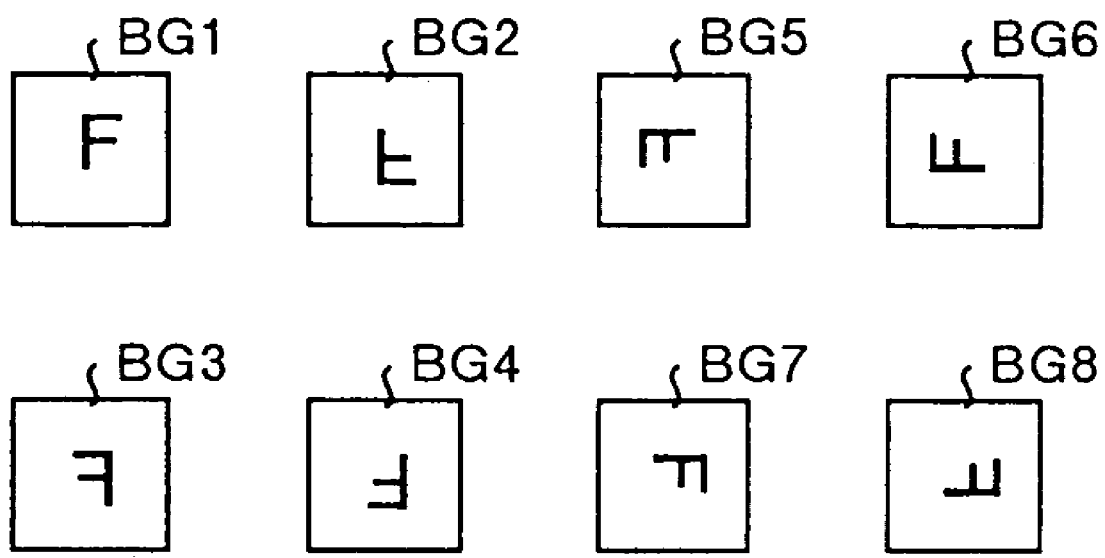
FIG. 47 is a view showing operations for correction by an image data direction correcting section shown in FIG. 45.
Figure 49:
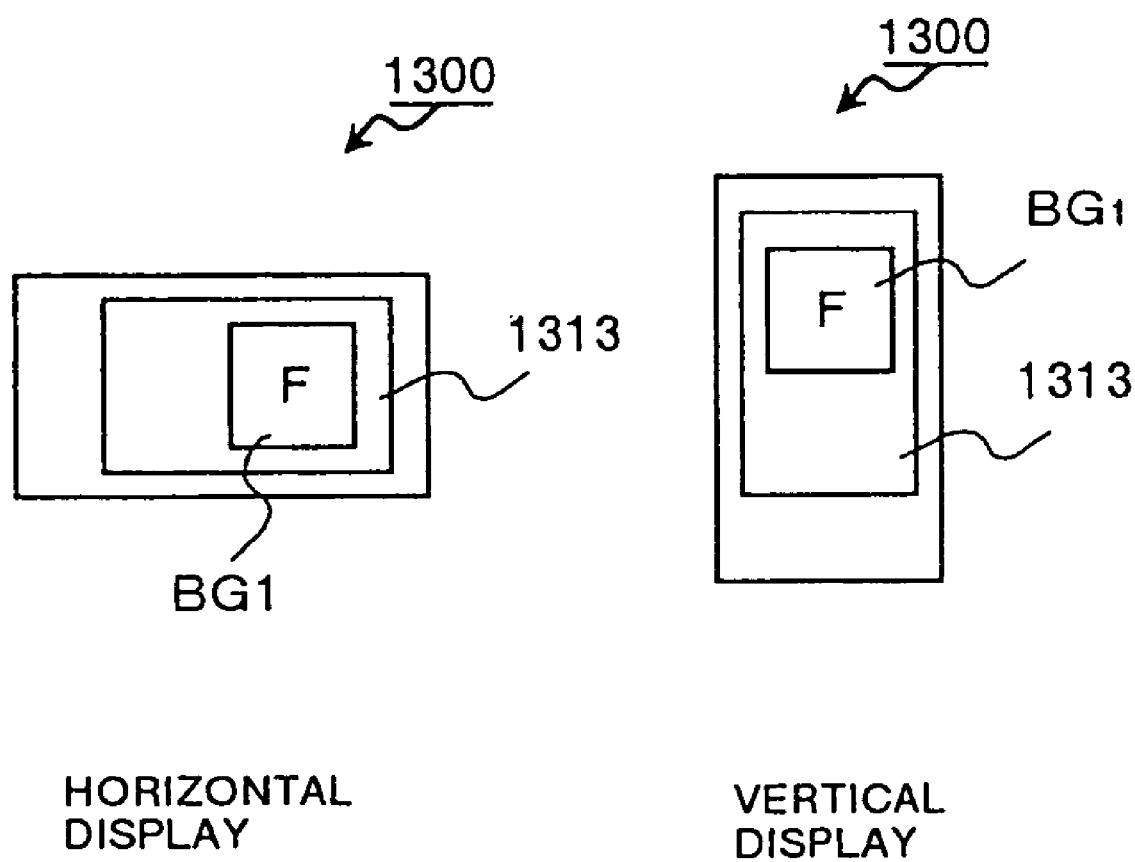
FIG. 49 is a view showing operations for correction by the image data direction correcting section shown in FIG. 45.

Further, the image data direction correcting section 1430 execute the same conversion as that for converting a separated image to a properly oriented image to an original image (Refer to FIG. 48) obtained from the digitized image data D3 to correct a rotated or mirrored image (Refer to FIG. 47) for obtaining data for a properly oriented image. Also the image data direction correcting section 1430 outputs the corrected image data to the image data memory 1440. Further, the image data direction correcting section 1430 determines a correct orientation of an image, when correcting an orientation of an image to a correct one the inclination (posture) of the image reader 1300 obtained from a result of determination by the inclination detecting section 1340 is taken into considerations. More specifically, the image data direction correcting section 1430 corrects an orientation of an image, in such a way that when the image reader 1300 is kept in the horizontal posture an image BG1 displayed on the LCD 1313 as shown in the left view of FIG. 49, is obtained. On the other hand, when the image reader 1300 is kept in the vertical posture the image data direction correcting section 1430 corrects orientation of the image such that the image BG1 displayed on the LCD 1313 as shown in the left view of FIG. 49 is obtained. Detailed description for operations of this image data direction correcting section 1430 is made later.

The image data memory 1440 corresponds to the DRAM 1356 shown in FIG. 44, and stores therein data outputted from the image data direction correcting section 1430 (corrected image data). A display control section 1460 controls to display the read image on the LCD 1313 according to the corrected image data stored in the image data memory 1440. A communication control section 1450 has a function similar to that of the communication control section 901 shown in FIG. 29, and controls data communication with the computer 1360 via the serial I/F section 1321 shown in FIG. 44.

Figure 51:
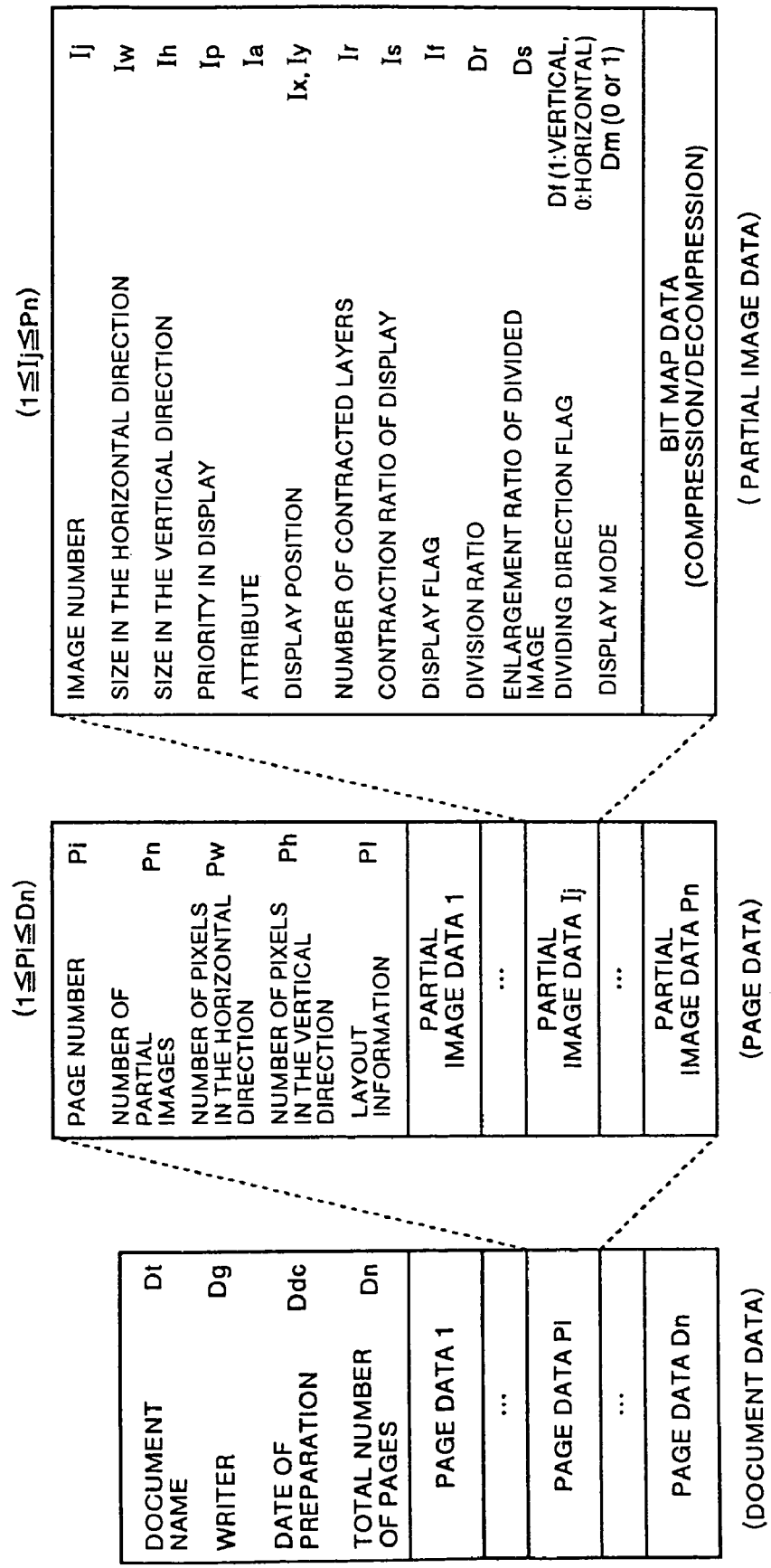
FIG. 51 is a view showing data structure in the image reader 1300 according to Embodiment 13.

Herein description is made for structure of image data in the image reader 13 according to Embodiment 13 of the present invention with reference to FIG. 51. In FIG. 51, document data comprises a header consisting of a document name Dt, a writer name Dg, a date of preparation Ddc, and a total number of pages Dn, and page data corresponding to a plurality of pages. The page data corresponding to each page comprises a header consisting of a number Pi, a number Pn of partial images included in the page, a number of pixels Pw in the horizontal direction as an image size for the entire page, a number of pixels in the vertical direction Ph, and layout information Pl indicating location of each partial image included on the page, and a plurality of partial image data included on the page.

The partial image data comprises an image number Ij specifically identifying the partial image on the page, size in the horizontal direction Iw of the partial image, size in the a vertical direction Ih , a priority order Ip of the partial image when the partial image is to be displayed, attributes Ia of a title or a diagram or a table or the like, a display position Ix and Iy, a number of contracted layers Ir indicating how may times the original image has been reduced, a contraction ratio Is used in display, a display flag Ir, a division ratio Dr, an enlargement ratio Ds of a divided image, a dividing direction flag Df (1: Vertical, 2: Horizontal), a display mode Dm (0 or 1), and bit map data for the partial image. The division ratio Dr, enlargement ratio Ds, dividing direction flag Df, and display mode Dm in partial image data is described later. The bit map data is stored as raster image data when data compression is not executed, and as code data when data compression is executed.

Figure 53:
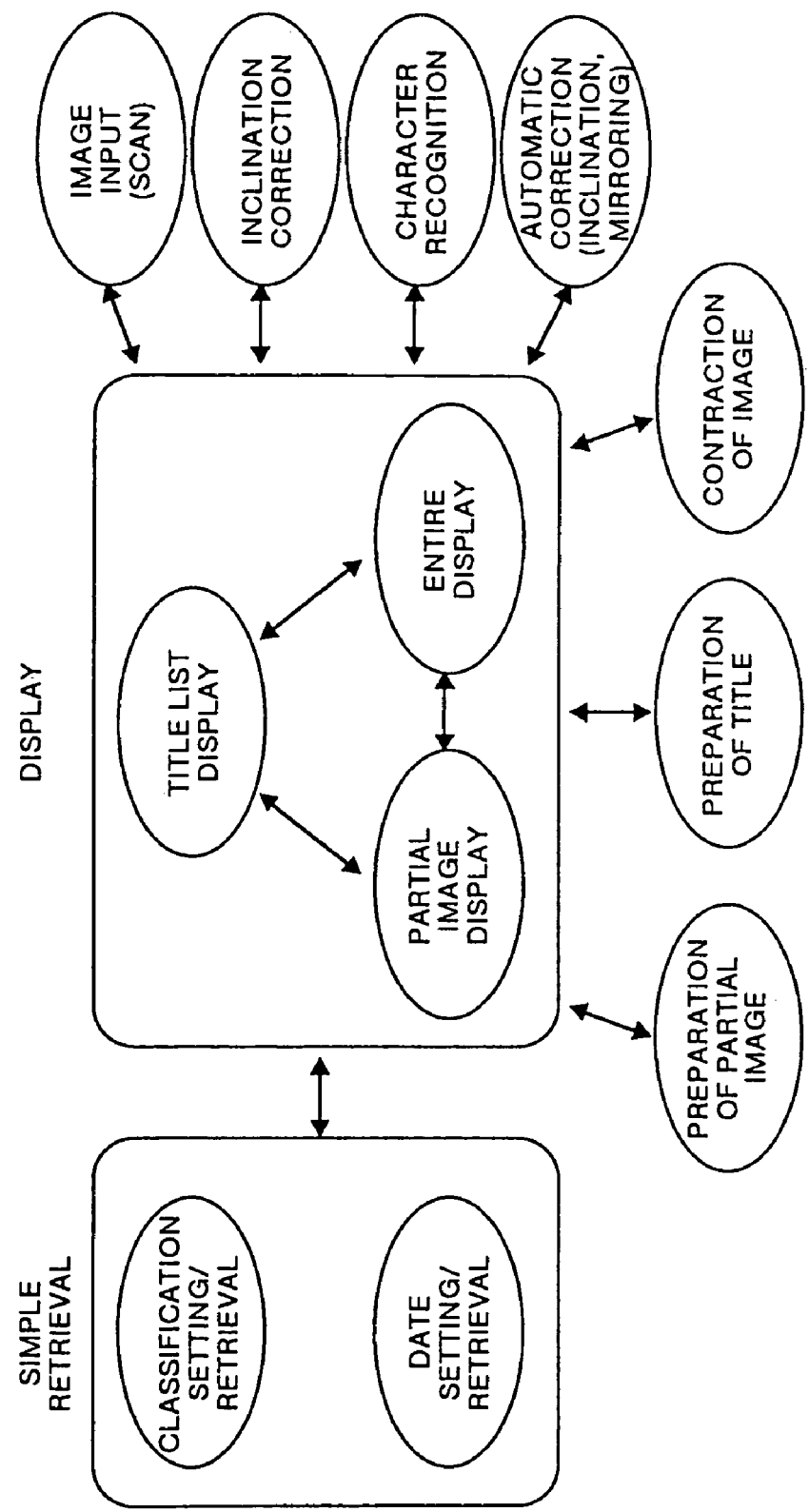
FIG. 53 is a view showing main functions of the image reader 1300 according to Embodiment 13.

Next, functions of the image reader 1300 according to Embodiment 13 of the present invention will be described with reference to FIG. 53. These functions are realized when a program stored in the flash memory 1355 shown in FIG. 44 is executed by the MPU 1350. It should be noted that detailed description for each function is made later.

At first, functions of the image reader 1300 according to Embodiment 13 of the present invention include the "Image Input" function, "Display" function, "Inclination Correction" function, "Character Recognition" function, "Automatic Correction" function, "Image Contraction" function, "Title Preparation" function", "Partial Image Preparation" function, "Simple retrieval" function each shown in the figure, and a "Communication" function which is not shown in this figure. The "Image Input" function is a function for reading an image of a document by means of scanning. The "Display" function is a function for having an image read with the "Image Input" function displayed on the LCD 1313 (Refer to FIG. 31). The "Display" function as defined herein is largely classified to a "Entire Display" function, a "Partial Image Display" function, and a "Title List Display" function.

Figure 54:
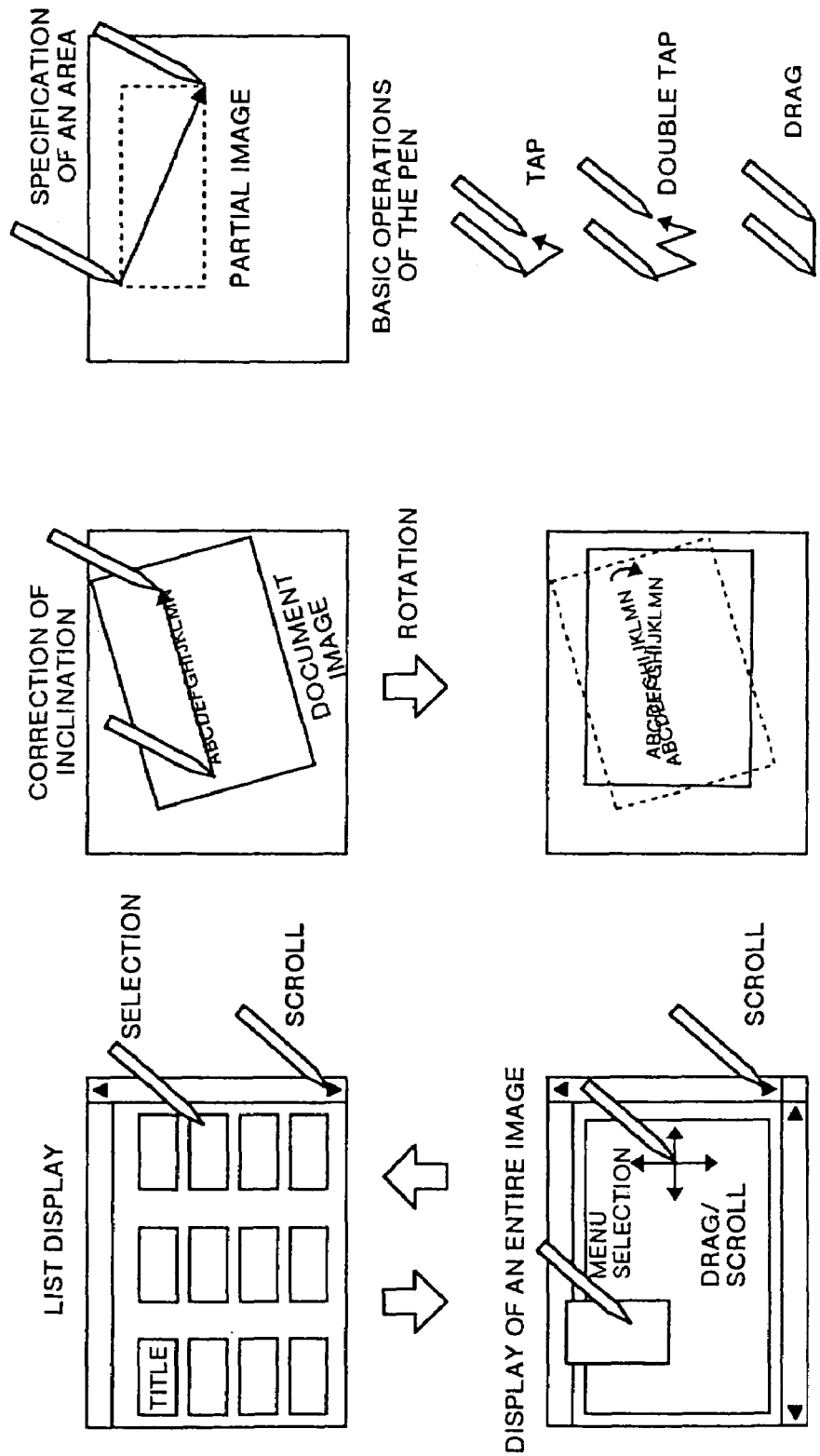
FIG. 54 is a view showing a method of controlling the pen 1322 in the image reader 1300 according to Embodiment 13.

The "Entire Display" function above is a function for having all of image data for one page displayed on the LCD 1313 (Refer to bottom left view in FIG. 54). The "Partial Image Display" function is a function for having a partially separated image of one or a plurality of images displayed on the LCD 1313. When specifying an area of an image to be separated, the pen 1322 (Refer to FIG. 32) is used as shown in the top right view in FIG. 54.

The "Title List Display" function is a function for having a title prepared for a particular area showing a feature of an image displayed on the LCD 1313 (Refer to top left view in FIG. 54). The "Inclination Correction" function is a function for correcting inclination of a displayed image, when a read image is to be or is displayed on the LCD 1313, by means of manual operations by a user (Refer to top and bottom middle views in FIG. 54). The "Character Recognition" function is a function for recognizing characters in a read image. The "Automatic Correction" function is a function for automatically correcting inclination of or a mirrored character in the read image by making use of the "Character Recognition" function described above. The "Image Contraction" function is a function for contracting image data for the read image.

Figure 79:
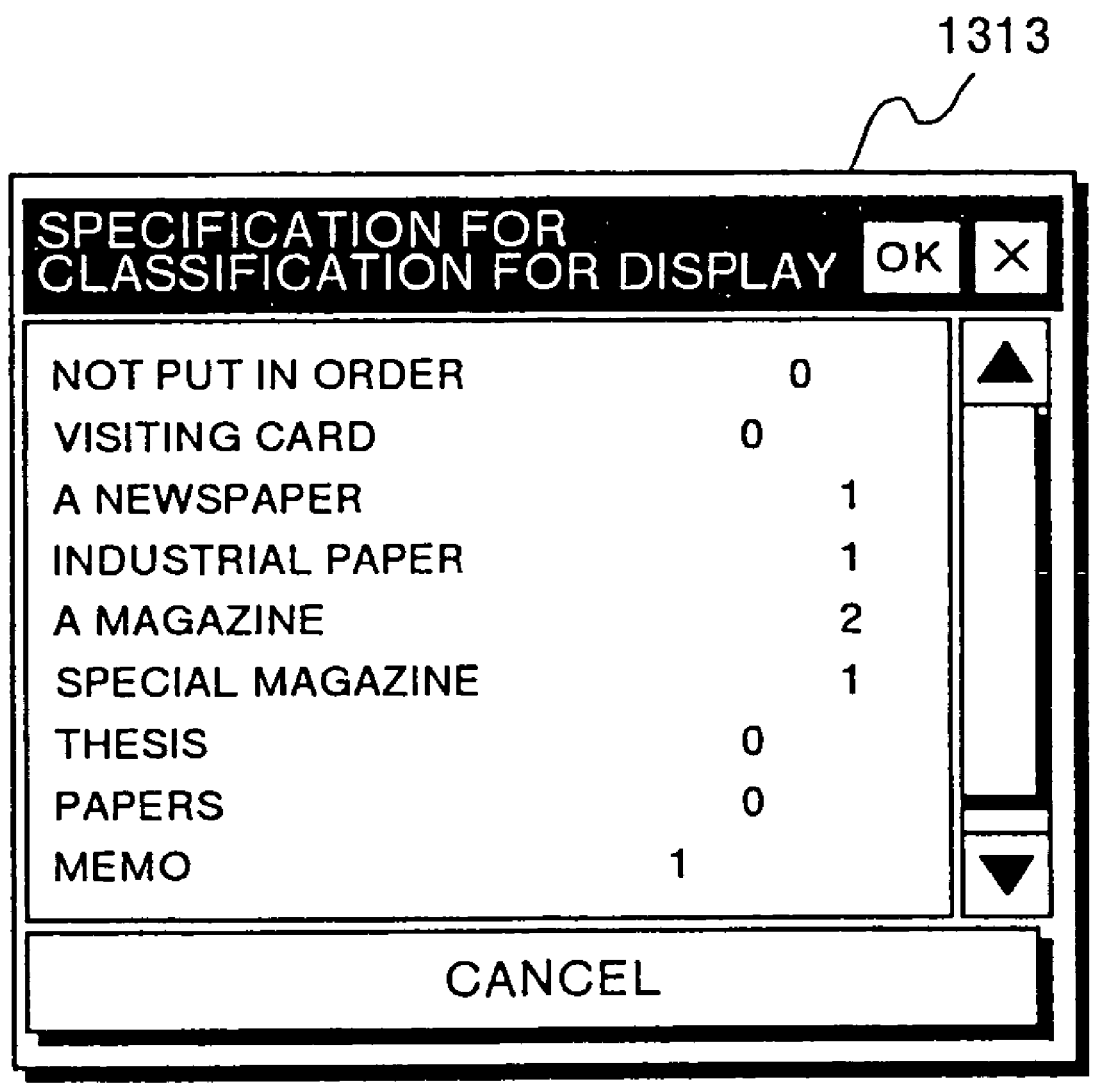
FIG. 79 is a view showing an example of screen display on the LCD 1313 when a classification item for display is specified in the image reader 1300 according to Embodiment 13.

Further the "Simple retrieval" function is a function for retrieving a desired image from a plurality of images read with the "Image Input" function by using a simple technique. This "Simple Retrieval" function is largely divided to a "Classification Setting/retrieval" function and a "Date Setting/Retrieval" function. The "Classification Setting/Retrieval" function is a function for classifying a plurality of read images by using such categories as "Visiting Card", "A Newspaper", "Industrial Paper" or the like as shown in FIG. 79 described later and retrieving a desired image from a plurality of images read according to any of the classification items as a key. Further, the "Date Setting/retrieval" function is a function for retrieving an image from a plurality of images using the date as a key. Finally, the "communication function" is a function for transacting image data or the like with an external device (such as the computer 1360: Refer to FIG. 44).

<Input Operation>

Figure 55:
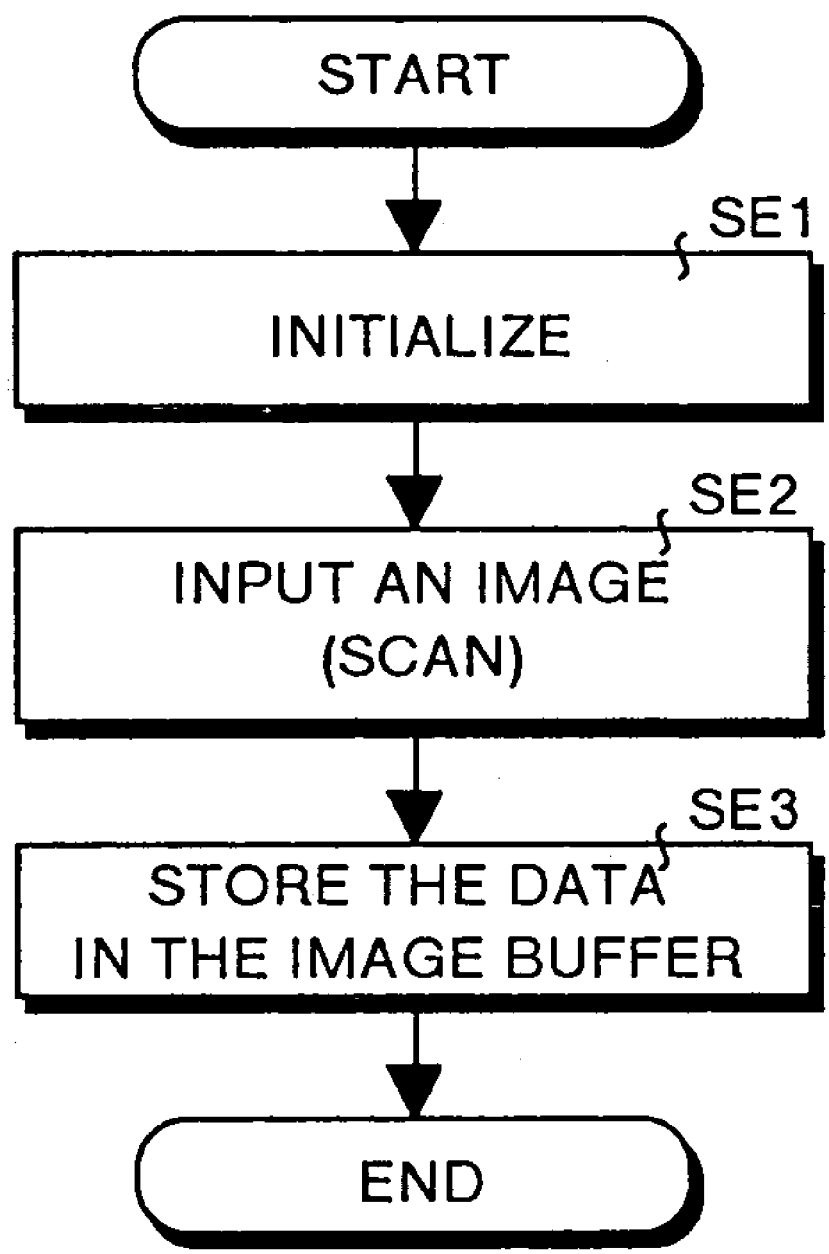
FIG. 55 is a flow chart showing an operation for reading an image in the image reader 1300 according to Embodiment 13.

Next, operations of the image reader 1300 according to Embodiment 13 of the present invention will be described with reference to FIG. 55 and FIG. 56. FIG. 55 is a flow chart showing an image input operation (an operation for reading an image) in the image reader 1300 according to Embodiment 13.

Figure 56:
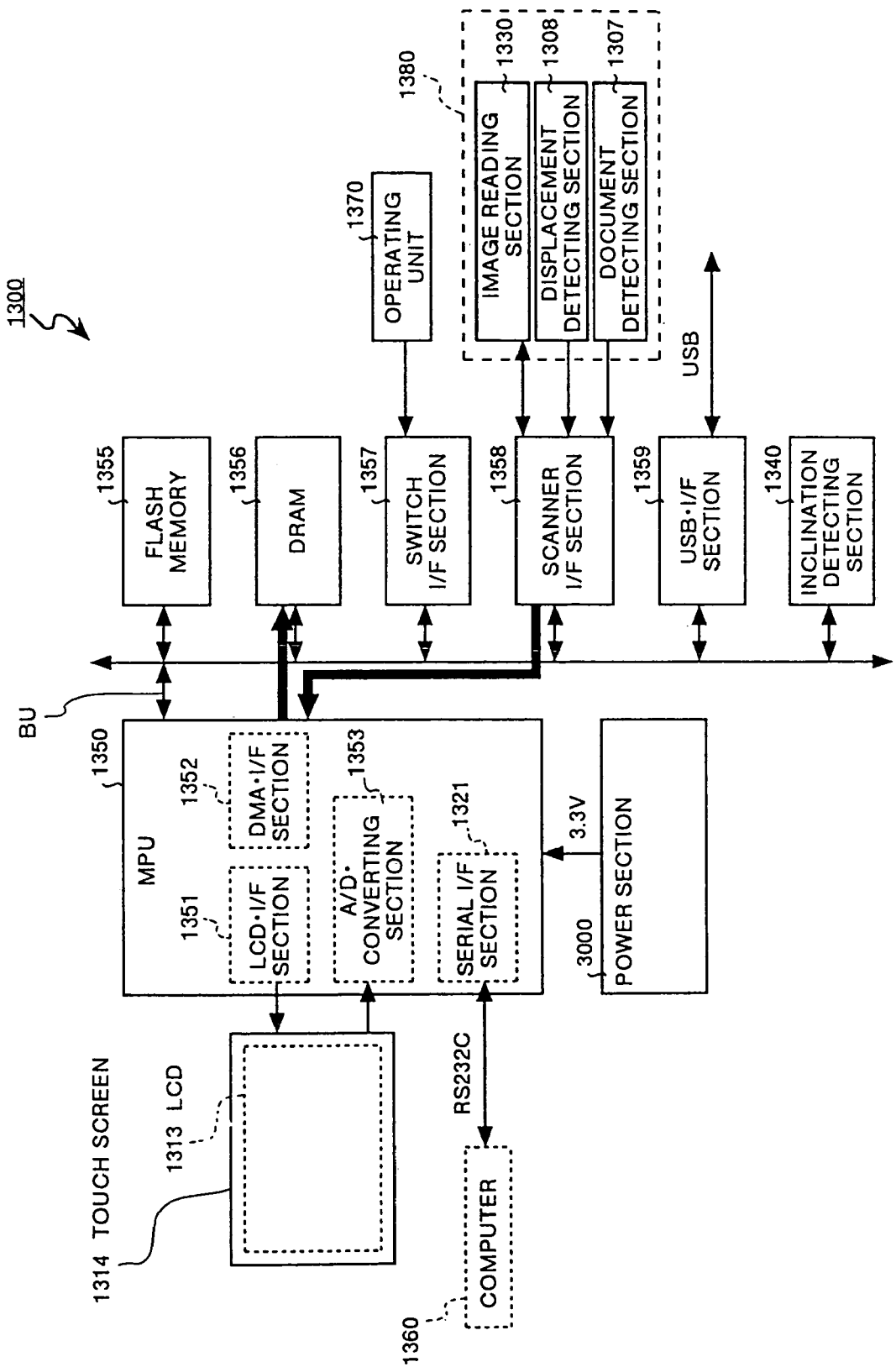
FIG. 56 is a circuit diagram showing a data flow when an image is read with the image reader 1300 according to Embodiment 13.

In FIG. 56, when the power switch 1315 (refer to FIG. 31) in the operating section 1370 is pressed, power is supplied from the power section 3000 to each section of the device, and the MPU 1350 shifts the system control to step SE1 shown in FIG. 55. It should be noted that the power switch enables suspend/resume, and that, while a battery inside the power switch is effective, contents of the DRAM is not lost in the suspend state even if the power is turned OFF. In step SE1, the MPU 1350 reads a program via a bus BU from the flash memory 1355, and initializes the program by means of booting. Then in step SE2, the MPU 1350 executes an operation for inputting (receiving) an image from a document (not shown) with the scanner section 1380, and then shifts the system control to step SE3. In step SE3, the MPU 1350 stores the image data inputted via the scanner I/F section 1350 and bus BU in the DRAM 1356 (buffer) via the bus BU, and terminates the operation. Herein sometimes the image data is compressed when storing the image data in the DRAM 1356.

<Display Operation>

Figure 57:
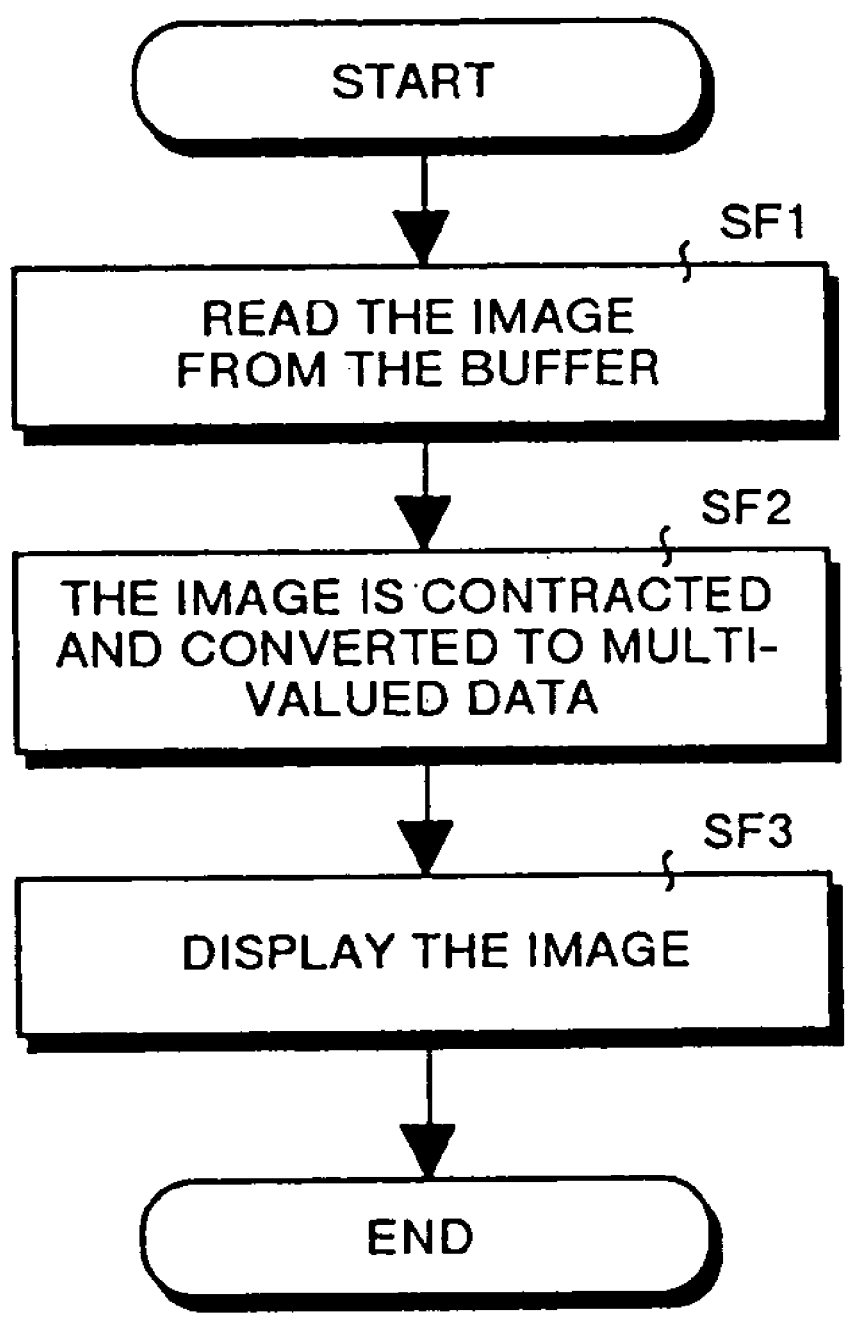
FIG. 57 is a flow chart showing image display operations in the image reader 1300 according to Embodiment 13.

Next, operation for displaying of an image in the image reader 1300 according to Embodiment 13 of the present invention will be described with reference to flow charts shown in FIG. 57 and FIG. 58, and also to FIG. 59. FIG. 57 is a flow chart showing operations for displaying an image on the LCD 1313 according to not-contracted image data stored in the DRAM 1356 shown in FIG. 59.

In the operations for displaying an image, in step SF1 shown in FIG. 57, the MPU 1350 reads out an image data via the bus BU from the DRAM 1356 (buffer), and then shifts the system control to step SF2. In step SF2, the MPUT 1350 contracts the read image data, converts the image data to a gray-scale data, and then shifts the system control to step SF3. Instep SF3, the MPU 1350 displays the image (Refer to FIG. 52) on the LCD 1313 via the LCD I/F section 1351 according to the compressed gray-scale data, and then terminates the operation.

Figure 58:
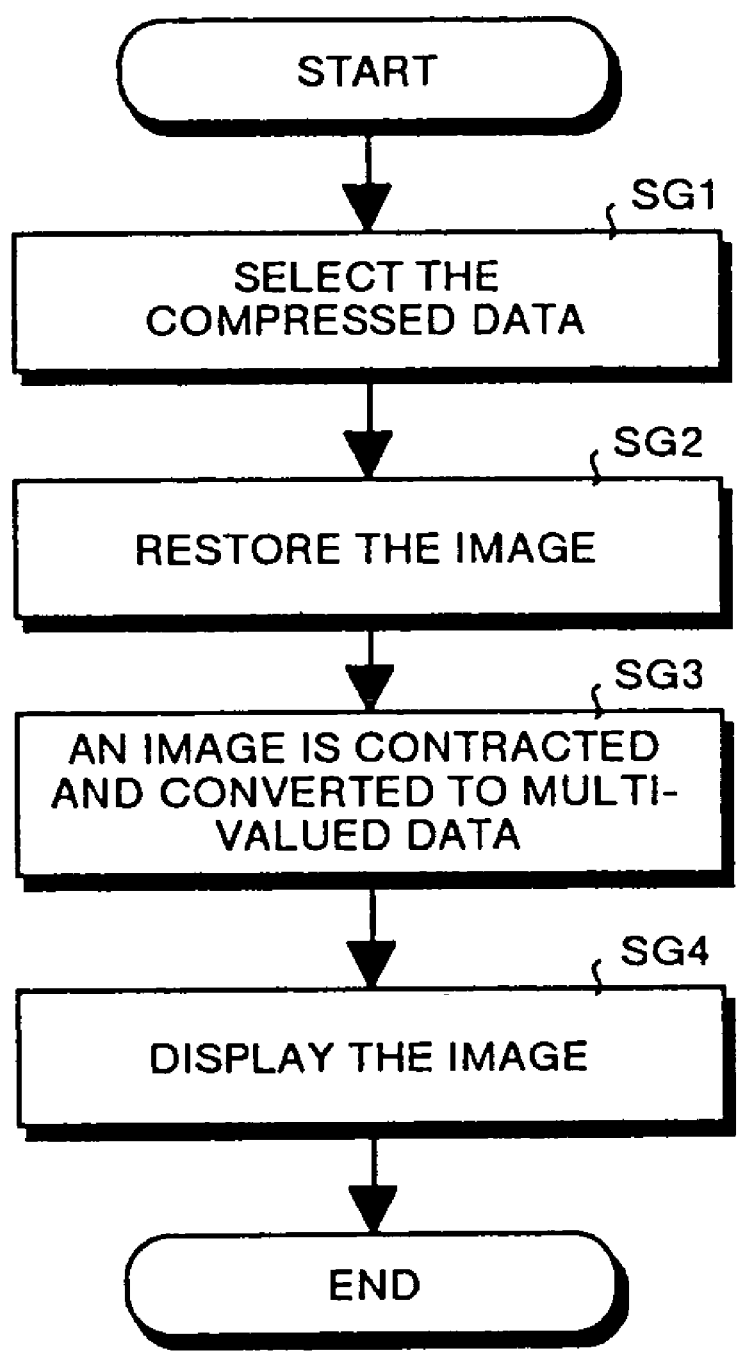
FIG. 58 is a flow chart showing image display operations in the image reader 1300 according to Embodiment 13.
Figure 59:
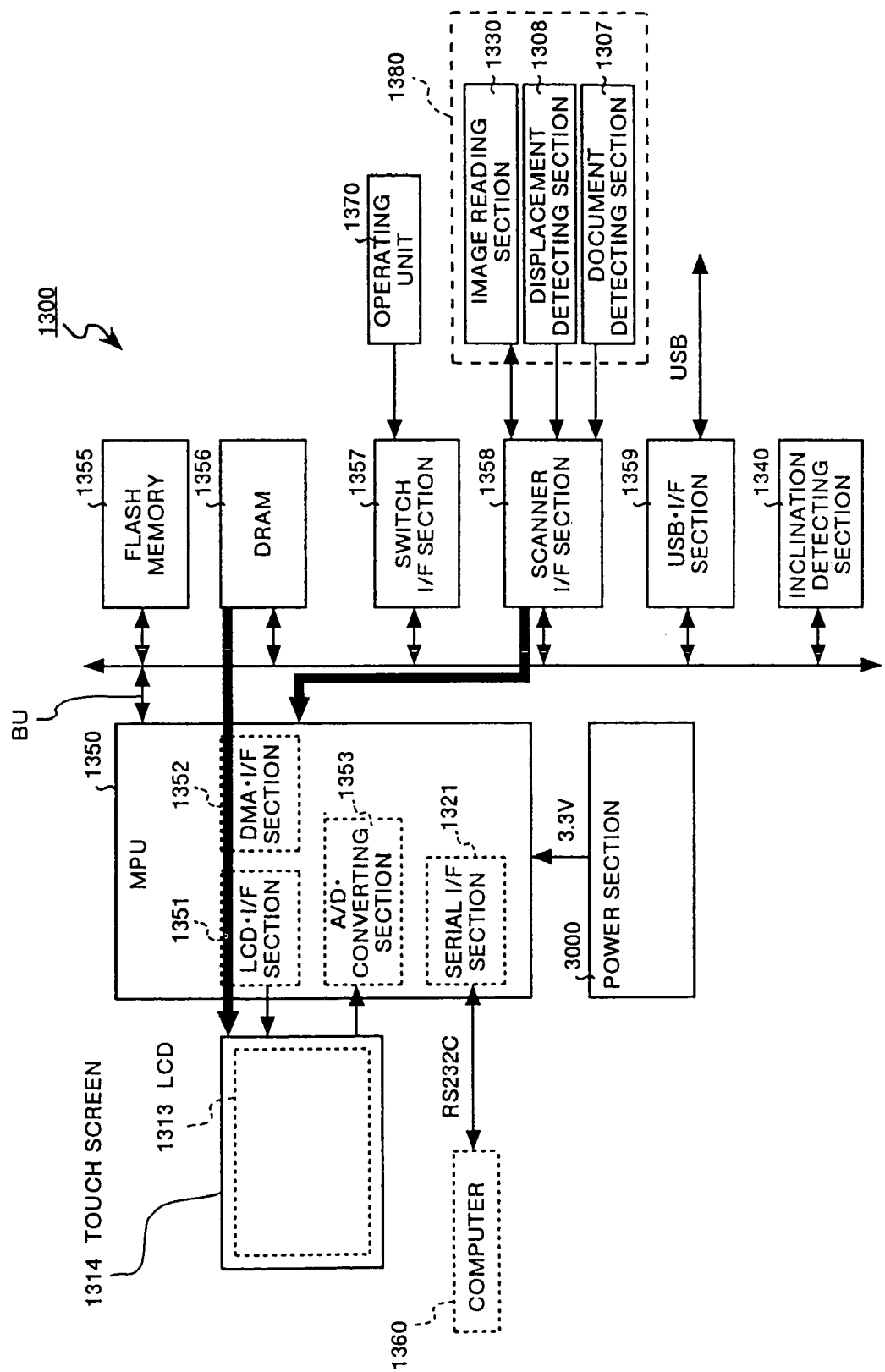
FIG. 59 is a circuit diagram showing a data flow when an image is displayed with the image reader 1300 according to Embodiment 13.

FIG. 58 is a flow chart showing operations for displaying an image on the LCD 1313 according to contracted image data stored in the DRAM 1356 shown in FIG. 59. In the operation for displaying an image, as shown in FIG. 59 the MPU 1350 accesses the DRAM 1356 via the bus BU, selects the compressed data and then shifts the system control to step SG2.

In step SG2, the MPU 1350 decompresses the contracted image data to the original data before contraction, and shifts the system control to step SG3. In step SG3, the MPU 1350 converts the image data decompressed in step SG2 to gray-scale data, and shifts the system control to step SG4. In step SG4, the MPU 1350 displays the image (Refer to FIG. 53) on the LCD 1313 via the LCD I/F section according to the gray-scale image data and then terminates the operation.

<Data Processing> (Index Generation 1)

Figure 60:
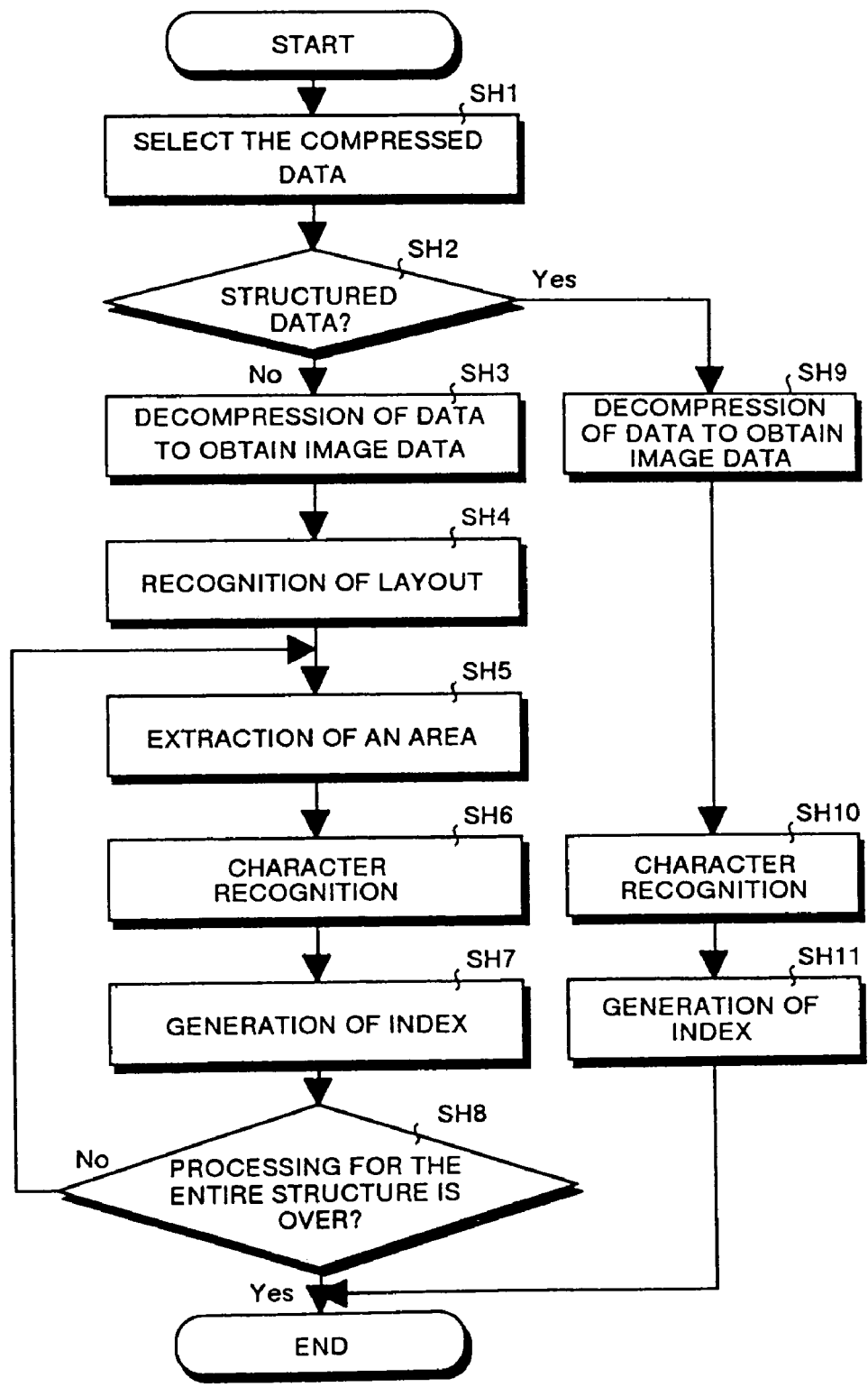
FIG. 60 is a flow chart showing operations for data processing (index generation) in the image reader 1300 according to Embodiment 13.

Next, operation for processing data in the image reader 1300 according to Embodiment 13 of the present invention will be described with reference to FIG. 60 to FIG. 65. FIG. 60 is a flow chart showing an operation for generating an image index according to the contracted image data stored in the DRAM 1356 shown in FIG. 56. In this data processing (index generating) operation, in step SH1 shown in FIG. 60, the MPU 1350 shown in FIG. 61 accesses the DRAM 1356 to select the compressed image data, and then shifts to the system control step SH2.

In step SH2, the MPU 1350 determines whether the contracted image data has been structured or not. Herein structuring of an image indicates dividing an image into several areas each corresponding to an attribute such as a character, a diagram, a table or the like, and sometimes this operation is called layout recognition or area division. In this case, if it is determined that the image has not been structured, the MPU 1350 recognizes a result of determination in step SH2 as "No", and shifts the system control to step SH3. In step SH3, the MPU 1350 decompresses the contracted image data selected in step SH1 to obtain the original data, and then shifts the system control to step SH4.

In step SH4, the MPU 1350 recognizes layout of an image obtained from the decompressed image data, and then shifts the system control to step SH5. In step SH5, the MPU 1350 extracts an image in a particular area in the image (described as a partial image), and then shifts the system control to step SH6. In step SH6, the MPU 1350 recognizes a character in the extracted partial image by using the character recognizing technique, and then shifts the system control to step SH7. In step SH7, the MPU 1350 generates an index according to a result of character recognition, and then shifts the system control to step SH8. In step SH8, the MPU 1350 determines whether index generation has been finished for all layout in the image or not, in other words whether all of image data has been structured or not, and if a result of determination is "No", the MPU 1350 returns the system control to step SH5, and repeats the operating sequence described above, and if a result of the determination is "Yes", the MPU 1350 terminates the operation.

On the other hand, in step SH2, if it is determined that the image is structured, the MPU 1350 recognizes that a result of determination as "Yes", and shifts the system control to step SH9. In step SH9, the MPU 1350 decompresses the contracted image data, executes character recognition for the image like in the processing in step SH6, and then shifts the system control to step SH11. In step SH11, the MPU 1350 generates an index according to a result of character recognition, and then terminates the operation.

<Data Processing> (Index Generation)

Figure 61:
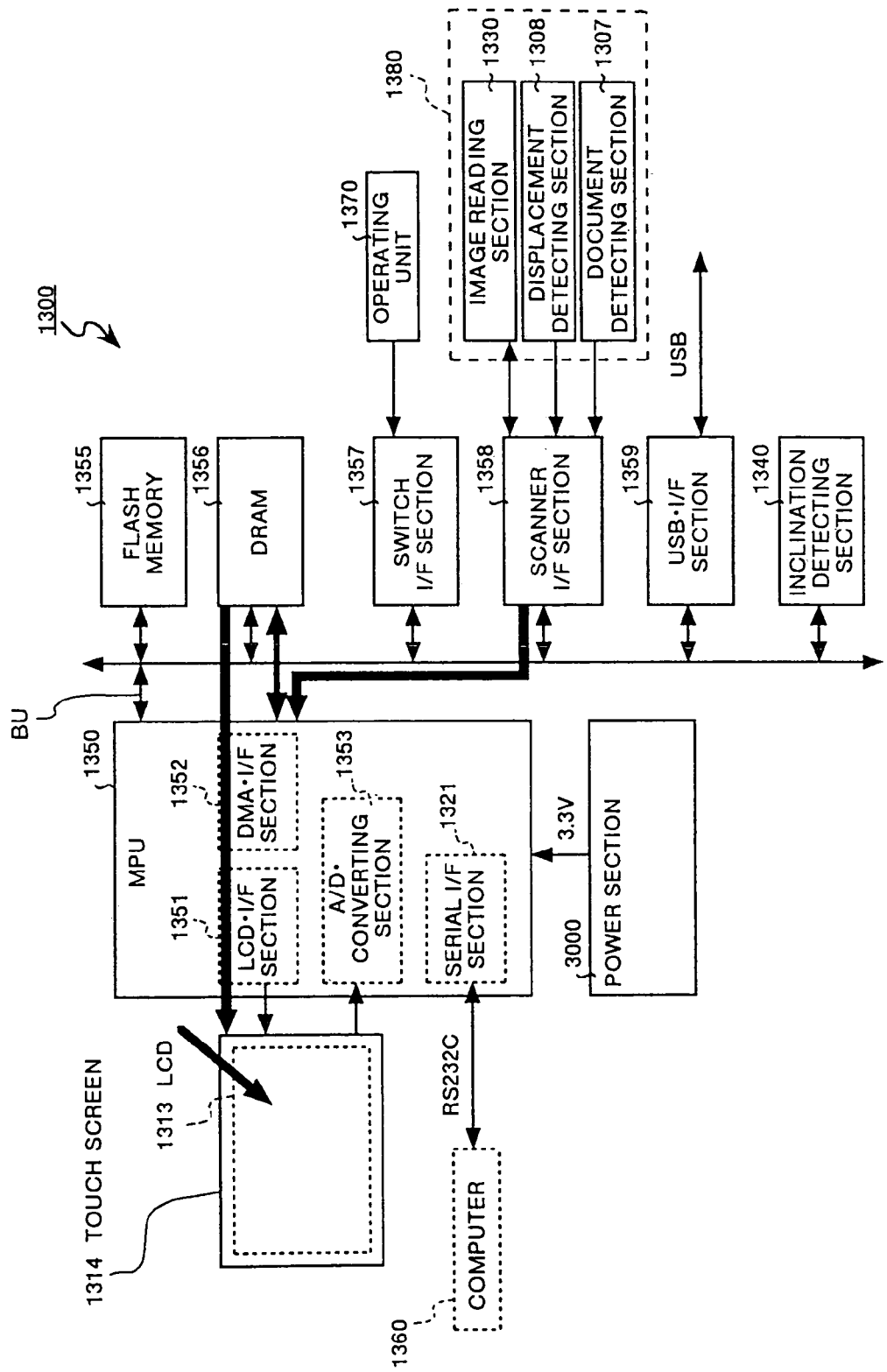
FIG. 61 is a circuit diagram showing a data flow during data processing (Index generation), operation of the pen, and image display operations in the image reader 1300 according to Embodiment 13.
Figure 62:
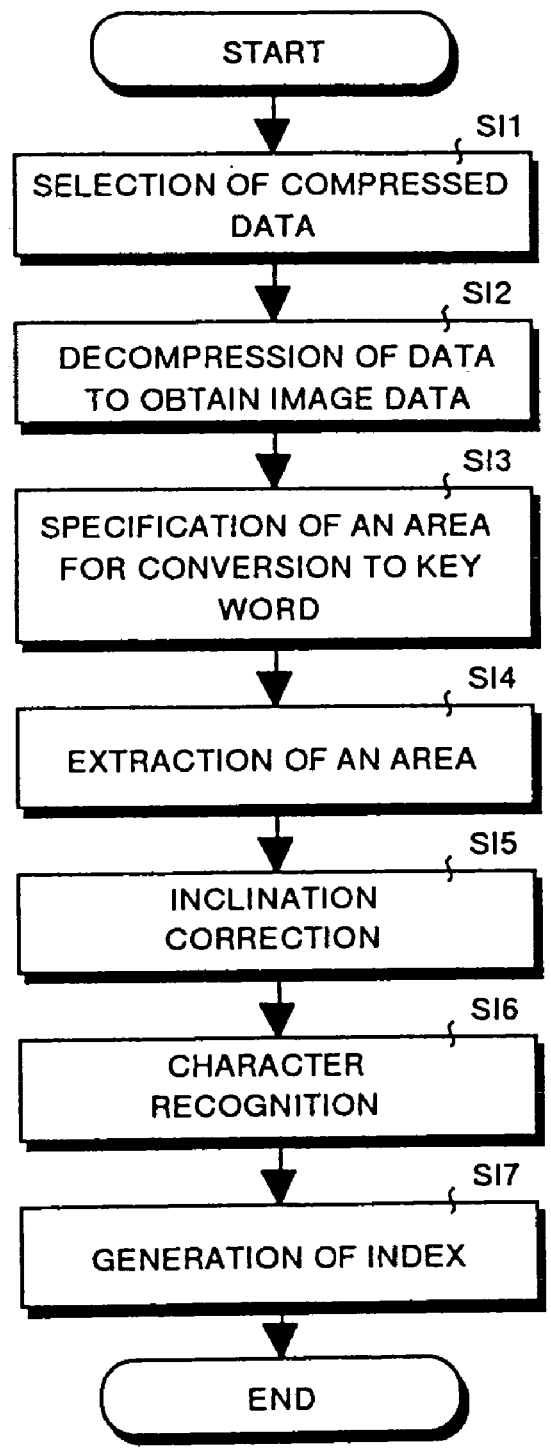
FIG. 62 is a flow chart showing data processing (index generating) operations in the image reader 1300 according to Embodiment 13.

FIG. 62 is a flow chart showing operations for generating an index for an image according to the contracted image data stored in the DRAM 1356 shown in FIG. 61. In this data processing (index generating) operation, in step SI1 shown in FIG. 62, the MPU 1350 shown in FIG. 61 accesses the DRAM 1356 via a bus BU to select the compressed image data, and then shifts the system control to step SI2.

In step SI2, the MPU 1350 decompresses the original data from the contracted image data selected in step SI1, and then shifts the system control to step SI3. In step SI3, the MPU 1350 specifies a particular area (keyword) of image data obtained from the decompressed image data, and then shifts the system control to step SI4. In step SI4, the MPU 1350 extracts the particular area specified in step SI3 from the decompressed image, and then shifts the system control to step SI5. In step SI5, the MPU 1350 corrects, when the particular area extracted in step SI4 is inclined with respect to the display surface, the inclination and then shifts the system control to step SI6. In step SI6, the MPU 1350 executes character recognition in the area for which the inclination has been corrected in step SI6, and then shifts the system control to step SI7. In step SI7, the MPU 1350 generates an index according to a result of character recognition, and then terminates the operation.

<Data Processing> (Recontraction)

Figure 63:
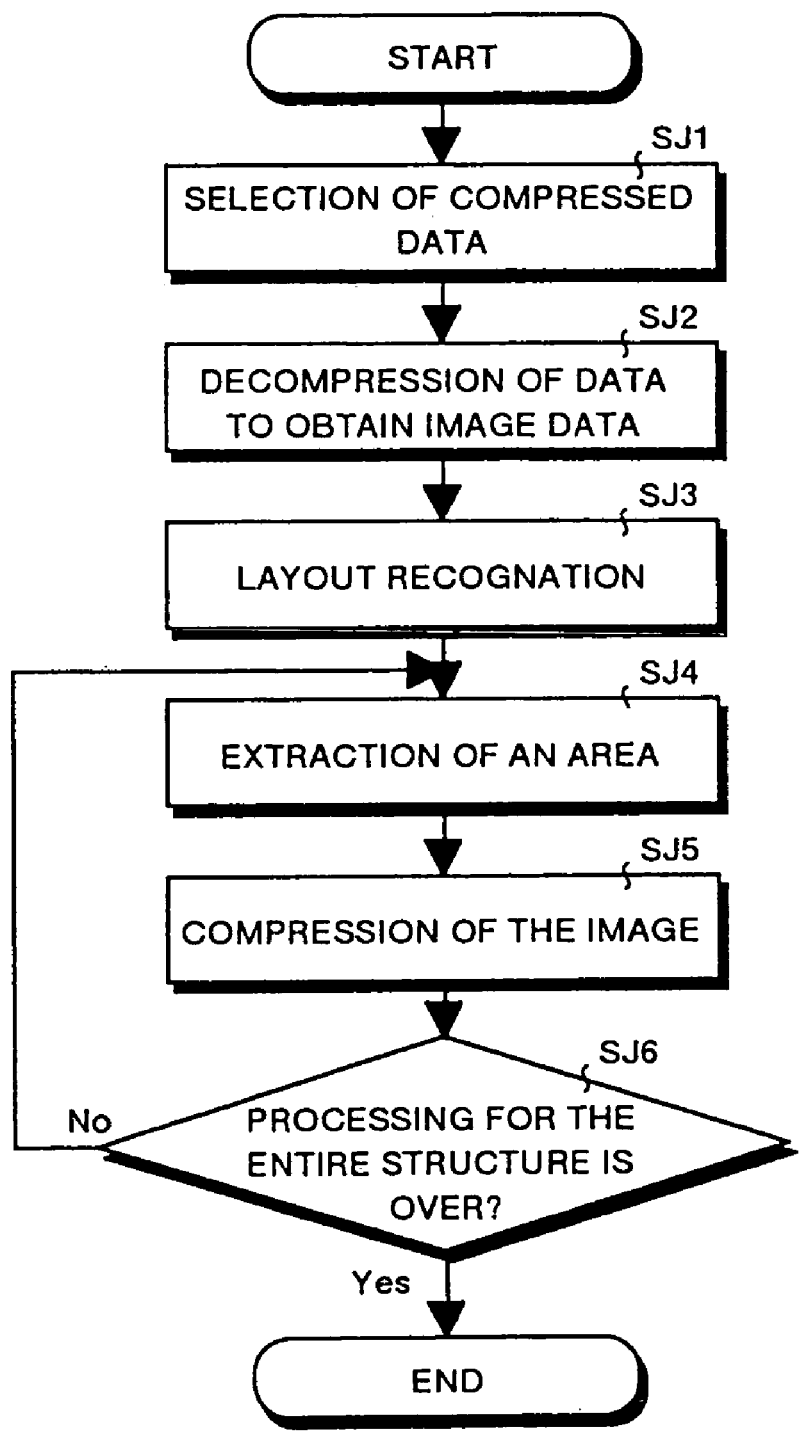
FIG. 63 is a flow chart showing operations for data processing (recompressing) in the image reader 1300 according to Embodiment 13.

FIG. 63 is a flow chart showing operations for structuring contracted image data stored in the DRAM 1356 shown in FIG. 61 but not having been structured yet and then recontracting the image data. In this recontracting operation, in step SJ1 shown in FIG. 63, the MPU 1350 shown in FIG. 61 accesses the DRAM 1356 to select compressed image data, and then shifts the system control to step SJ2.

In step SJ2, the MPU 1350 decompresses the original data from the contracted image data selected in step SJ1, and then shifts the system control to step SJ3. In step SJ3, the MPU 1350 recognizes layout of an image obtained from the decompressed image data, and then shifts the system control to step SJ4. In step SJ4, the MPU 1350 extracts a particular area in the image (described as partial image hereinafter), structures the image and then shifts the system control to step SJ5. In step SJ5, the MPU 1350 again compresses (recompresses) the image data corresponding to the structured image and shifts the system control to step SJ6. Instep SJ6, the MPU 1350 determines whether all of layout for the image has been structure or not according to a result of character recognition. If and when it is determined that a result of determination in step SJ6 is "No", the MPU 1350 returns the system control to step SJ4, and repeats the same operating sequence described above. If and when it is determined that a result of determination in step SJ6 is "Yes", the MPU 1350 terminates the operation.

<Data Processing) (Layout Recognition 1)

Figure 64:
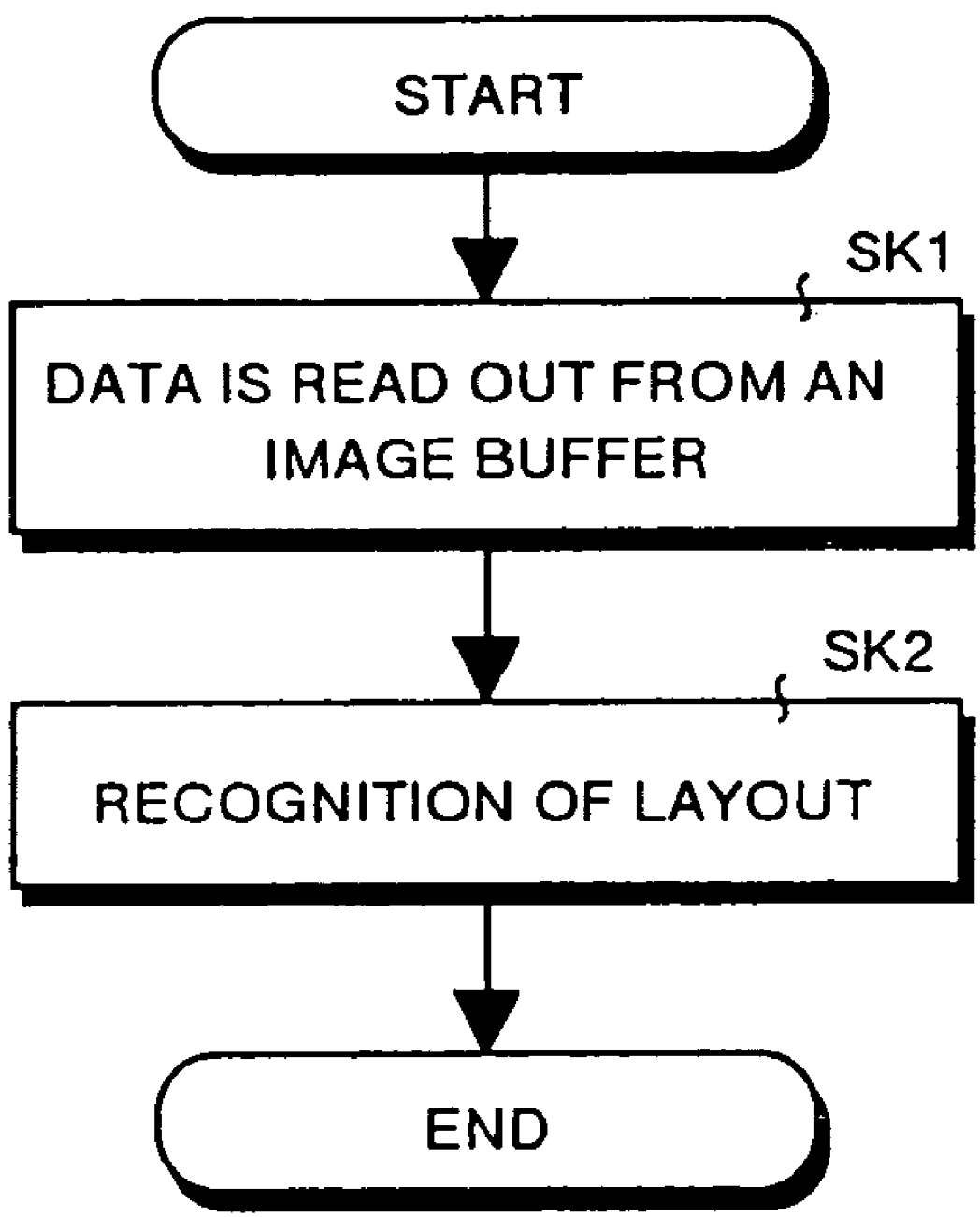
FIG. 64 is a flow chart showing operations for data processing (layout generation) in the image reader 1300 according to Embodiment 13.

FIG. 64 is a flow chart showing operations of layout recognition (structuring) for an image obtained from image data stored in the DRAM 1356 shown in FIG. 61. In this layout recognizing operation, in step SK1 shown in FIG. 64, the MPU 1350 shown in FIG. 61 reads out the image data stored in the DRAM 1356 via the bus BU, and then shifts the system control to step SK2.

In step SK2, the MPU 1350 recognizes layout of the image obtained form the image data read out in step SK1, structures the image data, and then terminates the operation.

<Data Processing) (Layout Recognition 2)

Figure 65:
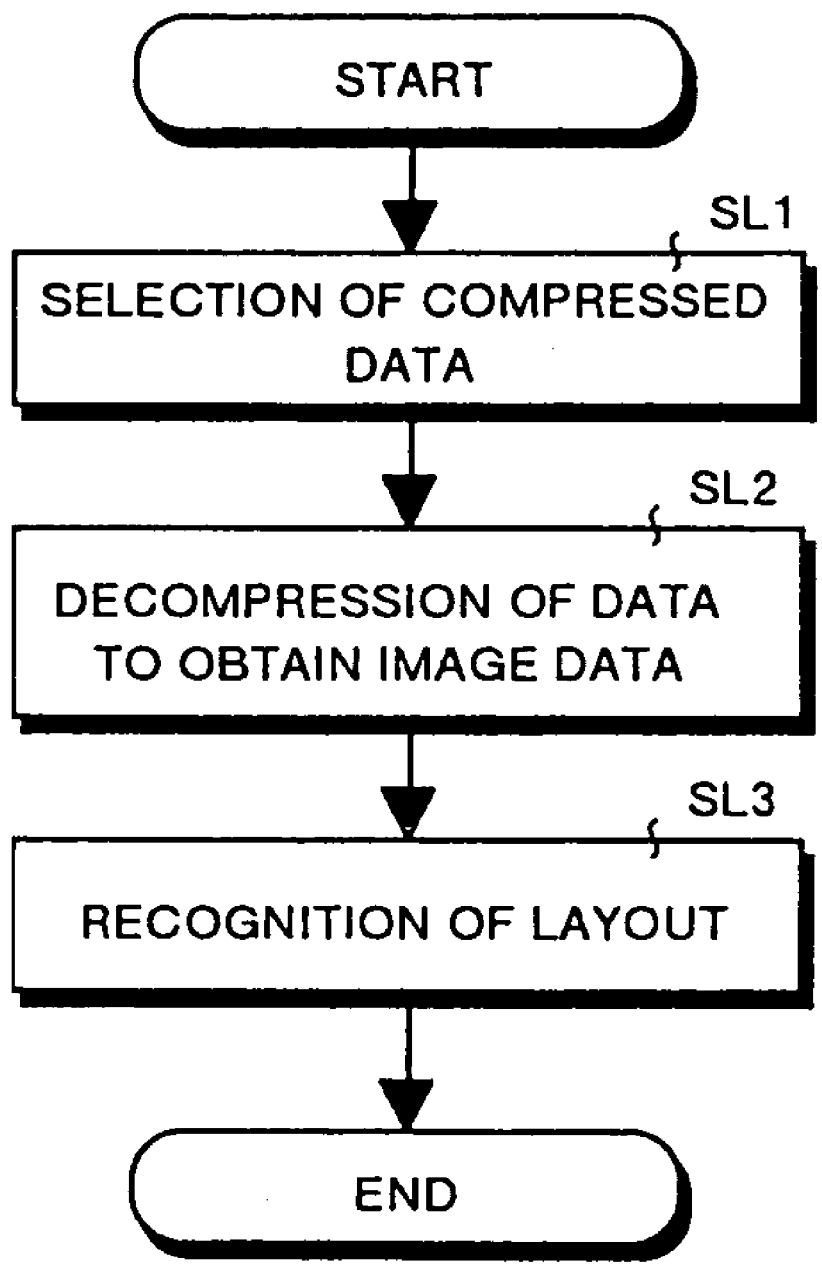
FIG. 65 is a flow chart showing operations for data processing (layout generation) in the image reader 1300 according to Embodiment 13.

FIG. 65 is a flow chart showing operations for executing layout recognition (structuring) for an image obtained from the contracted image data stored in the DRAM 1356 shown in FIG. 61. In this data processing (layout recognizing) operation, in the step SL1 shown in FIG. 65, the MPU 1350 shown in FIG. 61 accesses the DRAM 1356 to select the compressed image data, and then shifts the system control to step SL1. In step SL2, the MPU 1350 reproduces original image data by decompressing the selected compressed image data, and shifts the system control to step SL3. In step SL3, the MPU 1350 recognizes layout of an image for the image data obtained from the reproduced image data, executes structuring and then terminates the operation.

<Data Communications>

Figure 66:
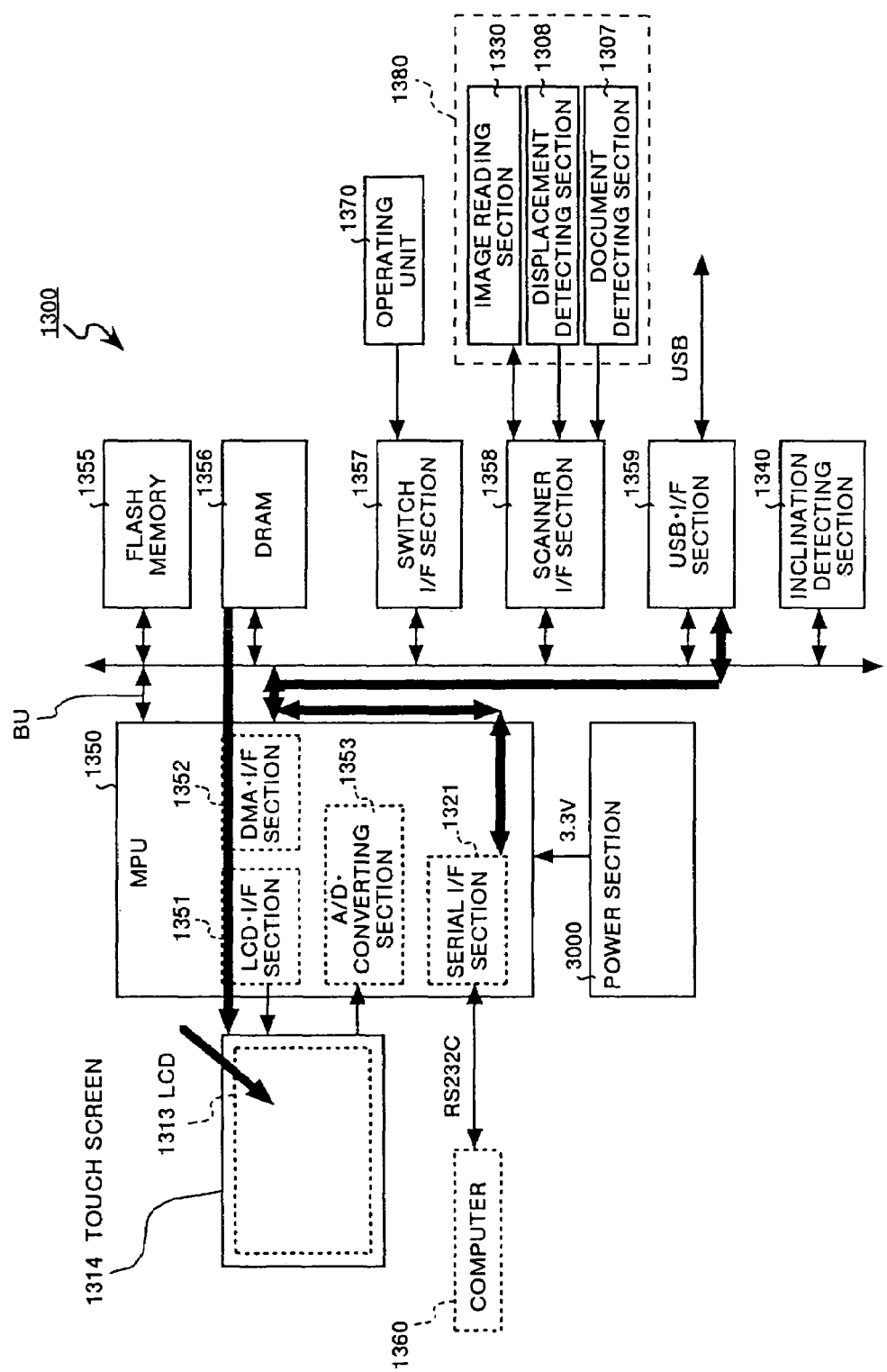
FIG. 66 is a circuit diagram showing a data flow when data is transmitted from the image reader 1300 according to Embodiment 13.

FIG. 66 is a circuit diagram showing operations for data communications with an external device (computer 1360) of the image reader 1300. In this figure, it is assumed that the computer 1360 is electrically connected to the serial I/F section. In the connection state as described above, the computer 1360 accesses the DRAM 1356 via the serial I/F interface 1321, a DMA I/F section 1352, and a bus BU. The image data is read out from the DRAM 1356 and transmitted to the computer 1360 via the bus BU, DMA I/F section 1352 and the serial I/F section.

On the contrary, when image data is transmitted from the computer 1360, the image data is written in the DRAM 1356 via the serial I/F section 1321 and the DMA I/F section 1352.

Assuming as an another example of the external device not shown in the figure to be electrically connected to the USB I/F section 1359, the external device accesses the DRAM 1356 via the USB I/F section 1359, the bus BU, the DMA I/F section 1352 and the bus BU. The image data is read out from the DRAM 1356 and is transmitted via the bus BU, DMA I/F section 1352, bus BU and USB I/F section 1359 to the external device (not shown). On the contrary, when image data is transmitted from the external device, the image data is written via the USB I/F section 1359, bus BU, DMA I/F section 1352 and bus BU in the DRAM 1356.

In FIG. 66, the computer 1360 (or an external device (not shown)) and DRAM 1356 are directly connected via the DMA I/F section 1352 without passing through the MPU 1350, but the two components may be connected to each other not via the DMA I/F section 1352, but via the MPU 1350.

Next, description is made for operations of the image reader 1300 according to Embodiment 13 described above with reference to FIG. 20, FIG. 31, FIG. 39, FIG. 40, FIG. 41, and FIG. 45 to FIG. 50.

When reading an image, a user at first presses the power switch 1315 shown in FIG. 31. With this operation, power is supplied to each section of the device. Then the user places the image reader 1300 at a read start position on a document P so that the image reading surface 1301a comes in contact with the document P. With this operation, it is determined that the main roller 1304, first auxiliary roller 1305, and second auxiliary roller 1306 contact the document P. Herein it is assumed that the image reader 1300 is placed on the document P in the horizontal posture as shown in the top view of FIG. 39. Accordingly, the permanent magnet 1342 is located at a position indicated by a solid line in FIG. 40. Namely, "S" pole of the permanent magnet 1342 comes in contact with the first stopper member 1345, and is located in parallel to the lead switch 1341.

With this operation, a magnetic field generated by the permanent magnet 1342 works in the longitudinal direction of the first ferromagnetic lead wire 1341b as well as of the second ferromagnetic lead wire 1341. Herein, in the first ferromagnetic lead wire 1341b, the first contact point 1341e becomes a "N" pole with the other edge section 1341d becoming a "S" pole. On the other hand in the second ferromagnetic lead wire 1341f, the other edge section 1341h becomes a "N" pole and the second contact point 1341i becoming a "S" pole.

Therefore, polarity of the first contact point 1341e is contrary to that of the second contact point 1341i, so that an attractive force is generated and the first contact point 1341e and the second contact point 1341i are contact each other. Therefore, an inclination detection signal S7 is outputted from the inclination detecting section 1340 shown in FIG. 45 to the data processing section 1400, and the image data direction correcting section 1430 recognizes inclination (posture) of the image reader 1300. Namely, the image data direction correcting section 1430 recognizes that the image reader 1300 is kept in the horizontal posture as shown in the top views of FIG. 39 and FIG. 49.

When the image reader 1300 is kept in the vertical posture as shown in the bottom views of FIG. 39 and FIG. 49, the permanent magnet 1432 shown in FIG. 40 is located at a position indicated by a two dot-dot chain line in the figure, so that the magnetic field does not act in a direction parallel to the lead switch 1341. In this case, as the first contact point 1341e and the second contact point 1342i are separated from each other, the inclination detection signal S7 is not outputted. Therefore, the image data direction correcting section 1430 recognizes that the image reader 1300 is kept in a vertical posture as shown in the bottom views of FIG. 39 and FIG. 49. When the image reader 1300 is placed at a read start position on the document P shown in FIG. 41 so that the image reading surface 1301a contacts the document P, the document P is detected by the document detecting section shown in FIG. 45, and a document detection signal S1 is outputted from the document detecting section 1307 to the read control section 1410.

With this operation, the read control section 1410 starts output of a drive signal S2 to the read control section 1330 and outputs the drive signal S2 shown in FIG. 20. Then the read control section 1410 checks whether a displacement detection signal S3 is inputted within a driving cycle T or not. Thus, the image reading surface 1330 is driven, an image for one line on the document P read in, and image data D1 for line 1 shown in FIG. 20 is outputted from the image reading section 1330 to the image signal processing section 1420.

Then, the A/D converting section 1421 shown in FIG. 46 converts the image data D1 (analog data) inputted from the image reading section 1330 to digital data, and outputs the digital data to the line data retaining section 1422 and to the density histogram generating section 1423.

The line data retaining section 1422 retains the digital data for one line. The density histogram generating section 1423 generates density histogram for each pixel according to output data (digital data) from the A/D converting section 1421 and outputs the data for the density histogram to the threshold value generating section 1424.

The threshold value generating section 1424 computes a peak value for a white color and a peak color for a black color according to the density histogram, and then computes a threshold value TH between the peak value for a white color and that for the a black color. The digitizing section 1425 compares the digital data stored in the line data retaining section 1422 with the threshold value TH, and outputs a result of digitizing of the digital data as digitized image data D3 (line the digitized image data D1 shown in FIG. 20) line by line to the read control section 1410. The read control section 1410 stores the digitized image data D3 for a first line in a buffer memory until digitized image data D3 is inputted for the next line (in this case, a second line).

Then a user starts scanning by holding the image reader 1300 and sliding it on the document P in the direction indicated by arrow Z2. With this, the main roller 1304, first auxiliary roller 1305, and second auxiliary roller 1306 are rotated due to a frictional force acting between the document P. Also a rotational force of the main roller 1304 is delivered via the shaft 1303, gear 1312, two-step gear 1311, and gear 1310 to the input shaft of the rotary encoder 1309. With this, detection of a displacement of the image reader 1300 by the displacement detecting section 1308 is started. At a time t1 shown in FIG. 20, when a displacement detection signal S3 is inputted from the displacement detecting section 1308, the read control section 1410 recognizes that the image reader 1300 has been moved by a distance corresponding to one line, and at the time t6 shown in FIG. 20, the read control section 1410 execute the processing for interruption of data transfer to the image data direction correcting section 1430. With this function, digitized image data D3 for one line is outputted from the image data direction correcting section 1430 to the image data memory 1440 and the digitized image data D3 is stored in the image data memory 1440.

In the example shown in FIG. 20, data transfer interrupt processing is executed at time t7, t8 and t9, and digitized image data D3 corresponding to the second, fourth, and seventh lines respectively is transferred to the image data memory 1440. Through the operations described above, digitized image data D3 is successively stored by each line in the image data memory 1440. Herein in the example shown in FIG. 20, a displacement detection signal S3 is inputted in all two times at the time t2 and t3 within one driving cycle T. This phenomenon occurs when the image reader 1300 is moved at a speed higher than an image reading speed of the image reader 1300. In this case, the read control section 1410 executes the data transfer interrupt processing shown in FIG. 20 according to a displacement detection signal S3 as a trigger.

On the other hand, a phenomenon that the displacement detecting signal S3 is not inputted within 1 driving cycle T occurs when the speed at which the image reader 1300 is moved is too slow, or when the image reader 1300 is stopped. In the cases as described above, only the processing for updating of digitized data D3 previously inputted and stored in a buffer memory to digitized data newly inputted is executed, and data transfer processing to the image data memory 1440 is not executed. When the image reader 1300 shown in FIG. 41 is slid from a read start position to a read end position on the document P, the user separates the image reader 1300 from the document P at a time t5 shown in FIG. 20 to terminate the operation of reading. Therefore, output of the document detection signal S1 from the document detecting section shown in FIG. 25 is stopped.

As a result, the read control section 1410 recognizes that the operation of reading has been finished, and terminates data transfer processing to the image data memory 1440. Then, digitized image data D3 for a plurality of lines obtained through the first operation of reading of an image is stored as image data for a first sheet of document P in the image data memory 1440. As the image reader 1300 is manually moved in the direction shown by arrow Z2 (scanning direction) in the figure, the document P can be scanned in any of upward, downward, leftward and rightward directions. Therefore, an image read with the image reading section 1330 may be inclined at a different angle or may be mirrored depending on the scanning direction. For instance, when there is a mirrored character "F" on the document P, the read image is either one of the images BG1 to BG8 shown in FIG. 47. Herein assuming that the original image shown in FIG. 48 is read with the image reading section 1330, the image data direction correcting section 1430 separates the image BG5 shown in FIG. 48 from the original image. Then the image data direction correcting section 1430 generates the image BG1 to image BG8 obtained from the separated image BG5 shown in FIG. 50 by rotation by 0 degree, 90 degrees in clockwise or counterclockwise direction and further mirroring the obtained images.

Next, the image data direction correcting section 1430 recognizes characters in each of the images BG1 to image BG8 with the technique explained below, and selects an image with the highest recognition certainty. Herein detailed description is made for the technique for separating and recognizing characters. This technique is disclosed in "TECHNICAL REPORT OF IEICE PRMU-25 (1997-93)" by Hiroshi Kamata and others of Electronic Information Communications Society. In this technique, a candidate character as a result of recognition is obtained at a high speed according to a small number of features of a character and then from a large number of features of the character, and this technique comprises a step of separating a character and a step of recognizing the character.

The character-separating processing is a processing of separating of an image of a character from a digitized image obtained from a text document. This character-separating processing is a bottom-up processing in which a character is formed from pixels by and by, and is executed according to the sequence described below.

At first continuous areas in each of which black pixels are coupled to each other are extracted as a basic element of a character. Then a common tangent rectangle for the plurality of continuous areas is obtained, and a direction of the line is determined through analysis of this positional relation, and a line for positional extraction is extracted. Further, continuous areas overlaying in a direction perpendicular to the line are formed into a group, integration of rectangles in a direction perpendicular to the line is executed to obtain a tangent rectangle for the group. The tangent rectangles are integrated in the line direction and recognized as a character, and a tangent rectangle for the uniformed section is recognized as a tangent rectangle for a candidate character.

Then a width and a position of a candidate character are decided from positions of the tangent rectangles adjoining to each other in the line according to the tangent rectangle for a candidate character as a reference. Further, in this system, in addition to the processing for separating a character, such processing as removal of noises other than a character or separation of contacting characters is executed.

The processing for character recognition is a processing of recognizing a character by inputting an image for a character separated by means of the processing for character separation described above, and is executed according to the following operating sequence.

(1) Normalization

In this process, an image of a character separated from a virtual character frame in the processing for character recognition is changed to a normalized image consisting of 48×48 pixels. When a number of pixels in the vertical direction or in the horizontal direction of the image is more than 48, the image is contracted evenly. However, when a number of pixels is ¾ of the number of pixels of the normal image the image is enlarged so that the maximum edge is accommodated within the virtual character frame.

(2) Extraction of Features

In this process of extraction features, features are extracted from the normalized image of a character. In this process, a contour change rate in a area obtained by variably dividing the character area so that a number of contour points is constant is recognized as a feature of variably dividing direction. Namely, after a number of contour points is extracted, a tangent rectangle for a candidate character is divided to partial areas each having a same number of contour points, and a directional feature of the candidate character in a direction of a long edge of the mother tangent rectangle is obtained. Finally numbers of features in partial rectangular areas are averaged for a direction of a short edge of the mother rectangle, and the average number is obtained as a final number of features for the candidate character.

(3) Contracted Features

In this process, features of a character extracted in the feature extracting process described above are contracted to contracted features consisting of a smaller number of dimensions. A process of obtaining contracted features comprises a process of extracting an initial contracted features coordinate axes to obtain a small number of coordinates enabling easy separation of features of a character, and a process of computing the contracted feature by converting features of the initial coordinate system to those on Cartesian coordinate system.

(4) Large Classification

In this process a candidate character is obtained by using the contracted features obtained in the feature contracting process described above. In the process for large classification, a process based on a precision-insured type of high speed classification and a process based on large classification by distance computing are used concurrently. In the former process, character features based of detailed classification are projected on a large classification feature space to obtain characters each having the possibility of being projected as a candidate character table, and then a character corresponding to any of the candidate characters is searched.

However, in this process, in place of projection by each divided area, features based on detailed classification are directly projected on the large classification feature space, and a margin is added to the projected distribution to make it larger by using character features based on detailed classification for a character pattern for a recognition directory. The latter process is used only when a number of candidate characters as a result of recognition is more than 70.

(5) Detailed Identification

In this process, computing for distances between an input character and candidate characters in the recognition directory is executed for the candidate characters obtained in the large classification process described above, a distance sorting is executed, and then a candidate character having the minimum distance is recognized as a final candidate for the inputted character.

Figure 50:
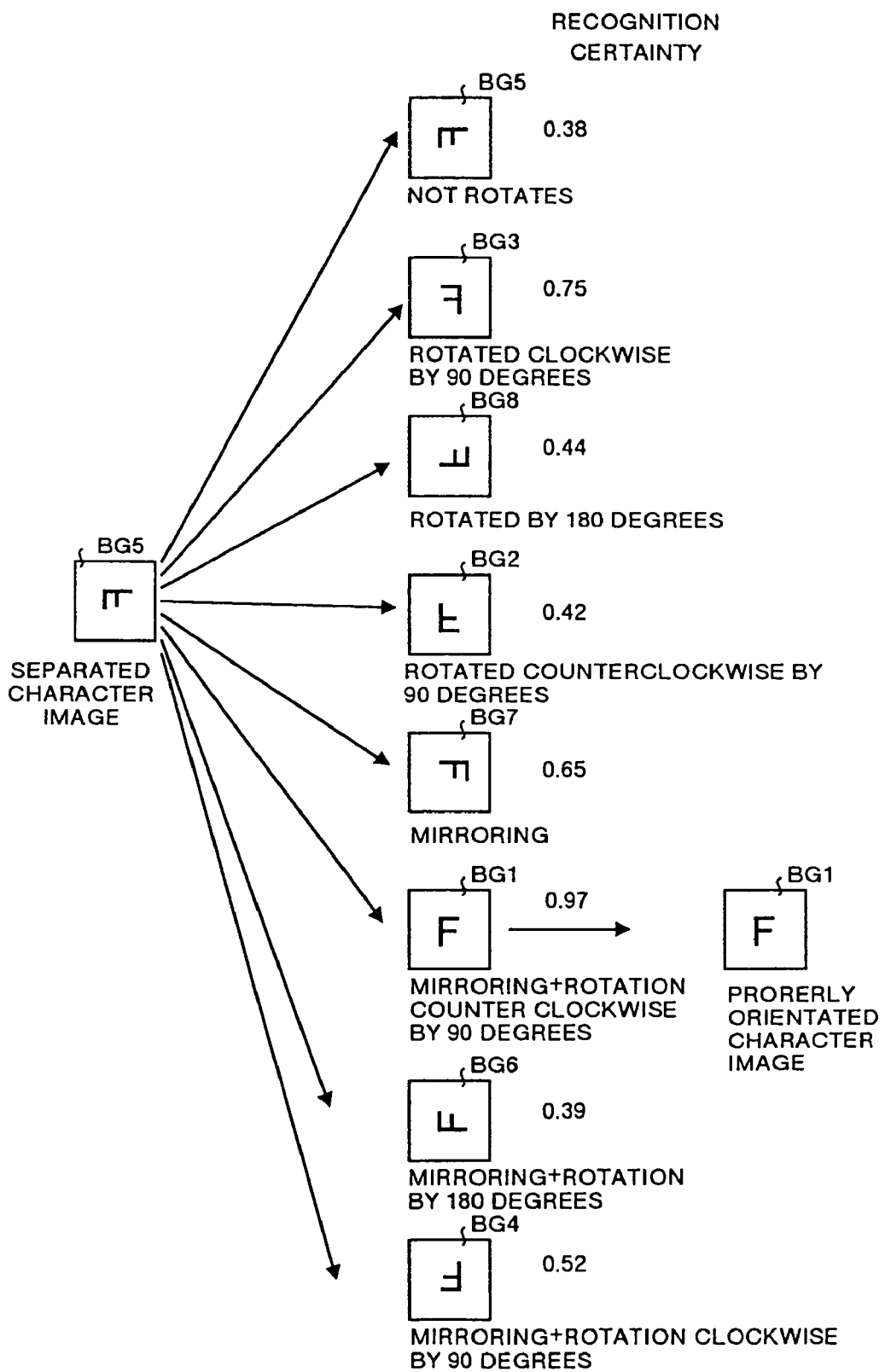
FIG. 50 is a view showing operations for correction by the image data direction correcting section shown in FIG. 45.

Returning to FIG. 50, the image direction correcting section 1430 (Refer to FIG. 45) checks the rotation angle or mirroring of an image having the highest recognition certainty or highest probability of accurate recognition among the images BG1 to image BG8 shown in FIG. 50. In FIG. 50, the image with the highest recognition certainty is the image BG1 (recognition certainty=0.97). The image data direction correcting section 1430 obtains data for an image which is properly orientated (Refer to FIG. 48) by executing the same conversion as that for converting a separated image to an image in the correct orientation to the original image obtained from the digitized image data D3 according to a result of the detection in order to correct a direction for the rotated or mirrored image (Refer to FIG. 47) to obtain data for the image in the correct direction.

Next, the image data direction correcting section 1430 outputs the corrected image data as a corrected image data to the image data memory 1440. Further, the image data direction correcting section 1430 checks a correct orientation of an image, when correcting an orientation of the obtained image to a correct one, in correspondence to inclination (posture) of the image reader 1300 obtained from a result of detection by the inclination correcting section1 1340 (inclination detection signal S7).

In this case, as shown in the left view of FIG. 49, as the image reader 1300 is kept in the horizontal posture, an inclination detection signal S7 is outputted from the inclination detecting section 1340. Accordingly, the inclination detecting section 1340 corrects an orientation of the obtained image such that the image BG1 displayed on the LCD 1313 is aligned with the direction of a shorter edge thereof.

On the other hand, when it is determined that the inclination detection signal S7 is not been inputted, the image data direction correcting section 1430 recognizes that the image reader 1300 is in a vertical posture as shown in the right view of FIG. 49, and executes a correction such that the image BG1 displayed on the LCD 1313 is aligned with the direction of a longer edge thereof. Then the digitized image data D3 having been subjected to correction for a correct orientation is read out by the display control section 1460, and the image BG1 shown in FIG. 49 is displayed on the LCD 1313. It should be noted that display control on the LCD 1313 by the display control section 1460 is executed even during an operation for reading an image, so that a user can carry out an operation for reading an image while visually checking the image being read.

<Two Screen Display>

Figure 67:
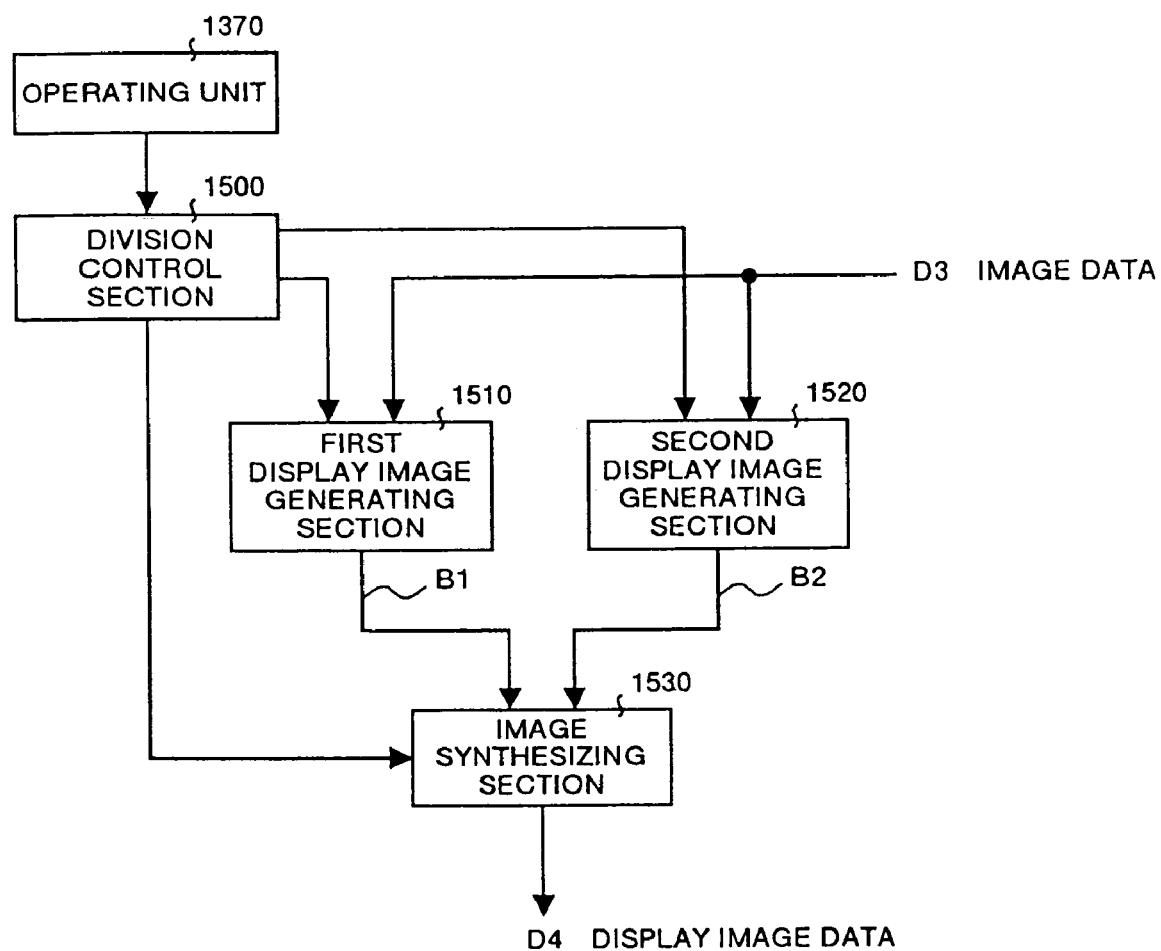
FIG. 67 is a block diagram showing a key section of the image reader 1300 according to Embodiment 13 when an image is divided to a plurality of sections on the screen.
Figure 71:
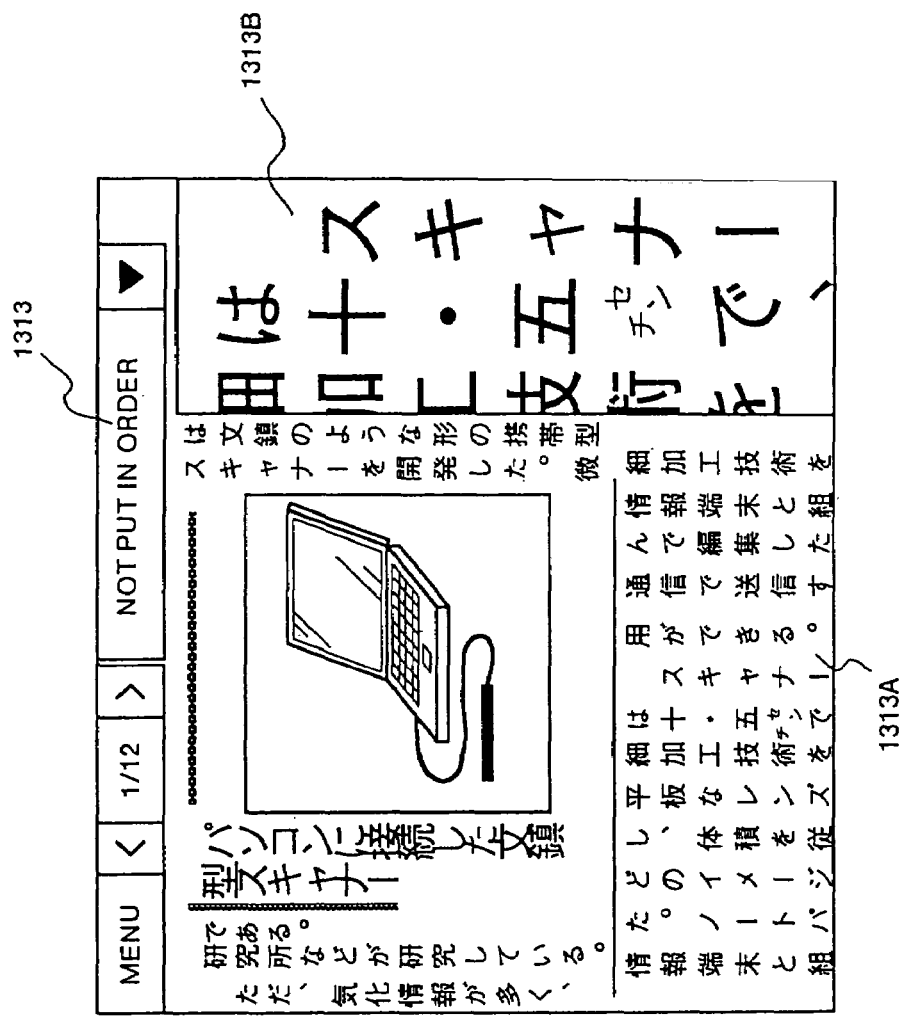
FIG. 71 is a view showing an example of screen display on the LCD 1313 in the screen division mode in the image reader 1300 according to Embodiment 13.

FIG. 67 is a block diagram showing configuration of the display control section 1460 when display of the LCD 1313 shown in FIG. 45 in separated into two portions. Herein the display separated into two portions is a display provided by dividing the LCD 1313 into two portions of a first image display area 1313A and a second image display image display area 1313B as shown in FIG. 71, displaying an image (contracted image) obtained by contracting the display provided on the full screen shown in FIG. 52 (described as reference image hereinafter) according to a prespecified contraction rate on the first image display area 1313A, and displaying an image obtained by enlarging the reference image according to a prespecified enlargement ratio on the second image display area 1313B.

Figure 69:
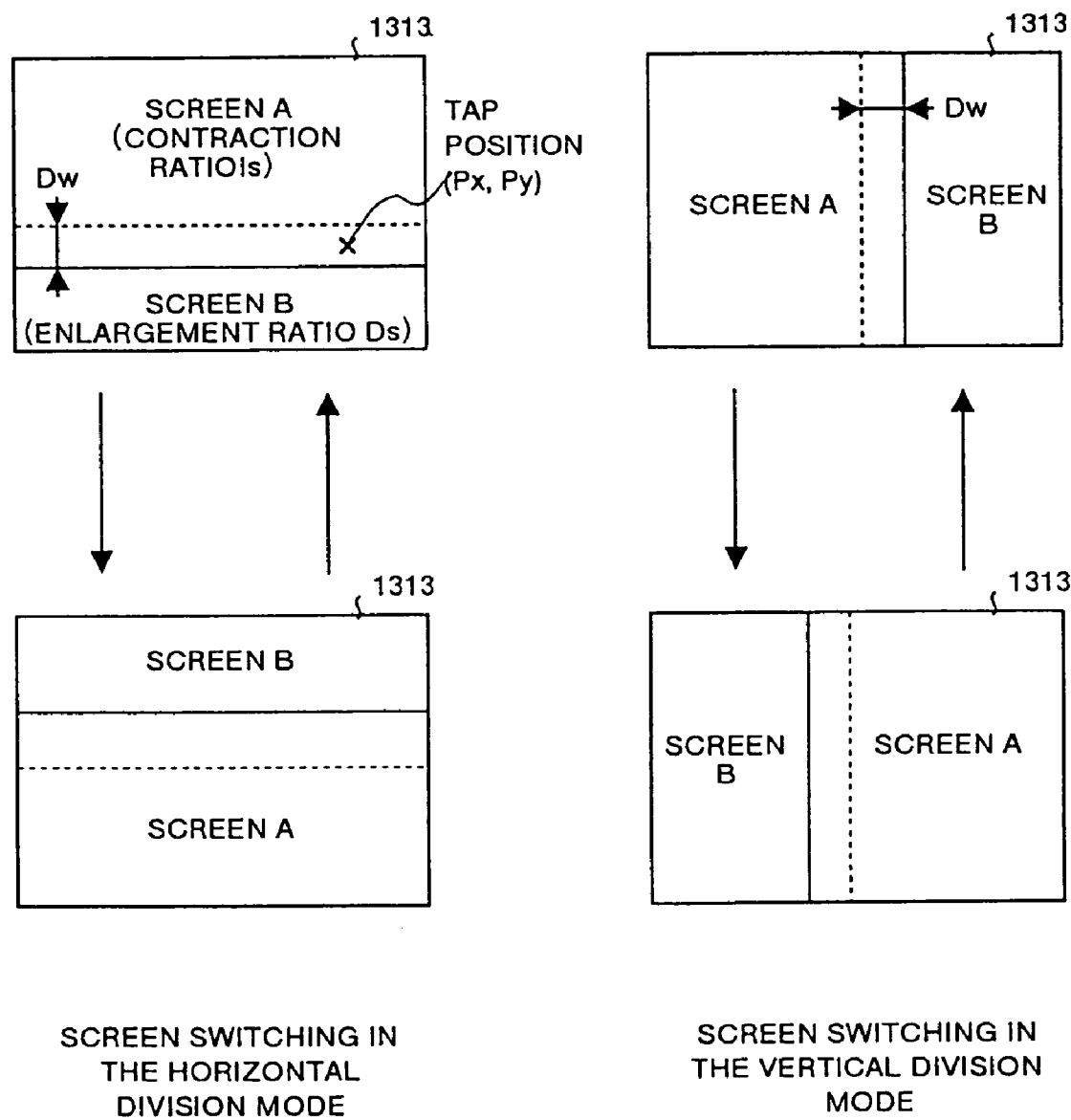
FIG. 69 is a view showing a method of dividing a screen in the image reader 1300 according to Embodiment 13.

Herein detailed description is made for configuration and operations of the display control section 1460 in the two screen display mode with reference to FIG. 68 and FIG. 69. At first, as shown in FIG. 68, a width X and a height Y of the LCD 1313 (Refer to FIG. 71) are defined. This width X corresponds to a length of the LCD 1313 in the lateral direction, while the height Y corresponds to a length of the LCD 1313 in the vertical direction. Herein, the left upper corner of the LCD 1313 in the figure is defined as an origin of the X-Y coordinate system. The two screen display mode includes display based on a screen separation in the horizontal direction and that based on a screen separation in the vertical direction. Separation in the horizontal direction is separating the LCD 1313 into two portions with a dividing position Dp as a border in the horizontal direction as shown in FIG. 68, while separation in the vertical direction is separating the LCD 1313 into two portions in the vertical direction.

In an example of display based on division in the horizontal direction of the LCD 1313 shown in FIG. 68, a screen A with the reference image contracted according to a contraction ratio Is and displayed thereon is displayed in an area upper than the dividing position Dp in the horizontal direction on the figure, while a screen B with the reference image enlarged according to a enlargement ratio Ds and shown thereon is displayed on an area lower than the dividing position Dp in the figure. An image with the contraction ratio Is generated by a first display image generating section 1510 is always displayed on the screen A. An image with a enlargement ratio Ds generated by a second display screen generating section 1520 is always displayed on the screen B. The Dr indicates a division ratio of the LCD 1313 in the vertical direction (in the direction of height Y). Namely the LCD 1313 is divided with a ratio of Dr: (1−Dr) in the horizontal direction with the dividing position Dp=(Dr×X) as a border.

In an another example of display based on division in the horizontal direction of the LCD 1313 shown in FIG. 68, the screen B with the reference image enlarged with the enlargement ratio Ds shown thereon is displayed on the area upper than the dividing position Dp in the horizontal direction in the figure, while the screen A with the reference image contracted according to the contraction Is shown thereon is displayed in the area lower than the dividing position Dp in the figure. Herein comparison of a screen division ratio in the first example to that in the second example shows that the screen division ratio in the first example is Dr:(1−Dr) and that in the second example is (1−Dr):Dr.

Namely a screen division ratio in the first example is complementary to that in the second example. Herein a display mode based on the screen division ratio shown in the first example is defined as Dm (=0), and the display mode based on the screen division ratio shown in the second example is defined as Dm (=1). Further a dividing direction flag Df (=0) is defined as a flag indicating division in the horizontal direction as shown in FIG. 68.

On the other hand, in an example of the division in the vertical direction described above, in the LCD 1313 shown in FIG. 68, the screen A with the reference image contracted according to the contraction ratio Is shown thereon is displayed in the left side of the dividing position Dp in the vertical direction, and the screen B with the reference screen enlarged according to the enlargement ratio Dm shown thereon is display in the right side of the dividing position Dp.

The Dr is a division ratio for the LCD 1313 in the horizontal direction (in the direction of width X). Namely, the LCD 1313 shown in the third example is divided in the vertical direction according to the ratio of Dr: (1−Dr) into two portions with the dividing position Dp (Dr×X) as a border. The display shown in FIG. 71 is prepared by using the method described with respect to the third example, and the first image display area 1313A shown in FIG. 71 corresponds to the screen A, while the second image display area 1313B corresponds to the screen B. In the fourth example of the display based on division in the vertical direction, the screen B with the reference image enlarged according to the enlargement ratio Ds shown thereon is displayed in the left side of the dividing position Dp in the vertical direction, while the screen A with the reference image contracted according to the contraction ratio of Is shown thereon is displayed in the right side of the dividing position Dp in the vertical direction. Herein comparison of the screen division ratio in the third example to that in the forth example shows that the screen division ratio in the third example is Dr: (1−Dr) and that in the forth example is (1−Dr): Dr.

Namely the screen division ratio in the third example is complementary to, that in the forth example. Herein the display mode according to the screen division ratio shown in the third example is defined as Dm (=0), and the display mode according to the screen division mode shown in the forth example is defined as Dm (=1). Further, a dividing direction flag Df (=1) is defined as a flag indicating division in the vertical direction as shown in FIG. 68.

As described above, as the two screen display, there are totally four types of displays shown in FIG. 68, and each display method can be identified by referring to values of the dividing direction flag Df and display mode Dm.

Namely the two screen display based on division in the horizontal direction as shown in the first example and according to the screen division ratio of Dr: (1−Dr) can be identified from the dividing direction flag Df=0 and the display mode Dm=0. Similarly, the two screen display based on division in the horizontal direction and according to the screen division ratio of (1−Dr):Dr can be identified from the dividing direction flag Df=0 and display mode Dm=1. Also the two screen display based on division in the vertical direction shown in the third example and according to the screen division of Dr: (1−Dr) is identified from the dividing direction flag Df=1 and display mode Dm=0. Further the two screen display based on division in the vertical direction as shown in the forth example and according to the screen division ratio of (1−Dr): Dr can be identified from the dividing direction flag Df=1 and display mode Dm=1. Further the division ratio Dr, enlargement ratio (enlargement ratio) Ds, dividing direction flag Dr, and display mode Dm are previously set, as shown in FIG. 51, according to input by a user with the touch screen 1314 and operating section 1370.

Next, configuration of the display control section 1460 in the two screen display mode will be described with reference to. FIG. 67. In FIG. 67, a division control section 1500 provides controls over two screen display according to the dividing position information inputted from the operating unit 1370 (or the touch screen 1314) as well as according to the division ratio Dr, enlargement ratio Ds, dividing direction flag Df, and display mode Dm. Herein the dividing position information inputted from the operating section 1370 (or the touch screen 1314) is the information concerning a tap position (Px, Py) shown in FIG. 69. The division control section 1500 outputs data for contraction ratio Is to a first display image generating section 1510, and at the same time outputs data for the enlargement ratio Ds to a second display image generating section 1520. Detailed description for operations of the division control section 1500 is made later.

The first display image generating section 1510 fetches digitized image data D3 from the image data memory 1440 (Refer to FIG. 45), and generates a first divided image data B1 for a contracted image obtained by contracting a reference image (Refer to, for instance, FIG. 52) obtained from the digitized image data D3 (Refer to third example in FIG. 68: screen A, FIG. 71: first image display area 1313A). The second display image generating section 1520 fetches, like the first display image generating section 1510, the digitized image data D3 from the image data memory 1440 (Refer to FIG. 45), and generates second divided image data concerning an enlarged image (Refer to third example in FIG. 68, FIG. 71: second image display area 1313B) obtained by enlarging the reference image obtained from the digitized image data D3 (Refer to, for instance, FIG. 52).

An image synthesizing section 1530 synthesizes the first divided image data B1 inputted from the first display image generating section 1510 and second divided image data B2 inputted from the second display image generating section under controls by the division control section 1500, generates, for instance, image data D4 corresponding to a two screen image shown in FIG. 71, and outputs the image to the LCD 1313 shown in FIG. 45.

Figure 70:
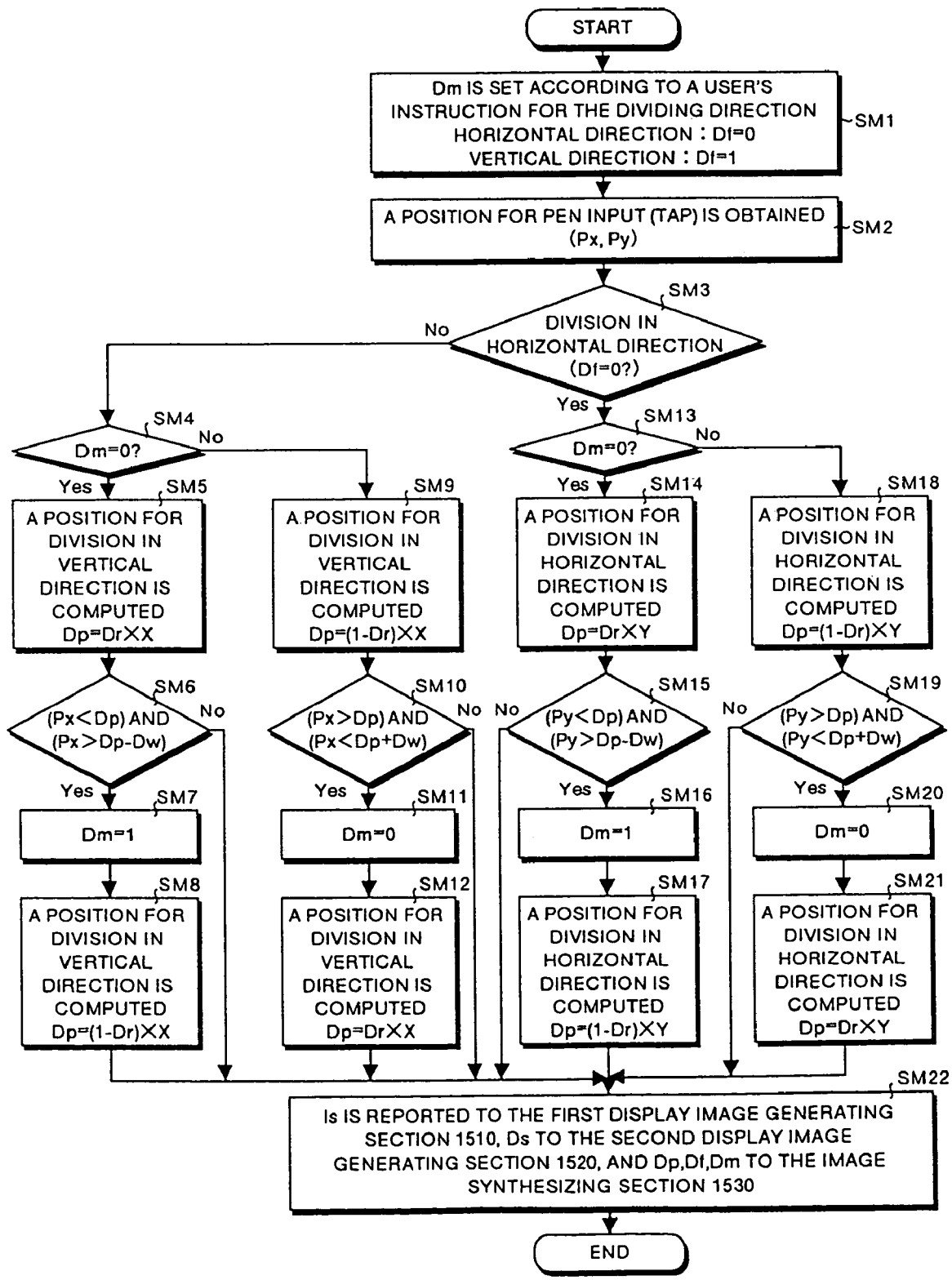
FIG. 70 is a flow chart showing operations for dividing a screen in the image reader 1300 according to Embodiment 13.

Next, operations of the display control section having the configuration shown in FIG. 67 (Refer to FIG. 45) will be described with reference to a flow chart shown in FIG. 70. The following description relates to a case where the reference image shown in FIG. 52 is displayed in the two screen mode.

Herein it is assumed that, in the LCD 1313, the reference image as shown in the figure is displayed on the full screen. In this state, when a dividing direction is specified by a user with the touch screen (or the operating unit 1370), the division control section 1500 shown in FIG. 67 shifts the system control to step SM1 shown in FIG. 70. In step SM1, the division control section 1500 sets a value corresponding to the specified dividing direction (0 or 1) in the dividing direction flag Df. Herein, if the dividing direction is specified as horizontal, "0" is set in the dividing direction flag Df, and when the dividing direction is specified as vertical, "1" is set in the dividing direction flag Df.

If the horizontal direction is specified as a dividing direction by a user, the division control section sets "0" in the dividing direction flag Df. Then the division control section 1500 sets the display mode Dm to "0", and then shifts the system control to step SM2. Namely, in this case, the dividing direction flag Df is 0 and display mode Dm is 0, so that controls are provided to effect the display based on division in the horizontal direction as shown in the first example of FIG. 68.

In step SM2, the division control section fetches a tap position (Px, Py) in response to input by a user from the touch screen 1314 (or operating unit 1370), and then shifts the system control to step SM3. In step SM3, the division control section 1500 determines whether division in the horizontal direction has been specified by a user or not, in other words, whether the dividing direction flag Df has been set to "0" or not. In this case, the dividing direction flag Df is "0" so that the division control section 1500 determines that a result of determination in step SM3 is "Yes", and shifts the system control to step SM13.

In step SM13, the division control section determines whether the display mode Dm is 0 or not. In this case, the display mode Dm is "0" so that the division control section 1500 determines the result of determination in step SM13 is "Yes", and shifts the system control to step SM14. In step SM14, the division control section 1500 computes the dividing position Dp by multiplying the division ratio Dr by the height Y (Refer to FIG. 68) (=Dr×Y), and then shifts the system control to step SM15. In step SM15, the division control section 1500 determines whether the condition that a Y coordinate Py at the tap position (Refer to FIG. 69) is smaller than the dividing position Dp and the condition that the Y coordinate Py is larger than a value obtained by subtracting a threshold value Dw from the dividing position Dp (Dp−Dw) (Refer to FIG. 60) are satisfied simultaneously or not. In this case, if a result of determination is "No", the division control section 1500 shifts the system control to step SM22. In step SM22, the division control section 1500 outputs data for contraction ratio Is and enlargement ratio Ds to the first display image generating section 1510 and the second display image generating section 1520 respectively, and also outputs data for the dividing position Dp (=Dr×Y), dividing direction flag Df (=0), and display mode Dm (=0) to the image synthesizing section 1530, and terminates the processing.

With this operation, the first display image generating section 1510 fetches digitized image data D3 from the image data memory 1440 (Refer to FIG. 45), generates first divided image data B1 for a contracted image obtained by contracting a reference image (Refer to, for instance, FIG. 52) obtained from the digitized image data D3 according to the contraction ratio Is, and outputs the image data to the image synthesizing section 1530.

At the same time, the second display image generating section 1520 fetches the digitized image data D3, generates second divided image data B2 for an enlarged image obtained by enlarging the reference image (Refer to, for instance, FIG. 52) obtained from the digitized image data D3, and outputs the image data to the image synthesizing section 1530. When the first divided image data B1 and second divided image data B2 are inputted, the image synthesizing section 1530 synthesizes the first divided image data B1 with the second divided image data B2 and outputs the synthesized image data to the LCD 1313 shown in FIG. 45. With this operation, a two screen image divided in the horizontal direction is displayed on the LCD 1313 as shown in the first example in FIG. 68.

On the other hand, in step SM15, if it is determined that a result of determination is "Yes", the division control section 1500 shifts the system control to step SM16. In step SM16, the division control section 1500 changes the current display mode of "0" to the display mode Dm of "1", and then shifts the system control to step SM17. Namely, the display mode based on division in the horizontal direction is changed to the display mode based on division in the horizontal direction.

In step SM17, the division control section 1500 computes the dividing position Dp shown in FIG. 68 by multiplying the division ratio (1−Dr) (Refer to the second example) by the height Y, and then shifts the processing to step SM22. In step SM22, the division control section 1500 outputs data for the contraction ratio Is and enlargement ratio Ds to the first display image generating section 1510 and second display image generating section 1520 respectively, and also outputs data for the dividing position Dp (=(1−Dr)×Y), dividing direction flag Df (=0), and display mode Dm(=1) to the image synthesizing section 1530, and then terminates the operation.

With this operation, the first display image generating section 1510 fetches the digitized image data D3, generates first divided image data B1 for a contracted image obtained by contracting a reference image obtained from the digitized image data D3 (Refer to, for instance, FIG. 52), and outputs the image data B1 to the image synthesizing section 1530.

At the same time, the second display image generating section 1520 fetches the digitized image data D3, generates second divided image data B2 for an enlarged image obtained by enlarging a reference image obtained from the digitized image data D3 (Refer to, for instance, FIG. 52) according to the enlargement ratio Ds, and outputs the image data B2 to the image synthesizing section 1530. When the first divided image data B1 and second divided image data B2 are inputted, the image synthesizing section 1530 synthesizes the first divided image data B1 with the second divided image data B2 and outputs the synthesized image data to the LCD 1313 shown in FIG. 45. With this operation, a two screen image divided in the horizontal direction is displayed as shown in the second example in FIG. 68.

On the other hand, when "1" is set as the display mode Dm, in step SM13, the division control section 1500 determines that a result of determination is "No" as the display mode Dm is "1", and the shifts the system control to step SM18. In step SM18, the division control section 1500 computes the dividing position Dp (=(1−Dr)×Y) shown in the second example in FIG. 68 by multiplying the division ratio (1−Dr) by the height Y, and then shifts the system control to step SM19.

In step SM19, the division control section 1500 determines whether the condition that the Y coordinate Py (Refer to FIG. 69) is larger than the dividing position Dp and the condition that the Y coordinate Py is smaller than a value of dividing position Dp+threshold value Dw (Refer to top left view in FIG. 69) are satisfied simultaneously or not. In this case, if a result of determination is "No", the division control section 1500 shifts the system control to step SM22. In step SM22, the division control section 1500 outputs the contraction ratio Is and enlargement ratio Ds to the first display image generating section 1510 and the second display image generating section 1520 respectively, and also outputs data for the dividing position Dp (=(1−Dr)×Y ), dividing direction flag Df (=0), display mode Dm (=1), and then terminates the processing.

With this operation, the first display image generating section 1510 fetches the digitized image data D3 from the image data memory 1440 (Refer to FIG. 45), generates first divided image data B1 for a contracted image obtained by contracting a reference image (Refer to, for instance, FIG. 52) obtained from the digitized image data D3 according to the contraction ratio I3, and outputs the image data B1 to the image synthesizing section 1530. At the same time, the second display image generating section 1520 fetches the digitized image data D3, generates second divided image data B2 for an enlarged image obtained by enlarging a reference image (Refer to, for instance, FIG. 52) obtained from the digitized image data D3 according to the enlargement ratio D3, and outputs the image data B2 to the image synthesizing section 1530.

When the first divided image data B1 and second divided image data B2 are inputted, the image synthesizing section 1530 synthesizes the first divided image data B1 with the second divided image data B2, and outputs the synthesized image data to the LCD 1313 shown in FIG. 45. With this operation, a two screen image divided in the horizontal direction as shown in the second example in FIG. 68 is displayed on the LCD 1313.

On the other hand, if it is determined in step SM19 that a result of determination is "Yes", the division control section 1500 shifts the system control to step SM20. In step SM20, the division control section 1500 changes the current display mode Dm=1 to display mode Dm=0, and shifts the system control to step SM21. Namely in this case, the display mode is switched from the display mode based on division in the horizontal direction shown in a the left side of FIG. 69 to the display mode based on division in the horizontal direction.

In step SM21, the division control section 1500 computes the dividing position Dp (=Dr×Y) shown in the first example in FIG. 68 by multiplying the division ratio Dr by the height Y, and then shifts the system control to step SM22. In step SM22, the division control section 1500 outputs data for the contraction ratio Is and enlargement ratio Ds to the first display image generating section 1510 and second display image generating section 1520 respectively, and also outputs data for the dividing position Dp (=Dr×Y), dividing direction flag Df(=0), and display mode Dm (=0), and then terminates the processing.

With this operation, the first display image generating section 1510 fetches the digitized image data D3, generates first divided image data B1 for a contracted image obtained by contracting a reference image (Refer to, for instance, FIG. 52) obtained from the digitized image data D3 according to the contraction ratio Is, and outputs the image data B1 to the image synthesizing section 1530. At the same time, the second display image generating section 1520 fetches the digitized image data D3, generates second divided image data B2 for an enlarged image obtained by enlarging the reference image (Refer to, for instance, FIG. 52) obtained form the digitized image data D3 according to the enlargement ratio D3, and outputs the image data B2 to the image synthesizing section 1530. When the first divided image data B1 and second divided image data B2 are inputted, the image synthesizing section 1530 synthesized the first divided image data B1 with the second divided image data B2 and outputs the synthesized image data to the LCD 1313 shown in FIG. 45. With this operation, a two screen image divided in the horizontal direction as shown in the first example in FIG. 68 is displayed on the LCD 1313.

On the other hand, when division in the vertical direction is specified by a user (Dr=1), in step SM3, the division control section 1500 recognized, as the dividing direction flag Df=1, that a result of determination is "No", and shifts the system control to step SM4.

In step SM4, the division control section 1500 determines whether the display mode Dm is "0" or not. In this case, it is determined that the display Dm is "0", the division control section 1500 recognizes that a result of determination in step SM4 is "Yes", and shifts the system control to step SM5. In step SM5, the division control section 1500 computes the dividing position Dp shown in the third example in FIG. 68 by multiplying the division ratio Dr by the width X (=Dr× X), and then shifts the system control to step SM6.

In step SM6, the division control section 1500 determines whether the condition that X coordinate Px at the tap position (Refer to FIG. 69) is smaller than the dividing position Dp and the condition that the X coordinate Px is larger than a value obtained by subtracting a threshold value Dw from the dividing position Dp (Dp−Dw) (Refer to right view in FIG. 69) are simultaneously satisfied or not. In this case, if a result of determination is "No", the division control section 1500 shifts the system control to step SM22. In step SM22, the division control section 1500 outputs data for the contraction ratio Is and enlargement ratio Ds to the first display image generating section 1510 and second display image generating section 1520 respectively, and also outputs data for the dividing position Dp (=Dp×X), dividing direction flag Df (=1), display mode Dm (=0) shown in the third example in FIG. 68 to the image synthesizing section 1530, and terminates the processing.

With this operation, the first display image generating section 1510 fetches digitized image data D3 from the image data memory 1440 (Refer to FIG. 45), generates first divided image data B1 for a contracted image obtained, by contracting a reference image (Refer to, for instance, FIG. 52) obtained from the digitized image data D3, and outputs the image data B1 to the image synthesizing section 1530. At the same time, the second display image generating section 1520 fetches digitized image data D3, generates second divided image data B2 for an enlarged image obtained by enlarging the reference (Refer to, for instance, FIG. 52) obtained from the digitized image data D3 according to the enlargement ratio Ds, and outputs the image data B2 to the image synthesizing section 1530.

Then, when the first divided image data B1 and second divided image data B2 are inputted, the image synthesizing section 1530 synthesizes the first divided image data B1 with the second divided image data B2, and outputs the synthesized image data to the LCD 1313 shown in FIG. 45. With this operation, a two screen image divided in the vertical direction is displayed on the LCD 1313 as shown in the third example in FIG. 68.

On the other hand, in step SM6, if a result of determination is "Yes", the division control section 1500 shifts the system control to step SM7. In step SM7, the division control section 1500 changes the current display mode Dm=1 to display mode Dm=1, and then shifts the system control to step SM9. Namely in this state, the display mode is switched from the display mode based on division in the vertical direction shown in the right view of FIG. 69 to the display mode based on division in the vertical direction. In step SM8, the division control section 1500 computes the dividing position Dp shown in the forth example in FIG. 68 by multiplying the division ratio (1−Dr) by the width X (=(1−Dr)×X), and then shifts the system control to step SM22. In step SM22, the division control section 1500 outputs data for the contraction ratio Is and enlargement ratio Ds to the first display image generating section 1510 and second display image generating section 1420 respectively, and also outputs data for the dividing position Dp (=(1−Dr)×X), dividing direction flag Df (=1), and display mode Dm (=1) shown in the forth example in FIG. 68 to the image synthesizing section 1530, and then terminates the processing.

With this operation, the first display image generating section 1510 fetches the digitized image data D3, generates first divided image data B1 for a contracted image obtained by contracting a reference image (Refer to, for instance, FIG. 52) obtained from the digitized image data D3 according to the contraction ratio Is, and outputs the image data B1 to the image synthesizing section 1530.

At the same time, the second display image generating section 1520 fetches the digitized image data D3, generates second divided image data B2 for an enlarged image obtained by enlarging the reference image (Refer to, for instance, FIG. 52) obtained from the digitized image data D3 according to the enlargement ratio Ds, and outputs the image data B2 to the image synthesizing section 1530. When the first divided image data B1 and second divided image data B2 are inputted, the image synthesizing section 1530 synthesizes the first divided image data B1 with the second divided image data B2, and outputs the synthesized image data to the LCD 1313 shown in FIG. 45. With this, a two screen image divided in the vertical direction is displayed on the LCD 1313 as shown in the forth example in FIG. 68.

On the other hand, if "1" is set as the display mode Dm, in step SM4 the division control section 1500 recognizes that a result of determination as "No", and shifts the system control to step SM9. The division control section 1500 computes the dividing position Dp shown in the forth example in FIG. 68 by multiplying the division ratio (1−Dr) by the width X (=(1−Dr)×X), and then shifts the system control to step SM10. In step SM10, the division control section 150 determines whether the condition that X coordinate Px at the tap position (Refer to FIG. 69) is larger than the dividing position Dp and the condition that the X coordinate Px is smaller than a value of the dividing position Dp plus threshold value Dw (Refer to right view in FIG. 69) are satisfied simultaneously or not. In this case, if a result of determination is "No", the division control section 1500 shifts the system control to step SM22.

In step SM22, the division control section 1500 outputs data for the contraction ratio Is and enlargement ratio Ds to the first display image generating section 1510 and the second display image generating section 1520 respectively, and also outputs data for the dividing position Dp (=(1−Dr)×X), dividing direction flag Df (=1), and display mode Dm (=1) shown in the forth example in FIG. 68 to the image synthesizing section 1530, and then terminates the processing. With this operation, the first display image generating section 1510 fetches the digitized image data D3 from the image data memory 1440 (Refer to FIG. 45), generates first divided image data B1 for a contracted image obtained by contracting a reference image (Refer to, for instance, FIG. 52) obtained from the digitized image, and outputs the image data B1 to the image synthesizing section 1530.

At the same time, the second display image generating section 1520 fetches the digitized image data D3, generates second divided image data B2 for an enlarged image obtained by enlarging the reference image (Refer to, for instance, FIG. 52) obtained from the digitized image data D3 according to the enlargement ratio Dm, and outputs the image data B2 to the image synthesizing section 1530. When the first divided image data B1 and second divided image data B2 are inputted, the image synthesizing section 1530 synthesizes the first divided image data B1 with the second divided image data B2 and outputs the synthesized image data to the LCD 1313 shown in FIG. 45. With this operation, a two screen image divided in the vertical direction is displayed on the LCD 1313 as shown in the forth example in FIG. 68.

On the other hand, in step SM10, if a result of determination is "Yes", the division control section 1500 shifts the system control to step SM11. In step SM11, the division control section 1500 changes the current display mode Dm=1 to the display mode Dm=0, and then shifts the system control to step SM12. In this case, the display mode is switched from the display mode based on division in the vertical direction shown in the right view in FIG. 69 to a display mode based on division in the vertical direction.

In step SM12, the division control section 1500 computes the dividing position Dp shown in the third example in FIG. 68 by multiplying the division ratio Dr by the width X (=Dr×X), and then shifts the system control to step SM22. In step SM22, the division control section 1500 outputs data for the contraction ratio Is and enlargement ratio Ds to the first display image generating section 1510 and second display image generating section 1520 respectively, and also outputs data for the dividing position Dp (=Dr×X), dividing direction flag Df (=1), and display mode Dm (=0) shown in the third example in FIG. 68 to the image synthesizing section 1530, and then terminates the processing.

With this operation, the first display image generating section 1510 fetches the digitized image data D3, generates first divided image data B1 for a contracted image obtained by contracting a reference image (Refer to, for instance, FIG. 52) obtained from the digitized image data D3 according to the contraction ratio Is, and outputs the image data B1 to the image synthesizing section 1530. At the same time, the second display image generating section 1520 fetches the digitized image data D3, generates second divided image data B2 for an enlarged image obtained by enlarging the reference image (Refer to, for instance, FIG. 52) obtained from the digitized image data D3 according to the enlargement ratio Ds, and outputs the image data B2 to the image synthesizing section 1530.

When the first divided image data B1 and second divided image data B2 are inputted, the image synthesizing section 1530 synthesized the first divided image data B1 with the second divided image data B2 and outputs the synthesized image data to the LCD 1313 shown in FIG. 45. With this operation, a two screen image divided in the horizontal direction is displayed on the LCD 1313 as shown in the third example in FIG. 68.

<Overlaid Display>

Figure 72:
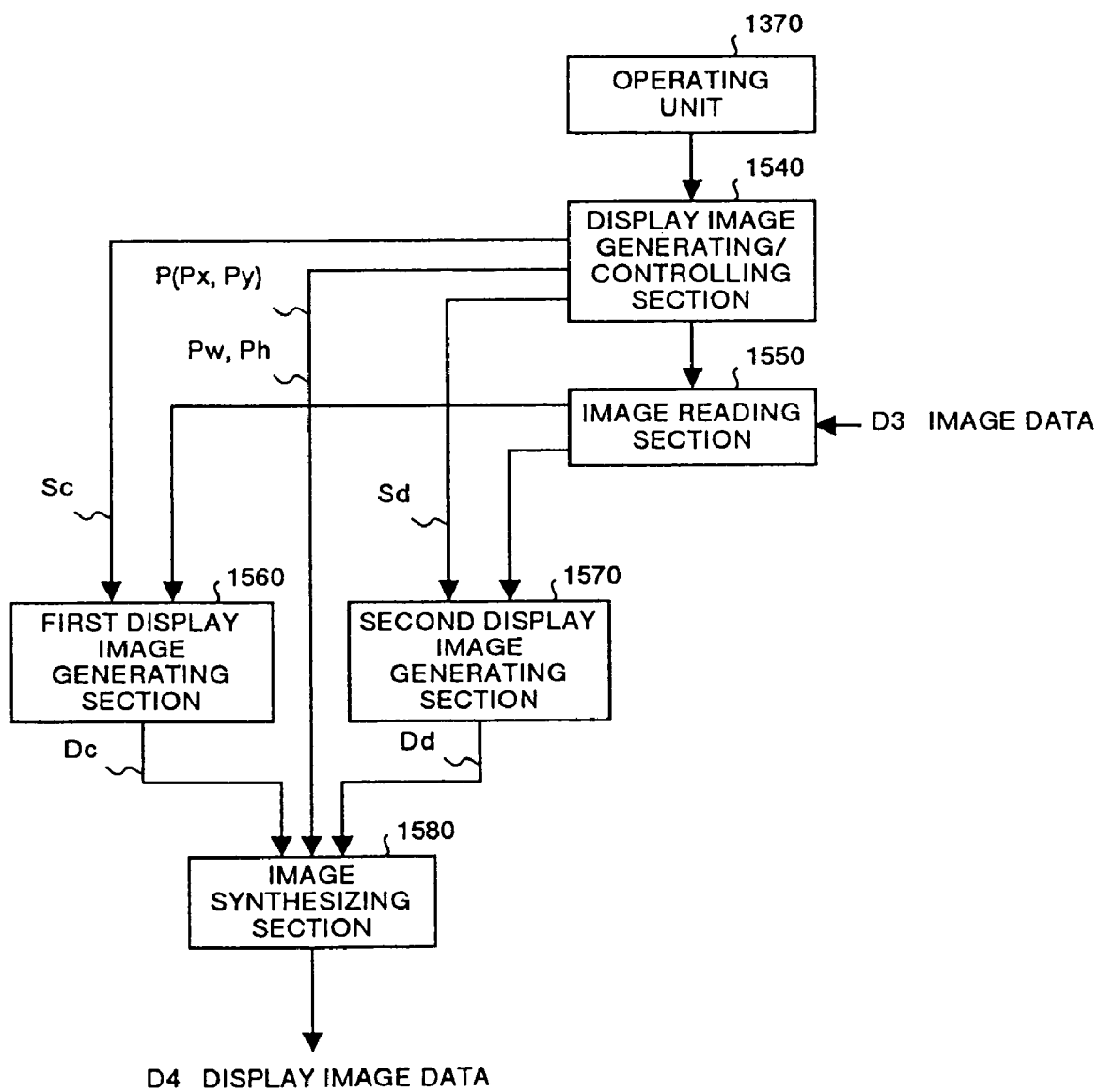
FIG. 72 is a block diagram showing a key section of screen display in the overlaid mode in the image reader 1300 according to Embodiment 13.

FIG. 72 is a block diagram showing configuration of the display control section 1460 when images are displayed in an overlaid form on the LCD 1313 shown in FIG. 45. Herein, the overlaid display means displaying on the LCD 1313 a first image C and, a second image D which is different from the first image C in an overlaid form as shown in FIG. 73.

It should be noted that the first image C is an image obtained by enlarging an original image according to a magnification Sc and is displays on a first image display area 1313A on the LCD 1313. On the other hand, a second image D is an image obtained by enlarging the original image according to Sd, and is displayed in a second image display area 1313B in the LCD 1313. A value of the magnification Sc is different from or the same as a value of the magnification Sd. A display area width of the second image display area 1313B for the second image D is Pw, while a display area height thereof is Ph, and further a display start point P for the second image display area 1313B is (Px, Py) in the XY coordinate system. It should be noted that an origin of the XY coordinate system is a left top corner of the LCD 1313 in the figure.

In FIG. 72, The operating unit 1370 is used to input data for the first image C to be displayed on the full screen, image specifying data for specifying a second image D to be displayed in an overlaid form, the magnification Sc described above, a magnification Sd, a display start point (Px, Py), display area width Pw, and display area height Ph. It should be noted that input of these data can be performed also with the touch screen 1314 in place of the operating unit 1370. A display image generating/controlling section 1540 provides controls for reading in the image reading section 1550 and also controls for image generation in a first display image generating section 1560 as well in a second display image generating section 1570. Detailed description of operations of this display image generating/controlling section is made later.

Figure 73:
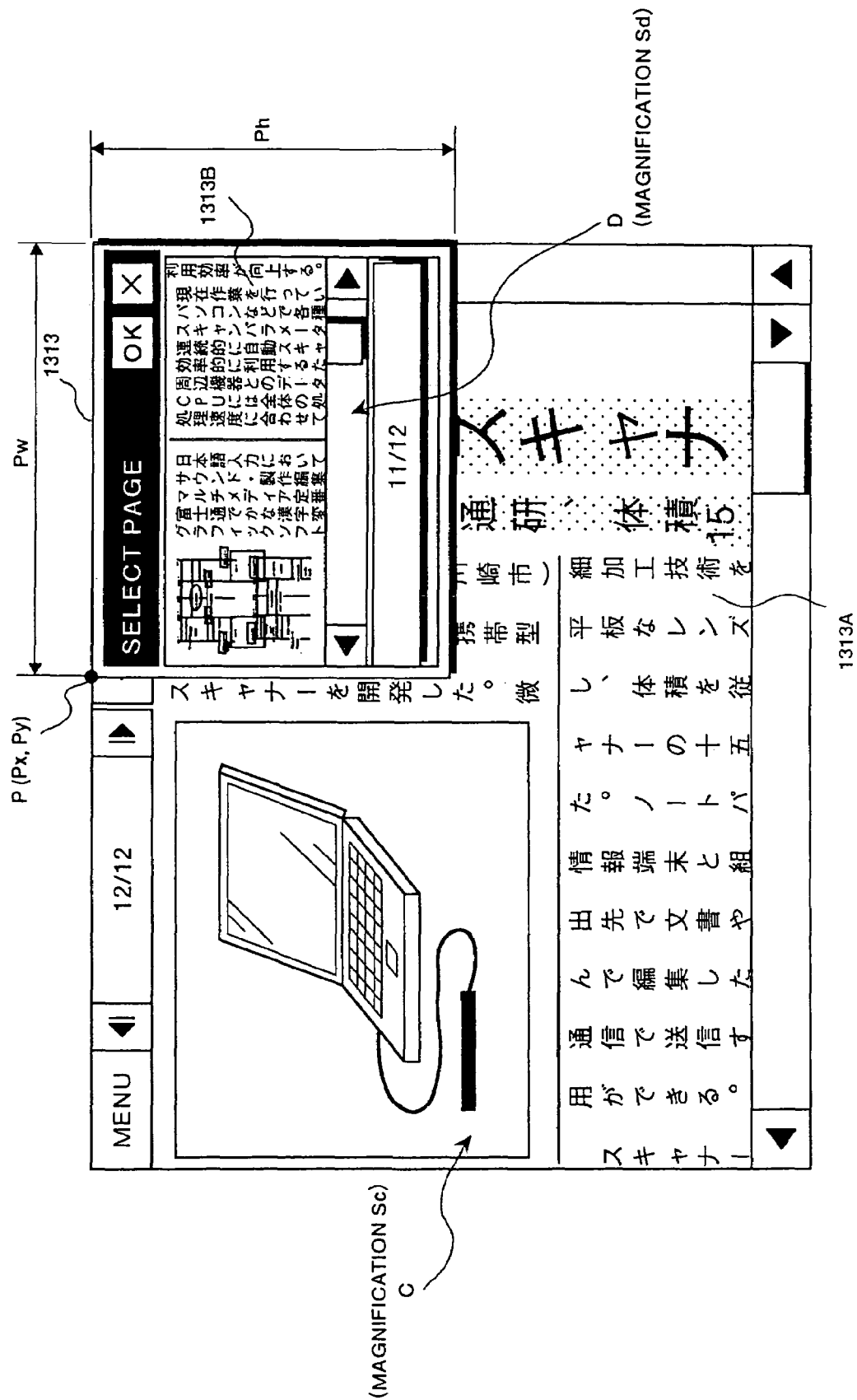
FIG. 73 is a view showing an example of screen display on the LCD 1313 in the overlaid display mode in the image reader 1300 according to Embodiment 13.

The image reading section 1550 reads out digitized image data D3 for a original image of the first image C shown in, for instance, FIG. 73 and digitized image data D3 for an original image of the second image data D.

The first display image generating section 1560 generates image data Dc for the first image C (Refer to FIG. 73) according to data for the magnification Sc inputted from the display image generating/controlling section 1540 and also according to the digitized image data D3 for a original image of the first image C inputted from the image reading section 1550. The second display image generating section 1570 generates image data Dd for the second image D (Refer to FIG. 73) according to data for the magnification Sd inputted from the display image generating/controlling section 1540 and also according to the digitized image data D3 for a original image of the second image D inputted from the image reading section 1550.

An image synthesizing section 1580 generates display image data D4 corresponding to the synthesized image shown in FIG. 73 according to the image data Dc inputted from the first display image generating section 1560, image data Dd inputted from the second display image generating section 1570, a display start point (Px, Py), display area width Pw, and a display area height Ph, and outputs the display image data D4 to the LCD 1313 shown in FIG. 45.

With the configuration as described above, when a user wants to display the second image D on the first image C in an overlaid form, the user inputs image specifying data for specifying data for the first image C to be displayed on the full screen and the second image D to be displayed in an overlaid form, and also inputs data for the magnification Sc, magnification Sd, display start point P (Px, Py), display area width Pw, and display area height Ph described above. Thus, various types of data including the magnification Sc or the like inputted by the user are successively outputted to the display area generating/controlling section 1540. Then the display image generating/controlling section 1540 controls the image reading section 1550 so that the digitized image data D3 for an original image of the first image C shown, for instance, in FIG. 73 is read out from the image data memory 1440 shown in FIG. 45, and also outputs data for the magnification Sc to the first display image generating section 1560.

With this, the image reading section 1550 reads out the digitized image data D3 for the first image C from the image data memory 1440 shown in FIG. 45, and outputs the digitized image data D3 to the first display image generating section 1560. When the digitized image data is inputted, the first display image generating section 1560 generates image data Dc for the first image C (Refer to FIG. 73) obtained by enlarging the original image obtained from the digitized image data D3 according to the magnification Sc(Refer to FIG. 73), and outputs the image data Dc to the image synthesizing section 1580.

The display image generating/controlling section 1540 controls the image reading section 1550 so that the digitized data D3 for an original image of the second image D shown in, for instance, FIG. 73 is read out from the image data memory 1440 shown in FIG. 45, and also outputs data for the magnification Sd to the second display image generating section 1570. With this operation, the image reading section 1550 reads out the digitized image data D3 for the second image D from the image data memory 1440 shown in FIG.

45, and outputs the digitized image data D3 to the second-display image generating section 1570.

When digitized image data D3 is inputted, the second display image generating section 1570 generates image data Dd for the second image (Refer to FIG. 73) obtained by enlarging an original image obtained from the digitized image data D3, and outputs the image data Dd to the image synthesizing section 1580.

Then, the display image generating/controlling section 1540 outputs data for the display start position P (Px, Py), display area width Pw, and display area height Ph to the image synthesizing section 1580. With this, the image synthesizing section 1580 generates display image data D4 according to the display start position P (Px, Py), display area width Pw, and display area height Ph, and outputs the display image data D4 to the LCD 1313 shown in FIG. 73. Thus, a synthesized image consisting of the first image C and the second image D overlaid thereon is displayed on the LCD 1313. Herein, the second image display area 1313B with the second image D displayed thereon is decided according to the display start position P (Px, Py), display area width Pw, and display area height Ph.

<List Display>

Figure 74:
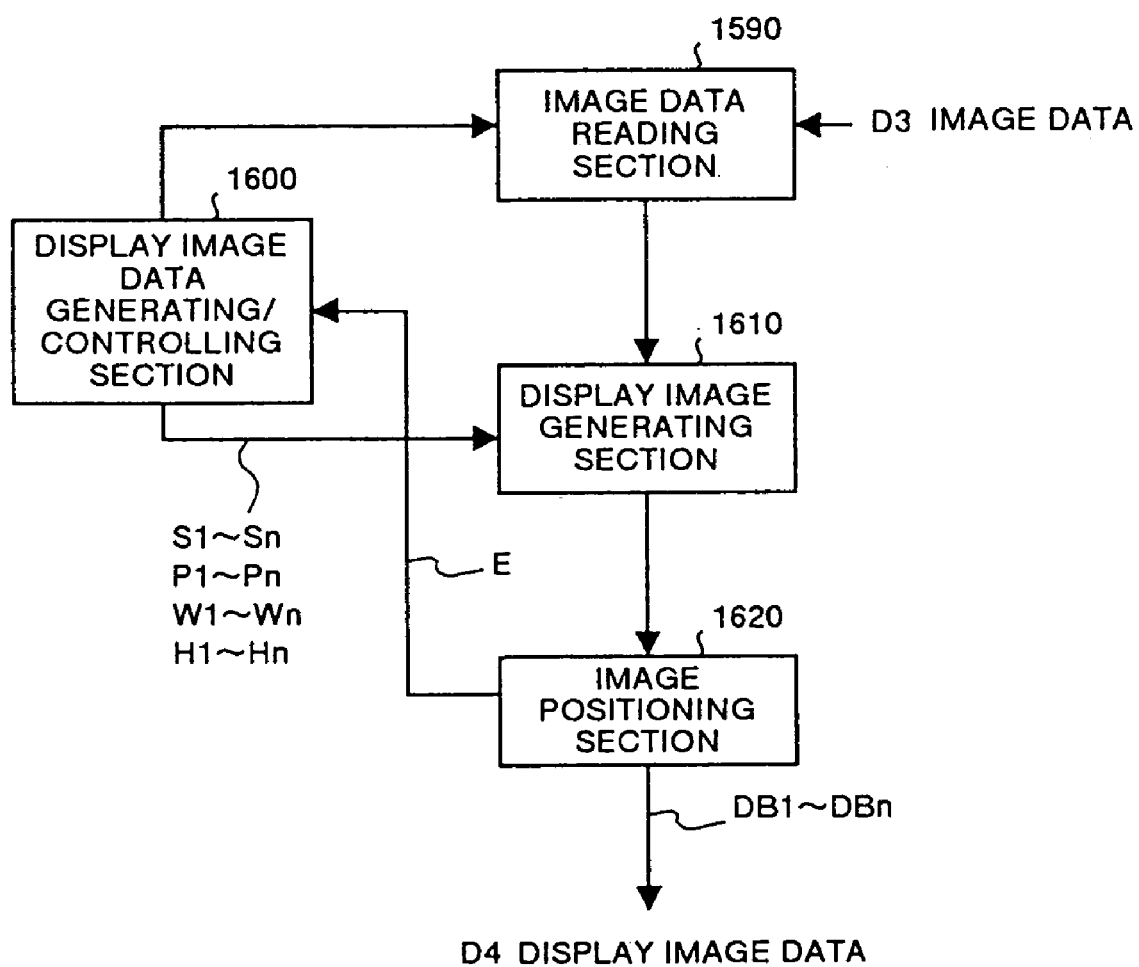
FIG. 74 is a block diagram showing a key section of screen display in the list display mode in the image reader 1300 according to Embodiment 13.
Figure 75:
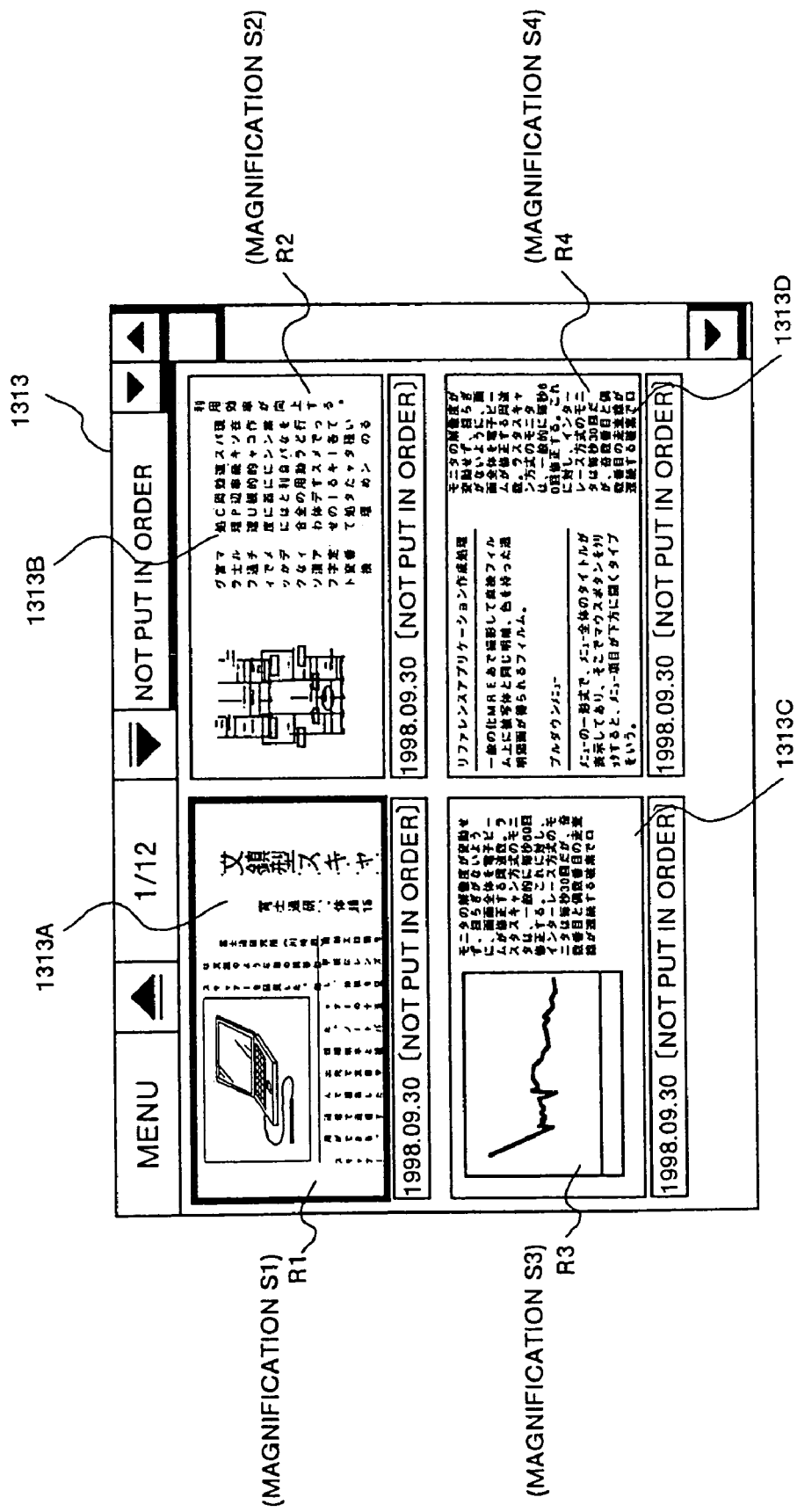
FIG. 75 is a view showing an example of screen display on the list display mode in the image reader 1300 according to Embodiment 13.

FIG. 74 is a block diagram showing configuration of the display control section 1460 utilized for displaying a plurality of image in a list form on the LCD 1313 shown in FIG. 45. Herein, list display means, as shown in FIG. 75, displaying a plurality of images comprising a display image R1, a display image R2, a display image R3, and a display image R4 as a list in the first image display area 1313A, second image display area 1313B, third image display area 1313C, and fourth image display area 1313D respectively. In FIG. 75, in all four types of display image R1 to display image R4 are displayed in the first image display area 1313A to fourth image display area 1313D on the LCD 1313 respectively. Parameters used in the following description are listed below.

<<Parameter>>

| (1) | (2) | (3) | (4) | (5) |
|---|---|---|---|---|
| R1 | P1 (x1, y1) | W1 | H1 | S1 |
| R2 | P2 (x1, y1) | W2 | H2 | S2 |
| R3 | P3 (x1, y1) | W3 | H3 | S3 |
| R4 | P4 (x1, y1) | W4 | H4 | S4 |
| . | . . | . | . | . |
| . | . . | . | . | . |
| . | . . | . | . | . |
| Rn | Pn (x1, y1) | Wn | Hn | Sn |

The parameters above are set by a user using the operating unit 1370 (or the touch screen 1314) in correspondence to the display image R1 to display image Rn respectively.

The display image R1 is obtained by enlarging an image (described as a first separated image hereinafter) separated with an area specified with an image separation start point P1 (x1, y1) on the XY coordinate system, display area width W1, and display area height H1 according to the magnification S1. The image separation start point P1(x1, y1) is a point indicating a point for starting the separation of an original image, the display area width W1 indicates a width of the first separated image, and the display area H1 indicates a height of the first separated image. As described above, the first separated image corresponding to the display area R1 is specified with the image separation start point P1 (x1, y1), display area width W1, and display area-height H1.

The display image R2 is obtained by enlarging an image (described as a second separated image hereinafter) separated with an area specified with an image separation start point P2 (x2, y2) on the XY coordinate system, display area width W2, and display area height H2 according to the magnification S1. The image separation start point P2(x2, y2) is a point indicating a point for starting the separation of an original image, the display area width W2 indicates a width of the second separated image, and the display area H2 indicates a height of the second separated image. As described above, the second separated image corresponding to the display area R2 is specified with the image separation start point P2 (x2, y2), display area width W2, and display area height H2.

The display image R2 is obtained by enlarging an image (described as a n-th separated image hereinafter) separated with an area specified with an image separation start point Pn (xn, yn) on the XY coordinate system, display area width Wn, and display area height Hn according to the magnification Sn. The image separation start point Pn (xn, yn) is a point indicating a point for starting the separation of an original image, the display area width Wn indicates a width of the n-th separated image, and the display area Hn indicates a height of the n-th separated image. As described above, the n-th separated image corresponding to the display area Rn is specified with the image separation start point Pn (xn, yn), display area width Wn, and display area height Hn.

A display image data generating/controlling section1 1600 shown in FIG. 74 provides controls over list display according to parameters comprising the image separation start points P1 (x1, y1) to Pn (xn, yn), display area widths W1 to Wn, display area heights H1 to Hn, and magnifications S1 to Sn. More specifically, the display image data generating/controlling section 1600 controls the image data reading section 1590 in such a way that the digitized image data D3 corresponding to an original image of each of the display images R1 to Rn is successively read out from the image data memory 1440 shown in FIG. 45.

In addition, the display image data generating/controlling section 1600 successively outputs the parameters described above (i.e. image separation start points P1 (x1, y1) to Pn (xn, yn), display area widths W1 to Wn, display area heights H1 to Hn, and magnifications S1 to Sn) from ones with smaller appended figures in correspondence to display images R1 to Rn.

The image data reading section 1590 successively reads out, under controls by the display image data generating/controlling section 1600, digitized image data D3 for a original image of the display image R1, digitized image data D3 for a original image of the display image R2, . . . , and digitized image data D3 for a original image of the display image Rn from the image data memory 1440 (Refer to FIG. 45), and successively outputs the image data to the display image generating section 1610.

The display image generating section 1610 successively separates the first to n-th separated images from the original images according to the parameters successively inputted from the display image data generating/controlling section 1600 and digitized image data D3 for the original images of the display images R1 to Rn. Further, the display image generating section 1610 successively outputs the image data for images obtained by the separated first to n-th separated images according to the magnifications S1 to Sn as enlarged image data DB1 to enlarged image DBn to an image positioning section 1620.

In this case, the image positioning section 1620 generates display image data D4 for images to be successively displayed in the first image display area 1313A to fourth image display area 1313D on the LCD 1313 shown in FIG. 75 according to the enlarged image data DB1 to enlarged image DBn successively inputted from the display image generating section 1610, and outputs the display image data D4 to the LCD 1313. When no display area is available on the LCD 1313 and display is disabled, the image positioning section 1620 outputs a display disabled signal E indicating the situation to the display image data generating/controlling section 1600.

Next, description is made for operations of the display control section 1460. It is assumed herein that the parameters as described above have been set in the display image data generating/controlling section 1600 shown in FIG. 74 by a user. When the parameters described above have been set, if a user operates the operating unit 1370 (or the touch screen 1314) for inputting data or a command, the display data generating/controlling section 1600 at first issues a command for reading out digitized image data D3 for an original image of the display image R1 shown in FIG. 75 from the image data memory 1440 (refer to FIG. 45) to the image data reading section 1590.

At the same time, the display image data generating/controlling section 1600 outputs parameters consisting of the image separation start point P1 (x1, y1) for the display image R1, display area width W1, display area height HI, and magnification S1 to the display image generating section 1610. With this operation, the image data reading section 1590 reads out the digitized image data D3 for an original image of the display image R1, and outputs the digitized image data D3 to the display image generating section 1610.

Next, the display image generating section 1610 at first recognizes an original image of the inputted display image R1 from the inputted digitized image data D3. Then the display image generating section 1610 separates the first separated image from the original image according to the parameters already inputted (i.e. the image separation start point P1 (x1, y1), display area width W1, display area height H1, and magnification S1), and outputs enlarged image data DB1 for a display image R1 obtained by enlarging the first separated image according to the magnification S1 to the image positioning section 1620. With this, the image positioning section 1620 outputs the display image data D4 according to the enlarged image data DB1 to the LCD 1313 shown in FIG. 75. As a result, the display image R1 is displayed in the first image display area 1313A shown in the figure.

Then the display image data generating/controlling section 1600 issues a command for reading the digitized image data D3 for an original image of the display image R2 shown in FIG. 75 from the image data memory 1440 (Refer to FIG. 45) to the image data reading section 1590.

At the same time, the display image data generating/controlling section 1600 outputs the parameters consisting of the image separation start point P2 (x2, y2) for the display image R2, display area width W2, display area height H2, and magnification S2 to the display image generating section 1610. With this operation, the image data reading section 1590 reads out, the digitized image data D3 for an original image of the display image R2 from the image data memory 1440, and outputs the image data D3 to the display image generating section 1610.

Next, the display image generating section 1610 recognizes an original image of the display image R3 from the inputted digitized image data D3. Then, the display image generating section 1610 separates a second separated image from the original image according to the parameters already inputted therein (e.g., the image separation start point P2 (x2, y2), display area width W2, display area height H2, and magnification S2), and outputs enlarged image data DB2 for the display image R2 obtained by enlarging the second separated image according to the magnification S2 to the image positioning section 1620. With this operation, the image positioning section 1620 outputs the display image data D4 according to the enlarged image data DB2 to the LCD 1313 shown in FIG. 75. As a result, the display image R2 is displayed in the second image display area 1313B adjoining to the first image display area 1313A shown in the figure.

Thereafter, the display image data generating/controlling section 1600 successively issues a command for reading out digitized image data D3 for original images of the display images R3 to Rn from the image data memory 1440 (Refer to FIG. 45). With this, in the same manner as described above, in the LCD 1313 shown in FIG. 75, the display image R3 is displayed in the third image display area 1313C, and the display image R4 is displayed in the fourth image display area 1313D. When the display image R4 is displayed in the fourth image display area 1313D, there is no space for displaying the display image R5 and on in the LCD 1313 so that the image positioning section 1620 outputs a display disabled signal E indicating this situation to the display image data generating/controlling section 1600. With this, the display image data generating/controlling section 1600 recognizes that additional display in the LCD 1313 is impossible and terminated the processing.

<Correction of Orientation>

Figure 76:
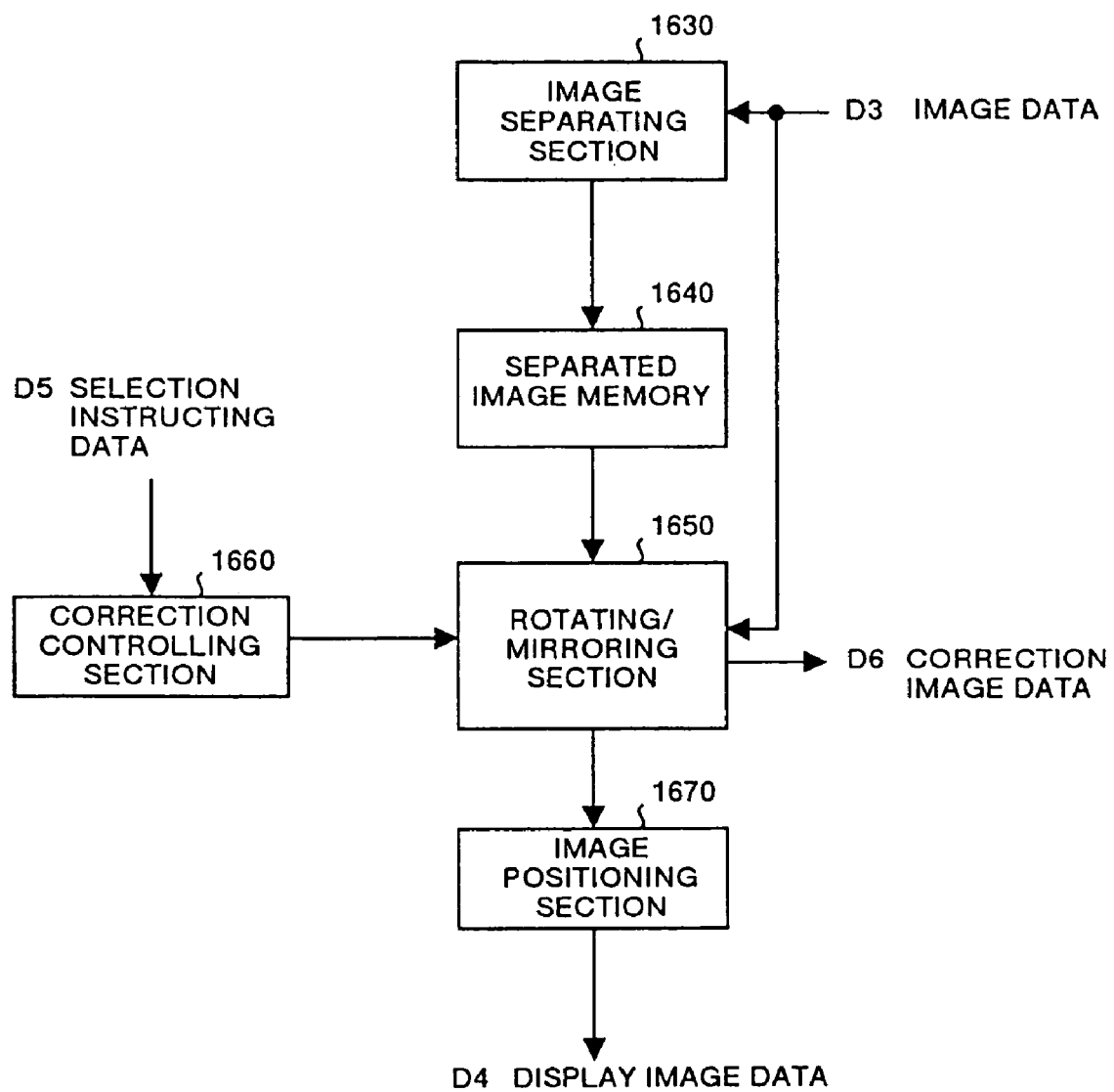
FIG. 76 is a block diagram showing configuration of a key section of screen display in the display direction correcting mode in the image reader 1300 according to Embodiment 13.

FIG. 76 is a block diagram showing configuration for executing correction of orientation of image with another technique in the image reader 1300 according to Embodiment 13 of the present invention. In this figure, the image separating section 1630 separates a portion of an image obtained from the digitized image data D3 shown in FIG. 45. A separated image memory 1640 temporally stores therein data for an image (described as separated image hereinafter) by the image separating section 1630.

Figure 77:
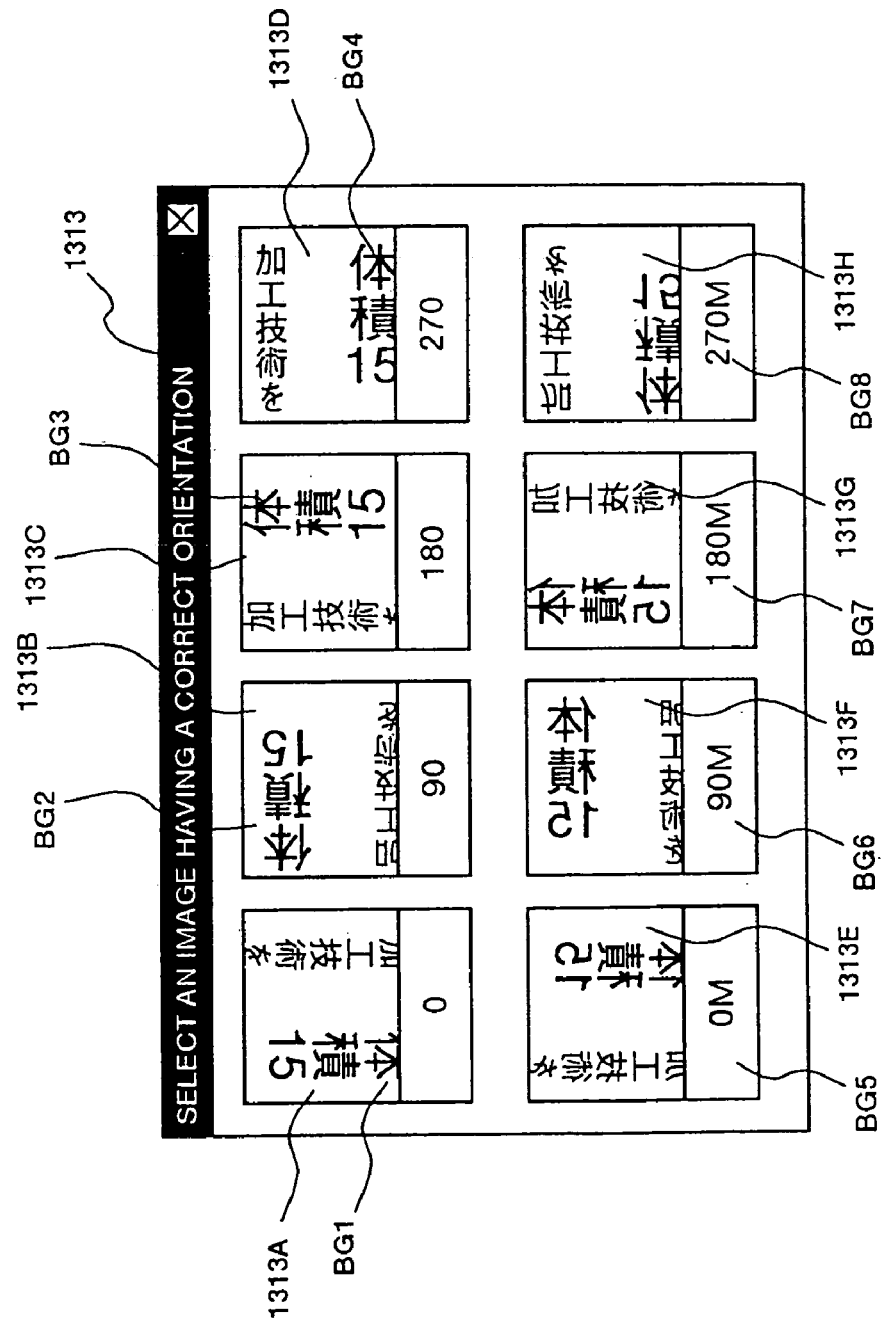
FIG. 77 is a view showing an example of screen display on the LCD 1313 in the display direction correcting mode in the image reader 1300 according to Embodiment 13.

A rotating/mirroring section 1650 rotates or mirrors the separated image as shown in FIG. 77. A correction controlling section 1660 provides controls over operations for rotating or mirroring an image in the rotating/mirroring section 1650. Description for operations of this correction controlling section 1660 is made later. The image positioning section 1670 outputs display image data D4 obtained in the rotating/mirroring section 1650, for instance, for the image BG1 to image BG8 shown in FIG. 77 to have the images displayed in the first image display area 1313A to the eighth image display area 1313H in a matrix form.

With the configuration described above, when the digitized image rata D3 is inputted into the image separating section 1630, the image separating section 1630 separates a portion of an image obtained from the digitized image rata D3, and outputs data for the separated image to the separated image memory 1640.

With this, data for the separated image is stored in the separated image memory 1640. Next, the correction controlling section 1660 rotates or mirrors the data for separated images stored in the separated image memory 1640 by issuing an instruction to the rotating/mirroring section 1650.

The rotating/mirroring section 1650 generates in all 8 images as shown in FIG. 77. Namely, the rotating/mirroring section 1650 generates separated image not rotated (image BG1), an image rotated by 90 degrees (image BG2), an image rotated by 180 degrees (image BG3), an image rotate by 270 degrees (image BG4), an image obtained by mirroring the original image (image BG5), an image obtained by rotating the mirrored image BG5 (image BG6), an image obtained by rotating the mirrored image BG5 by 180 degrees (image BG7), and an image obtained by rotating the mirrored image BG5 by 270 degrees (image BG8).

Then the rotating/mirroring section 1650 outputs data for the images BG1 to image BG8 to the image positioning section1 1670. With this operation, the image positioning section 1670 generates the display image data D4 according to the data, and outputs the display image data D4 to the LCD 1313. With this operation, the image BG1 to image BG8 are displayed in the first image display area 1313A to the eighth display area 1313H in the LCD 1313 in a matrix form. Herein an image having the correct orientation (image BG3) is included in the image BG1 to image BG8.

Then a user inputs an instruction for selection from the operating unit 1370 or the touch screen 1314 to select the image BG3 as a properly orientated image from the images BG1 to BG8. With this, the selection instructing data D5 is inputted to the correction controlling section 1660.

Then the correction control section 1660 determines which image has been selected from the rotated or mirrored images according to the selection instructing data D5, and gives a command for the same conversion as that for the selected image (image BG3) to the rotating/mirroring section 1650. With this operation, the rotating/mirroring section 1650 reads out the digitized image data D3 for the original image from the image data direction correcting section 1430, and executes the same conversion (rotation by 180 degrees) as that for the selected image (image BG3) to the original image.

Then the rotating/mirroring section 1650 replaces the digitized image data D3 for the image having been subjected to the conversion described above with the display image data D4 for the original image stored in the image data memory 1440. As a result, an image inputted as a rotated or mirrored image is corrected to that having a proper orientation.

<Directional Correction>

Figure 78:
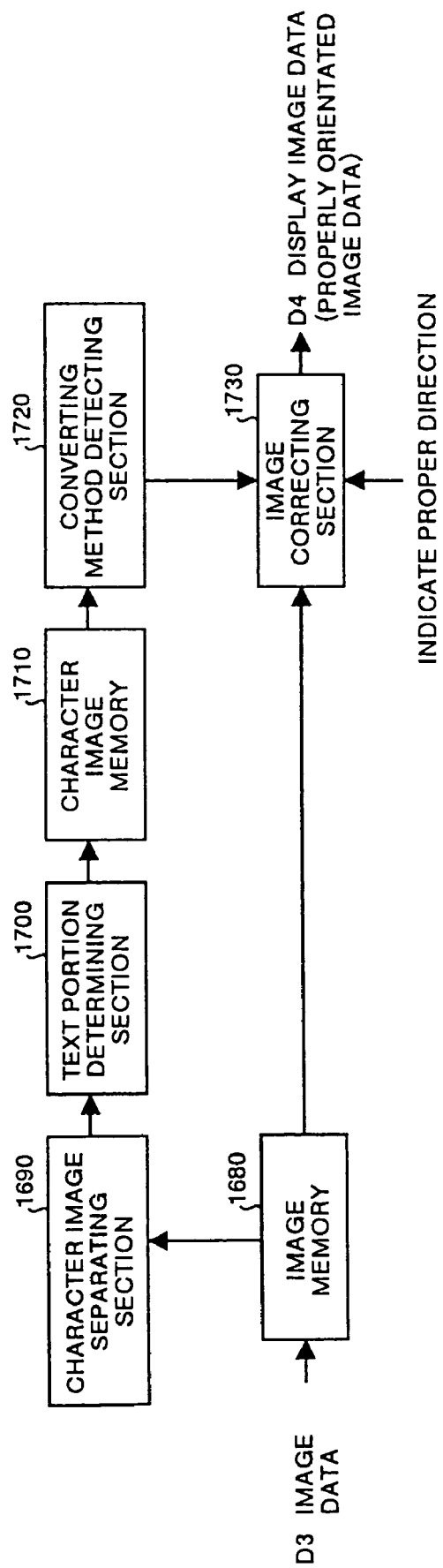
FIG. 78 is a block diagram showing configuration of a key section of a variant of the image reader 1300 according to Embodiment 13.

FIG. 78 is a block diagram showing configuration for recognizing characters in an image obtained from the digitized mage data D3 and automatically correcting an orientation of an image (in this case a document image) by using a result of character recognition. In this figure, image memory 1680 temporally stores therein the digitized image data D3 (refer to FIG. 45). A character image separating section 1690 separates a character image character by character from a image obtained from the digitized mage data D3. A text portion determining section 1700 determines whether a character image separated by the character image separating section 1690 is a main text or not.

Generally the size of a character in a document is in a range from 9 to 11 points, and a number of pixels is around 20×20 (or up to 30) pixels for 200 dpi. A number of pixels changes for a resolution in scanning even for a character having the same point number. Therefore, the text portion determining section 1700 determines whether the separated character image is of a main text or not by checking whether a number of pixels in the character image separated by the character image separating section 1690 is within the range of a number of pixels described above.

The text portion determining section 1700 compares a number of pixels of the character image separated by the character image separating section 1690 in the horizontal direction and a number of pixels of that in the vertical direction to a range of a number of pixels in a general main text described above. When it is determined that the separated character image is of a main text, the character image separating section 1690 stores the separated image in the character image memory 1710.

On the other hand, when it is determined according to a result of the comparison above by the text portion determining section 1700 that the separated image (character image) is not of a main text, the text portion determining section 1700 aborts the character image. A conversion method detecting section 1720 detects a rotational direction and presence or absence of mirroring of a character image stored in the character image memory 1710. An image correcting section 1730 corrects an image obtained from the digitized image data D3 to a properly oriented image according to a result of detection by the conversion method detecting section 1720 and outputs the image data as display image data D4 to, for instance, the LCD 1313.

In this step, in addition to a result of detection by the conversion method detecting section 1720 when an instruction for a proper orientation is inputted from the operating unit 1370 (or the touch screen), the image correcting section 1730 corrects orientation of the image to the correct one as instructed, and outputs the image data as display image data D4. With the configuration as described above, by preferentially recognizing a main text portion with a high recognition ratio in the text portion determining section 1700, a number of characters to be recognized for detecting orientation of an image is reduced, so that time required for image correction can be reduced.

Description was made above for the image reader 1300 according to Embodiment 13 of the present invention above with related figures, but configuration of the present invention is not limited to that according to Embodiment 13, and modifications and changes in the design within a gist of the present invention are included in this invention. For instance, in the image reader 1300 according to Embodiment 13, an image obtained from the digitized image data D3 stored in the image data memory shown in FIG. 45 may be classified according to any of classification items (visiting card, a newspaper, or the like) shown in FIG. 79 with the classification item displayed in the second image display area 1313B in the LCD 1313 as shown in FIG. 80.

Figure 80:
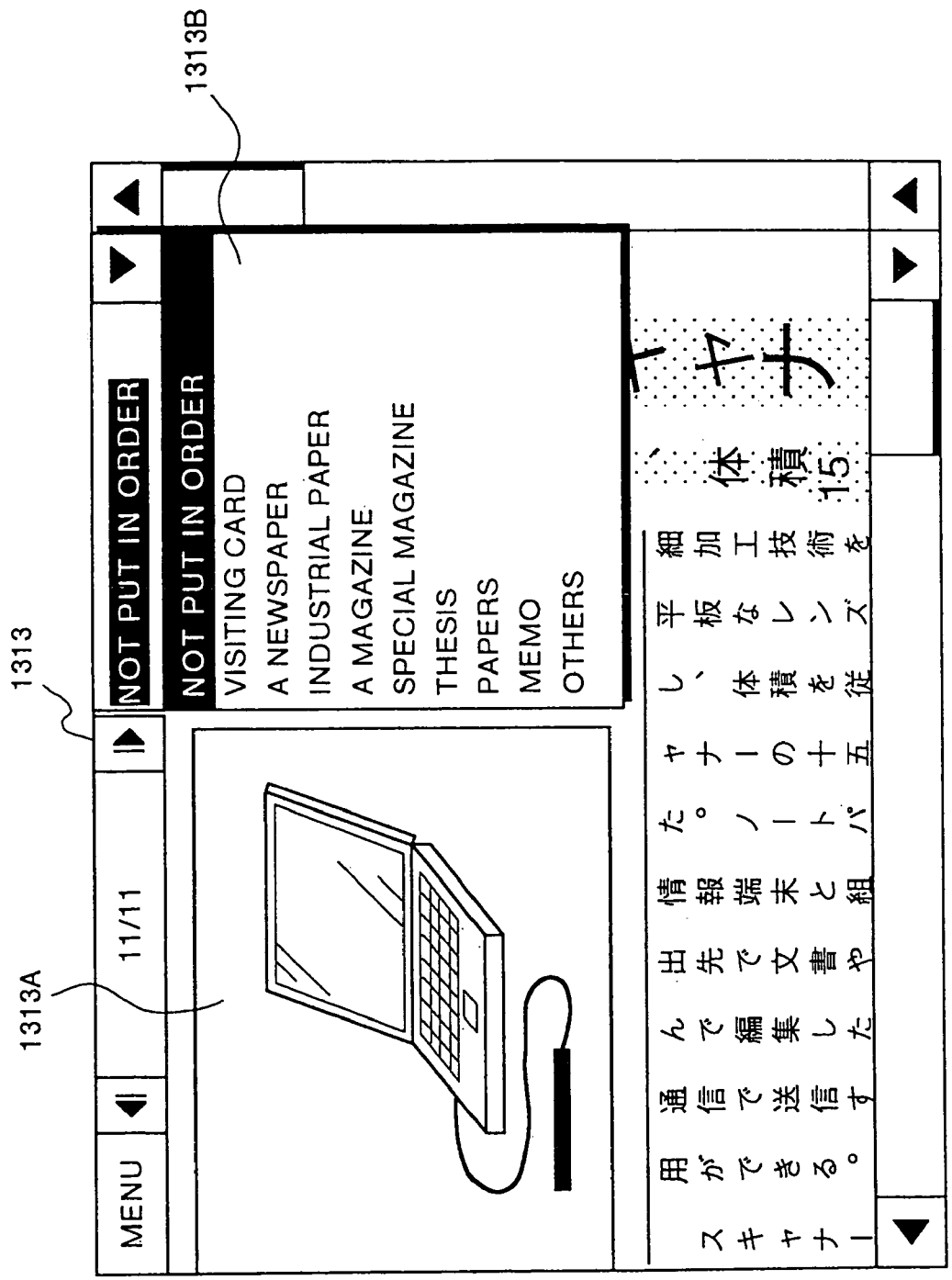
FIG. 80 is a view showing an example of screen display on the LCD 1313 when a classification item for display is specified in the image reader 1300 according to Embodiment 13.

In this case, when any one of the classification items in the second image display area 1313B shown in FIG. 80 is selected by means of input from the touch screen 1314, an image corresponding to the classification item is displayed in the first image display area 1313A. Accordingly, in this case, easiness in retrieval with the image reader 1300 can further be improved.

Description of the image reader 1300 according to Embodiment 13 above assumes used of an incremental type of optical rotary encoder 1309 shown in FIG. 37, but the type of the rotary encoder is not limited to this one, and like in Embodiment 4, an incremental type of magnetic rotary encoder may be used as the rotary encoder 1309. Also description of the image reader 1300 according to Embodiment 13 above assumes a three-roller system in which the image reader 1300 is supported at three points by the main roller 1304, first auxiliary roller 1305, and second auxiliary roller 1306, but configuration of the present invention is not limited to this one.

Namely, if the one-roller system or the two-roller system described above causes no problem in actual operation, the configuration based on the one-roller system comprising only the main roller 1304, or that based on the two-roller system comprising the main roller 1304 and first auxiliary roller 1305 (or second auxiliary roller 1306) may be employed in the image reader 1300 according to Embodiment 13. Also description of the image reader 1300 according to Embodiment 13 above assumes a case where either one of touch screen input from the touch screen 1314 and key input with the select switch 1318, four-directional instructing keys 1318 or the like is allowable, but the configuration is not limited to this one, and for instance a configuration is allowable in which the select switch 1318 is not provided and only the touch screen 1314 is provided to enable only input from the touch screen.

On the contrary, in the image reader 1300 according to Embodiment 13 described above, a configuration is also allowable in which the touch screen 1314 is not provided and only the select switch 1318 or the like is provided to enable only key input. When the configuration enabling only touch screen input or key input is employed, the required cost is lower as compared to that in a case where either way for input can be selected, and also size and weight of the device can be reduced.

Description of the image reader 1300 according to Embodiment 13 assumes a case where the LCD 1313 is used, but any type of display unit may be used on the condition that images can be displayed therewith. Therefore, in the image reader 1300 according to Embodiment 13, a plasma display or the like may be used in place of the LCD 1313. Also description of the image reader 1300 according to Embodiment 13 above assumes a case where the LCD 1313 is provided on the operating surface 1310ƒ as shown in FIG. 32, but the configuration is not limited to this one, and the LCD 1313 may be arranged at any place so long as the LCD 1313 can easily be seen from the user. Also description of the image reader 1300 according to Embodiment 13 assumes a case where the LCD 1313 is integrated with the housing 1301 as shown in FIG. 32, but the configuration is not limited to this one, and the LCD 1313 may be separated from the housing 1301, and in this case the LCD 1313 and display control section 1460 are connected to each other with a cable. In this case, a position of the LCD 1313 and an angle thereof can freely be adjusted, so that convenience in actual operation can further be improved.

Although description of the image reader 1300 according to Embodiment 13 above assumes a case where the LCD 1313 is located and fixed on the operating surface 1301ƒ as shown in FIG. 32, the configuration is not limited to this one, and a configuration is allowable in which a hinge mechanism or the like is provided between the LCD 1313 and the operating surface 1301ƒ so that an angle of the LCD 1313 can freely be adjusted. In this case, an angle of a display screen of the LCD 1313 can be adjusted according to the necessity, so that the LCD 1313 can be located at a position best suited for visual recognition by the user. Also in this case, convenience for users in actual operation thereof can further be improved.

Description of the image reader 1300 according to Embodiment 13 assumes a case where an operating unit such as the cancel switch 1317 is provided on the right side of the LCD 1313 as shown in FIG. 31, but the operating unit may be provided on either the left side or the right side of the LCD 1313 so long as the operating unit is orientated in the longitudinal direction of the operating surface 1301ƒ. Although description of the image reader 1300 according to Embodiment 13 assumes a case where one inclination detecting section 1340 (Refer to FIG. 39) is provided as an inclination (posture) detecting unit, the configuration is not limited to this one, and a plurality of inclination detecting sections 1340 may be provided inside the housing 1301. In this case, even when one of the inclination detecting sections 1340 fails, inclination (posture) can be detected with other inclination detecting section 1340, so that precision in detection of inclination (posture) can be improved.

Description of the image reader 1300 according to Embodiment 13 above assumes the configuration in which either touch screen input or key input may be selected according to necessity, but the configuration is not limited to this one, and configuration enabling voice input may be employed. In this case, it is required to provide a microphone for converting voices for operating instructions to audio signals, a speech recognizing section for recognizing voices according to the audio signals, and a control section for providing controls over display and data processing according to a result of recognition by the voice recognizing section. Also in the image reader 1300 according to Embodiment 13, the image data memory 801 and memory I/F section 802 shown in FIG. 22 may be provided in place of the DRAM 1356 shown in FIG. 44. In this case, in addition to the effects as described above, also the effects provided by the image reader 800 according to Embodiment 8 can be obtained.

Description of the image reader 1300 according to Embodiment 13 above assumes a case where inclination (posture) of the image reader 1300 is recognized according to an inclination detection signal S7 from the inclination detecting section 1340 shown in FIG. 45, and a correction for proper orientation is made according to a result of this recognition, but the configuration is not limited to this one. Alternatively, the correction for proper orientation may be executed by the image data direction correcting section 1430 according to instruction data provided by a user for instructing a proper orientation inputted from the operating unit 1370 (or the touch screen 1314). With this configuration, a user can specify the proper orientation of a corrected image in both the horizontal and vertical directions, so that the image is always displayed on the LCD 1313 of the image reader 1300 at a position best suited to visual recognition by the user. With this configuration, convenience of the image reader 1300 in actual use can further be improved.

In the image reader 1300 according to Embodiment 13, the inclination detecting section 1340 shown in FIG. 45 may have functions similar to those of the image data direction correcting section 1430 to execute correction for proper orientation to the digitized image data D3 stored in the image data memory 1440.

In this case, a image that gives consideration to the inclination of the image reader 1300 is displayed on the LCD 1313, so that the similar effects as those provided in a case where the image data direction correcting section 1430 is used can be obtained. Also description of the image reader 1300 according to Embodiment 13 above assumes a case where a screen display is two screen as shown in FIG. 67 to FIG. 71, but the screen display is divided to three or more portions.

Figure 81:
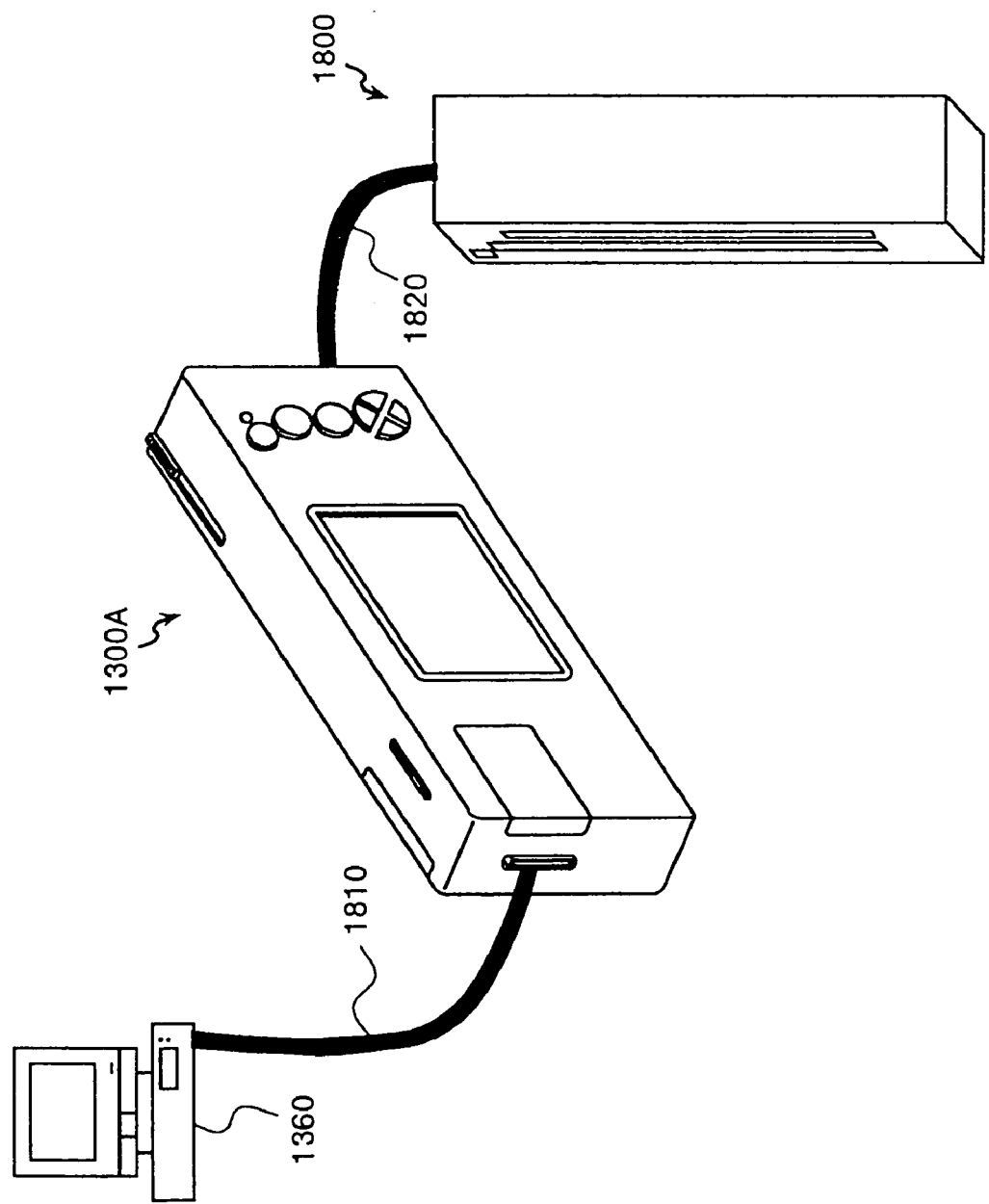
FIG. 81 is a perspective view showing appearance and configuration of an image reader 1300A according to Embodiment 14 of the present invention, an auxiliary image reader 1800 connected thereto, and a computer 1360.
Figure 82:
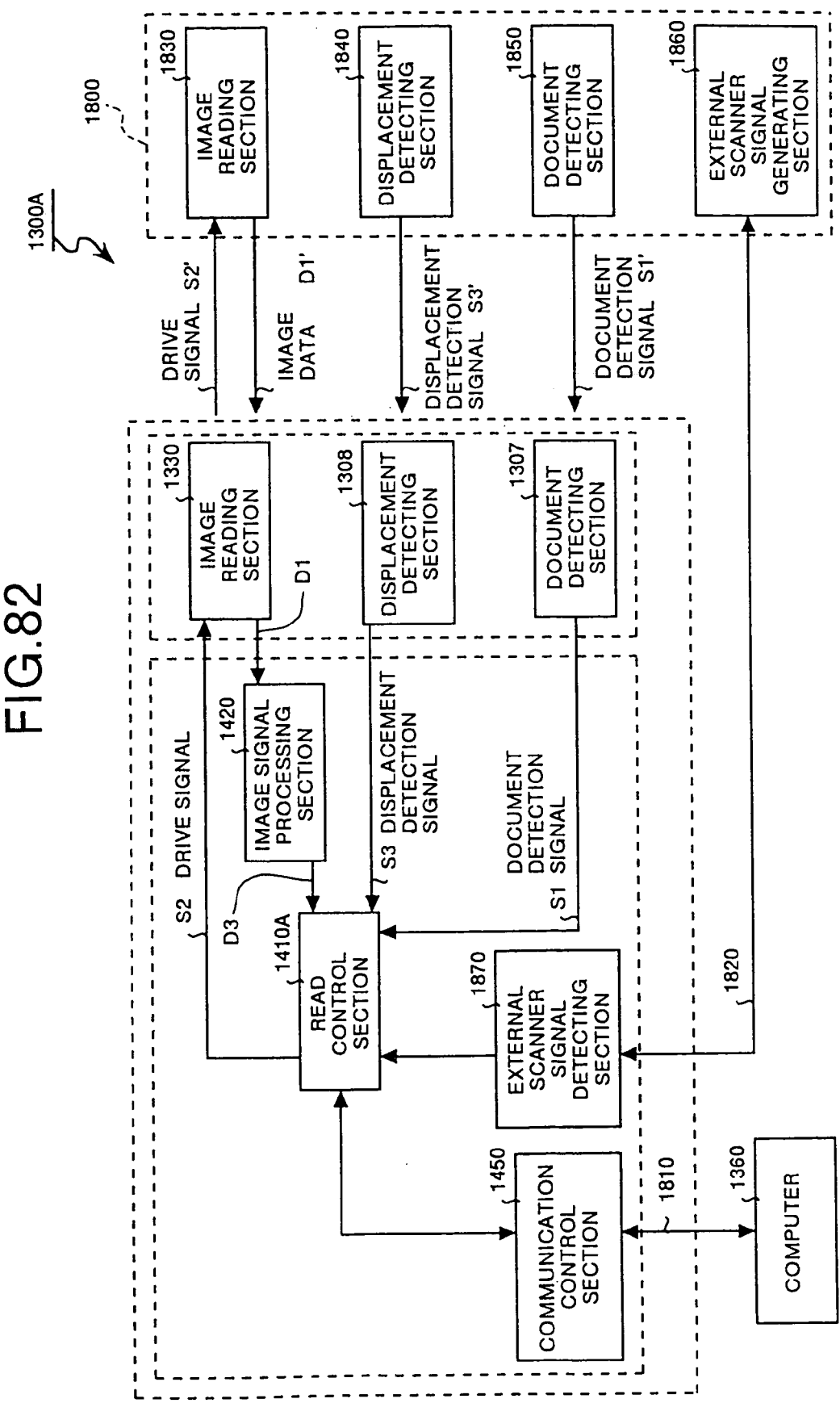
FIG. 82 is block diagram showing electric configuration of the image reader 1300A according to Embodiment 14, auxiliary image reader 1800 connected thereto, and a computer 1800.

Description is made for an image reader 1300A according to Embodiment 14 of the present invention with reference to FIG. 81 and FIG. 82. FIG. 81 is a perspective view showing appearance and configuration of the image reader 1300A according to Embodiment 14, an auxiliary image reader 1800 used for the same, and of a computer 1360. The appearance and configuration of the image reader 1300A shown in the figure are the same as those in the image reader 1300 shown in FIG. 32.

The image reader 1300A shown in FIG. 81 has, however, a connector (not shown) for connection to the auxiliary image reader 1800 via a cable 1820. The image reader 1300A reads an image on a A6 size document (105 mm wide) described above. In contrast, the auxiliary image reader 1800 reads an image on a A4 size (210 mm wide) document which is different from a document size (A6 wide) readable by the image reader 1300A. Namely, the auxiliary image reader 1800 is used for reading an image on a document having a size that can not be read by the image reader 1300A in the same manner as that of the auxiliary image reader 1120 shown in FIG. 27 described above. The auxiliary image reader 1800 has the same appearance and configuration as those of the auxiliary image reader 1120 shown in FIG. 27, and detailed description thereof is omitted herein.

FIG. 82 is a block diagram showing electric configuration of the key section of the image reader 1300A according to Embodiment 14, auxiliary image reader 1800 used for the same, and of the computer 1360. In this figure, the same reference numerals are assigned to components corresponding to those in FIG. 81 and FIG. 45. In FIG. 82, however, the operating unit 1370, inclination detecting section 1340, LCD 1313, and display control section 1460 each shown in FIG. 45 are not shown herein. In the image reader 1300A shown in FIG. 82, a read control section 1410A is provided in place of the read control section 1410 shown in FIG. 45, and an external scanner signal detecting section 1870 is provided anew.

The read control section 1410A shown in FIG. 82 has, although the basic function thereof is the same as that of the read control section 1410 shown in FIG. 45, a function of providing drive controls over the image reading section 1830 in the auxiliary image reader 1800 in addition to the basic function. Details of the operation of the read control section 1410A will be described later.

The external scanner signal detecting section 1870 has a connector with the cable 1820 connected thereto, and outputs a high-level signal to the read control section 1410A when the cable 1820 is not connected, and detects, when the cable 1820 is connected, the connection thereof and outputs a low-level signal to the read control section 1410A. The external scanner signal detecting section 1870 plays a role of an interface among the image reading section 1830, a displacement detecting section 1840, a document detecting section 1850, and an external scanner signal generating section 1860 each in the auxiliary image reader 1800.

On the other hand, in the auxiliary image reader 1800, the image reading section 1830 having the same configuration as that of the image reading section 1330 reads an image for one line in the same manner as described above each time a 1-pulse drive signal S2' is inputted from the read control section 1410A through the external scanner signal detecting section 1870 and the cable 1820, and outputs a result of reading as image data D1' to an image signal processing section 1420 through the cable 1820 and the external scanner signal detecting section 1870. Herein, the image data D1' is digitized by the image signal processing section 1420, and the data is inputted into the read control section 1410A as the digitized image data D3. When inputting the data D3, the read control section 1410A temporarily stores the digitized image data D3 in its own memory buffer (not shown).

The displacement detecting section 1840 outputs a 1-pulse displacement detection signal S3' to the read control section 1410A through the cable 1820 and external scanner signal detecting section 1870 each time the auxiliary image reader 1800 moved for a specified distance in the same manner as that in the displacement detecting section 1840. The document detecting section 1850 having the same configuration as that of the document detecting section 1307 outputs, when a document is detected, the result of detection as a document detection signal S1' to the read control section 1410A through the cable 1820 and external scanner signal detecting section 1870. The read control section 1410A transfers the digitized image data D3 stored in the buffer memory to the computer 1360 through a communication control section 1450 and the cable 1810 each time the displacement detection signal S3' is inputted.

The external scanner signal generating section 1860 generates size pattern data corresponding to a size of a document readable in the auxiliary image reader 1800. Herein as the size pattern data, when a size of a document is A8 the data is "0", when the size is A6 the data is "1", and when the size is A4, the data is "2". In this case, it is assumed that the external scanner signal generating section 1860 generates "2" data indicating the A4 size as the size pattern data.

The read control section 1410A recognizes, when the cable 1820 is connected thereto, a document size from the size pattern data obtained through the external scanner signal detecting section 1870, and outputs a drive signal S2' to the image reading section 1830 through the external scanner signal detecting section 1870 and cable 1820 at a cycle matching this document size. It should be noted that the read control section 1410A outputs, when the cable 1820 is not connected to the external scanner signal detecting section 1870, a drive signal S2 to the image reading section 1330 in the same manner as that in the read control section 1410 shown in FIG. 45 described above.

Next, operations of the image reader 1300A and auxiliary image reader 1800 according to Embodiment 14 will be described. In FIG. 82, the user connects the cable 1820 to the external scanner signal detecting section 1870 of the image reader 1300A. A signal outputted from the external scanner signal detecting section 1870 to the read control section 1410A is switched from a high level to a low level. Thus, the read control section 1410A recognizes that the cable 1820 is connected thereto.

Then, the external scanner signal detecting section 1870 accesses the external scanner signal generating section 1860 through the cable 1820, obtains the above mentioned size pattern data generated by the external scanner signal generating section 1860, and outputs the data to the read control section 1410A. It is assumed that the size pattern data in this case is "2" indicating a A4 size document.

Therefore, when the size pattern data is inputted, the read control section 1410A outputs a drive signal S2' to the image reading section 1830 through the external scanner signal detecting section 1870 and cable 1820 at a cycle matching the A4 size. With this operation, the image reading section 1830 is driven, and image data D1' is outputted from the image reading section 1830 to the image signal processing section 1420 through the cable 1820 by one line. This image data D1' is converted to digitized image data D3 by the image signal processing section 1420 and temporarily stored in the buffer memory of the read control section 1410A.

Then, the user slides the auxiliary image reader 1800 placed at a start position of reading on the A4 not illustrated sized document in the scanning direction. With this operation, a document detection signal S1' and a displacement detection signal S3' are outputted from the document detecting section 1850 and displacement detecting section 1840 to the read control section 1410A through the cable 1820 and external scanner signal detecting section 1870.

The read control section 1410A transfers the digitized image data D3 stored in the buffer memory to the computer 1360 through the communication control section 1450 and the cable 1810 each time the displacement detection signal S3' is inputted. The computer 1360 performs various data processing such as of storing the digitized image data D3 inputted from the image reader 1300A as an external scanner device in its own storage device and of displaying the image according to the digitized image data D3.

As described above, with the image reader 1300A according to Embodiment 14, the external scanner signal detecting section 1870 is provided in the image reader 1300A, and further the auxiliary image reader 1800 for enabling reading of an image having a size different from that of a document readable by the image reader 1300A and also for automatically detecting a document is connected thereto through the cable 1820. Thus, a different sized images can easily be read. Therefore, with the image reader 1300A according to Embodiment 14 described above, a range of sizes that can be selected is widened, which allows its versatility to further be enhanced and also adaptability for handling to further be improved.

Figure 83:
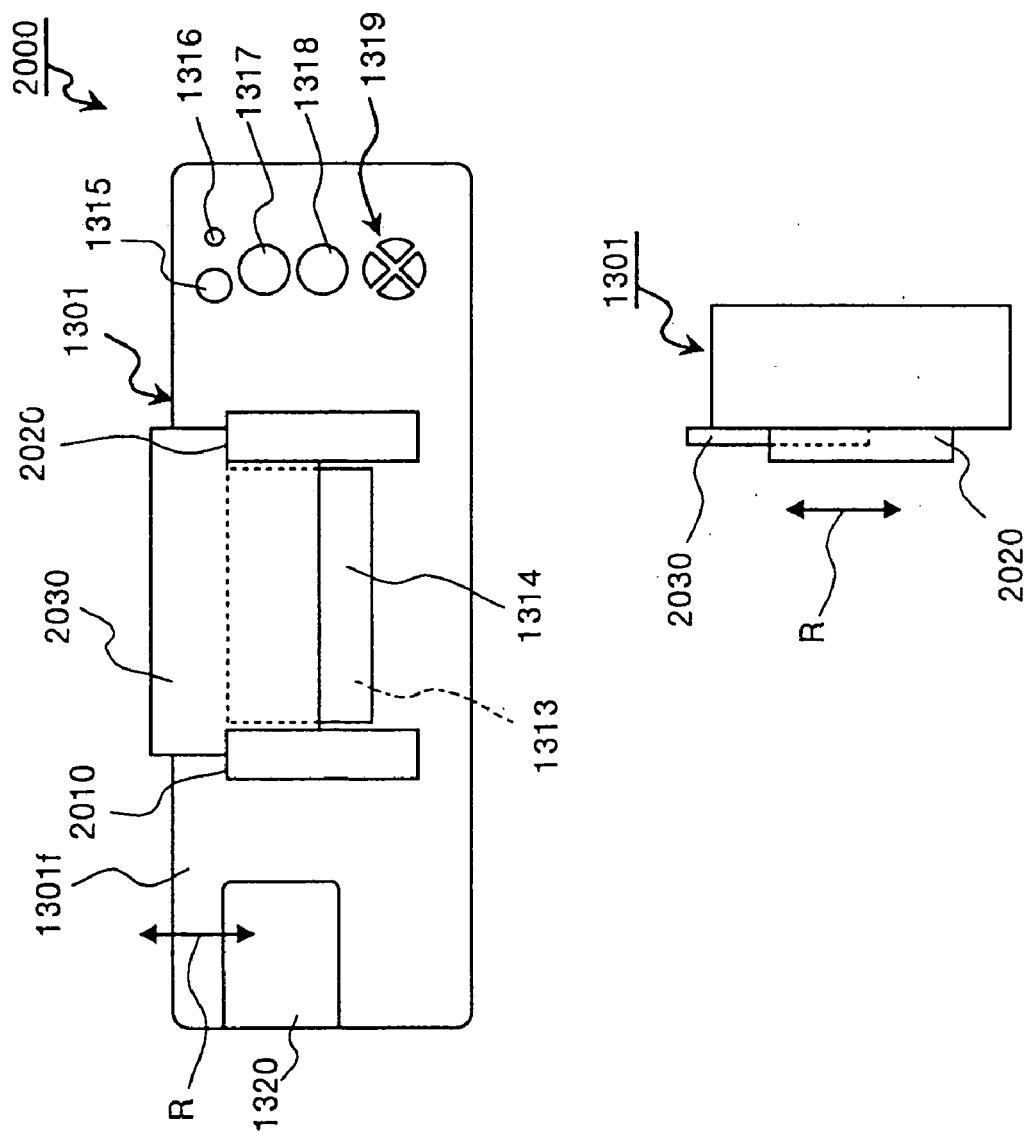
FIG. 83 is a view showing appearance and configuration of an image reader 2000 according to Embodiment 15 of the present invention.

Description is made for an image reader 2000 according to Embodiment 15 of the present invention with reference to FIG. 83. The top view in FIG. 83 is a front view showing appearance and configuration of the image reader 2000 according to Embodiment 15, and the bottom view FIG. 83 is a side view showing appearance and configuration of the image reader 2000 according to Embodiment 15. In FIG. 83, the same reference numerals are assigned to components corresponding to those in FIG. 31, and description thereof is omitted herein.

In FIG. 83, a first slider 2010, a second slider 2020, and a protection plate 2030 are newly provided therein. As shown in the top view, the first slider 2010 is a long plate attached to an operating surface 1301ƒ of a housing 1301 so as to be provided along one short side of the LCD 1313 (or the touch screen 1314). A narrow gap (not shown) is provided between the first slider 2010 and the operating surface 1301ƒ. Thus, gap is used as a slide groove for sliding the protection plate 2030 described later in the direction indicated by the arrow R in the figure.

On the other hand, the second slider 2020 is attached to the operating surface 1301ƒ so as to be provided along the other short side of the LCD 1313 (or the touch screen 1314). Namely, the second slider 2020 and above mentioned first slider 2010 are provided opposite to each other so that the LCD 1313 (or the touch screen 1314) is therebetween. A narrow gap is provided between the second slider 2020 and the operating surface 1301ƒ. This gap is used as a slide groove for sliding the protection plate 2030 in the direction indicated by the arrow R in the figure. The protection plate 2030 is formed with transparent synthetic resin to a plate. The area of the protection plate 2030 is substantially the same or slightly larger as compared to the area of the LCD 1313 (or the touch screen 1314). The protection plate 2030 protects the surface of the touch screen 1314 (or the LCD 1313) from external shocks given thereto or the oil or dirt on user's fingers. Both edges of the protection plate 2030 are inserted into the slide grooves formed in the first slider 2010 and the second slider 2020 respectively. Furthermore, when inserted, the protection plate 2030 covers the whole surface of the touch screen 1314 (LCD 1313).

Next, description is made for a method of using the above mentioned protection plate 2030. In FIG. 83, it is assumed that the protection plate 2030 is not inserted into the slide grooves formed in the first slider 2010 and second slider 2020. In this state, when both edges of the protection plate 2030 are inserted by the user into the slide grooves from the upper side, the protection plate 2030 slides along the slide grooves in the direction indicated by the arrow R (downward) and gradually covers the touch screen 1314 (or the LCD 1313).

Then, when two corners in the lower side of the protection plate 2030 are located in lower sides of the first slider 2010 and second slider 2020, the movement of the protection plate 2030 in the direction indicated by the arrow R is restricted by a stopper member not shown herein. When the plate can not slide further, the protection plate 2030 covers the whole surface of the touch screen 1314 (or the LCD 1313). In this state, when the user grasps the image reader 2000 with one hand to carry out the operation of reading an image, the thumb and other fingers of the user's hand tightly contact the protection plate 2030. Therefore, in this case, oil on the thumb or the other fingers is not directly adhered to the touch screen 1314. The protection plate 2030 can be slid by the user in the direction indicated by the arrow R (upward) to removed it from the slide grooves.

As described above, with the image reader 2000 according to Embodiment 15, the first slider 2010, second slider 2020, and the protection plate 2030 are provided therein to cover the surface of the touch screen 1314 (or the LCD 1313) completely, so that shocks from outside can be prevented from being given to the touch screen 1314, and oil or dirt deposited on user's fingers can also be prevented from being adhered thereto. Especially, in the image reader 2000 according to Embodiment 15, because the protection plate 2030 is transparent, dirt and damage can be prevented without interfering the checking of display of the LCD 1313 even when the protection plate 2030 is mounted thereon.

Although the image reader 2000 according to Embodiment 15 of the present invention has been described in detail, the specific configuration is not limited to Embodiment 15 but it is clear that all modifications and alternative constructions which fairly fall within the basic teaching herein are included in the present invention. For example, in the image reader 2000 according to Embodiment 15 described above, the description has assumed the case where the transparent protection plate 2030 is used, but the protection plate is not limited to the above type and a non-transparent protection plate 2030 may be used. Furthermore, in the image reader 2000 according to Embodiment 15 described above, although the description has assumed the case where the protection plate 2030 is detachable, if the touch screen 1314 is not provided, the protection plate 2030 may be permanently attached at a position where the entire surface of the LCD 1313 can be covered with the plate.

Figure 84:
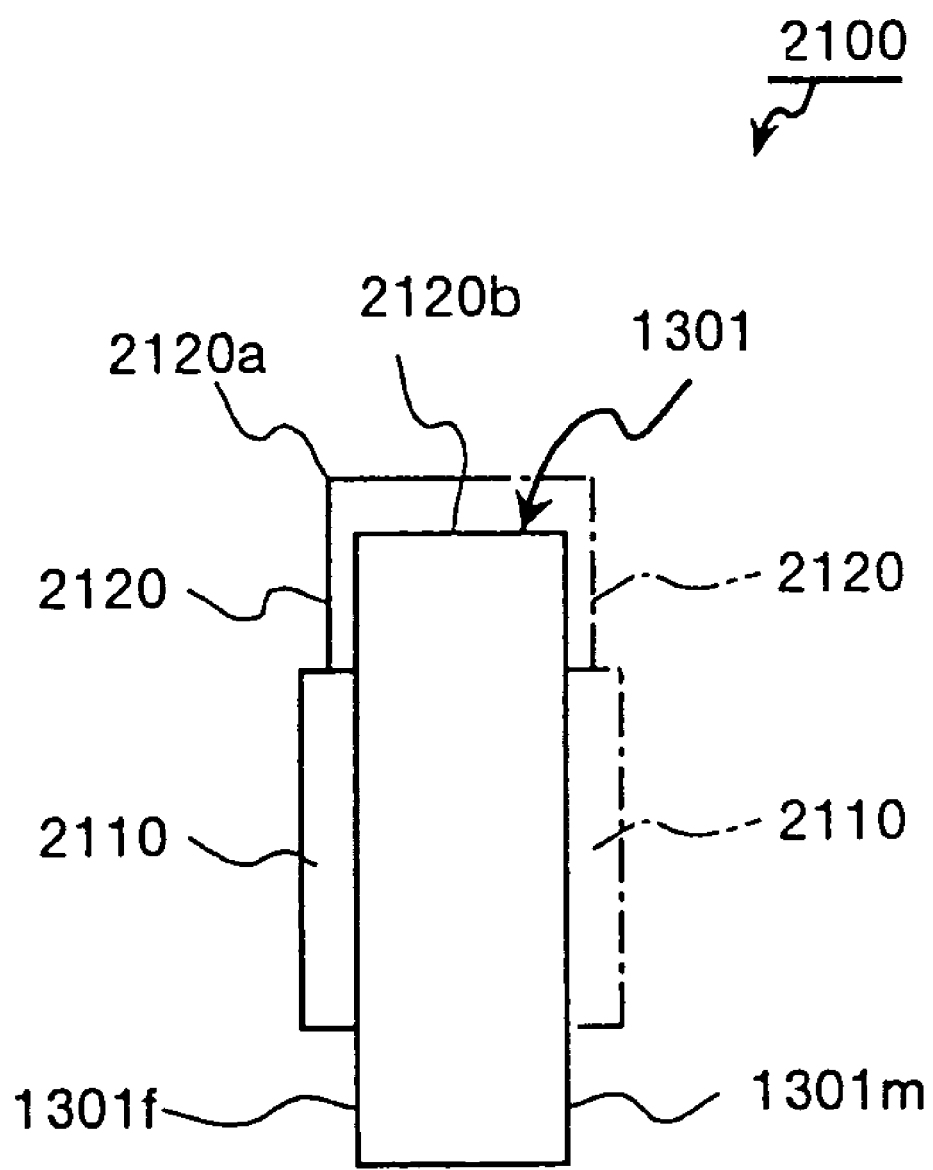
FIG. 84 is a side view showing appearance and configuration of an image reader 1600 according to Embodiment 16 of the present invention.

An image reader 2100 according to Embodiment 16 of the present invention will be described with reference to FIG. 84. FIG. 84 is a side view showing appearance and configuration of the image reader 2100 according to Embodiment 16. In the figure, the same reference numerals are assigned to components corresponding to those in FIG. 32 and FIG. 33, and description thereof is omitted herein. However, in FIG. 84, the LCD 1313, touch screen 1314, power switch 1315, and reset switch or the like each shown in FIG. 32 are not shown.

In FIG. 84, a protection plate 2110 is formed with transparent synthetic resin in such a way that the area thereof is substantially the same or slightly wider as compared to the area of the LCD 1313 (or the touch screen 1314). The protection plate 2110 protects the surface of the touch screen 1314 (or the LCD 1313) from external shocks given thereto and oil or dirt on user's fingers in the same manner as that of the protection plate 2030 (Refer to FIG. 83).

A hinge member 2120 has a hinge section 2120*a* and a hinge section 2120*b* both of which can be bend at two positions shown in the figure. One edge of this hinge member 2120 is attached to the top surface of the housing 1301 and the other edge thereof is attached to the upper edge of the protection plate 2110 in the figure. Namely, the protection plate 2110 is, attached to the housing 1301 through the hinge member 2120. Next description is made for a method of using the above mentioned protection plate 2110. In FIG. 84, when the protection plate 2110 is not used, the protection plate 2110 is contacted to a rear surface 1301*m* of the housing 1301 in a state where the plate is supported by the housing 1301 through the hinge member 2120 as shown by the phantom line in the figure.

When the protection plate 2110 is to be used, in other words, when the whole surface of the touch screen 1314 (or the LCD 1313) shown in FIG. 32 is to be covered with the protection plate 2110 for the purpose of the above mentioned protection thereto, the user grasps the protection plate 2110 and moves it just like inside out from the side of rear surface 1301*m* to the side of operating surface 1301*f*. Herein, the hinge section 2120*a* and hinge section 2120*b* of the hinge member 2120 are bent respectively, which makes the protection plate 2110 smoothly contact the operating surface 1301*f*. When the plate contacts the touch screen, the touch screen 1314 (LCD 1313) shown in FIG. 31 is fully covered by the protection plate 2110. When the user grasps the image reader 2100 by one hand in the state described above to perform the operation of reading an image, the thumb of the user's hand (or the other fingers) tightly contacts the protection plate 2110, and the other fingers (or thumb) tightly contact the rear surface 1301*m* thereof.

Therefore, in this case, oil on the thumb (or the other fingers) is not directly adhered to the touch screen 1314 as described in the image reader 2000 according to Embodiment 15.

Then, when the protection plate 2110 is not to be used, the user grasps the protection plate 2110 again and moves it just like inside out from the operating surface 1301*f* to the rear surface 1301*m* in the reverse way to the operation described above. Thus, the hinge section 2120*a* and hinge section 2120*b* of the hinge member 2120 are bent respectively, which makes the protection plate 2110 smoothly contacted to the rear surface 1301*m*.

As described above, with the image reader 2100 according to Embodiment 16, the protection plate 2110 and hinge member 2120 are provided to cover the whole surface of the touch screen 1314 (LCD 1313), so that a shock from outside can be prevented from being given to the touch screen 1314, and oil or dirt on user's fingers can also be prevented from being adhered thereto in the same manner as that in the image reader 2000 according to Embodiment 15. In addition, with the image reader 2100 according to Embodiment 16, as the protection plate 2110 is held by the housing 1301 through the hinge member 2120, the protection plate 2110 can be prevented from its loss. Furthermore, with the image reader 2100 according to Embodiment 16, as a transparent protection plate 2110 is used, dirt and damage can be prevented without interfering the checking of display of the LCD 1313 even when the protection plate 2030 is mounted thereon.

Although the image reader 2100 according to Embodiment 16 of the present invention has been described in detail, the specific configuration is not limited to Embodiment 16 but it is clear that all modifications and alternative constructions which fairly fall within the basic teaching herein are included in the present invention. For example, in the image reader 2100 according to Embodiment 16 described above, the description has assumed the case where the transparent protection plate 2110 is used, but the protection plate is not limited to the above type and a non-transparent protection plate 2110 may be used.

Figure 85:
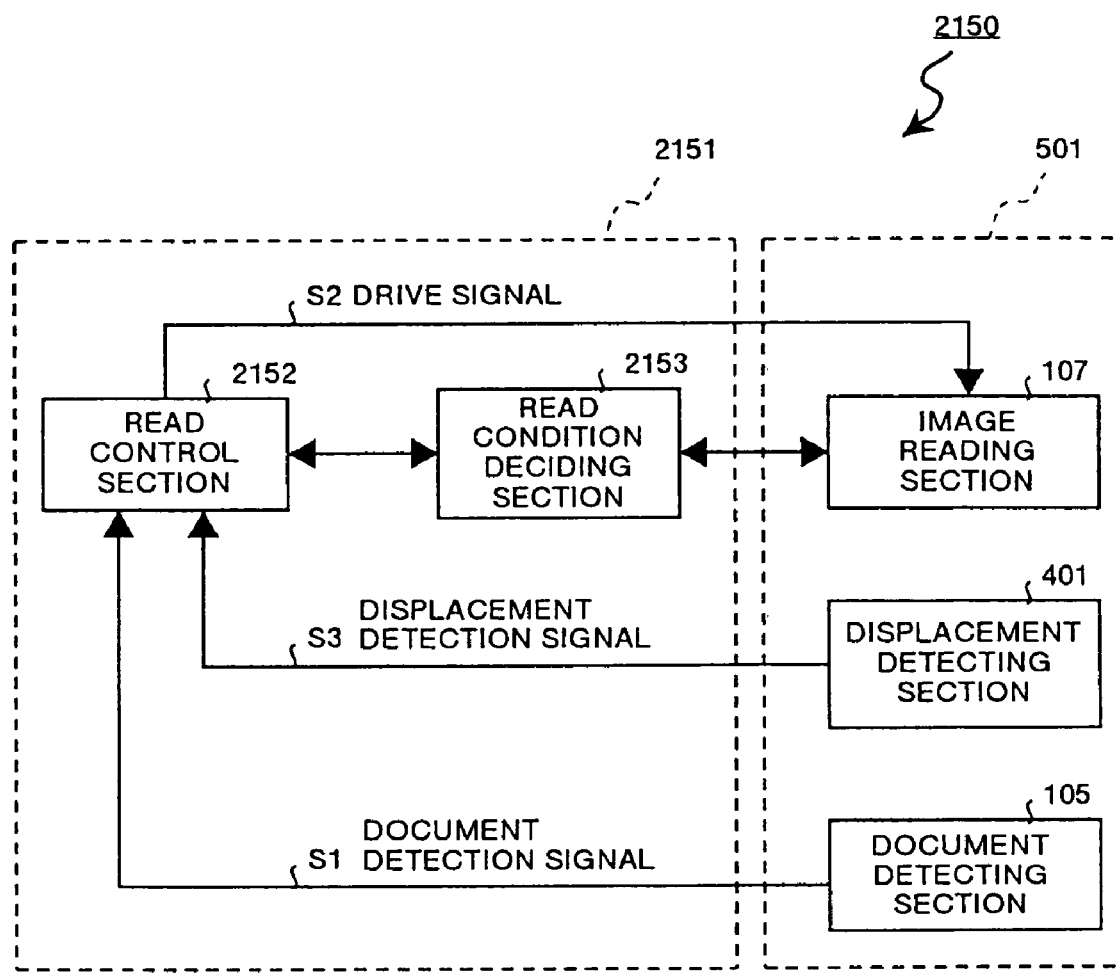
FIG. 85 is a block diagram showing configuration of an image reader 2150 according to Embodiment 17 of the present invention.

Description is made for an image reader 2150 according to Embodiment 17 of the present invention with reference to FIG. 85. FIG. 85 is a block diagram showing configuration of the image reader 2150 according to Embodiment 17. In the figure, the same reference numerals are assigned to components corresponding to those in FIG. 13. In FIG. 85, a data processing section 2151 is provided in place of the data processing section 112C shown in FIG. 13. The image reading section 107 reads an image on a document according to conditions for reading (e.g., threshold value for digitizing) of an image decided by a read condition deciding section 2153 described later. Appearance and configuration of the image reader 2150 is the same as those of the image reader 500 shown in FIG. 10.

Figure 113:
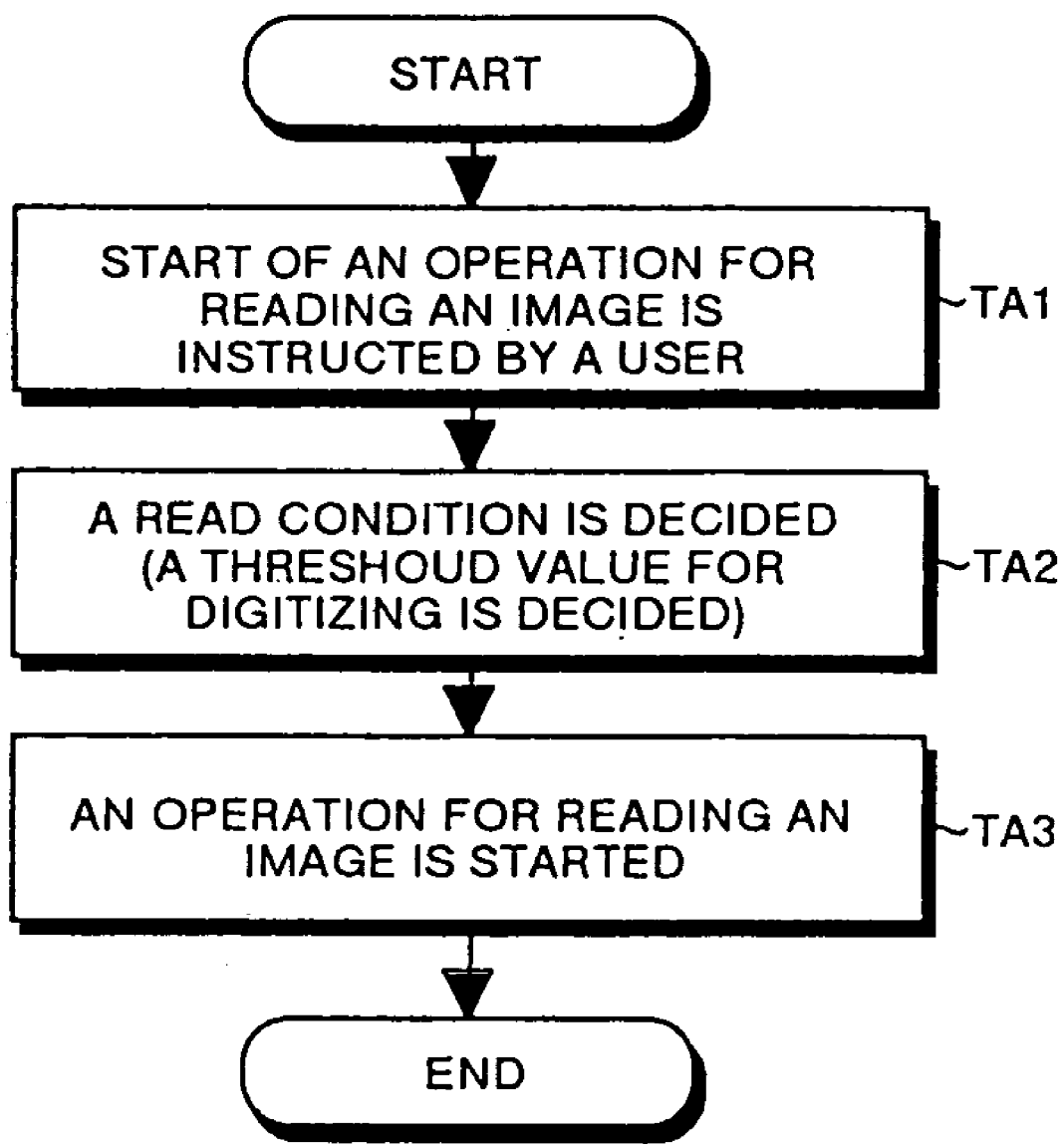
FIG. 113 is a flow chart showing an example of operations of an image reader based on the conventional technology.

The image reader 2150 according to Embodiment 17 which will be described in detail hereinafter is provided for the purpose of solving the problem in the conventional type of image reader having been described with reference to the flow chart shown in FIG. 113, namely the problem that quality of read image is reduced.

In the data processing section 2151 shown in FIG. 85, a read control section 2152 outputs a drive signal S2 for reading an image on a document (not shown) by one line to the image reading section 107 at a specified cycle upon input of both a document detection signal S1 and a displacement detection signal S3 as a trigger. In addition the read control section 2152 gives an instruction for deciding a condition for reading to the read condition deciding section 2153. Herein, the condition for reading is a threshold value for digitizing used when an image on a document is read in the image reading section 107 as monochrome image data (digitized data).

The read condition deciding section 2153 decides an optimal condition for reading (threshold value for digitizing) to obtain an image that is not faded or distorted from the image data by one line read in the image reading section 107 upon input of the instruction from the read control section 2152 as a trigger. The read condition deciding section 2153 decides the condition for reading (threshold value for digitizing) and sets the condition in the image reading section 107. Herein, the read condition deciding section 2153 decides a condition for reading using the same method as that of deciding a threshold value for digitizing described above with reference to FIG. 46. Refer to FIG. 46 for the details of the deciding method. The image reading section 107 corrects and converts an image on the document for reading according to the condition for reading (threshold value for digitizing) decided by the read condition deciding section 2153.

First Example of the Operation in Embodiment 17

An example of the operation of the image reader 2150 according to Embodiment 17 will be described with reference to a flow chart shown in FIG. 86. It is assumed that reading of an image is effected after a not illustrated power switch is turned ON and that the image reader 2150 (document detecting section 105) shown in FIG. 85 is not located near a document. Then, in step SN1 shown in FIG. 86, the read control section 2152 reports to the user by lighting a lamp or the like that image can be read and then the system control shifts to step SN2.

In step SN2, the read control section 2152 enables acceptance of input of a document detection signal S1 from the document detecting section 105, and then the system control shifts to step SN3. Herein, the document detection signal S1 is a signal outputted from the document detecting section 105 when a document contacts (tightly contacts) the image reading surface (not shown). In step SN3, the read control section 2152 determines whether the document has been detected by the document detecting section 105 or not, in other words, whether a document detection signal S1 has been inputted from the document detecting section 105 or not. The read control section 2152 recognizes a result of determination as "No" since the image reader 2150 (document detecting section 105) is not located near the document and the system control is returned to step SN2. Then, when a user places the image reader 2150 on a document so that the image reading surface thereof contacts the document, a document detection signal S1 is outputted from the document detecting section 105 to the read control section 2152 because the document detecting section 105 and the document closely contact each other.

With this, the read control section 2152 recognizes a result of determination in step SN3 as "Yes" and the system control is shifted to step SN4. In step SN4, the read control section 2152 enables acceptance of input of a displacement detection signal S3 from the displacement detecting section 401, and then the system control shifts to step SN5. Herein the displacement detection signal S3 is a signal outputted from the displacement detecting section 401 according to a displacement of the read control section 2152. In step SN5, the read control section 2152 determines whether the displacement obtained from the displacement detection signal S3 inputted from the displacement detecting section 401 is more than the threshold value or not. When the result of this determination is "No" the system control is returned to step SN4 and the read control section 2152 repeats the sequence of operations described above. Herein, the case where the result of determination in step SN5 is "No" indicates a case where the image reader 2150 is slightly moved due to influence of vibrations. Namely, the step SN5 is provided in order to prevent a malfunction due to influence of vibrations.

Then, the user slides the image reader 2150 in the scanning direction in a state where the user is grasping the image reader 2150 and the image reading surface thereof contacts the document by performing the same operation described above to read an image. With this operation, a displacement detection signal S3 according to a displacement of the image reader 2150 is outputted, and when the displacement becomes more than the threshold value, the read control section 2152 recognizes a result of determination in step SN5 as "Yes" and the system control is shifted to step SN6. In step SN6, the read control section 2152 issues an instruction for deciding a condition for reading (e.g., threshold value for digitizing) to the read condition deciding section 2153.

With this operation, the read condition deciding section 2153 decides an optimal condition for reading (threshold value for digitizing) from the image data by one line on the document read in the image reading section 107 and sets the condition in the image reading section 107. In step SN7, an image is read according to the condition for reading (threshold value for digitizing) each time a drive signal S2 is inputted from the read control section 2152 to the image reading section 107 at each specified time interval.

Second Example of the Operation in Embodiment 17

In the first example of the operation described above, the description has been made for the case where a malfunction due to vibrations can be prevented by deciding a condition for reading under the fact that the displacement of the image reader 2150 exceeds the threshold value as one condition (Refer to step SN5 in FIG. 85). However, in the first example of the operation, a total displacement exceeds the threshold value through accumulation of minute displacement due to vibrations over a plurality of times. Therefore, in an actual case, there may occur a malfunction that it would be determined as if the image reader 2150 is moved although the image reader 2150 is not moved. Detailed description is made hereinafter for the second example of the operation to prevent the above mentioned malfunction.

Figure 86:
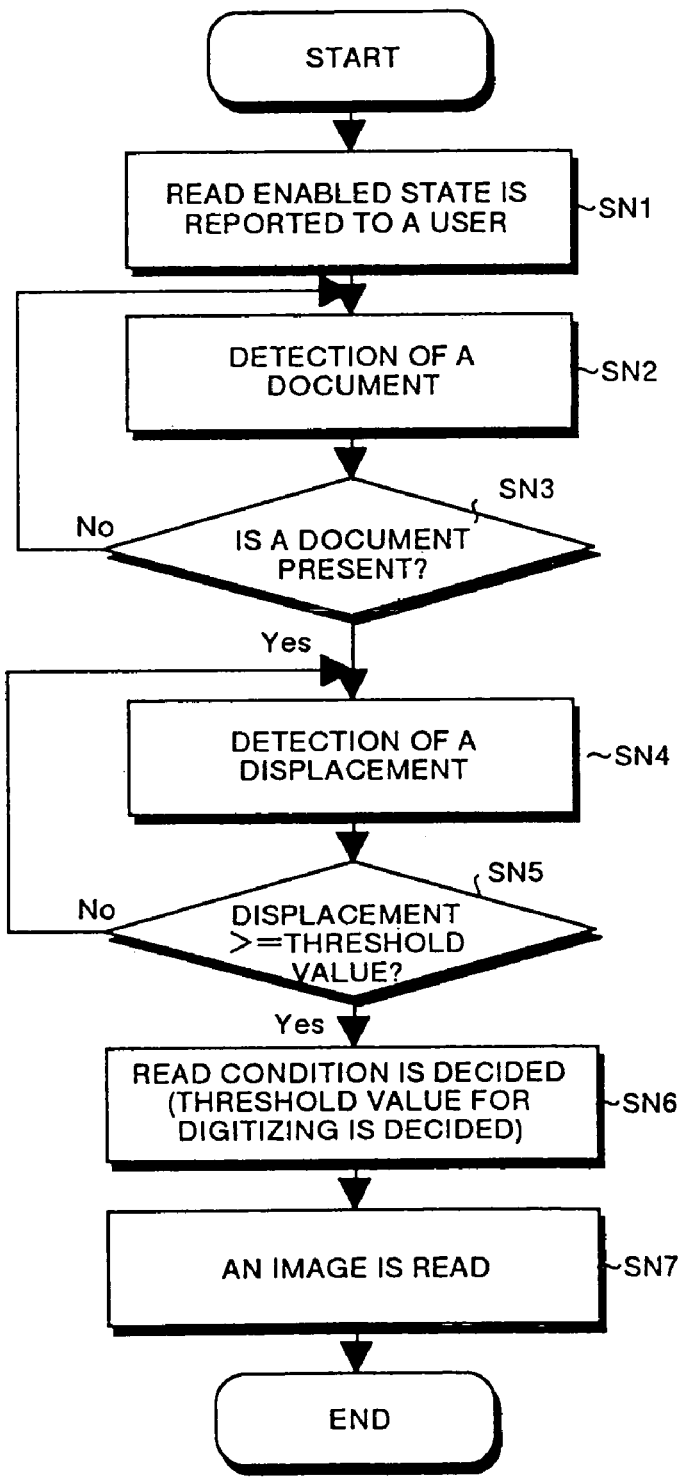
FIG. 86 is a flow chart showing an example 1 of operations of the image reader according to Embodiment 17.
Figure 87:
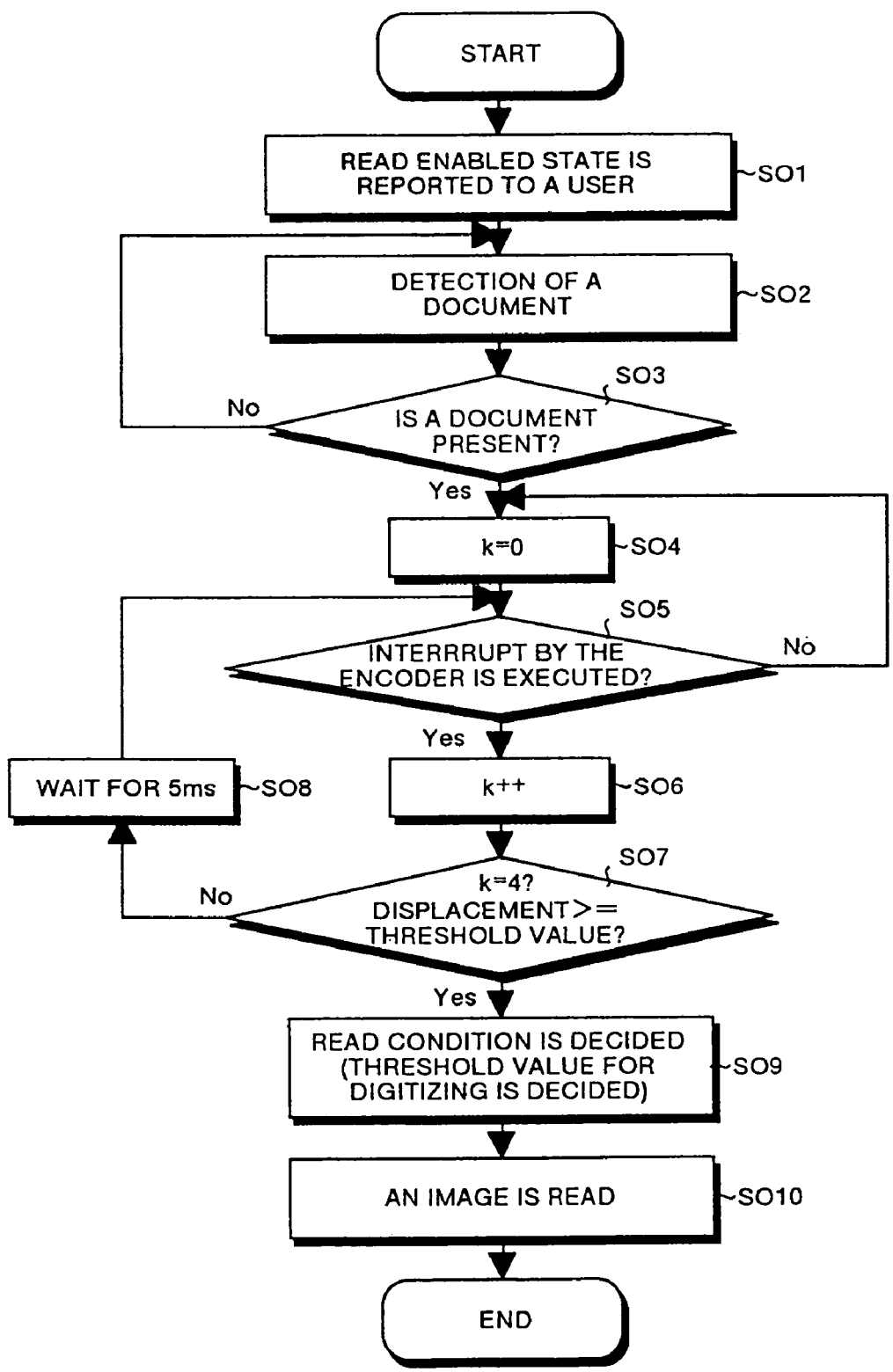
FIG. 87 is a flow chart showing an example 2 of operations of the image reader 2150 according to Embodiment 17.

In FIG. 87, step SO1 to step SO3 and step SO9 as well as step SO10 correspond to step SN1 to step SN3 and step SN6 as well as step SN7 shown in FIG. 86 respectively. Namely, in the second example of the operation, the sequence of operations in step SO4 to step SO8 is executed in place of the sequence of operations in step SN4 and step SN5 shown in FIG. 86.

Namely, in step SO1 shown in FIG. 87, a status that image read is possible is reported by lighting up the lamp or the like, and in step SO2, a document detection signal S1 is received, Then in step SO3, the read control section 2152 determines whether a document has been detected by the document detecting section 105 or not. When the image reader 2150 is placed on the document by the user, the document detection signal S1 is outputted from the document detecting section 105 to the read control section 2152 by performing the same operation as described above, with which the read control section 2152 recognizes a result of determination in step SO3 as "Yes" and the system control is shifted to step SO4.

In step SO4, the read control section 2152 sets a displacement parameter k to "0", and then the system control shifts to step SO5. Herein, the displacement parameter k is a parameter indicating a displacement of the image reader 2150. In step SO5, the read control section 2152 determines whether a next interrupt is executed within 5 ms since an interrupt is received from the rotary encoder 402 (Refer to FIG. 10) of the displacement detecting section 401 or not. In other words, the read control section 2152 determines whether a next displacement detection signal S3 is inputted within 5 ms since the displacement detection signal S3 is inputted or not. The displacement detection signal S3 is a signal outputted by one pulse each time the read control section 2152 is moved by a specified distance.

When a result of determination in step SO5 is "No" the read control section 2152 returns the system control to step SO4, sets the displacement parameter k to "0", and then the system control shifts to step SO5. Herein, when a displacement detection signal S3 is outputted by the fact that the read control section 2152 is moved by a minute amount of distance due to its vibration once, the read control section 2152 recognizes a result of determination in step SO5 as "Yes" and the system control is shifted to step SO6. In step SO6, the read control section 2152 increments the displacement parameter k by one (k=1 in this case), and then the system control shifts to step SO7. In step SO7, the read control section 2152 determines whether the displacement parameter k (=1) is 4 or not, in other words, whether the displacement is more than the threshold value or not. In this case, the read control section 2152 recognizes, as the displacement parameter k is 1, a result of determination in step SO7 as "No" and the system control is shifted to step SO8.

In step SO8, the read control section 2152 waits for 5 ms, and then the system control returns to step SO5. Herein, when the next displacement detection signal S3 is not inputted within 5 ms as described above, the read control section 2152 returns to step SO4, and sets the displacement parameter k to "0" and the system control is shifted to step SO5. Namely, in this case, as the displacement due to the vibration that previously occurred is reset, inconvenience due to accumulation of each displacement caused by vibrations in the above mentioned first example of the operation can be prevented.

The user slides the image reader 2150 in the scanning direction in a state where the user is grasping the image reader 2150 and the image reading surface thereof contacts the document by performing the same operation described above to read an image. With this operation, a displacement detection signal S3 according to a displacement of the image reader 2150 is continuously outputted. In this case, as the displacement detection signal S3 is inputted within 5 ms in step SO8, the loop in step SO5 to step SO7 is repeated. When the displacement parameter k reaches "4" (the displacement is more than the threshold value), the read control section 2152 recognizes a result of determination in step SO7 as "Yes" and the system control is shifted to step SO9. In step SO9, as described above, the read control section 2152 issues an instruction for deciding a condition for reading (e.g., threshold value for digitizing) to the read condition deciding section 2153.

With this operation, the read condition deciding section 2153 decides an optimal condition for reading (threshold value for digitizing) from the image data by one line on the document read in the image reading section 107 and sets the condition in the image reading section 107. In step SO10, an image is read according to the condition for reading (threshold value for digitizing) each time a drive signal S2 is inputted from the read control section 2152 to the image reading section 107 at each specified time interval.

Figure 110:
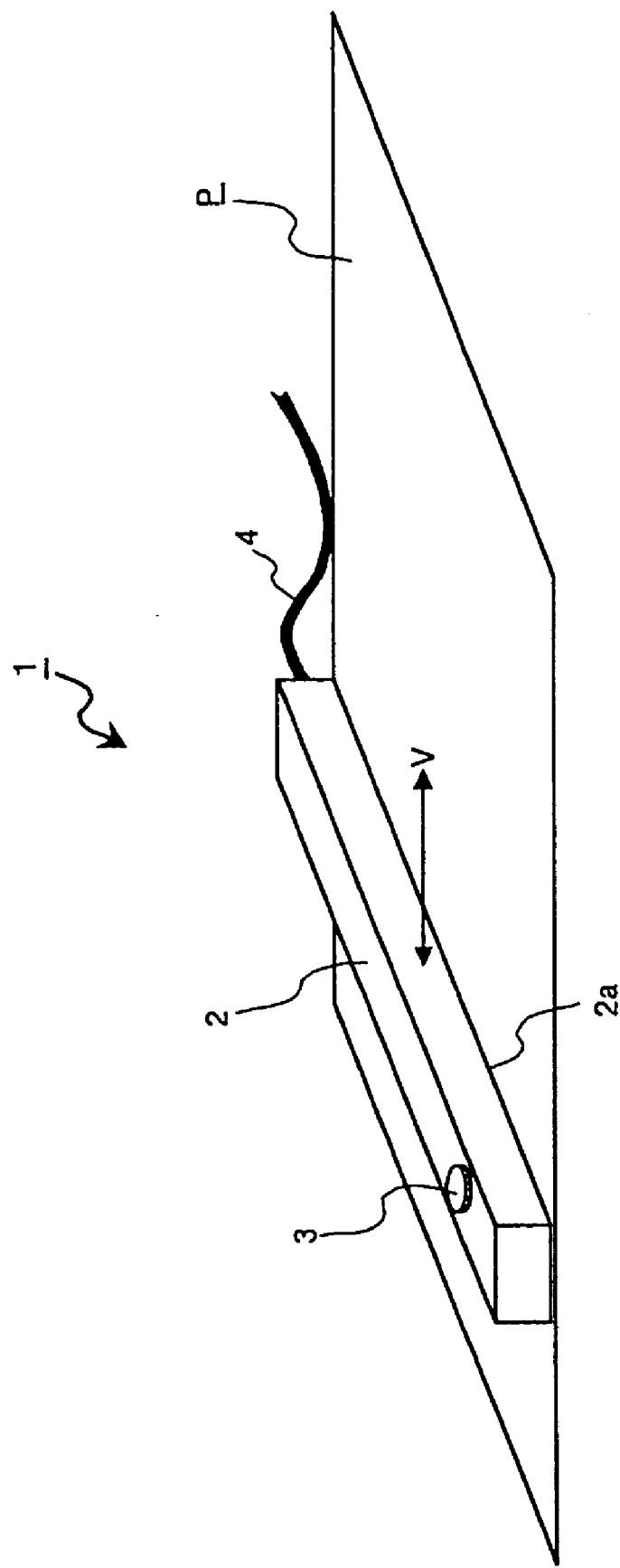
FIG. 110 is a perspective view showing appearance and configuration of the image reader 1 based on the conventional technology.
Figure 111:
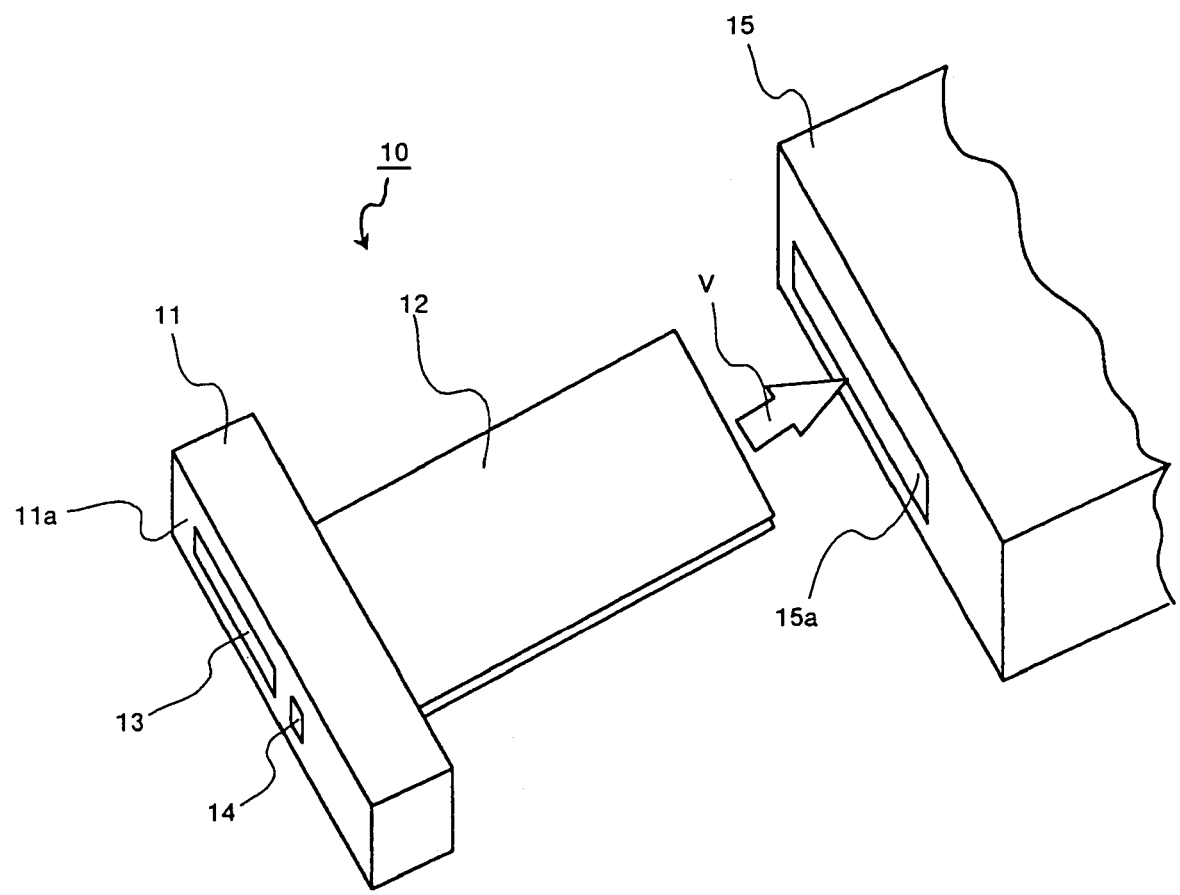
FIG. 111 is a perspective view showing appearance and configuration of an image reader 10 based on the conventional technology.
Figure 112:
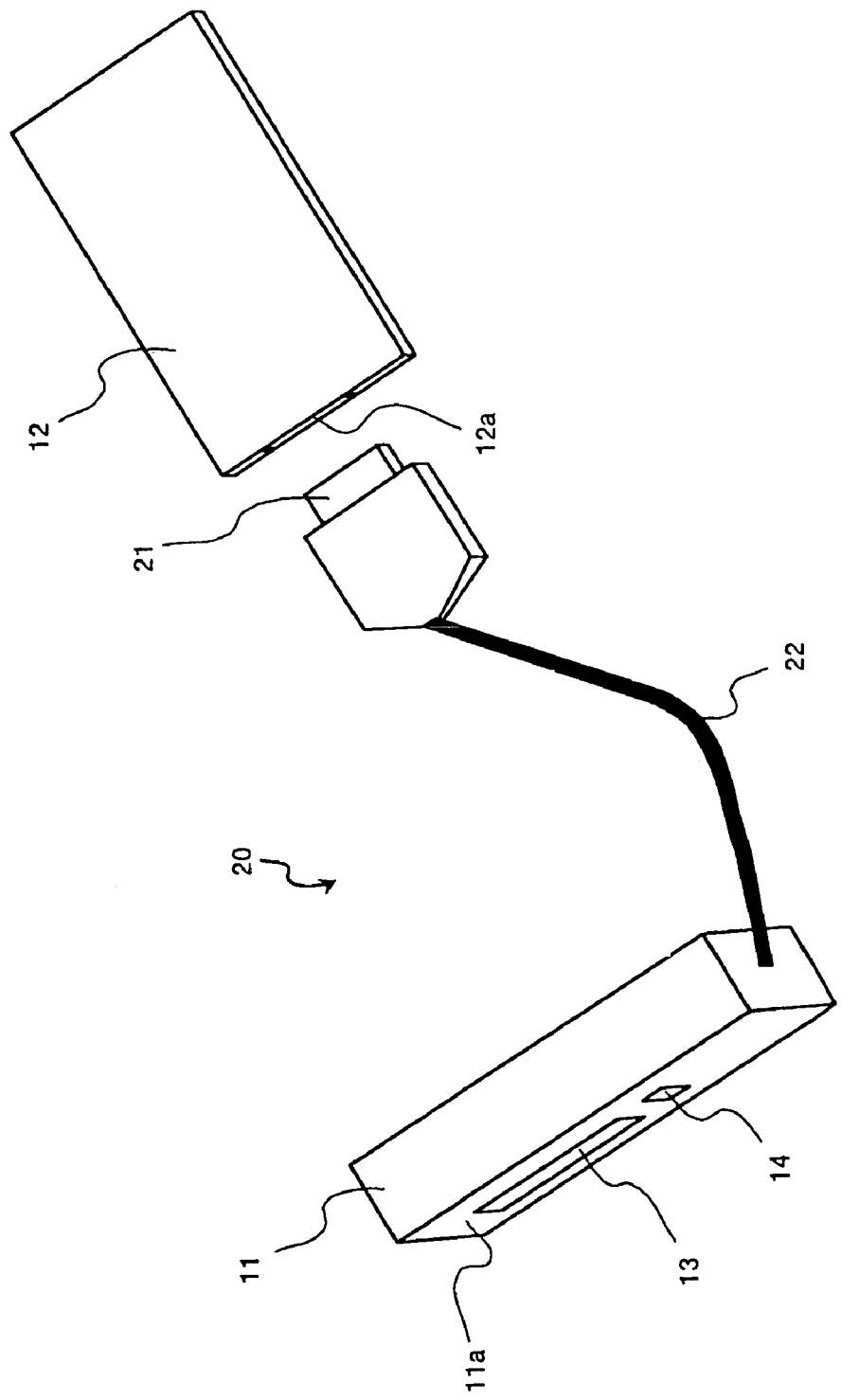
FIG. 112 is a perspective view showing appearance and configuration of an image reader 20 based on the conventional technology.

Although the description has assumed the case of a threshold value for digitizing as a condition for reading in the image reader 2150 according to Embodiment 17, the condition for reading is not limited to the above case, and any other condition may be employed. Furthermore, the method of deciding a condition for reading of an image having been described in Embodiment 17 is applicable to any of Embodiments 1 to 16 described above. In addition, the above mentioned deciding method is also applicable to an image reader 1 having an operation key 3 shown in FIG. 110. In this case, in step SN1 shown in FIG. 86, the user presses the operation key 3. With this operation, the sequence of operations in step SN2 to step SN7 is executed.

As described above, with the image reader 2150 according to Embodiment 17, the fact that the image reading section 107 contacts the document and the operation of read is stated by the user is detected by the document detecting section 105 and the displacement detecting section 401, and then a condition for reading (threshold value for digitizing) is decided, so that decision of a read condition based on recognition of space as a document surface like in the conventional technology can be prevented. Namely, a condition for reading is always decided according to image data for a document as an object for reading. Therefore, with the image reader 2150 according to Embodiment 17, image reading is carried out according to an optimal condition for reading correlated to the document, so that an image with high quality can be obtained at any time.

In addition, with the image reader 2150 according to Embodiment 17 (first example of the operation), a condition for reading is not decided until a displacement exceeds a threshold value, so that a malfunction which occurs when the device slightly moves due to influence of vibrations can be prevented.

Furthermore, with the image reader 2150 according to Embodiment 17 (second example of the operation), in step SO4 to step SO8 shown in FIG. 87, when a displacement within 5 ms does not reach a preset distance, by setting the displacement parameter k to "0", accumulation of the displacement due to vibrations can be reset. As described above, in the second example of the operation, malfunction due to accumulation of each displacement based on malfunction due to vibrations can be prevented, so that reliability and adaptability for handling of the device are further enhanced.

Figure 88:
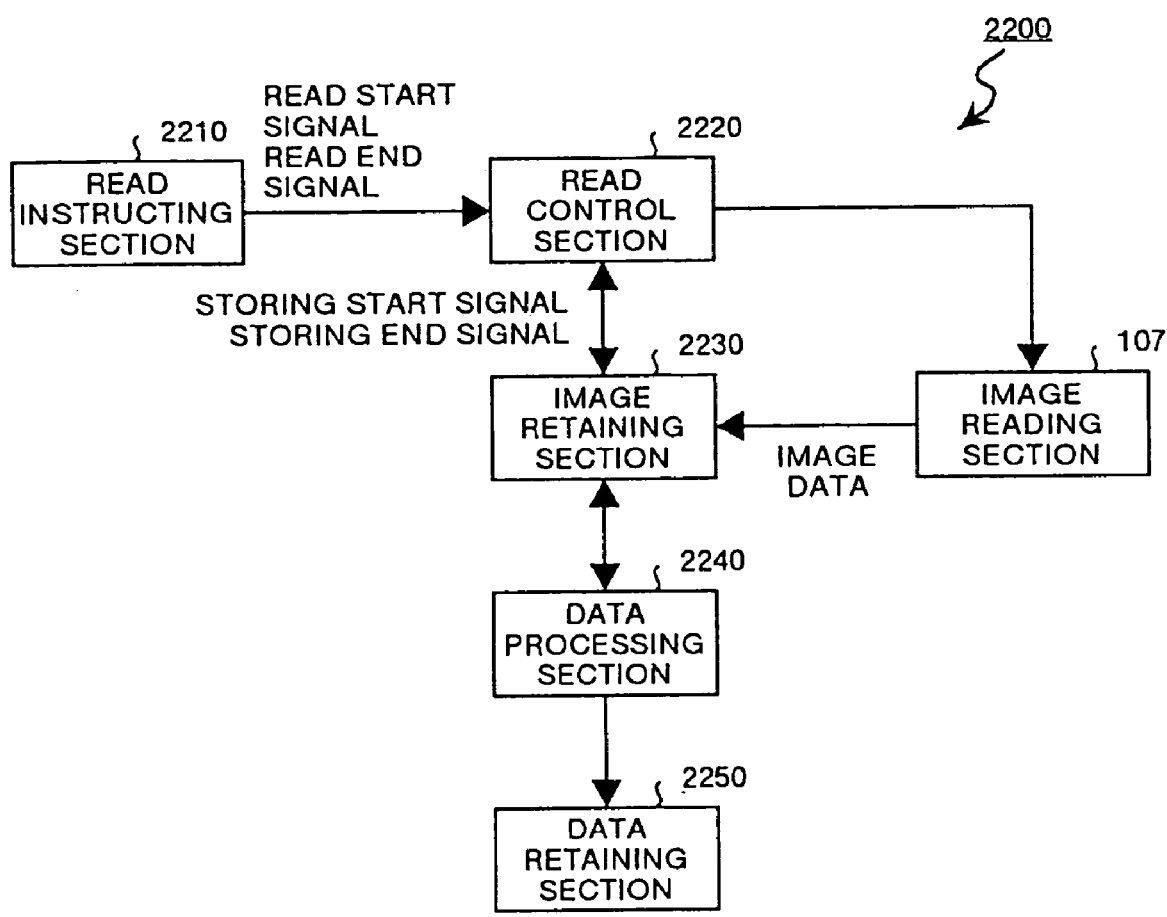
FIG. 88 is a block diagram showing configuration of an image reader 2200 according to Embodiment 18 of the present invention.
Figure 89:
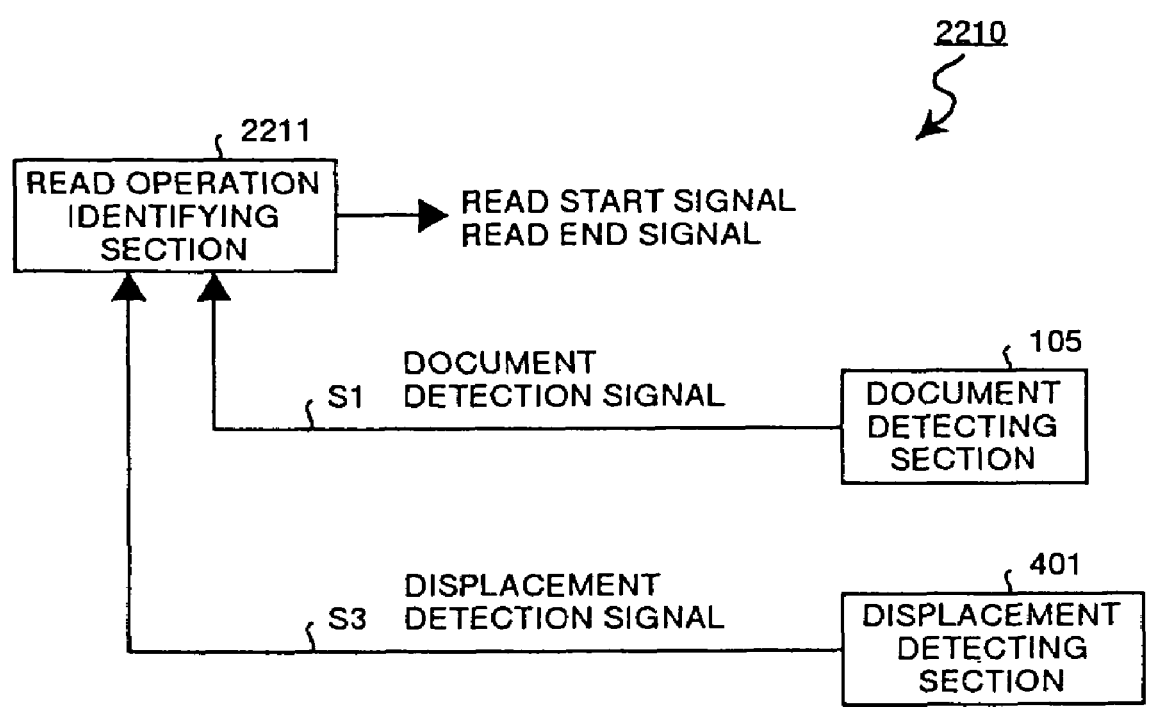
FIG. 89 is a block diagram showing configuration of a read instructing section 2210 shown in FIG. 88.
Figure 90:
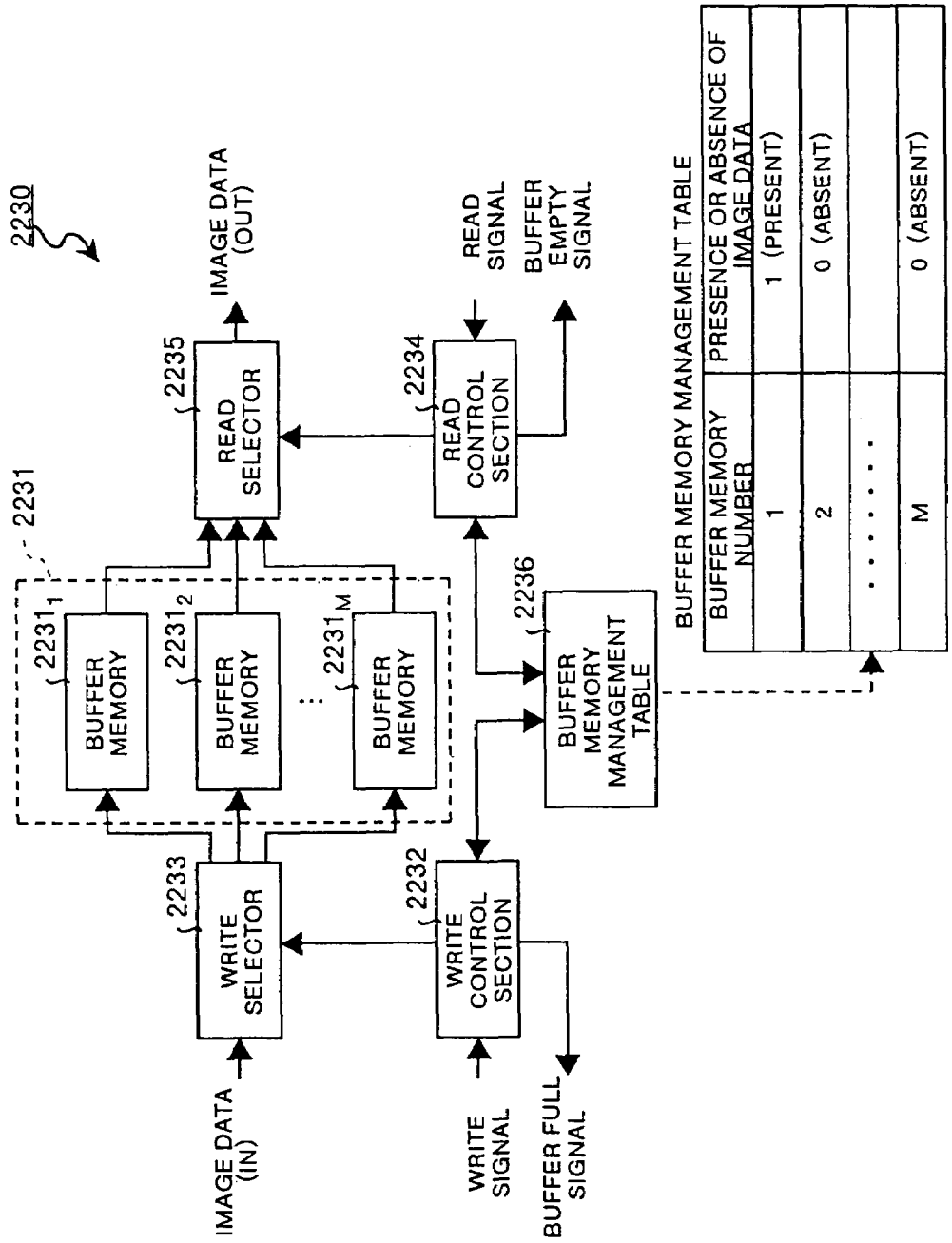
FIG. 90 is a block diagram showing configuration of an image retaining section shown in FIG. 88.

Description is made for an image reader 2200 according to Embodiment 18 of the present invention with reference to FIG. 88, FIG. 89 and FIG. 90. FIG. 88 is a block diagram showing configuration of the image reader 2200 according to Embodiment 18, and FIG. 89 is a block diagram showing configuration of a read instructing section 2210 shown in FIG. 88. FIG. 90 is a block diagram showing configuration of an image retaining section 2230 shown in FIG. 88. In FIG. 88 and FIG. 89, the same reference numerals are assigned to components corresponding to those in FIG. 13. Appearance and configuration of the image reader 2200 according to Embodiment 18 which will be described hereinafter is the same as those of the image reader 500 shown in FIG. 10.

Figure 114:
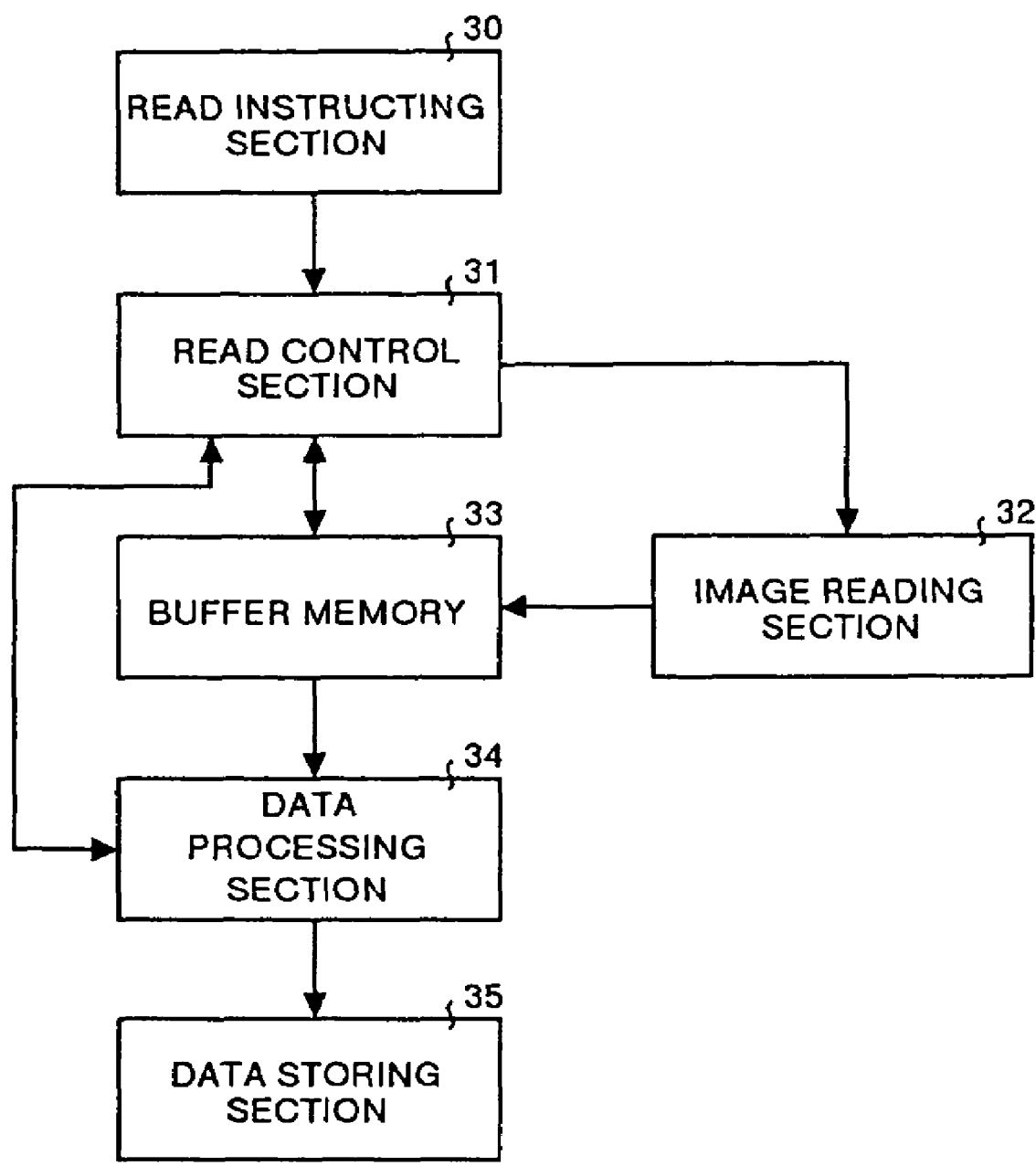
FIG. 114 is a block diagram showing configuration of the image reader based on the conventional technology.
Figure 115:
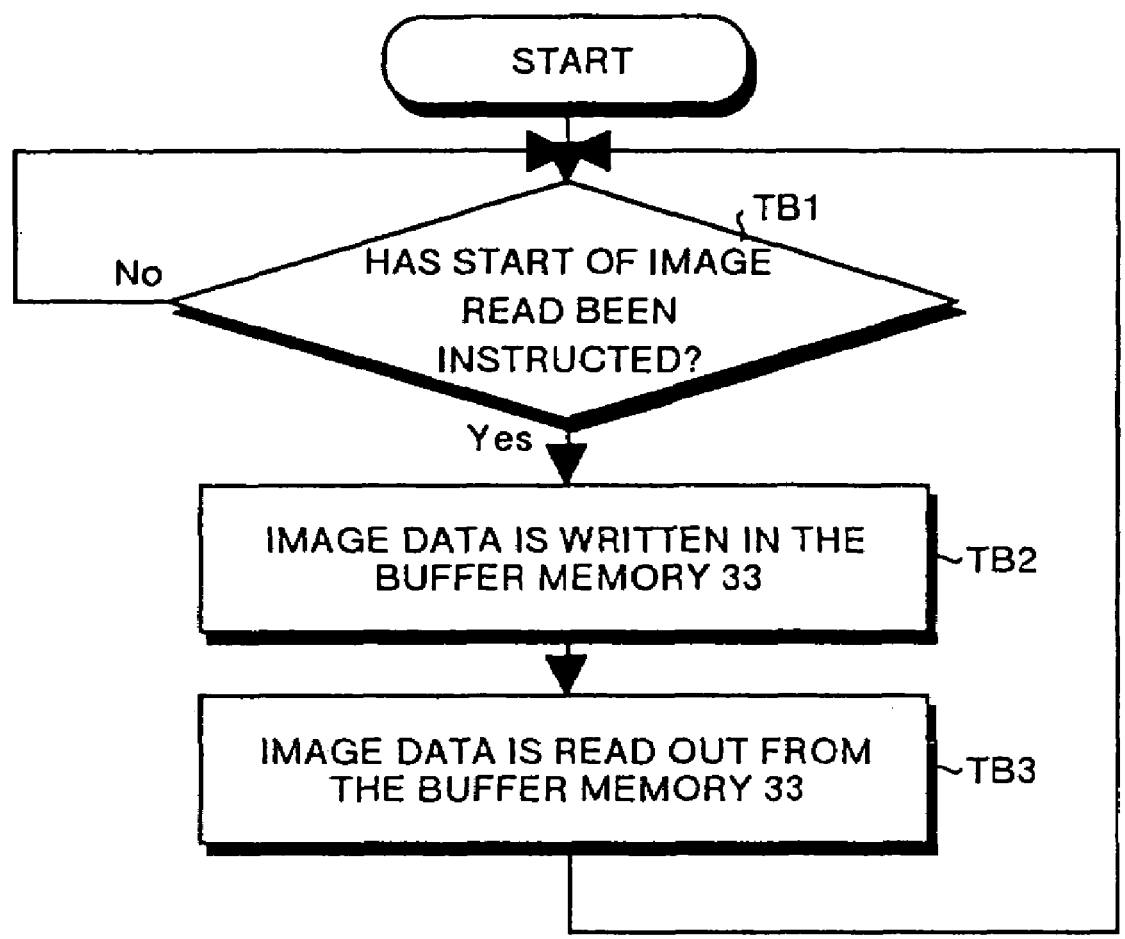
FIG. 115 is a flow chart showing an example 2 of operations of the image reader based on the conventional technology.
Figure 116:
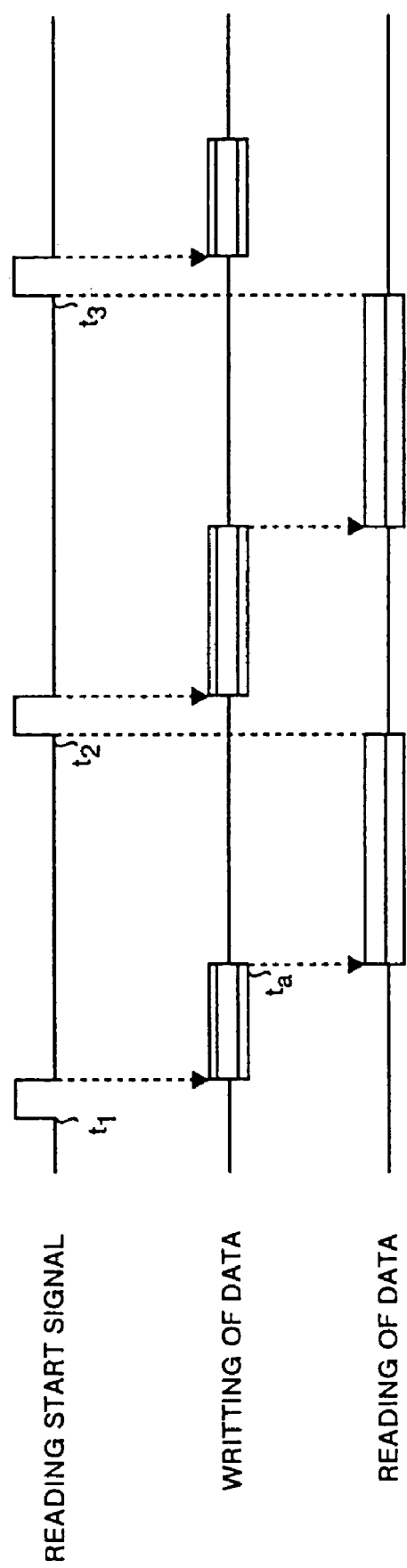
FIG. 116 is a flow chart showing an example 2 of operations of the image reader based on the conventional technology.

Herein, the image reader 2200 according to Embodiment 18 which will be described in detail hereinafter is provided in order to solving the problem in the conventional type of image reader having been described with reference to FIG. 114 to FIG. 116, namely the problem that adaptability for handling is not good enough because reading can not continuously be performed.

In FIG. 88, the image reader 2200 comprises an image reading section 107, the read instructing section 2210, a read control section 2220, the image retaining section 2230, a data processing section 2240, and a data retaining section 2250. The image reading section 107 optically reads an image on a document (not shown) and outputs the image as image data. The read instructing section 2210 instructs reading of image data using the image reading section 107 by outputting a read start signal for instructing start of reading an image on a document as well as a read end signal for instructing end of reading an image to the read control section 2220.

The read instructing section 2210 comprises as shown in FIG. 89 a read operation identifying section 2211, a document detecting section 105 (Refer to FIG. 13), a displacement detecting section 401 (Refer to FIG. 13). The read operation identifying section 2211 determines, when both a document detection signal S1 from the document detecting section 105 and a displacement detection signal S3 from the displacement detecting section 401 are inputted, that the image reader 2200 is placed on and slid along a document, namely that the operation of reading has been performed, and outputs a read start signal to the read control section 2220 (Refer to FIG. 88). The read operation identifying section 2211 determines, when input of the document detection signal S1 from the document detecting section 105 is stopped, that the operation of reading is terminated, and outputs a read end signal to the read control section 2220 (Refer to FIG. 88).

Returning to FIG. 88, the read control section 2220 controls an operation of reading upon input of a read start signal and a read end signal inputted by the read instructing section 2210 as a trigger. Details of an operation of the read control section 2220 will be described later with the help of a flow chart. The image retaining section 2230 is a memory for temporarily retaining the image data read by the image reading section 107 therein. Writing of image data in the image retaining section 2230 is controlled by the read control section 2220, while reading of the written image data is controlled by the data processing section 2240. Namely, in the image retaining section 2230, write control under the control of the read control section 2220 and read control under the control of the data processing section 2240 are performed concurrently respectively. Therefore, reading and writing can concurrently carried out in this image retaining section 2230.

Herein, detailed description is made for configuration of the image retaining section 2230 shown in FIG. 88 with reference to FIG. 90. In the figure, a buffer memory group 2231 comprises buffer memories M in number from $2231_1$ to $2231_M$, and image data from the image reading section 107 is written therein. In these M buffer memories $2231_1$ to $2231_M$, the numerical subscripts 1 to M are buffer memory numbers for identifying each memory.

In the buffer memories $2231_1$ to $2231_M$, when image data is to be written, any one of the buffer memories is selected by the write selector 2233 and image data is written in that selected buffer memory. In this case, an empty buffer memory with no image data stored therein is selected. A write control section 2232 provides controls for writing image data in the buffer memories 2231 under the control of the read control section 2220 (Refer to FIG. 88).

More specifically, the write control section 2232 provides, when an instruction for starting the storing is issued from the read control section 2220 (Refer to FIG. 88), namely when a write signal is inputted, controls over the write selector 2233 so that an empty buffer memory is selected from the buffer memories 2231 by referring to a buffer memory managing table 2236.

Herein, the buffer memory managing table 2236 is a table representing a correlation between the buffer memory numbers 1 to M of the buffer memory $2231_1$ to buffer memory $2231_M$ and a flag indicating presence or absence of image data in each of the buffer memory $2231_1$ to buffer memory $2231_M$ respectively. When this flag is "1" it indicates that image data is written in a corresponding buffer memory. In the example shown in the figure, image data is written in the buffer memory $2231_1$ with the buffer memory number "1".

On the other hand, When the flag is "0" it indicates that image data is not written in a corresponding buffer memory, namely that the corresponding buffer memory is empty. In the example shown in the figure, image data is not written in the buffer memory $2231_2$ and buffer memory $2231_M$ with the buffer memory number "2" and "M" respectively. The write control section 2232 outputs, when all the flags are "1" as a result of referring to the buffer memory managing table 2236, a buffer full signal indicating that there is no empty memory in the buffer memories $2231_1$ to $2231_M$ so that image data can not be written therein to the read control section 2220 (Refer to FIG. 88).

When image data is read out, any one of the buffer memories $2231_1$ to $2231_M$ is selected by a read selector 2235, image data is read out from the selected memory, and is subjected to data processing by the data processing section 2240 (Refer to FIG. 88). In this case, a buffer memory with image data stored therein is selected. A read control section 2234 provides controls for reading image data from the buffer memory group 2231.

More specifically, the read control section 2234 provides, when an instruction for starting of reading is issued from the data processing section 2240 (Refer to FIG. 88), namely when a read signal is inputted, controls over the read selector 2235 so that a buffer memory with image data written therein is selected from the buffer memories 2231 by referring to the buffer memory managing table 2236. The read control section 2234 outputs, when all the flags are "0" as a result of referring to the buffer memory managing table 2236, a buffer empty signal indicating that all the buffer memories $2231_1$ to $2231_M$ are empty, namely that all the image data is read out from the buffer memories $2231_1$ to $2231_M$ to the data processing section 2240.

Returning to FIG. 88, the data processing section 2240 subjects the read-out image data to data processing such as correction of inclination thereof or data contraction by providing read controls over the image retaining section 2230. The data retaining section 2250 retains therein image data subjected to data processing by the data processing section 2240.

Figure 91:
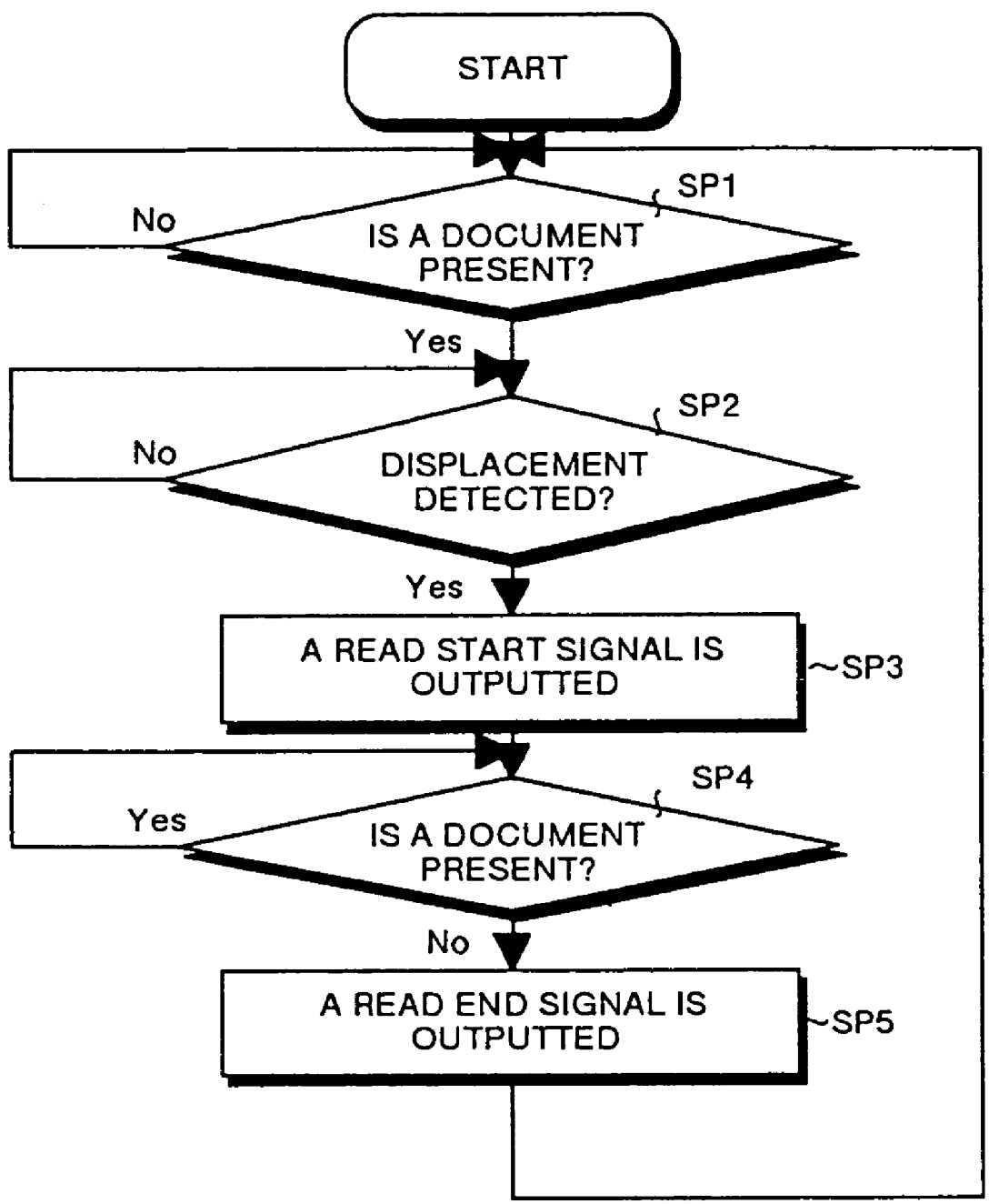
FIG. 91 is a flow chart showing operations of the read instructing section shown in FIG. 88.
Figure 92:
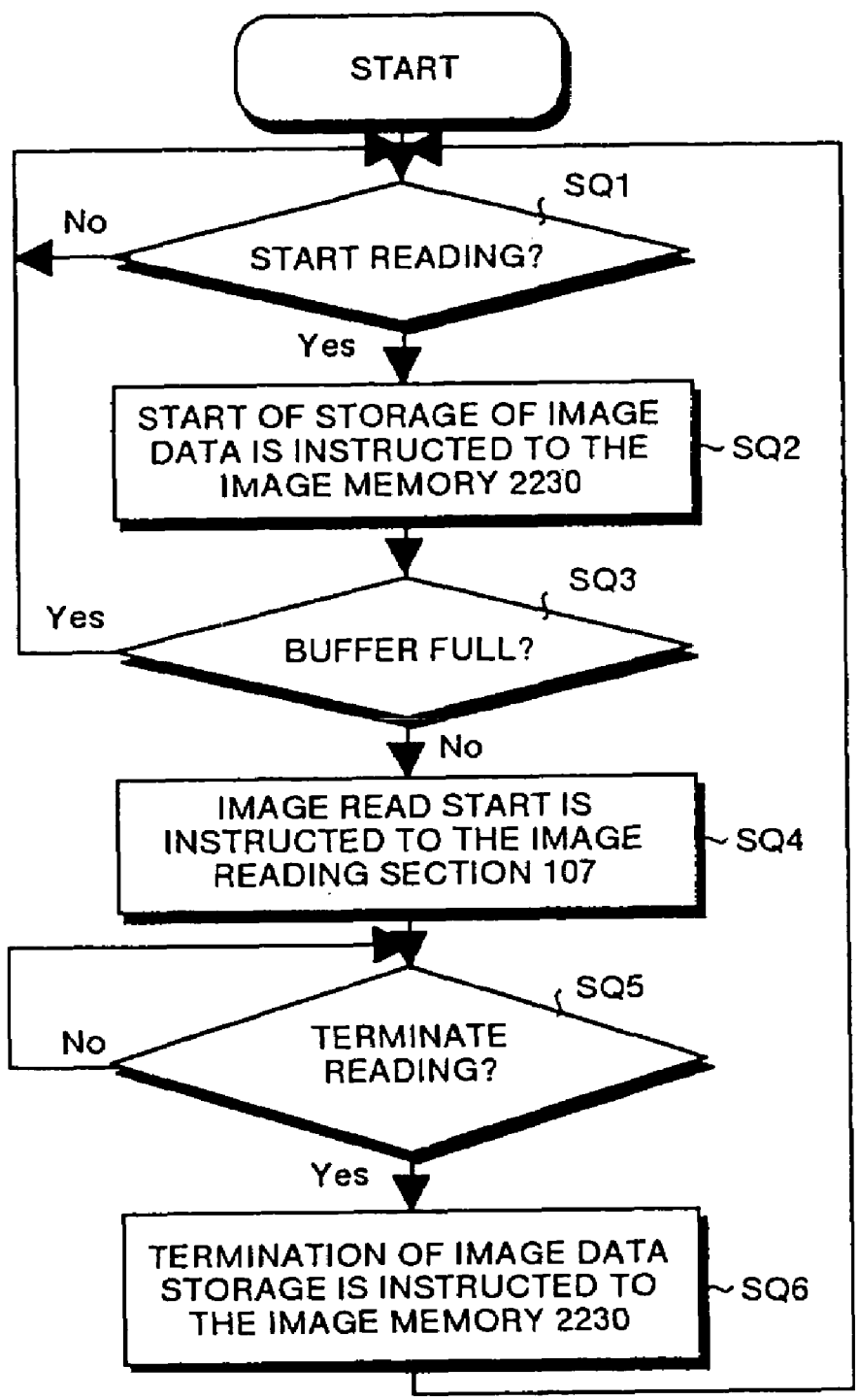
FIG. 92 is a flow chart showing operations of a read control section shown in FIG. 88.
Figure 93:
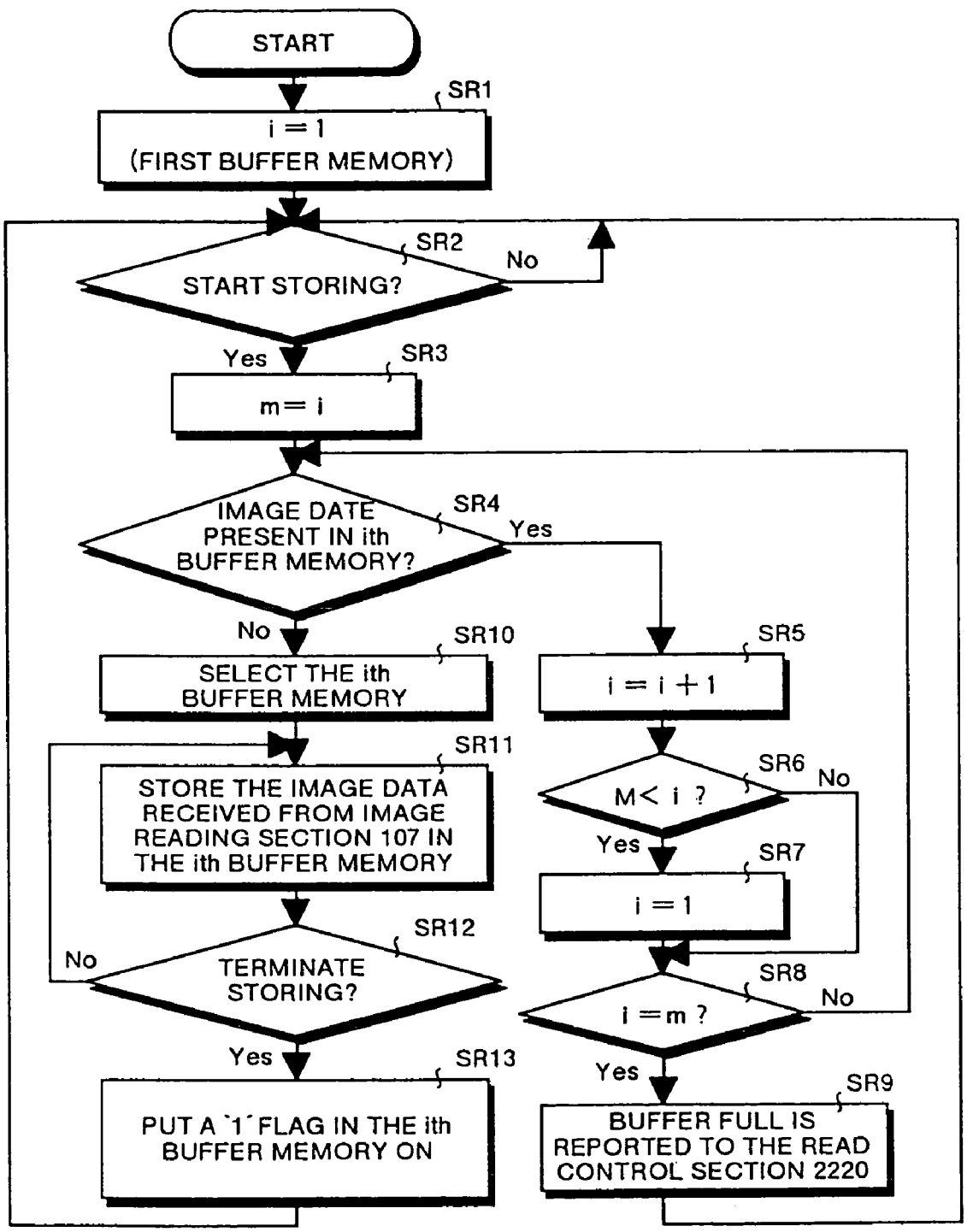
FIG. 93 is a flow chart showing operations for writing an image in the image retaining section shown in FIG. 90.
Figure 94:
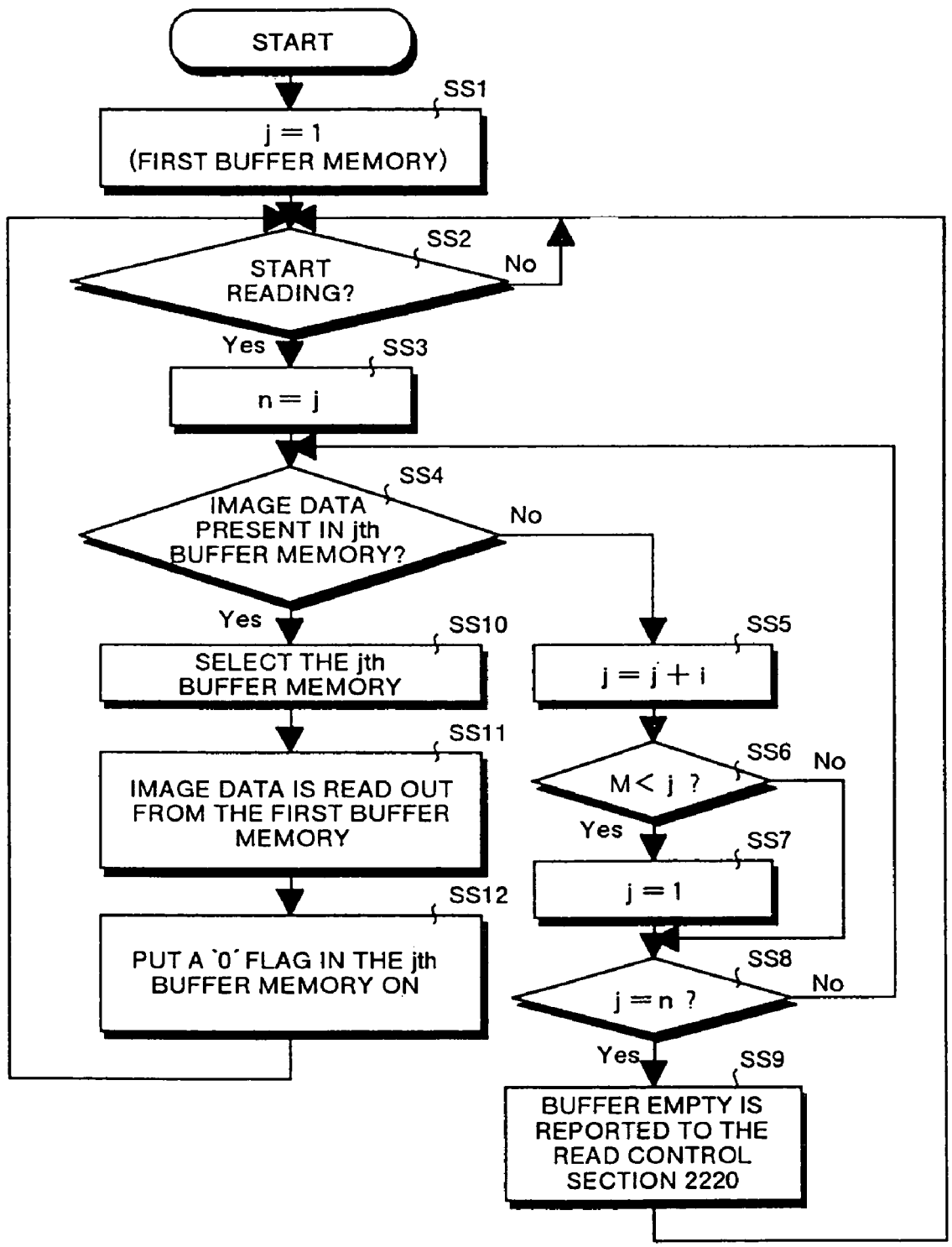
FIG. 94 is a flow chart showing operations of reading an image form the image retaining section 2230 shown in FIG. 90.

Next, operation of the image reader 2200 according to Embodiment 18 will be described with reference to flow charts shown in FIG. 91 to FIG. 94 respectively. FIG. 91 is a flow chart for explaining operations performed by the read instructing section 2210 shown in FIG. 88, and FIG. 92 is a flow chart for explaining operations performed by the read control section 2220 shown in FIG. 88. FIG. 93 is a flow chart for explaining an operation of writing in the image retaining section 2230 shown in FIG. 90, and FIG. 94 is a flow chart for explaining an operation of reading in the image retaining section 2230 shown in FIG. 90.

Description will assume hereinafter a case where a total number M of buffer memories in the buffer memory group 2231 shown in FIG. 90 is "3". It will also be assumed that image data is not written in the buffer memories $2231_1$ to $2231_M$. Therefore, in the buffer memory managing table 2236 in this case, all the flags correlating to the buffer memory numbers "1" to "M" (=3) are "0". Therefore, in this case, a buffer empty signal (Refer to FIG. 95) is outputted from the read control section 2234 to the data processing section 2240, while a buffer full signal (Refer to FIG. 95) is not outputted from the write control section 2232.

Under the conditions described above, the read instructing section 2210 determines in step SP1 shown in FIG. 91 whether a document (not shown) has been detected by the document detecting section 105 (Refer to FIG. 89) or not. More specifically, the read instructing section 2210 determines whether a document detection signal S1 has been inputted from the document detecting section 105 or not, and repeats the same determination when the result of determination is "No".

Concurrently with the above operation, the read control section 2220 (Refer to FIG. 88) determines whether an instruction for starting of reading is inputted from the read instructing section 2210 or not in step SQ1 shown in FIG. 92. More specifically, the read control section 2234 determines whether a read start signal has been inputted from the read operation identifying section 2211 (Refer to FIG. 89) or not, and repeats the same determination when the result of determination is "No".

Furthermore, concurrently with the operations of the read instructing section 2210 as well as the read control section 2220, the next operation is executed in the write control section 2232 and read control section 2234 shown in FIG. 90. Namely, in step SR1 shown in FIG. 93, the write control section 2232 substitutes "1" in the parameter i for selection of a write buffer memory, and then the system control shifts to step SR2. Herein the parameter i for selection of a write buffer memory is an internal parameter corresponding to a buffer memory number of a buffer memory as a candidate for writing image data therein in the buffer memory group 2231. In step SR2, the write control section 2232 determines whether an instruction for starting the storing has been inputted from the read control section 2220 (Refer to FIG. 88) or not. In this case, as the instruction for starting the storing is not received, the write control section 2232 recognizes a result of determination in step SR2 as "No", and repeats the same determination.

On the other hand, in step SS1 shown in FIG. 94, the read control section 2234 substitutes "1" in the parameter j for selection of a read buffer memory, and then the system control shifts to step SS2. Herein the parameter j for selection of a read buffer memory is an internal parameter corresponding to a buffer memory number of a buffer memory as a candidate for reading image data therefrom in the buffer memory group 2231. In step SS2, the read control section 2234 determines whether an instruction for starting of the reading has been inputted from the data processing section 2240 (Refer to FIG. 88) or not. In this case, as the instruction for starting of the reading is not received, the read control section 2234 recognizes a result of determination in step SS2 as "No", and repeats the same determination.

Then, the user places the image reader 2200 on a document (not shown) in a state where the user is grasping the image reader 2200 to perform a first image read so that the image reading surface thereof (not shown) contacts the document. When the reader is placed on the document, the document detecting section 105 (Refer to FIG. 89) is located close to the document, so that a document detection signal S1 is outputted from the document detecting section 105 to the read operation identifying section 2211. With this operation, the read operation identifying section 2211 recognizes a result of determination in step SP1 as "Yes" and the system control is shifted to step SP2. In step SP2, the read operation identifying section 2211 determines whether a displacement of the image reader 2200 has been detected or not according to whether a displacement detection signal S3 has been inputted from the displacement detecting section 401 or not, and repeats the same determination when a result of determination is "No".

Then, the user contacts, in a state where the user is grasping the image reader 2200 to start the first image read, the image reading surface thereof to the document and slides the reader along the document in the scanning direction under the same situation as that shown in FIG. 1. With this operation, by outputting the displacement detection signal S3 from the displacement detecting section 401, the read operation identifying section 2211 recognizes a result of determination in step SP2 as "Yes" and the system control is shifted to step SP3. In step SP3, the read operation identifying section 2211 outputs a read start signal to the read control section 2220 shown in FIG. 88.

With this operation, the read control section 2220 recognizes a result of determination in step SQ1 shown in FIG. 92 as "Yes" and the system control is shifted to step SQ2. In step SQ2, the read control section 2220 outputs a write signal for issuing an instruction for starting the storing to the write control section 2232 in the image retaining section 2230 at time t1 shown in FIG. 95, and then the system control shifts to step SQ3.

In step SQ3, the read control section 2220 determines whether the buffer memories 2231 are in a buffer full state or not according to whether a buffer full signal has been inputted from the write control section 2232 (Refer to FIG. 90) or not, in this case, the read control section 2220 recognizes a result of determination as "No" and the system control is shifted to step SQ4. In step SQ4, the read control section 2220 issues an instruction for starting the reading to the image reading section 107, and then the system control shifts to step SQ5. With this, the image reading section 107 starts reading of an image on the document and outputs image data by one line. In step SQ5, the read control section 2220 determines whether an instruction for termination of reading has been inputted from the read operation identifying section 2211 (Refer to FIG. 89) of the read instructing section 2210 or not according to whether a read end signal has been inputted or not. Namely, it is determined whether the first operation of reading by the user is finished or not. In this case, the read control section 2220 recognizes a result of determination in step SQ5 as "No" and repeats the same determination.

Figure 95:
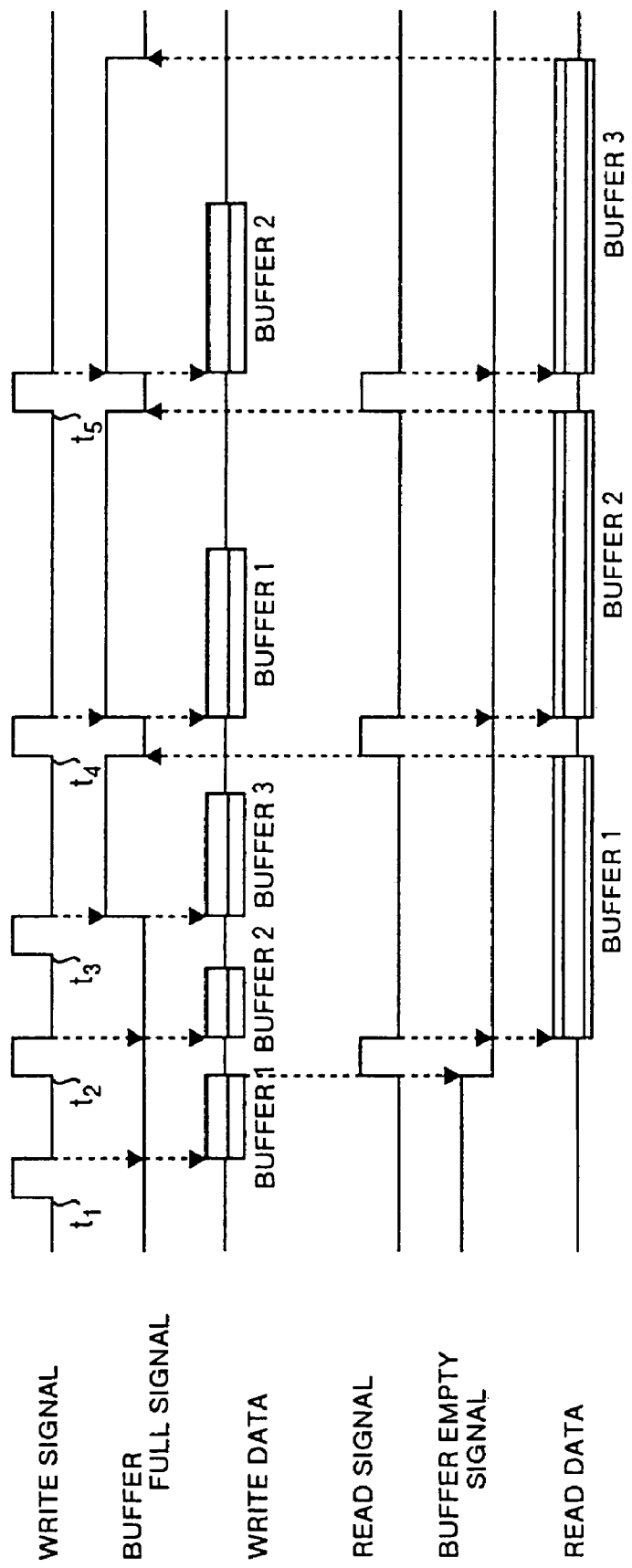
FIG. 95 is a view showing operations of an image reader 2200 according to Embodiment 18.

When in step SQ2 a write signal is outputted to the write control section 2232 (Refer to FIG. 90) at time t1 shown in FIG. 95, the write control section 2232 (Refer to FIG. 90) in step SR2 shown in FIG. 93 recognizes a result of determination as "Yes" and the system control is shifted to step SR3. In step SR3, the write control section 2232 substitutes the parameter i (=1) for selection of a write buffer memory in a selection-start buffer memory constant m, and then the system control shifts to step SR4. Herein, the selection-start buffer memory constant m represents a buffer memory number of a buffer memory to be first selected in the buffer memory group 2231. In this case, the selection-start buffer memory constant m is 1.

In step SR4, the write control section 2232 determines whether image data has been written in an i-th buffer memory with the same number as the parameter i for selection of a write buffer memory in the buffer memories 2231 or not. In this case, the write control section 2232 determines whether image data has been written in the first buffer memory $2231_1$ or not, and recognizes a result of determination as "No" and the system control is shifted to step SR10. In step SR10, the write control section 2232 selects the i-th buffer memory with the same number as the parameter i for selection of a write buffer memory in the buffer memory group 2231. In this case, the write control section 2232 selects the first buffer memory $2231_1$, and then the system control shifts to step SR11. In step SR11, the write control section 2232 starts controlling image data from the image reading section 107 to be stored as write data ("buffer 1") shown in FIG. 95 by controlling the write selector 2233, and then the system control shifts to step SR12. With this operation, image data obtained by the first operation of reading an image is successively stored in the buffer memory $2231_1$ by one line.

In step SR12, the write control section 2232 determines whether an instruction for termination of storage has been inputted from the read control section 2220 or not. Namely, the write control section 2232 determines whether the first operation of reading has been finished or not. In this case, as the first operation of reading is still on, the write control section 2232 recognizes a result of determination in step SR12 as "No" and the system control is returned to step SR11 to repeat the step SR11 and step SR12.

Then, when the first operation of reading is finished, the user separates the image reader 2200 from the document. With this operation, output of the document detection signal S1 from the document detecting section 105 (Refer to FIG. 89) is stopped, so that the read operation identifying section 2211 recognizes a result of determination in step SP4 shown in FIG. 91 as "No" and the system control is shifted to step SP5. In step SP5, the read operation identifying section 2211 outputs a read end signal to the read control section 2220 and the system control is returned to step SP1, and repeats the sequence of operations described above. In this case, as the second operation of reading is not started, the read operation identifying section 2211 recognizes a result of determination in step SP1 as "No", and repeats the same determination.

Then, when the read end signal is inputted from the read operation identifying section 2211, the read control section 2220 recognizes a result of determination in step SQ5 shown in FIG. 92 as "Yes" and the system control is shifted to step SQ6. In step SQ6, the read control section 2220 issues, by stopping output of a write signal, an instruction for terminating storage of image data to the write control section 2232 (Refer to FIG. 90) of the image retaining section 2230. With this operation, the write control section 2232 shifts the system control to step SR13.

In step SR13, the write control section 2232 sets "1" at a flag corresponding to the buffer memory number 1 in the buffer memory managing table 2236 and the system control is returned to step SR2, and repeats the sequence of operations described above. Namely, the write control section 2232 recognizes a result of determination in step SR2 as "No" and repeats the same determination until the instruction for starting of storing in association with starting the second operation of reading is inputted.

The read control section 2234 reports to the data processing section 2240 (Refer to FIG. 88) that image data to be read out exists in the buffer memory group 2231 through the fact that "1" is set at the flag with the buffer memory number 1 in the buffer memory managing table 2236. Namely, the read control section 2234 stops output of a buffer empty signal (Refer to FIG. 95E) to the data processing section 2240.

With this operation, a read signal (Refer to FIG. 95) is outputted from the data processing section 2240 to the read control section 2234, and the read control section 2234 recognizes a result of determination in step SS2 shown in FIG. 94 as "Yes" and the system control is shifted to step SS3. In step SS3, the read control section 3422 substitutes the parameter j (=1) for selection of a read buffer memory in a selection-start buffer memory constant n, and then the system control shifts to step SS4. Herein, the selection-start buffer memory constant n represents a buffer memory number of a buffer memory to be first selected in the buffer memory group 2231. In this case, the selection-start buffer memory constant n is 1.

In step SS4, the read control section 2234 determines whether image data has been written in a j-th buffer memory with the same number as the parameter j for selection of a read buffer memory in the buffer memory group 2231 or not. In this case, the read control section 2234 determines whether image data has been written in the first buffer memory 2231$_1$ or not, and recognizes a result of determination as "Yes" in this case with the system control is shifted to step SS10. In step SS10, the read control section 2234 selects the j-th buffer memory with the same number as the parameter j for selection of a read buffer memory in the buffer memory group 2231.

In this case, the read control section 2234 selects the first buffer memory 2231$_1$, and then the system control shifts to step SS11. In step SS11, the read control section 2234 starts controlling image data stored in the buffer memory 2231$_1$ to be read out as read data ("buffer 1") shown in FIG. 95 by controlling the read selector 2235, and then the system control shifts to step SS12. With this operation, the above mentioned read data is successively read out to the data processing section 2240 by one line, and the data processing section 2240 subjects the read-out data to data processing as the postprocessing described above.

Herein, when the image reader 2200 is placed on a document and moved in a scanning direction by the user to perform a second image read, a document detection signal S1 and a displacement detection signal S3 are inputted from the document detecting section 105 and the displacement detecting section 401 to the read operation identifying section 2211 through the operation described above. With this operation, the read operation identifying section 2211 recognizes each result of determination in step SP1 and step SP2 shown in FIG. 91 as "Yes", and outputs a read start signal to the read control section 2220 (Refer to FIG. 88) in step SP3.

With this operation, the read control section 2220 recognizes a result of determination in step SQ1 shown in FIG. 92 as "Yes" and the system control is shifted to step SQ2, and outputs a write signal to issue an instruction for starting the storing to the write control section 2232 of the image retaining section 2230 at time t2 shown in FIG. 95, and then the system control shifts to step SQ3. In step SQ3, the read control section 2220 recognizes, as a buffer full signal is not inputted, a result of determination as "No" and the system control is shifted to step SQ4. In step SQ4, the read control section 2220 issues an instruction for starting of the reading to the image reading section 107, and then the system control shifts to step SQ5. With this operation, the image reading section 107 starts reading the image a second time, and outputs image data by one line. In step SQ5, the read control section 2220 recognizes, as an instruction for termination of reading is not inputted, a result of determination as "No" and repeats the same determination.

When in step SQ2 the write signal is inputted to the write control section 2232 (Refer to FIG. 90) at time t2 shown in FIG. 95, the write control section 2232 (Refer to FIG. 90) in step SR2 shown in FIG. 93 recognizes a result of determination as "Yes" and the system control is shifted to step SR3. In step SR3, the write control section 2232 substitutes a parameter i (=1) for selection of a write buffer memory in the selection-start buffer memory constant m, and then the system control shifts to step SR4.

In step SR4, the write control section 2232 determines whether image data has been written in the first buffer memory 2231$_1$ by referring to the buffer memory managing table 2236 by performing the same operation as described above. In this case, write control section 2232 recognizes, as image data is written in the first buffer memory 2231$_1$, a result of determination as "Yes" and the system control is shifted to step SR5. In step SR5, the write control section 2232 increments the parameter i for selection of a write buffer memory by one, and then the system control shifts to step SR6. In this case, the parameter i for selection of a write buffer memory is 2.

In step SR6, the write control section 2232 determines whether the parameter i (=2) for selection of a write buffer memory is larger than the total number M (=3) of buffer memories or not. In this case, the write control section 2232 recognizes a result of determination as "No" and the system control is shifted to step SR8. In step SR8, the write control section 2232 determines whether the parameter i (=2) for selection of a write buffer memory is equal to the selection-start buffer memory constant m (=1) or not. Namely, in step SR8, it is determined whether checking for presence or absence of image data is performed to all the buffer memories in the buffer memory group 2231 or not. In this case, the write control section 2232 recognizes a result of determination in step SR8 as "No" and the system control is returned to step SR4.

In step SR4, the write control section 2232 determines whether image data has been stored in the second buffer memory $2231_2$ by referring the buffer memory managing table 2236 through the same operation as described above. In this case, the write control section 2232 recognizes a result of determination in step SR4 as "No" and the system control is shifted to step SR10. In step SR10, the write control section 2232 selects the second buffer memory $2231_2$, and then the system control shifts to step SR11.

In step SR11, the write control section 2232 starts controlling image data from the image reading section 107 to be stored as write data ("buffer 2") shown in FIG. 95 by controlling the write selector 2233, and then the system control shifts to step SR12. With this operation, image data obtained by the second operation of reading an image is successively stored in the second buffer memory $2231_2$ by one line. In step SR12, the write control section 2232 determines whether an instruction for termination of storage has been inputted from the read control section 2220 or not, recognizes a result of determination in step SR12 as "No" as the second operation of reading is still on in this case with the system control returned to step SR11, and repeats the sequence of operations described above.

Then, when the second operation of reading is finished, the user separates the image reader 2200 from the document. With this operation, output of the document detection signal S1 from the document detecting section 105 (Refer to FIG. 89) is stopped, so that the read operation identifying section 2211 recognizes a result of determination in step SP4 shown in FIG. 91 as "No" and the system control is shifted to step SP5. In step SP5, the read operation identifying section 2211 outputs a read end signal to the read control section 2220 and the system control is returned to step SP1, and repeats the sequence of operations described above. In this case, as the third operation of reading is not started, the read operation identifying section 2211 recognizes a result of determination in step SP1 as "No", and repeats the same determination.

Then, when the read end signal is inputted from the read operation identifying section 2211, the read control section 2220 recognizes a result of determination in step SQ5 shown in FIG. 92 as "Yes" and the system control is shifted to step SQ6. In step SQ6, the read control section 2220 issues, by stopping output of a write signal, an instruction for terminating storage of image data to the write control section 2232 (Refer to FIG. 90) of the image retaining section 2230. With this operation, the write control section 2232 recognizes a result of determination in step SR12 as "No" and the system control is shifted to step SR13, sets "1" at the flag corresponding to the second buffer memory in the buffer memory managing table 2236 and then the system control returned to step SR2, and repeats the sequence of operations described above. Namely, in this case, "1" is set at flags corresponding to the first and second buffer memories respectively in the buffer memory managing table 2236.

After the step, when a third operation of reading an image is started in the middle of reading data (Refer to FIG. 95) from the first buffer memory $2231_1$, a write signal is inputted in the write control section 2232 at time t3 shown in FIG. 95 through the operation described above. With this operation, a third buffer memory $2231_3$ is selected in step SR10 (Refer to FIG. 93) by the write control section 2232, and the write data (Buffer 3) shown in FIG. 95 is written in the third buffer memory $2231_3$. Then, "1" is set at the flag corresponding to the third buffer memory $2231_3$ in the buffer memory managing table 2236 shown in FIG. 90, and the parameter i for selection of a write buffer memory is 3.

Then, when a fourth operation of reading an image is started immediately after the third operation of image read is finished, a write signal is inputted into the write control section 2232 through the operation described above. However, as the read data is in the middle of being read from the buffer memory $2231_1$ as shown in FIG. 95, there is no empty buffer memory in the buffer memory group 2231. Therefore, it is not possible to write the data for storing in the buffer memory group 2231 in this case.

In step SR2 shown in FIG. 93, the write control section 2232 recognizes a result of determination as "Yes" and the system control shifted to step SR3, substitutes the parameter i (=3) for selection of a write buffer memory in a selection-start buffer memory constant m, and then the system control shifts to step SR4. Instep SR4, the write control section 2232 determines where image data has been written in the third buffer memory $2231_3$ or not by referring to the buffer memory managing table 2236. In this case, the write control section 2232 recognizes, as image data is written in the third buffer memory $2231_3$, a result of determination as "Yes" with the system control shifted to step SR5.

In step SR5, the write control section 2232 increments the parameter i (=3) for selection of a write buffer memory by one, and then the system control shifts to step SR6. In this case, the parameter i for selection of a write buffer memory is 4. In step SR6, the write control section 2232 determines whether the parameter i (=4) for selection of a write buffer memory is larger than the total number M (=3) of buffer memories or not. In this case, the write control section 2232 recognizes a result of determination as "Yes" and the system control is shifted to step SR7.

In step SR7, the write control section 2232 substitutes "1" in the parameter i for selection of a write buffer memory, and then the system control shifts to step SR8. In step SR8, the write control section 2232 determines whether the parameter i (=1) for selection of a write buffer memory is equal to the selection-start buffer memory constant m (=3) or not, and recognizes a result of determination in step SR8 as "No" in this case and the system control is returned to step SR4. After the step, the sequence of operations in step SR4 to step SR8 is repeated, and whether or not image data is stored in the buffer memories is checked in order of the first buffer memory $2231_1$ to the second buffer memory $2231_2$ and so on.

Then, in step SR8, when the parameter i (=3) for selection of a write buffer memory becomes equal to the selection-start buffer memory constant m (=3), the write control section 2232 recognizes a result of determination as "Yes" and the system control is shifted to step SR9, outputs a buffer full signal (Refer to FIG. 95) to the read control section 2220, and then the system control returns to step SR2. Namely, as there in no empty memory in the buffer memories 2231 in this case, the fourth operation of reading an image can not be performed.

When reading data (Refer to FIG. 95) from the first buffer memory $2231_1$ is finished, the data processing section 2240 outputs a read signal (Refer to FIG. 95) to the read control section 2234. With this operation, the read control section 2234 recognizes a result of determination in step SS2 shown in FIG. 94 as "Yes" and the system control is shifted to step SS3. In step SS3, the read control section 2234 substitutes a parameter j (1, in this case) for selection of a read buffer memory in the selection-start buffer memory constant n, and then the system control shifts to step SS4.

In step SS4, the read control section 2234 determines whether image data has been written in a j-th buffer memory $2231_1$ with the same number as the parameter j for selection of a read buffer memory or not by referring to the buffer memories 2236. In this case, the read control section 2234 recognizes, as image data is not written in the first buffer memory $2231_1$, a result of determination as "No" and the system control is shifted to step SS5.

In step SS5, the read control section 2234 increments the parameter j (=1) for selection of a read buffer memory by one, and then the system control shifts to step SS6. In this case, the parameter j for selection of a read buffer memory is "2". In step SS6, the read control section 2234 determines whether the parameter j (=2) for selection of a read buffer memory is larger than the total number M (=3) of buffer memories or not. In this case, the read control section 2234 recognizes a result of determination as "No" and the system control is shifted to step SS8. If the result of determination in step SS6 is "Yes", the system control is shifted to step SS7, and the read control section 2234 substitutes "1" in the parameter j for selection of a read buffer memory, and then the system control shifts to step SS8.

In step SS8, the read control section 2234 determines whether the parameter j (=2) for selection of a read buffer memory is equal to the selection-start buffer memory constant n (=1) or not, and recognizes a result of determination in this case as "No" and the system control is returned to step SS4. If the result of determination in step SS8 is "Yes", the read control section 2234 reports that there is no image data to be read in the buffer memories 2231 to the data processing section 2240 by outputting a buffer empty signal thereto with the system control returned to step SS2, and repeats the sequence of operations described above.

In step SS4, the read control section 2234 determines whether image data is stored in the second buffer memory $2231_2$ with the same number as the parameter j (=2) for selection of a read buffer memory or not by referring to the buffer memories 2236, and recognizes a result of determination in this case as "No" and the system control is shifted to step SS10. With this operation, after step SS10 and on, image data is read out from the second buffer memory $2231_2$ as read data (Buffer 2 in FIG. 95) through the same operation as described above.

When a fourth operation of reading an image is performed after reading data (buffer 1 in FIG. 95) from the first buffer memory $2231_1$ is finished, a write signal is inputted into the write control section 2232 (Refer to FIG. 90) at time t4 shown in FIG. 95, so that the image retaining section 2230 recognizes a result of determination in step SR2 as "Yes" and executes the sequence of operations in step SR3 and on. At this point of time, as the first buffer memory $2231_1$ is empty, write data (buffer 1 in FIG. 95) is stored in the first buffer memory $2231_1$ through the operation described above under the control of the write control section 2232.

As described above, with the image reader 2200 according to Embodiment 18, a plurality of buffer memories $2231_1$ to $2231_M$ are provided therein to independently perform read processing and write processing by the write control section 2232 and read control section 2234, so that the write processing can be executed during performance of the read processing as shown in FIG. 95. Therefore, with the image reader 2200 according to Embodiment 18, the operation of reading can continuously be performed, which allows adaptability for handling of the user to significantly be enhanced.

Description has been made for the case where the photoelectric switch 301 (Refer to FIG. 8) is used as a unit for detecting a document. This photoelectric switch 301 detects a document by receiving the light reflected by the document from the light emitting element 301a by a light receiving element 301b. Then, it is natural that the document is normally detected by the photoelectric switch 301 under ordinary environments, and convenience of use can significantly be enhance as described above. However, under adverse environments that interference light having very high brightness such as sunlight, spot light, and a flash of a camera is irradiated, a document may not be detected because output from the light receiving element 301b of the photoelectric switch 301 is saturated.

Furthermore, under the particular using condition that an image on a document having steps like on a book is read, the mechanical switch 201 (Refer to FIG. 5) may not correctly detect the document because of the steps. Embodiments 19 to 27 described below relate to an image reader so configured that image reading can always be carried out even under any environments or any using conditions by solving the problems described above.

Figure 96:
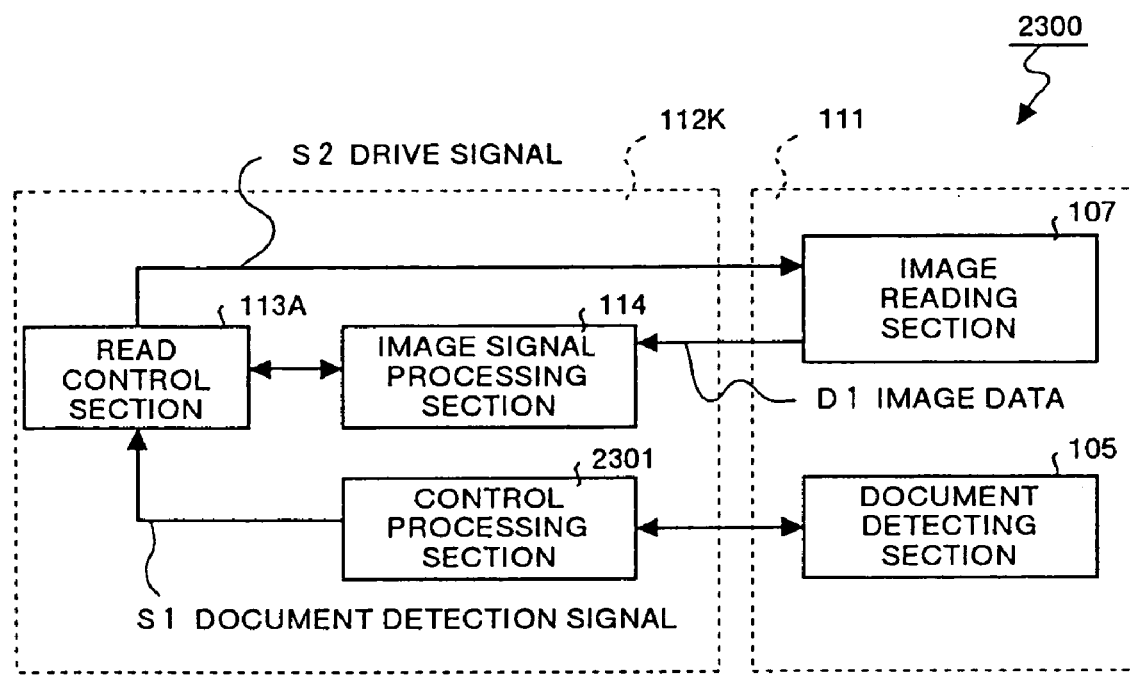
FIG. 96 is a block diagram showing configuration of an image reader 2300 according to Embodiment 19 of the present invention.

At first, an image reader 2300 according to Embodiment 19 of the present invention will be described. FIG. 96 is a block diagram showing configuration of the image reader 2300 according to Embodiment 19. In the figure, the same reference numerals are assigned to the components corresponding to those in FIG. 3, and description thereof is omitted herein. A control processing section 2301 is newly provided between a document detecting section 105 and a read control section 113A in the data processing section 112K shown in the figure.

The control processing section 2301 outputs a document detection signal S1 to the read control section 113A by subjecting a result of detection obtained from the document detecting section 105 to the processing through provision of controls described in detail in Embodiment 20 and thereafter over the document detecting section 105. With the image reader 2300 according to Embodiment 19 described above, by providing the control processing section 2301 therein, a document can be detected at any time even under particular environments or using conditions. Specific examples will be described in detail hereinafter with reference to Embodiment 20 and thereafter.

Figure 97:
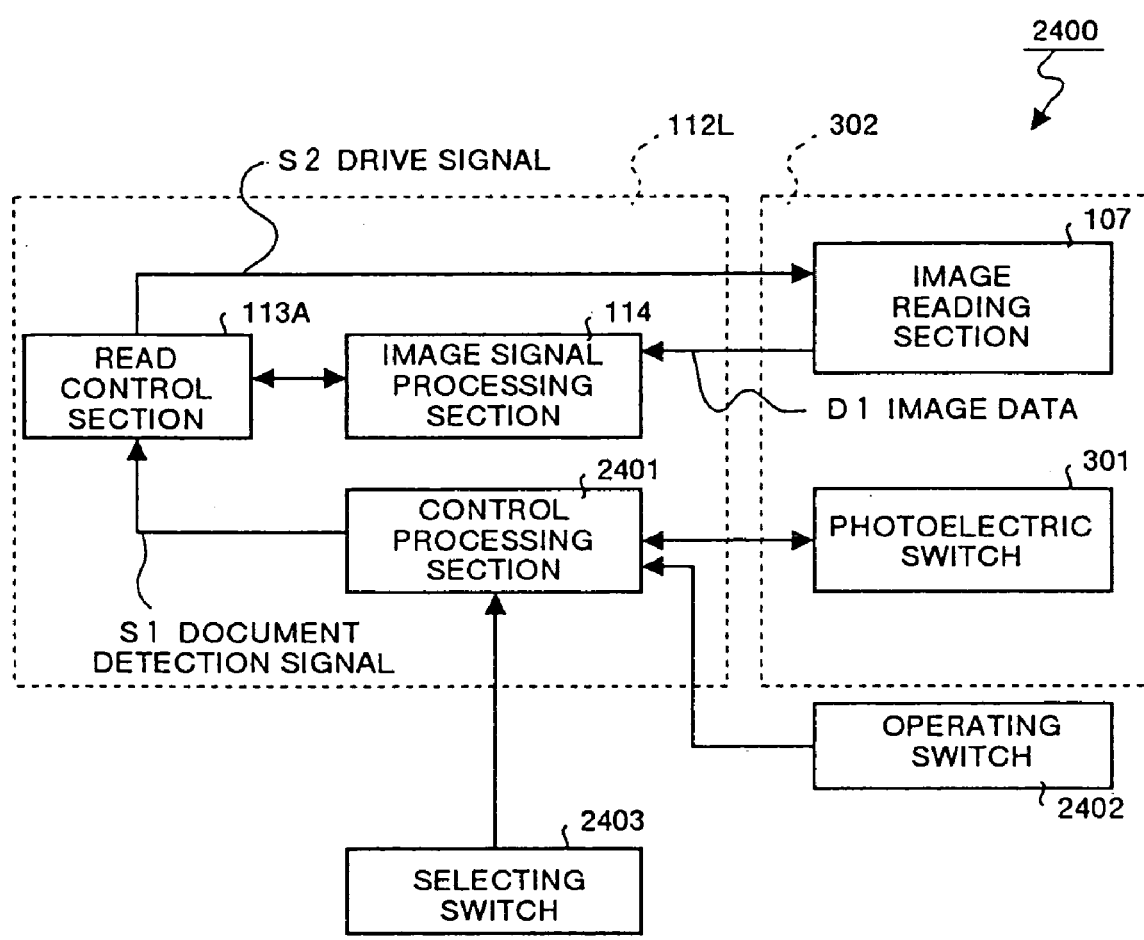
FIG. 97 is a block diagram showing configuration of an image reader 2400 according to Embodiment 20 of the present invention.

An image reader 2400 according to Embodiment 20 of the present invention will be described with reference to FIG. 97. FIG. 97 is a block diagram showing configuration of the image reader 2400 according to Embodiment 20. In the figure, the same reference numerals are assigned to components corresponding to those in FIG. 9, and description thereof is omitted herein. In a data processing section 112L shown in the figure, a control processing section 2401 is newly provided between a read control section 113A and a photoelectric switch 301, and an operating switch 2402 and a selecting switch 2403 are newly provided.

The operating switch 2402 is a switch for instructing start and end of image reading in place of the photoelectric switch 301 when an operating of reading is performed under particular environment such that there is an extremely large quantity of light. The selecting switch 2403 is a switch for validating either one of an output signal from the photoelectric switch 301 and an output signal from the operating switch 2402 in the control processing section 2401. The selecting switch 2403 includes a soft switch controlled by software in addition to a mechanical switch. The control processing section 2401 outputs a document detection signal S1 to the read control section 113A according to an output signal, of the output signal from the photoelectric switch 301 and output signal from the operating switch 2402, selected by the selecting switch 2403.

In the above configuration, when the image reader 2400 is used under the ordinary environment, the photoelectric switch 301 is selected by the selecting switch 2403. When a document is detected by the photoelectric switch 301 in this selected state, an output signal from the photoelectric switch 301 is inputted into the control processing section 2401, and the control processing section 2401 outputs a document detection signal S1 to the read control section 113A according to the output signal. With this, the read control section 113A starts an operation of reading an image by performing the same operation as described above.

On the other hand, when the image reader 2400 is used under particular environment such that there is an extremely large quantity of light, the operating switch 2402 is selected by the selecting switch 2403 in place of the photoelectric switch 301. In this selected state, when disturbing light enters the photoelectric switch 301 before the photoelectric switch 301 detects a document, an output signal is outputted from the photoelectric switch 301 to the control processing section 2401. Namely, in this case, since output from the light receiving element of the photoelectric switch 301 is saturated due to influence of the disturbing light, the photoelectric switch 301 does not possibly detect a document.

In the control processing section 2401, however, the output signal from the photoelectric switch 301 is invalidated, so that a document detection signal S1 is not outputted. Then, when the operating switch 2402 is operated after the user places the image reader 2400 on the document, an output signal from the operating switch 2402 is inputted into the control processing section 2401. With this configuration, the control processing section 2401 validates the output signal and outputs a document detection signal S1 to the read control section 113A. Then, the read control section 113A starts the operation of reading an image by performing the same operation as described above. When the operating switch 2402 is operated by the user to terminate the operation of reading an image, the control processing section 2401 stops output of the document detection signal S1 according to the output signal from the operating switch 2402. With this operation, the read control section 113A terminates the operation of reading an image.

As described above, with the image reader 2400 according to Embodiment 20, the operating switch 2402 is provided in addition to the photoelectric switch 301 and further a selecting switch 2403 for validating/invalidating an output signal from the photoelectric switch 301 is provided. Thus, by invalidating the photoelectric switch 301 and validating the operating switch 2402 using the selecting switch 2403 even under the environment such that there is an extremely large quantity of light, an instruction for starting or terminating image read can normally be issued to the read control section 113A. Therefore, with the image reader 2400 according to Embodiment 20, reading an image is possible even in any environment, so that convenience for users in practical use can significantly be enhanced.

Figure 98:
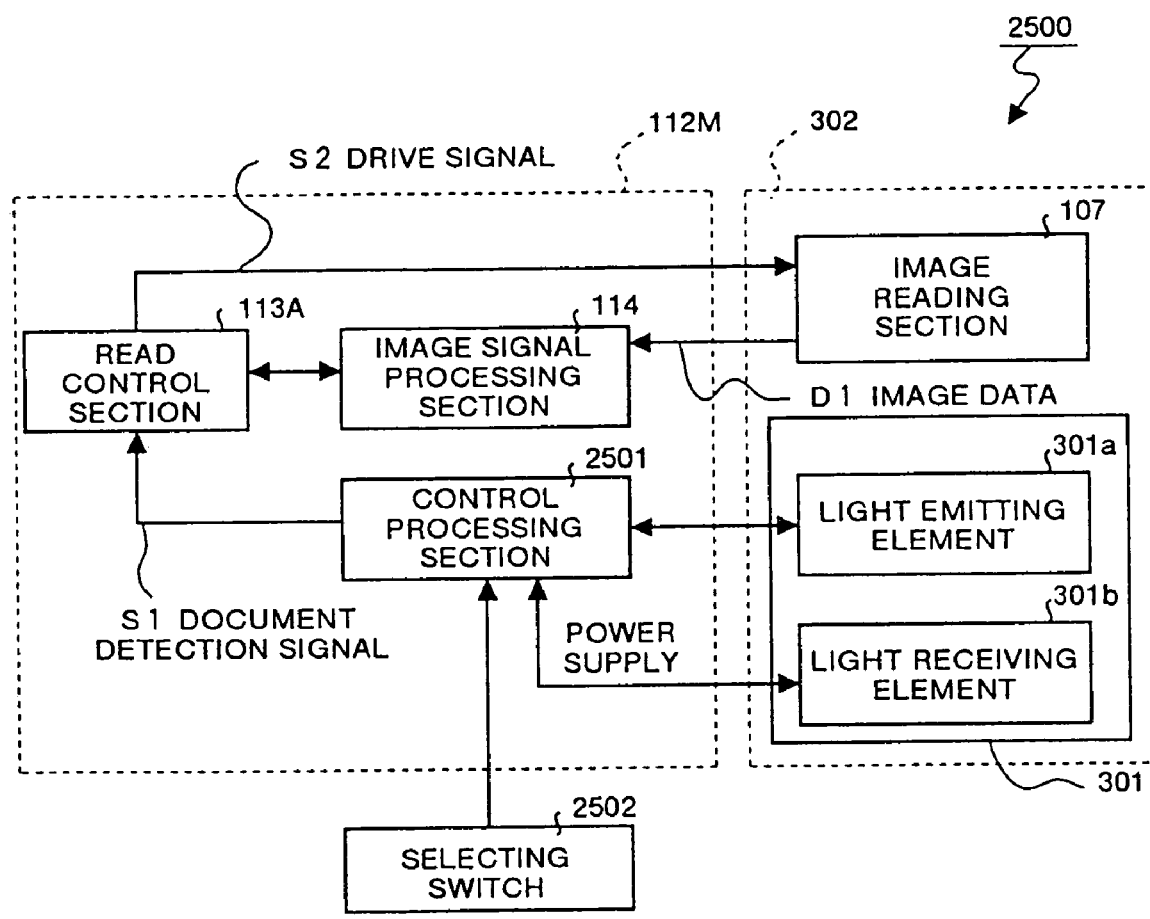
FIG. 98 is a block diagram showing configuration of an image reader 2500 according to Embodiment 21 of the present invention.

An image reader 2500 according to Embodiment 21 of the present invention will be described with reference to FIG. 98. FIG. 98 is a block diagram showing configuration of the image reader 2500 according to Embodiment 21. In the figure, the same reference numerals are assigned to components corresponding to those in FIG. 9, and description thereof is omitted herein. In a data processing section 112M shown in the figure, a control processing section 2501 is newly provided between a read control section 113A and a photoelectric switch 301, and a selecting switch 2502 is newly provided.

The photoelectric switch 301 shown in FIG. 98 has a light emitting element 301a and a light receiving element 301b. The selecting switch 2502 is a switch for selecting either one of modes of a power supply mode for supplying power to the light emitting element 301a and a power supply stop mode for stopping power supply to the light emitting element 301a through the control processing section 2501. The selecting switch 2502 includes a soft switch controlled by software in addition to a mechanical switch.

The control processing section 2501 supplies, when the power supply mode is selected by the selecting switch 2502, power to the light emitting element 301a, and stops the supply when the power supply stop mode is selected. When the power supply mode is selected, the control processing section 2501 outputs a document detection signal S1 only when an output signal from the light receiving element 301b is at a high level. On the other hand, when the power supply stop mode is selected, the control processing section 2501 outputs a document detection signal S1 only when an output signal from the light receiving element 301b is at a low level.

Figure 99:
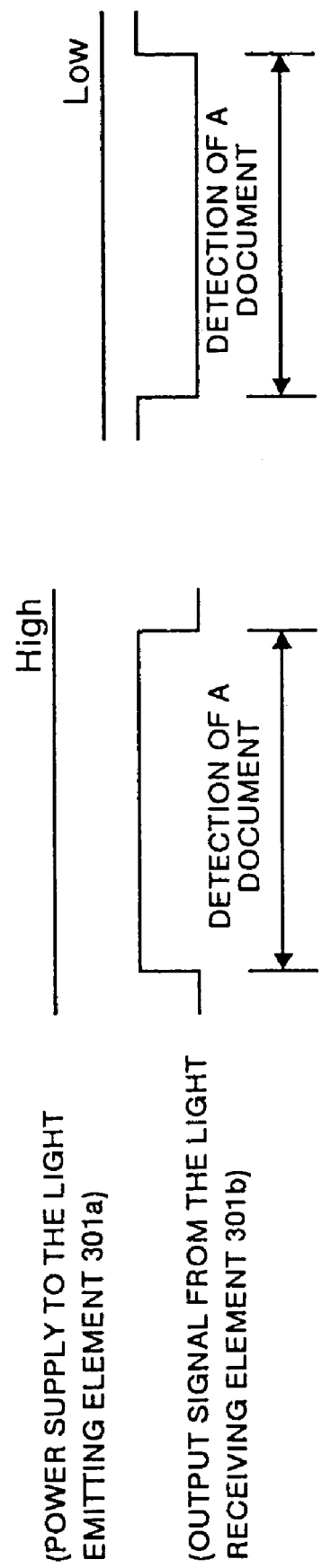
FIG. 99 is a view showing operations of the image reader 2500 according to Embodiment 21.

In the above configuration, when the image reader 2500 is used under ordinary environment, the power supply mode is selected by the selecting switch 2502. With this configuration, the control processing section 2501 supplies power to the light emitting element 301a (Refer to FIG. 99). When the photoelectric switch 301 is located near the document in this selected state, light from the light emitting element 301a is reflected on the document, and received by the light receiving element 301b. With this, the output signal from the light receiving element 301b enters into the high level as shown in FIG. 99, so that the control processing section 2501 outputs a document detection signal S1 to the read control section 113A according to the output signal. With this feature, the read control section 113A starts an operation of reading an image by performing the same operation as described above.

On the other hand, when the image reader 2500 is used under particular environment such that there is an extremely large quantity of light, the power supply stop mode is selected by the selecting switch 2502 in place of the power supply mode. With this, the control processing section 2501 stops power supply to the light emitting element 301a (Refer to FIG. 99). Then, when disturbing light enters the light receiving element 301b before the photoelectric switch 301 detects a document, a high-level output signal is outputted from the light receiving element 301b to the control processing section 2501. In this case, since the power supply stop mode is selected, the control processing section 2501 does not output any signal.

When the user places the image reader 2500 on the document, a quantity of disturbing light received by the light receiving element 301b significantly decreases, and because the light emitting element 301a does not emit light, an output signal from the light receiving element 301b changes from its high level to a low level as shown in FIG. 99. Then, the read control section 113A starts an operation of reading an image by performing the same operation as described above. When the user separates the image reader 2500 from the document to terminates the operation of reading an image, the output signal from the light receiving element 301b changes, because disturbing light enters again the light receiving element 301b, from its low level to a high level.

With this configuration, the control processing section 2501 stops output of the document detection signal S1.

As described above, with the image reader 2500 according to Embodiment 21, when an operation of reading is performed under particular environment such that a malfunction due to disturbing light may occur, power supply to the light emitting element 301*a* is stopped and the control processing section 2501 outputs a document detection signal S1 when an output signal from the light receiving element 301*b* is the low level, so that reading an image is possible even in any environment, therefore, convenience for users in practical use can significantly be enhanced.

Figure 100:
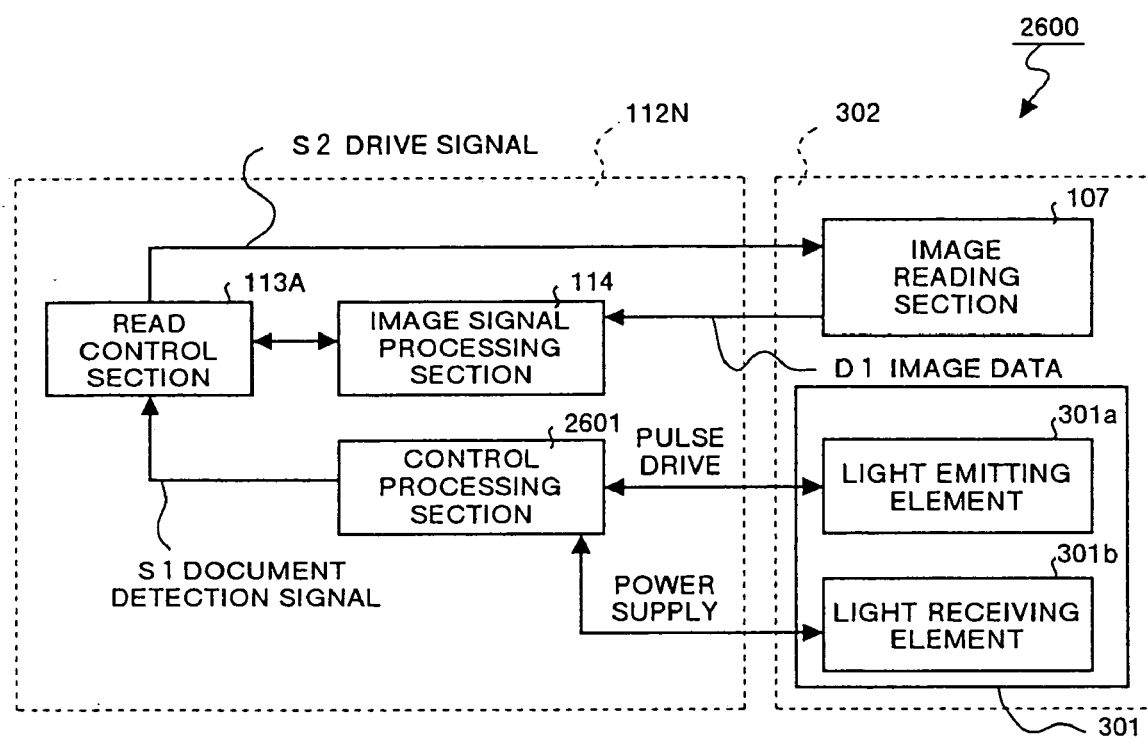
FIG. 100 is a block diagram showing configuration of an image reader 2600 according to Embodiment 22 of the present invention.

An image reader 2600 according to Embodiment 22 of the present invention will be described with reference to FIG. 100. FIG. 100 is a block diagram showing configuration of the image reader 2600 according to Embodiment 22. In the figure, the same reference numerals are assigned to components corresponding to those in FIG. 98, and description thereof is omitted herein. Provided in a data processing section 112N shown in the figure is a control processing section 2601 in place of the control processing section 2501 and selecting switch 2502 shown in FIG. 98. This control processing section 2601 pulse-drives a light emitting element 301*a* by intermittently supplying power to the light emitting element 301*a*. Therefore, pulsatory light shown in FIG. 101 is outputted from the light emitting element 301*a*. The control processing section 2601 outputs a document detection signal S1 as long as a cycle of pulse drive and an output signal from the light receiving element 301*b* are synchronized to each other.

In the above configuration, when a position of the image reader 2600 is in space under the ordinary environment, namely when there is no disturbing light, as shown in the first line in FIG. 101, pulsed light is outputted from the light emitting element 301*a* while an output signal from the light receiving element 301*b* enters into the low level. In this case, the control processing section 2601 does not output a document detection signal S1 because the output signal from the light receiving element 301*b* is not synchronized to the driving cycle of the light emitting element 301*a*.

Then, when the image reader 2600 is placed on a document, pulsed light from the light emitting element 301*a* is reflected by the document as shown in the second line in FIG. 101, and is received by the light receiving element 301*b*. With this configuration, the pulsed output signal from the light receiving element 301*b* is inputted into the control processing section 2601, and in response to the input, the control processing section 2601 outputs a document detection signal S1 to the read control section 113A. As described above, when there is no disturbing light, a document can accurately be detected.

On the other hand, when there is any disturbing light and if a position of the image reader 2600 is in space, pulsed light is outputted from the light emitting element 301*a* as shown in the third line FIG. 101. While the disturbing light is received by the light receiving element 301*b*, so that an output signal from the light receiving element 301*b* enters into the high level. In this case, the control processing section 2601 does not output a document detection signal S1 because the output signal from the light receiving element 301*b* is not synchronized to the driving cycle of the light emitting element 301*a*.

Then, when the image reader 2600 is place on the document, pulsed light from the light emitting element 301*a* is reflected by the document as shown in the last line in FIG. 101, and the reflected light is received by the light receiving element 301*b*. With this operation, a pulsed output signal from the light receiving element 301*b* is inputted into the control processing section 2601, and in response to the input, the control processing section 2601 outputs a document detection signal S1 to the read control section 113A. As described above, even when there is disturbing light, a document can accurately be detected.

As described above, with the image reader 2600 according to Embodiment 21, the light emitting element 301*a* is pulse-driven, and a document detection signal S1 is outputted as long as an output signal from the light receiving element 301*b* in the control processing section 2601 is a pulse, so that reading an image is possible even in any environment without being affected by disturbing light, therefore, convenience for users in practical use can significantly be enhanced.

Figure 102:
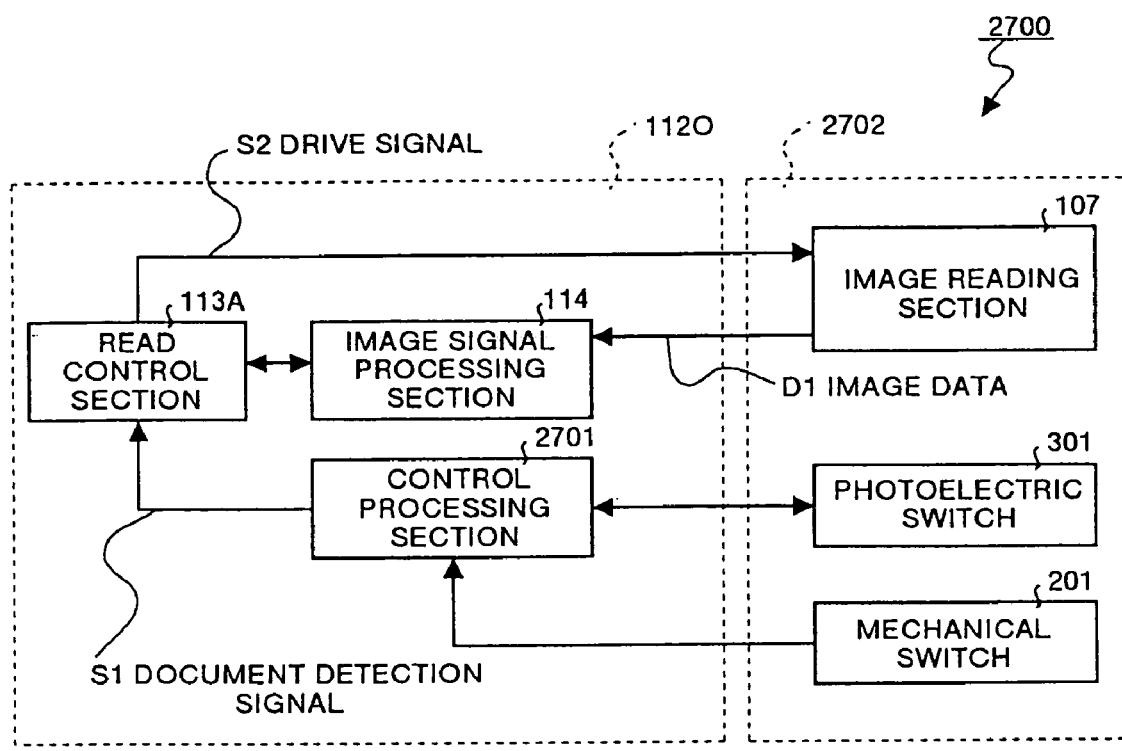
FIG. 102 is a block diagram showing configuration of an image reader 2700 according to Embodiment 23 of the present invention.

An image reader 2700 according to Embodiment 23 of the present invention will be described with reference to FIG. 102. FIG. 102 is a block diagram showing configuration of the image reader 2700 according to Embodiment 23. In the figure, the same reference numerals are assigned to components corresponding to those in FIG. 100, and description thereof is omitted herein. Provided in a data processing section 1120 shown in the figure is a control processing section 2701 in place of the control processing section 2601 shown in FIG. 100. Further a mechanical switch 201 (Refer to FIG. 5 and FIG. 6) is newly provided in a scanner section 2702.

A photoelectric switch 301 and a mechanical switch 201 shown in FIG. 102 are provided at locations apart from each other on the image reading surface of the image reader 2700. The control processing section 2701 outputs a document detection signal S1 according to an output signal from the photoelectric switch 301 as well as to an output signal from the mechanical switch 201. Herein, the control processing section 2701 outputs a document detection signal S1 according to either one criterion of determination of the following an item (a) and an item (b).

(a) Both, the output signal from the photoelectric switch 301 and the output signal from the mechanical switch 201 enter into a detectable level (ON) (i.e. a AND condition), (b) One of the output signal from the photoelectric switch 301 and an output signal from the mechanical switch 201 enters into a detectable level (ON) (i.e. a OR condition).

Herein, the photoelectric switch 301 can accurately detect a document having irregularities such as steps on its surface although it may malfunction due to the above mentioned disturbing light. On the other hand, the mechanical switch 201 is not affected by disturbing light although it may not detect a document having steps on its surface. Namely, the photoelectric switch 301 and mechanical switch 201 have both merits and demerits. Therefore, in the configuration, like the image reader 2700, in which both the photoelectric switch 301 and mechanical switch 201 each having a different detecting method are used, a document can accurately be detected in both cases: a case where there is disturbing light and a case where a document has steps on its surface is read, so that malfunctions are reduced, which allows reliability to be enhanced.

Herein, when the criterion of determination (AND condition) as the item (a) is employed in the control processing section 2701, a document detection signal S1 is outputted according to two results of detection, thus reliability of detection being enhanced. In the control processing section 2701, when the criterion of determination (OR condition) as the item (b) is employed, even if one type of mechanical switch 201 is not capable of detection due to steps on the surface of the document, the document can be detected by the other type of photoelectric switch 301, thus reliability being enhanced.

In addition, in the image reader 2700, a switch (not shown) for specifying to which of an output signal from the photoelectric switch 301 and an output signal from the mechanical switch 201 priority should be given may be provided. This switch is operated by the user. For example, when specification is made by the switch so that priority should be given to an output signal from the mechanical switch 201 under environment that there is disturbing light, the image reader 2700 outputs a document detection signal S1 according to the output signal from the mechanical switch 201 even when the output signal from the photoelectric switch 301 has been inputted.

With this configuration, a document can be detected by the mechanical switch 201 without being affected by disturbing light. When the switch is provided as described above, the user can freely specify an output signal to be preferred according to environment and conditions for using the device, so that malfunctions can be reduced, thus reliability being enhanced. It should be noted that the image reader 2700 according to Embodiment 23 may be designed such that either one of the criterion of determination as the item (a) and the criterion of determination as the item (b) can freely be selected by a switch. Furthermore, as the above mentioned switch, a soft switch controlled by software may be used in addition to the mechanical switch 201.

The case where the photoelectric switch 301 malfunctions due to disturbing light has been described above. As one example, in the image reader 300 shown in the top view of FIG. 103, a narrow gap exists between the image reading surface 101*a* and a document P because of the roller 104. Therefore, disturbing light may enter the photoelectric switch 301 from this gap. Especially, in the case of Embodiment 21 (Refer to FIG. 98 and FIG. 99) described above, an output signal from the light receiving element 301*b* enters into the high level due to the disturbing light, because of that, a malfunction occurs.

An image reader 2800 according to Embodiment 24 described below is provided in order to solving this inconvenience. The bottom view in FIG. 103 is a partially broken side view showing configuration of the image reader 2800 according to Embodiment 24. In this figure, although the basic configuration of the image reader 2800 is the same as that of the image reader 300 shown in the top view, the photoelectric switch 301 is provided at the back of the image reading surface 101*a*.

Namely, in the image reader 2800, a distance between the photoelectric switch 301 and a document P is longer, therefore, disturbing light reflected by the document P does not enter a light receiving element of the photoelectric switch 301. Furthermore, an internal wall 2801 of the portion where the photoelectric switch 301 is located is colored with black, which plays a role of absorbing the disturbing light. With the configuration as described above, disturbing light does not directly enter the light receiving element of the photoelectric switch 301, so that a malfunction due to disturbing light can be prevented.

Figure 104:
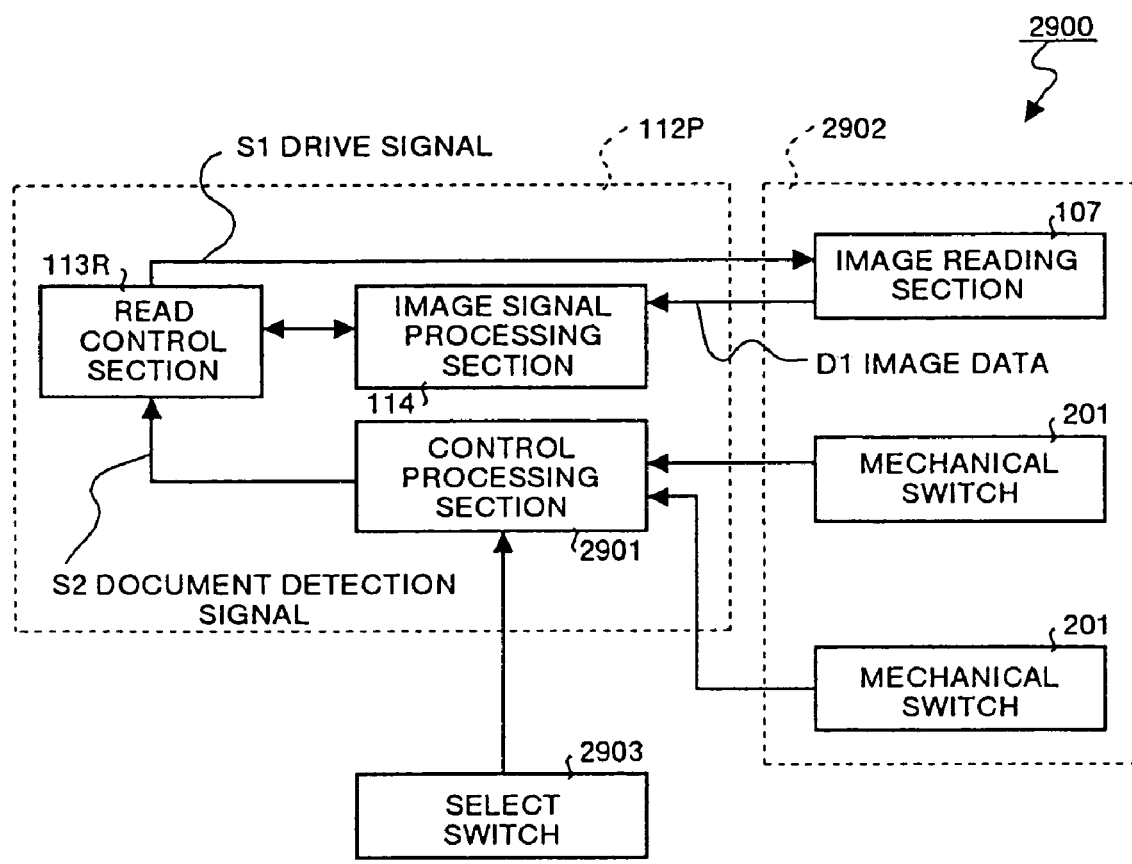
FIG. 104 is a block diagram showing configuration of an image reader 2900 according to Embodiment 25 of the present invention.

An image reader 2900 according to Embodiment 25 of the present invention will be described with reference to FIG. 104. FIG. 104 is a block diagram showing configuration of the image reader 2900 according to Embodiment 25. In the figure, the same reference numerals are assigned to components corresponding to those in FIG. 6, and description thereof is omitted herein. Newly provided in a data processing section 112P shown in the figure is a control processing section 2901. In addition, in the scanner section 2902, a plurality of mechanical switches 201, 201 are provided. Furthermore, a selecting switch 2903 is newly provided therein.

The plurality of mechanical switches 201, 201 shown in FIG. 104 are provided at locations apart from each other on the image reading surface of the image reader 2900. The control processing section 2901 outputs a document detection signal S1 according to output signals from the mechanical switches 201, 201. Herein, the control processing section 2701 outputs a document detection signal S1 according to either one criterion of determination of the following an item (A) and an item (B).

(A) Both output signals from the mechanical switches 201, 201 enter into a high level (ON) (i.e. a AND condition), (B) Either one of output signals from the mechanical switches 201, 201 enters into a high level (ON) (i.e. a OR condition).

As described above, in the configuration where a plurality of mechanical switches 201, 201 are used, even if a document having steps on its surface is to be read, the document can accurately detected, thus reliability being enhanced. Namely, when the criterion of determination (AND condition) as the item (A) is employed in the control processing section 2901, a document detection signal S1 is outputted according to two results of detection, thus reliability of detection being enhanced. In the control processing section 2901, when the criterion of determination (OR condition) as the item (B) is employed, even if one of mechanical switches 201 is not capable of detection due to levels of a document, the document can be detected by the other mechanical switch 201, thus reliability being enhanced.

In addition, provided in the image reader 2900 is a selecting switch 2903 for selecting either one of the criterion of determination as the item (A) and the criterion of determination as the item (B). This selecting switch 2903 is operated by the user. As this selecting switch 2903, a soft switch controlled by software may be used in addition to the mechanical switch 201. By providing the selecting switch 2903 as described above, the user can freely select and specify a processing method in the control processing section 2901 according to environment, conditions for using the device, and a cause of a malfunction, so that malfunctions can be reduced, thus reliability being enhanced.

Although description has been made for the case where a plurality of mechanical switches 201 of same type are provided in the image reader 2900 according to Embodiment 24, the configuration is not limited to the above case, and a plurality of photoelectric switches 301, 301 (Refer to FIG. 8) may be provided in place of the plurality of mechanical switches 201, 201 shown in FIG. 104. In this case, the control processing section 2901 performs the same processing as that when the plurality of mechanical switches 201, 201 are used. Especially, in the case where a plurality of photoelectric switches 301, 301 are used, the device is effective at detecting a document with levels on its surface.

Although the case where a document is detected using a mechanical switch 201 (Refer to FIG. 5) has been described above, this mechanical switch 201 directly contacts the document, and because of that, it is easily worn out, and at worst, it may be broken. Embodiment 26 described below is provided in order to solve the above mentioned problem and enhancing durability of the device.

Figure 105:
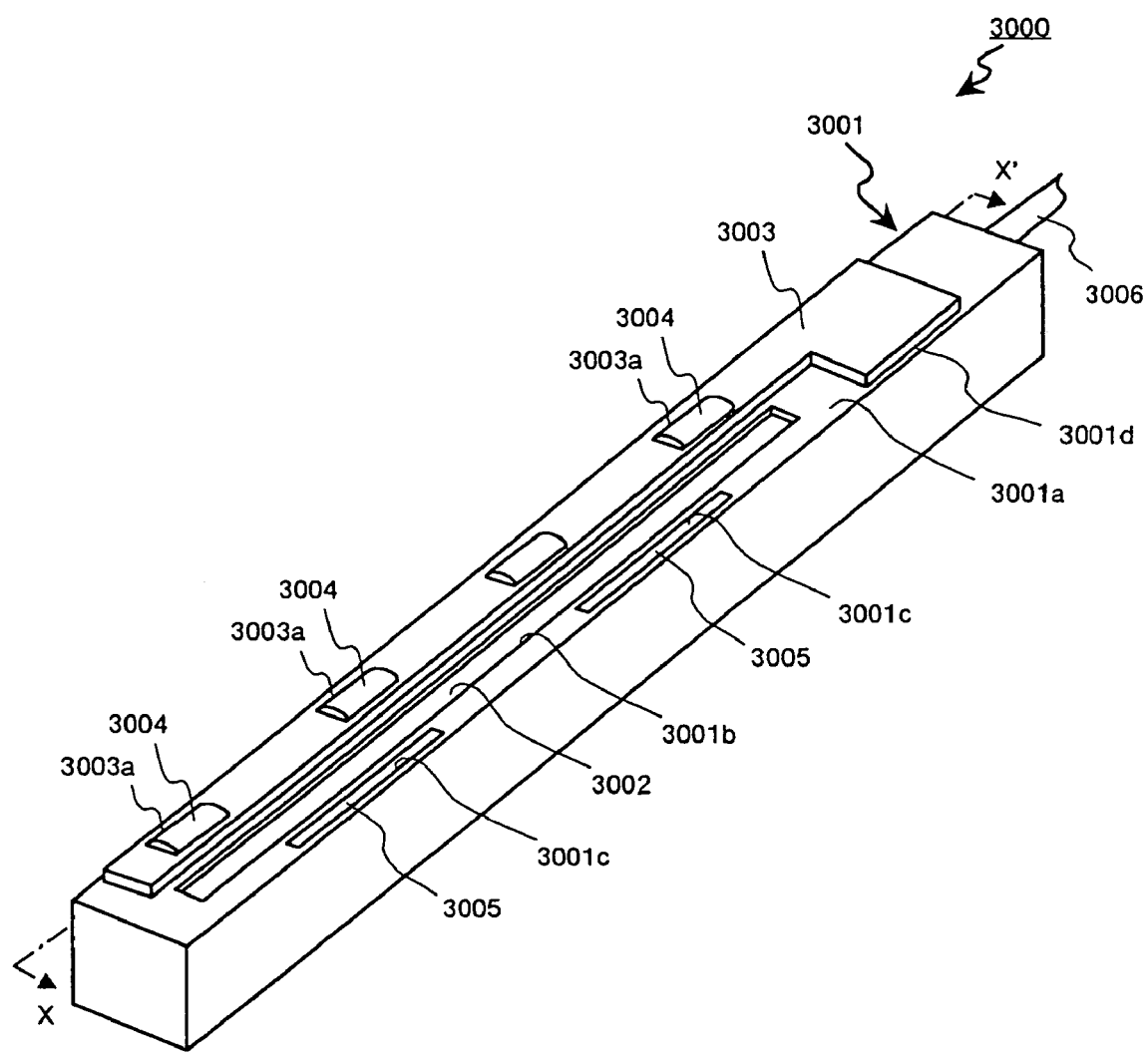
FIG. 105 is a perspective view showing configuration of an image reader 1300 according to Embodiment 26 of the present invention.
Figure 106:
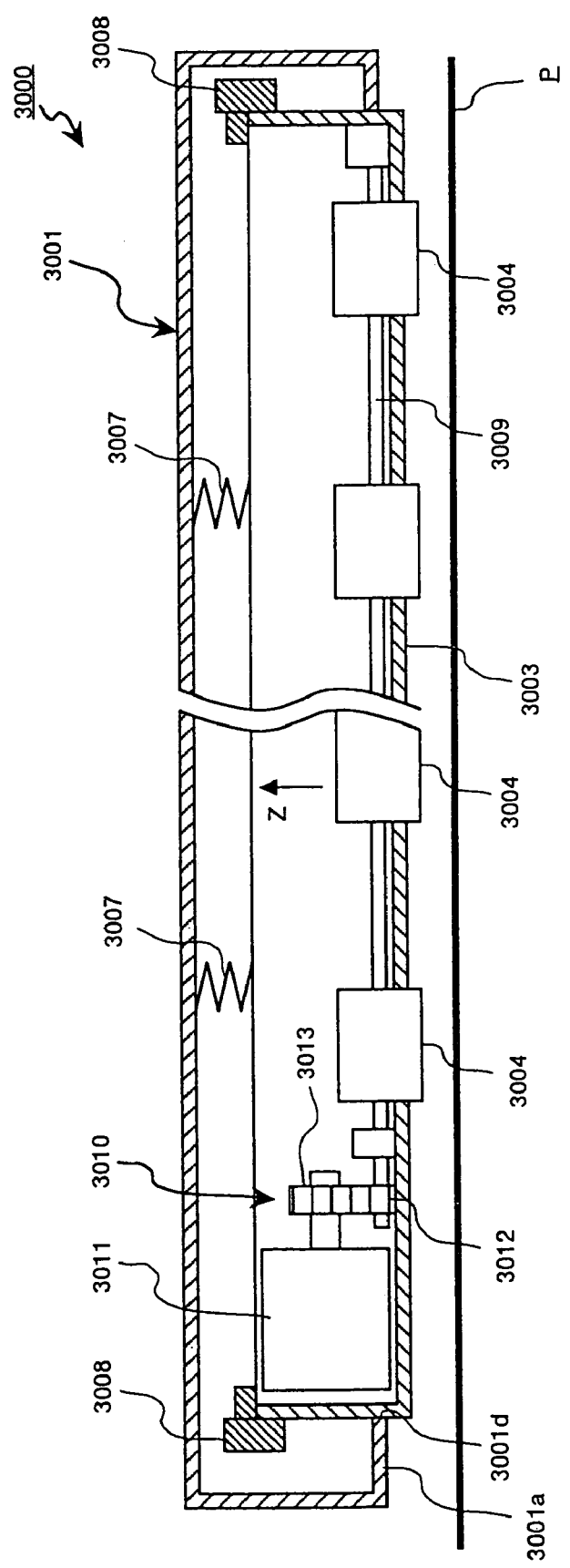
FIG. 106 is a cross-sectional view taken along the line X-X' in FIG. 105.

An image reader 3000 according to Embodiment 26 of the present invention will be described with reference to FIG. 105 and FIG. 106. FIG. 105 is a perspective view showing configuration of the image reader 3000 according to Embodiment 26, and FIG. 106 is a cross-sectional view taken along the line X-X' shown in FIG. 105. The basic configuration of the image reader 300 according to Embodiment 26 is the same as that of the image reader 200 shown in FIG. 5. In an image reading surface 3001a of a housing 3001 shown in these figures an image reading window 3001b is formed along a long edge thereof in the longitudinal direction. A transparent protection cover 3002 is covered and attached to the image reading window 3001b.

Formed in the image reading surface 3001a are rectangular holes 3001c and 3001c so as to be in parallel to the image reading window 3001b. Auxiliary rollers 3005 and 3005 rotating correlatively with a shaft not shown are provided in those rectangular holes 3001c and 3001c. Furthermore, a casing-shaped moving member 3003 for accommodating a plurality of main rollers 3004, 3004, . . . is inserted in an insertion hole 3001d on the image reading surface 3001a. This moving member 3003 is formed along another long edge of the housing 3001, and a plurality of rectangular holes 3003a, 3003a, . . . are formed at a specified clearance therebetween on the surface of the member, and the main rollers 3004, 3004, . . . are provided rotatably through the shaft 3009 in the plurality of rectangular holes 3003a, 3003a, . . . . A cable 3006 is connected to a computer not shown.

Accommodated in the moving member 3003 shown in FIG. 106 are the plurality of main rollers 3004, 3004, . . . , shaft 3009, and a displacement detecting section 3010 (a gear 3012, gear 3013, and a rotary encoder 3011). Springs 3007 and 3007 are inserted in between the housing 3001 and the moving member 3003, so that the moving member 3003 is energized in the side of the document P. Therefore, the surface of the moving member 3003 slightly projects from the image reading surface 3001a. Moving member detectors 3008 and 3008 are provided on both sides of the moving member 3003 respectively inside the housing 3001. Each moving member detector 3008 detects movement of the moving member 3003 in the Z direction by a mechanical system respectively, and has the same function as the above mentioned mechanical switch 201 (Refer to FIG. 5).

In the configuration described above, the user places the image reader 3000 on the document P to perform the operation of reading. At this point of time, the moving member 3003 slightly projecting from the image reading surface 3001a in the side of the document P receives a force from the document P to be moved in the Z direction against the energizing force by the springs 3007 and 3007. Because of this feature, either one of the moving member detectors 3008 and 3008 is turned ON, and then a series of image reading operations is started in the same manner as that in Embodiment 2 described above. Then, when the image reader 3000 is separated from the document P by the user, the moving member 3003 is moved in the opposite direction to the Z direction by the energizing force of the springs 3007 and 3007. With this feature, the moving member detectors 3008 and 3008 are turned OFF, and the series of image reading operations is finished.

As described above, with the image reader 3000 according to Embodiment 26, when the moving member 3003 in the side of main roller 3004 is pushed inside the housing 3001 by being contacted to the document P, the moving member 3003 is detected by the moving member detectors 3008 and 3008, and a series of the reading operations is started according to the result of detection, so that the moving member detectors 3008 and 3008 do not directly contact the document P.

Namely, in the image reader 3000 according to Embodiment 26, the moving member 3003 itself in the side of main rollers 3004 plays a role of the mechanical switch, and only the main rollers 3004 and auxiliary rollers 3005 contact the document P during the operation of reading, so that worn-out places are reduced as compared to the image reader 200 using the mechanical switch 201 (Refer to FIG. 5). Therefore, with the image reader 3000 according to Embodiment 26, its wear-out and damage can be prevented.

In addition, with the image reader 3000 according to Embodiment 26, even if the document has steps on its surface, any of the main rollers 3004, 3004, . . . contacts the document P, so that a document P having steps on its surface can accurately be detected. Furthermore, with the image reader 3000 according to Embodiment 26, the moving member detectors 3008 and 3008 are provided on both side of the moving member 3003, therefore, even when the moving member 3003 is pushed inside the housing 3001 in a slanting direction, the document can be detected by either one of the moving member detectors 3008 and 3008, thus reliability being enhanced. In Embodiment 26, although description has been made for the case where two moving member detectors 3008 and 3008 are provided therein, one moving member detector 3008 may be allowable.

Figure 107:
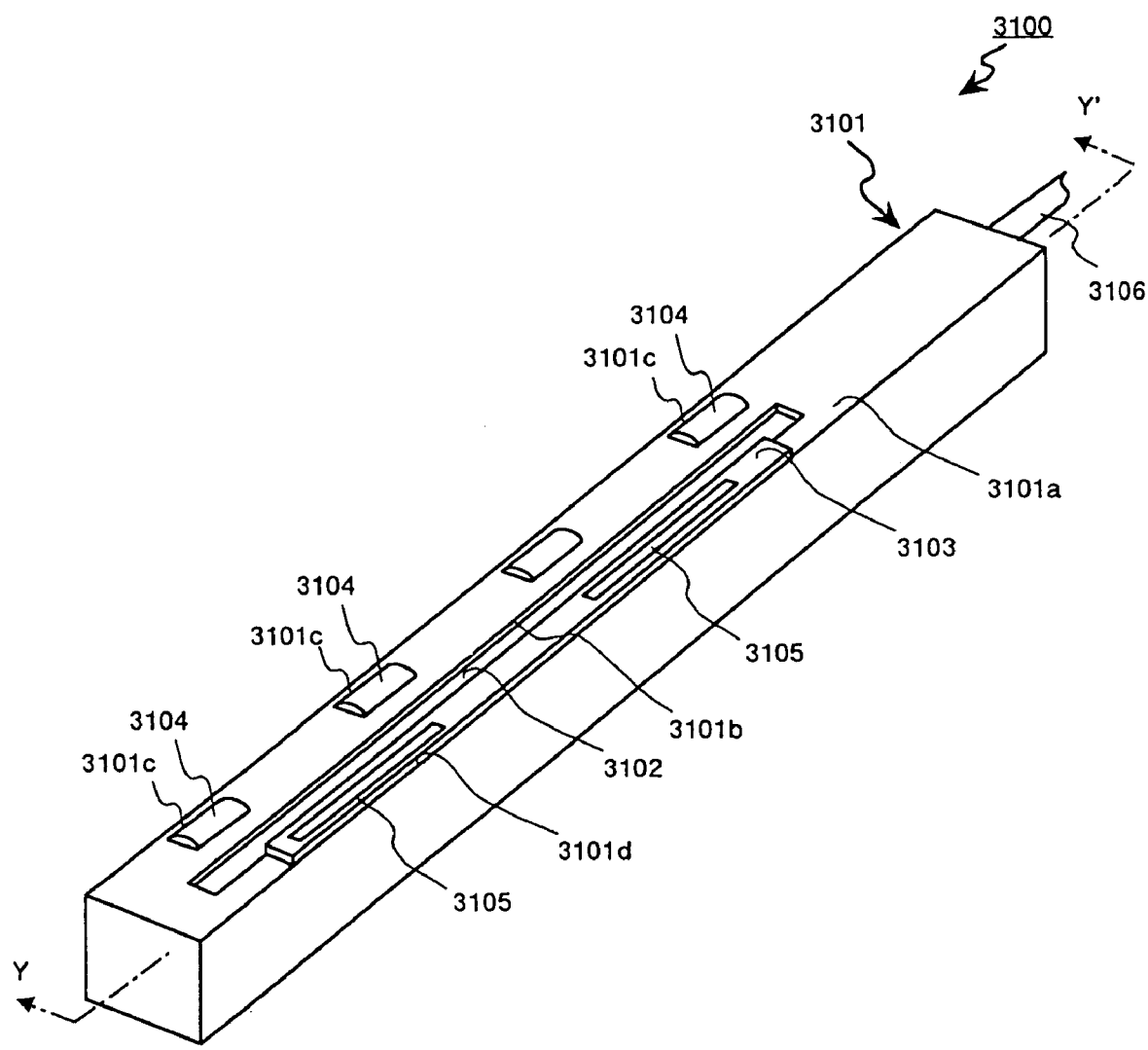
FIG. 107 is a perspective view showing configuration of an image reader 3100 according to Embodiment 27 of the present invention.

In image reader according to Embodiment 26, although description has been made for the case where the side of the main rollers is movable, the side of auxiliary rollers may be movable. An image reader 3100 according to Embodiment 27 described below is one with the side of auxiliary rollers to be movable. FIG. 107 is a perspective view showing configuration of the image reader 3100 according to Embodiment 27, and FIG. 108 is a cross-sectional view taken along the line Y-Y' shown in FIG. 107.

In these figures, in an image reading surface 3101a of a housing 3101, an image reading window 3101b is formed along a long edge thereof in the longitudinal direction. A transparent protection cover 3102 is covered and attached to the image reading window 3001b. Formed in the image reading surface 3101a are rectangular holes 3101c and 3101c so as to be in parallel to the image reading window 3101b. Main rollers 3104, 3104, . . . rotating correlatively with a shaft not shown are provided in these rectangular holes 3101c, 3101c, . . . . Furthermore, a casing-shaped moving member 3103 for accommodating two auxiliary rollers 3105 and 3105 is inserted in an insertion hole 3101d on the image reading surface 3101a. This moving member 3103 is formed along another long edge of the housing 3101.

Figure 108:
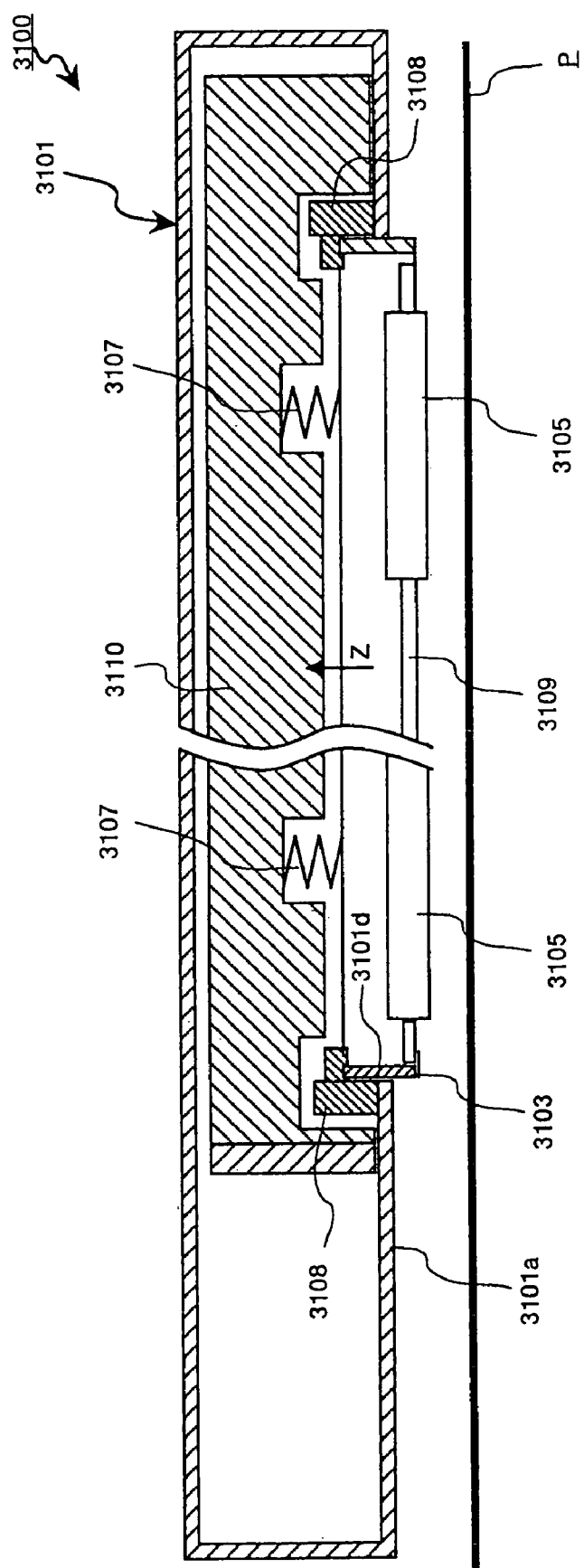
FIG. 108 is a cross-sectional view taken along the line Y-Y' shown in FIG. 107.

Accommodated in the moving member 3003 shown in FIG. 108 are two auxiliary rollers 3105 and 3105 respectively. Springs 3107 and 3107 are inserted in between a support member 3110 and the moving member 3103 provided inside the housing 3101, so that the moving member 3103 is pressed in the side of the document P. Therefore, the surface of the moving member 3103 slightly projects from the image reading surface 3101a. Moving member detectors 3108 and 3108 are provided on both sides of the moving member 3103 respectively inside the housing 3101. Each moving member detector 3108 detects movement of the moving member 3103 in the Z direction by a mechanical system respectively, and has the same function as the above mentioned mechanical switch 201 (Refer to FIG. 5).

In the configuration described above, the user places the image reader 3100 on the document P to perform the operation of reading. When the reader is placed on the document, the moving member 3103 slightly projecting from the image reading surface 3101a in the side of the document P receives a force from the document P to be moved in the Z direction against the pressing force by the springs 3107 and 3107 based on the same feature as that in Embodiment 26 described above. Therefore, any one of the moving member detectors 3108 and 3108 is turned ON, and then a series of image reading operations is started in the same manner as that in Embodiment 2 described above. Then, when the image reader 3100 is separated from the document P by the user, the moving member 3103 is moved in the opposite direction to the Z direction by the pressing force of the springs 3107 and 3107. With this feature, the moving member detectors 3108 and 3108 are turned OFF, and the series of image reading operations is finished.

As described above, with the image reader 3100 according to Embodiment 27, when the moving member 3103 in the side of auxiliary roller 3105 is pushed inside the housing 3101 by being contacted to the document P, the moving member 3103 is detected by the moving member detectors 3108 and 3108, and a series of the reading operations is started according to the result of detection, so that the moving member detectors 3108 and 3108 do not directly contact the document P.

Namely, in the image reader 3100 according to Embodiment 27, the moving member 3103 itself in the side of auxiliary rollers 3105 plays a role of the mechanical switch, and only the main rollers 3104 and auxiliary rollers 3105 contact the document P during the operation of reading, so that worn-out places are reduced as compared to the image reader 200 using the mechanical switch 201 (Refer to FIG. 5). Therefore, with the image reader 3100 according to Embodiment 27, its wear-out and damage can be prevented in the same manner as that in Embodiment 26.

In addition, with the image reader 3100 according to Embodiment 27, even if the document has steps (unevenness) on its surface, either one of the two auxiliary rollers 3105 and 3105 contacts the document P, so that a document P having steps on its surface can accurately be detected. Furthermore, with the image reader 3100 according to Embodiment 27, the moving member detectors 3108 and 3108 are provided on both side of the moving member 3103, therefore, even when the moving member 3103 is pushed inside the housing 3101 in a slanting direction, detection of the document can be made by either one of the moving member detectors 3108 and 3108, thus reliability being enhanced.

Herein, in the image reader 3000 according to Embodiment 26 described above (Refer to FIG. 105 and FIG. 106), the description has been made for the case where the side of the main roller 3104 is movable. In this case, the displacement detecting section 3010 including a gear transfer mechanism as a component attached to the main roller 3004 is used, therefore, precision of machining and assembling components are required to be extremely high. Therefore, the image reader 3000 according to Embodiment 26 has many merits as described above yet includes demerits such that the cost is high.

In contrast, with the image reader 3100 according to Embodiment 27, by making the side of the auxiliary roller 3105 movable which does not require much of machining precision as well as assembling precision, the cost can be reduced as compared to the case of making the side of the main roller movable.

Figure 109:
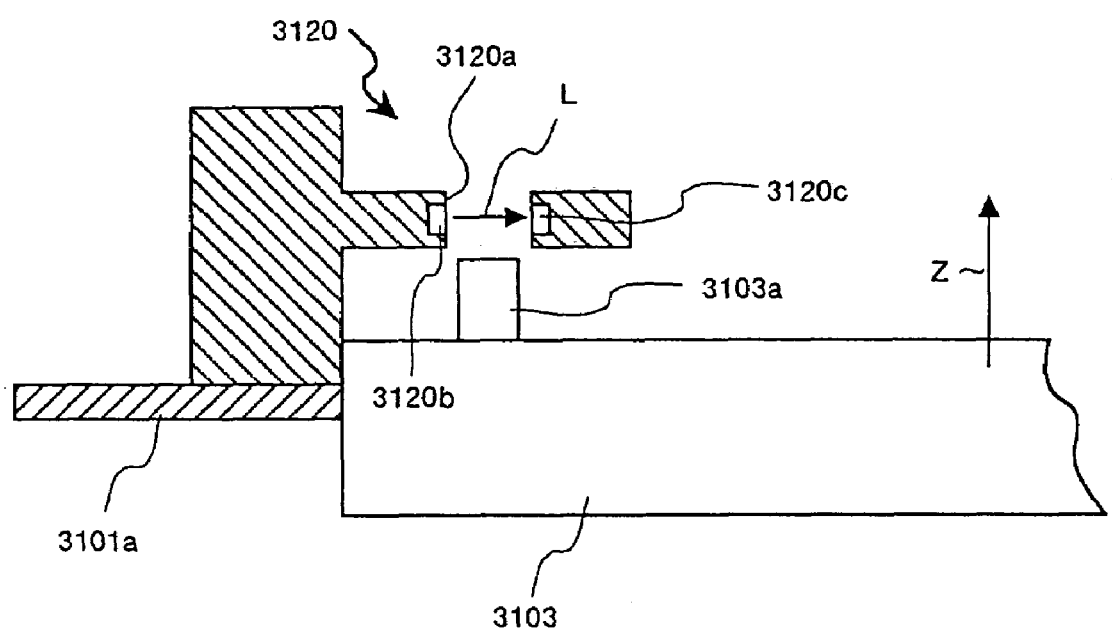
FIG. 109 is a partially cut cross-sectional view showing a variant of the image reader 3100 according to Embodiment 27.

In the image reader 3100 according to Embodiment 27, although movement of the moving member 3103 is detected by the moving member detector 3108 (Refer to FIG. 108) having the mechanical system, a photo-interrupter 3120 shown in FIG. 109 may be used in place of the moving member detector 3108. This photo-interrupter 3120 is located adjacent to the moving member 3103 and optically detects movement of the moving member 3103. An insertion hole 3120a is formed in the photo-interrupter 3120. A projection section 3103a formed on the moving member 3103 is inserted into the insertion hole 3120a.

The photo-interrupter 3120 comprises a pair of a light emitting element 3020b and a light receiving element 3020c. In this case, when the moving member 3103 contacts a document when reading an image, the moving member 3103 moves in the Z direction. With this configuration, light from the light emitting element 3020b is blocked by inserting the projection section 3103a into the insertion hole 3120a, which makes output from the light receiving element 3020c to be turned OFF, because of that, movement of the moving member 3103 is detected. After this, the above mentioned series of reading operations is performed. Then, when the series of reading operations is finished and the moving member 3103 is separated from the document, the moving member 3103 is moved in the opposite direction to the Z direction. Because of this feature, the projection section 3103a is taken off from the insertion hole 3120a, and light from the light emitting element 3020b is received by the light receiving element 3020c. In this case, therefore, the series of image reading operations is finished. It should be noted that the photo-interrupter 3120 is applicable in the image reader 3000 according to Embodiment 26 described above.

Although the plurality cases of the configuration have been described with respect to Embodiments 1 to 27 according to the present invention, any combination of some of those plurality cases as required is also included in the present invention. In addition, although description has assumed the case of a document as a medium in Embodiments 1 to 27 of the present invention, the medium is not limited to the document, but anything, for instance, a flat substance such as a wall with a painting thereon, and a substance having a curved surface may be allowable.

As described above, with the present invention, the image reading unit automatically starts (or terminates) according to a result of detection by the medium detecting unit, and because of this configuration there is provided the advantage that a user is not required to give an instruction for an operation for reading an image like in the conventional technology with convenience for users in actual operations and operability thereof can be improved.

With the invention, the image reading unit automatically starts (or terminates) an operation for reading an image according to a result of detection by the mechanical switch, and because of this configuration, there is provided the advantage that a user is not required to give an instruction for an operation for reading an image each time with convenience for users and operability thereof improved, and further as a mechanical switch is used, influences by electric noises or the like can advantageously be reduced.

With the invention, the image reading unit automatically starts (or terminates) an operation for reading an image in a non-contacted form according to a result of detection by the optical switching unit, and because of this configuration there is provided the advantage that an operating life of the optical switching unit is prolonged because of the non-contact characteristics and also convenience for users and operability thereof are improved.

With the invention, when the housing is approached to a medium by a user so that the image reading surface contacts the medium, light from the light emitting unit is reflected by the medium, and the reflected light is received by the light receiving unit. As a result, the medium is detected by the light receiving unit in a non-contacted form. With this operation the image reading unit starts an operation for reading image information on the medium. When the user separates the housing from the image reading medium, the light is not received by the light receiving unit, so that the image reading unit terminates the operation for reading an image. With this configuration, there is provided the advantage that a medium can be detected in a non-contacted form with the operating life prolonged and convenience for users and operability can be improved.

With the invention, when the image reader is placed on a medium so that the image reading surface contact the document, the housing is supported at three points of the roller, first roller, and second roller. Because of this configuration, there is provided the advantage that the housing does not move irregularly and a high quality image can be obtained.

With the invention, start and end of an operation for reading an image is automatically recognized by the read control unit according to a result of detection by the medium detecting unit, and the image reading unit is controlled according to a result of this recognition, and because of this configuration there is provided the advantage that control by manual operation is not required with the convenience for users and operability improved.

With the invention, when the auxiliary image reader is connected to the interface unit, the read control unit processes data for an image with a different size read from the auxiliary image reader, and because of this configuration there is provided the advantage that images having two types of size can be read with the convenience for users, operability, and availability for various applications thereof improved.

With the invention, power supply to the medium detecting unit is executed intermittently while an operation for reading an image is not being performed according to a result of recognition by the read control unit, and because of this configuration, there is provided the advantage that power consumption can be reduced.

With the invention, the image reading unit automatically starts (or terminates) an operation for reading an image according to a result of detection by the displacement detecting unit, and because of this configuration, there is provided the advantage that a user is not required to give an instruction for an operation for reading an image with the convenience for users and operability thereof improved.

With the invention, when the housing is placed by a user on a medium so that the image reading surface contacts the medium and then the housing is moved in the scanning direction, the rollers rotates and the displacement computing section computes a displacement from the rotation. With this operation, the image reading unit starts an operation for reading image information on the medium. Because of this configuration, there is provided the advantage that a user is not required to give an instruction for an operation for reading an image each time like in the conventional technology with the convenience for users and operability improved.

With the invention, when the housing is placed by a user on a medium so that the image reading surface contacts the medium, the housing is supported at three points of the roller, first roller, and second roller. Because of this configuration, there is provided the advantage that the housing does not move irregularly during movement and a high quality image can be obtained.

With the invention, start and end of an operation for reading an image is automatically recognized by the read control unit according to a result of detection by the displacement detecting unit, and the image reading unit is controlled according to a result of the recognition, and because of this configuration, there is provided the advantage that control by manual operations is not required with the operability and adaptability for handling improved.

With the invention, when the auxiliary image reader is connected to the interface unit, the read control unit processes data for an image with a different size read by the auxiliary image reader, which makes it possible for the image reader to read images having two different sizes, and because of this configuration, there is provided the advantage that the availability for various purposes can further be improved.

With the invention, while a operation for reading an image is not being performed, the power supply unit intermittently supplies power to the medium detecting unit according to a result of recognition by the read control unit, and because of this configuration, there is provided the advantage that the power consumption can be reduced.

With the invention, the image reading unit reads an image according to both a result of detection by the medium detecting unit and a result of detection by the displacement detecting unit, and because of this configuration, there is provided the advantage that a frequency of malfunctions can be reduced as compared to a case where an image is read according on a result of detection by only either one.

With the invention, a mechanical switch unit us used, because of this configuration, there is provided the advantage that influence due to the electrical noise can be reduced and a frequency of malfunction can be reduced proportionately.

With the invention, the image reading unit automatically starts (or terminates) an operation for reading an image in a non-contacted state according to a result of detection by the optical switching unit, and because detection is executed in a non-contacted state, an operating life of the optical switch is prolonged, and further, the image reading unit executes an operation for reading an image according to both a result of detection by the medium detecting unit and a result of detection by the displacement detecting unit, and because of this configuration, there is provided the advantage that a frequency of malfunctions can be reduced.

With the invention, when a user separates the housing from a medium, reflected light from the medium is not received from the light receiving unit, and because of this configuration, there is provided the advantage that the medium can be detected in a non-contacted state with the life of each component being prolonged and further a frequency of malfunctions as described above can be reduced.

With the invention, a user is not required to give an instruction for an operation for reading an image each time, and because of this configuration, there is provided the advantage that the convenience for users and operability can be improved.

With the invention, with the housing is placed on an image reading by a user so that the image reading surface contacts the medium, the housing is supported at three points of the roller, first roller, and second roller. Because of this configuration, there is provided the advantage that the housing does not move irregularly during movement and a high quality image can be obtained.

With the invention, start and end of an operation for reading an image is automatically recognized by the read control unit according to both a result of recognition by the medium detecting unit and a result of detection by the displacement detecting unit, and because of this configuration, there is provided the advantage that a frequency of malfunctions can be reduced as compared to a case where an operation for reading an image is executed according to a result of detection by only either one thereof.

With the invention, when the auxiliary image reader is connected to the interface unit, the read control unit processes data for images with different types of size read by the auxiliary image reader, and because of this configuration, there is provided the advantage that the image reader can read images with two different sizes with convenience for users and availability for various purposes thereof improved.

With the invention, the power supply unit intermittently supplies power to the medium detecting unit, while an operation for reading an image is not being performed, according to a result of recognition by the read control unit, and because of this configuration, there is provided the advantage that power consumption can be reduced.

With the invention, a result of reading a plurality of images by the image reading unit is stored as image data in the memory, and because of this configuration, there is provided the advantage that image data for a plurality of images can successively be read by operating the image reader once with the convenience for users improved.

With the invention, the memory is arranged on the substrate in a layered form, and because of this configuration, there is provided the advantage that a space required for installation thereof can be made smaller and also the device can be down-sized.

With the invention, the memory can be connected to or disconnected from the housing, so that the memory can be used as a memory for other device. Therefore, there is provided the advantage that data stored in the memory can be shared with the availability for various applications improved.

With the invention, contents of storage in the memory is reported by the reporting unit, and because of this configuration, there is provided the advantage that a situation where an operation for reading an image is executed in spite that there is no additional memory space can be evaded with the convenience for users further improved.

With the invention, when an external device is connected, the external device can access the memory with the interface function of the communicating unit, and because of this configuration, there is provided the advantage that contents of storage in the memory can be shared with an external device with the availability for various applications further improved.

With the invention, when an external device is connected, image data can be transmitted to the external device by the communicating unit, and the image reader can be used for an external image reader for the external device, and because of this configuration, there is provided the advantage that the availability for various applications can further be improved.

With the invention, an image as a result of an operation for reading an image by the image reading unit is displayed on the display unit, and because of this configuration, there is provided the advantage that, when a user is performing an operation for reading an image, the user can visually check the image and the convenience for users can further be improved.

With the invention, the display unit is provided in the vertical posture against an reading surface of the image reading unit, and a user can perform an operation for reading an image visually checking an image displayed by the display unit at a position suited to visual check by the user, and because of this configuration, there is provided the advantage that the adaptability for handling can further be improved.

With the invention, an angle of a display surface of the display unit can freely be adjusted by the angle adjusting unit, and a user can check display on the display unit at an angle which is best suited for visual check by the user, and because of this configuration, there is provided the advantage that the convenience for users can substantially be enhanced.

With the invention, the display unit is provided at a center of the operating surface, and a user can perform an operation for reading an image visually checking an image at a position best suited for visual check by the user, and because of this configuration, there is provided the advantage that the adaptability for handling can substantially be improved.

With the invention, the protection cover is provided, and because of this configuration, there is provided the advantage that the display unit can be protected against contamination and physical shocks with the operating life prolonged.

With the invention, the protection cover is made from a transparent material, and a user can visually check display on the display unit through the protection cover, and because of this configuration, there is provided the advantage that not only the operating life thereof can be prolonged but also convenience for users can be improved.

With the invention, the protection cover can freely be attached to or detached from the housing, so that a user can attach the protection cover to or detach it from the housing according to the necessity, and because of this configuration, there is provided the advantage that the convenience for users can further be improved.

With the invention, the protection cover is supported by the supporting unit, and a user can set the protection cover on the display unit or remove it from the display unit according to the necessity, and because of this configuration, there is provided the advantage that loss of the protection cover can be prevented.

With the invention, a user can operate an operating section provided near one edge of an operating surface of the housing holding the housing, and because of this configuration, there is provided the advantage that the user can operate the image reader irrespective of orientation of the housing or a position of the user's hand.

With the invention, the display control unit controls orientation of an image to be displayed on the display unit according to contents of an instruction from the instructing unit, and because of this configuration, there is provided the advantage that orientation of an image displayed on the display unit is automatically corrected with the convenience for users improved also in display.

With the invention, the display control unit controls orientation of display on the display unit according to a result of detection by the inclination detecting unit, and because of this configuration, there is provided the advantage that orientation of a displayed image is automatically corrected with the convenience for users and adaptability for handling further improved.

With the invention, the display control units controls orientation of an image displayed on the display unit according to orientation of a displayed image instructed from the operating unit, and because of this configuration, there is provided the advantage that a user can freely change the orientation of a displayed image with the operability thereof enhanced.

With the invention, an image displayed on the display unit is divided according to a division ratio of N:M (N+M=1) by the display control unit, and each of the divided images can be displayed on the display unit according to a desired contraction ratio or an enlargement ratio, and because of this configuration, there is provided the advantage that the user can visually check two images each displayed according to a different contraction ratio (or an enlargement ratio) with the convenience for users improved.

With the invention, a portion of an image can be displayed with size equal to original one or contracted or enlarged from the original one on another image in the overlaid state, and because of this configuration, there is provided the advantage that a user can visually check two images on one screen with the convenience further improved.

With the invention, portions of a plurality of images each having the same size as that of the original one or contracted or enlarged size can be displayed on the display unit an arrayed form, and because of this configuration, there is provided the advantage that a user can visually check a plurality of images simultaneously and also can understand a type of each image easily.

With the invention, arbitrary sections of a text image can be displayed by the display control unit with contracted or enlarged size in an arrayed form, and because of this configuration, there is provided the advantage that the display screen can easily be checked by a user.

With the invention, when one of rotated, mirrored, or correctly-oriented images is selected by the selecting unit, the orientation correcting unit executes a processing for correcting the orientation to the selected image. Because of this configuration, there is provided the advantage that orientation of an image can freely be corrected according to a result of selection by the selecting unit.

With the invention, after a test portion of an image is determined by the text portion determining unit, a rotation direction of the image is detected from a character image in the text portion. Then the image is displayed by the display control unit in the correct orientation according to a result of detection by the rotating direction detecting unit. Accordingly, a rotation direction of a test portion with a high recognition rate is preferentially detected, and because of this configuration, there is provided the advantage that a time required for correcting orientation of a displayed image can be shortened.

With the invention, a plurality of images read by the image reading unit are classified by the classifying unit according to prespecified classification items. Then an image corresponding to a classification item selected by the selecting unit is displayed by the display control unit on the display unit. Accordingly, there is provided the advantage that a time required for selecting (retrieving) a desired image can be shortened.

With the invention, a threshold value for digitizing is automatically generated by the digitizing unit according to a result of an operation for reading an image by the image reading unit, and digitizing is executed according to a result of the operation for reading an image, and because of this configuration, there is provided the advantage that a user is not required to decide a threshold value for digitizing independently from an image read by the user and always a clear image can be obtained from the digitized image data.

With the invention, even if the image reader is held and moved by a user, moment acting in the moving direction is small, and a stable posture is maintained during movement, and because of this configuration, there is provided the advantage that the convenience for users can further be improved.

With the invention, when start of an operation for reading an image is detected by the read start detecting unit, as the operation for reading an image for reading image information of an image reading has been started, a read condition is decided according to an image on the medium. Then the reading unit optically reads an image according to the read condition. As described above, different from the conventional technology, an empty space is never recognized as an area to be read, and a read condition is always decided according to the image on the medium, and because of this configuration, there is provided the advantage that a high quality image can always be obtained.

With the invention, when star of an operation for reading an image is detected by the read start detecting unit according to presence of a medium, a read condition is decided by the read condition deciding unit according to a result of the operation for reading an image on the medium. Then the reading unit optically reads an image according to the read condition. As described above, different from the conventional technology, an empty space is never recognized as an area to be read, and a read condition is always decided according to an image on a medium, and because of this configuration, there is provided the advantage that a user is not required to give an instruction for giving an instruction for start of an operation for reading an image with the convenience for users and operability thereof improved.

With the invention, when a displacement is detected by the read start detecting unit, star of the operation for reading an image is detected by the read start detecting condition, and then a read condition is decided by the read condition deciding unit according to a result of the operation for reading an image on the medium. Then an image on the medium is optically read according to the read condition. As described above, different from the conventional technology, an empty space is never recognized as an area to be read, and a read condition is always decided according to the image on the medium, and because of this configuration, there is provided the advantage that always a high quality image is obtained and a user is not required to give an instruction for starting an operation for reading an image each time with the adaptability for handling and operability thereof improved.

With the invention, the read start detecting unit detect start of an operation for reading an image by detecting both presence of a medium and a displacement of the medium. In this step and on, a read condition is decided by the read condition deciding unit according to a result of an operation for reading an image on a medium, and an image is optically read by the reading unit according to the read condition. As described above, different from the conventional technology, an empty space is never recognized as an area to be read, and a read condition is always decided according to the image on the medium, so that a high quality image is always obtained and also start of an operation for reading an image is detected according to both present of a medium and a displacement of the medium, and because of this configuration, there is provided the advantage that a frequency of malfunctions can be reduced as compared to a case where start of an operation for reading an image is detected according to a result of detection by either one.

With the invention, a read condition is not decided until a displacement surpasses a threshold value, and because of this configuration, there is provided the advantage that a malfunction due to influence of vibrations can be prevented.

With the invention, even if vibration is generated, a result of detection of start of an operation for reading an image within a specified period of time is invalidated, so that the accumulated value of the displacement due to vibrations is reset and a malfunction due to accumulation of the displacements erroneously detected due to vibration can be prevented, and because of this configuration, there is provided the advantage that reliability of the device and adaptability for handling thereof are improved.

With the invention, an operation for reading image data is started simultaneously when an instruction for starting an operation for reading an image, so that an operation for reading an image can be performed at an arbitrary timing with the adaptability for handling improved. As an image memory for storing therein data for a plurality of images is used, so that, when image data for a plurality of images is stored, the image data can be written in an empty storage area, and because of this configuration, there is provided the advantage that an operation for reading an image can be executed without any delay.

With the invention, in the image memory, storage of image data read by the image reading unit and an operation for reading the stored image data are concurrently executed, so that, even if image data read as described above can be stored in an empty area and thus an operation for reading an image can be executed successively. Because of this configuration, there is provided the advantage that the adaptability for handling by a user can substantially be improved.

With the invention, when an instruction for terminating an operation for reading an image is given and the operation is terminated once, control is provided by the read control unit so that a next instruction for starting an operation for reading an image can be accepted immediately, and an operation for reading an image can be executed successively and repeatedly, and because of this configuration, there is provided the advantage that the adaptability for handling by a user can be improved.

With the invention, the read instructing unit instructs start and end of an operation for reading an image according to a result of detection of a medium, so that an operation for reading an image is started or terminated without requiring an user to intentionally give an instruction for starting or terminating an operation for reading an image, and because of this configuration, there is provided the advantage that the adaptability for handling by a user is improved.

With the invention, there is provided the control processing unit for controlling the medium detecting unit as well as for executing processing to a result of detection by the medium detecting unit so that detection of a medium can correctly be executed according to an environment and conditions for reading an image so that the medium can correctly be detected even in an environment or conditions disabling detection of a medium due to external disturbance, and because of this configuration, there is provided the advantage that the reliability is improved.

With the invention, if there is disturbing light around the light emitting element or light receiving element, output from the light receiving element is saturated and detection of a medium is disabled, but use of the medium detecting unit is inhibited by the control processing unit so that other unit can selectively be used in place of the medium detecting unit, and because of this configuration, there is provided the advantage that the situation where medium detection is completely disabled can be prevented.

With the invention, power supply to the light receiving element is controlled according to an environment or conditions therearound, because of this configuration, there is provided the advantage that the situation where medium detection is completely disabled can be prevented with the reliability improved.

With the invention, when the light emitting element is driven in a pulsating state, light is emitted from the light emitting element in the pulsating state, so that also the light reflected from the medium and received by the light receiving element is in the pulsating state, which makes it possible to differentiate the light from the disturbing light. Accordingly, there is provided the advantage that it is possible to determine whether the device is on the medium or not even in the environment where there is disturbing light by driving the light emitting element in the pulsating state with the control processing unit.

With the invention, there are a plurality units of medium detecting unit, and a AND of a result of detection by each of the medium detecting unit is computed, and because of this configuration, there is provided the advantage that reliability of the medium detecting unit is improved and a frequency of malfunctions due to influence by disturbing light can be reduced.

With the invention, there are provided a plurality units of medium detecting unit, and a OR of a result of detection by each of the medium detecting units is computed, so that output from several medium detecting units which can not detect the medium because a length of the medium is smaller than that of the body of the image reader can be ignored, and because of this configuration, there is provided the advantage that a frequency of malfunctions can be reduced.

With the invention, a control method according to a result of determination by each of a plurality of medium detecting units changes according to a difference of a factor for external disturbance causing a malfunction, but the control method can freely be adjusted with the changing method according to an environment and conditions for use, and because of this configuration, there is provided the advantage that an operation for reading an image can be performed without being affected by external disturbance with the reliability improved.

With the invention, by concurrently using a mechanical switch and a photo-electric switch based on different principles for detection respectively, a necessary response can be made to factors of external disturbance for respective switches, and because of this configuration, there is provided the advantage that an operation for reading an image can be performed without being affected by external disturbance.

With the invention, a mechanical switch and a photoelectric switch based on different principles for detection respectively are used each as the medium detecting unit, and AND of a result of detection by each switch is computed, and because of this configuration, there is provided the advantage that the reliability in detection can be improved.

With the invention, a mechanical switch and a photoelectric switch based on different principles for detection respectively are used each as the medium detecting unit, OR of a result of detection by each switch is computed so that, even if the photoelectric switch fails due to external disturbance, detection of a medium can be executed by the other mechanical switch, and because of this configuration, there is provided the advantage that the reliability in detection can be improved.

With the invention, a mechanical switch and a photoelectric switch based on different principles for detection respectively are used each as the medium detecting unit, and one of the two switches is preferentially used according to an environment and conditions for use, and because of this configuration, there is provided the advantage that the reliability in detection is improved.

With the invention, the medium detecting unit is not packaged on a surface of the housing, but is provided inside the housing with walls provided around the medium detecting unit, so that a quantity of disturbing light directly introduced into the medium detecting unit is reduced with a frequency of malfunctions reduced.

With the invention, a plurality units of mechanical switch are provided each as the medium detecting unit, and AND of a result of detection by each medium detecting unit is computed, and because of this configuration, there is provided the advantage that a frequency of malfunctions due to irregularities such as a step on a medium can be reduced with the reliability of the reading medium detecting unit improved.

With the invention, there are a plurality of mechanical switches each as the medium detecting unit and OR of a result of detection by each switch is computed, so that a result of detection by several switches which can not detect the medium can be ignored, and because of this configuration, there is provided the advantage that a frequency of malfunctions can be reduced.

With the invention, a control method according to a result of detection by each of the plurality of mechanical switches changes according to difference in a factor for external disturbance causing a malfunction, but the control method can freely be changed according to an environment or conditions for use, and because of this configuration, there is provided the advantage that detection of the medium can normally be executed without being affected by factors for external disturbance.

With the invention, the medium detecting unit comprising a moving member and a displacement detecting unit is used, so that only the roller section around the main roller contacts a medium when reading an image, and because of this configuration, there is provided the advantage that wearing and breakage can be prevented. Further the main roller supports almost entire range to be read, and because of this configuration, there is provided the advantage that, even if there is any irregularity such as a step is present on the medium, an operation for reading an image can normally be executed without being affected by the irregularity.

With the invention, the medium detecting unit comprising a moving member and a displacement detecting unit are used as the medium detecting unit, and only the roller section around the auxiliary roller contacts a medium when reading an image, and because of this configuration, there is provided the advantage that wearing and breakage can be prevented. Further the auxiliary roller supports almost all range to be read, so that, even if any irregularity such as a step is present on the medium, an operation for reading an image can be performed without being affected by the irregularity. Further, precision in assembly of the auxiliary roller may be lower as compared to that required in assembling the main roller, and because of this configuration, there is provided the advantage that the cost can be reduced as compared to that when the main roller is employed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image reader for optically reading an image on a medium by means of manual operations comprising:
  a housing having an image reading surface coming in contact with the medium when reading an image;
  a displacement detecting unit having a plurality of rollers for detecting a displacement of said housing; and
  an image reading unit provided on said housing for reading image information of the medium according to a result of detection by said displacement detecting unit,
  wherein said image reading unit automatically starts and terminates reading said image information based on said detected displacement of said housing provided by said displacement detecting unit using said plurality of rollers.

2. An image reader according to claim 1;
  wherein said displacement detecting unit comprises a displacement computing section for computing a displacement of said housing from the rotation of said plurality of rollers.

3. An image reader according to claim 2 comprising:
  first and second auxiliary rollers rotatably provided on the image reading surface of said housing so that said first and second auxiliary rollers hold said roller therebetween.

4. An image reader according to claim 3 comprising:
  a transmitting unit with an external device connectable thereto for transmitting a result of reading by said image reading unit as image data to said external device.

5. An image reader according to claim 2 comprising:
  a read control unit for recognizing start and end of image read according to a result of detection by the displacement detecting unit and controlling said image reading unit according to a result of recognition.

6. An image reader according to claim 5 comprising:
  an interface unit with various types of auxiliary image reader each having a different reading size connectable thereto;
  wherein said read control unit processes a result of reading by said auxiliary image reader when said auxiliary image reader is connected to said interface unit.

7. An image reader according to claim 5 comprising:
  a power supply unit for intermittently supplying power to said displacement detecting unit when an image is not being read according to a result of recognition by said read control unit.

8. An image reader according to claim 5 comprising:
  a communicating unit working as a communication interface between said memory and an external device with said external device capable of accessing said memory connectable thereto.

9. An image reader according to claim 1 comprising:
  a memory for storing the data corresponding to a plurality of images read by said image reading unit as image data.

10. An image reader according to claim 1 comprising:
  a digitizing unit for digitizing a result of reading by generating a threshold value for digitizing according to a result of reading by said image reading unit.

11. An image reader according to claim 1;
  wherein, when reading an image, an action point of grasping fingers is at a position lower than a center of gravity of said image reader and at the same time a height of the action point is smaller than a width of said housing.

12. An image reader according to claim 1 comprising:
  a display unit provided on an operating surface of said housing for displaying an image according to a result of reading by said image reading unit.

13. An image reader according to claim 12;

wherein said display unit is provided in a vertical posture with respect to a reading surface of said image reading unit.

14. An image reader according to claim 12 comprising:

an angle adjusting unit for freely adjusting an angle of a display surface of said display unit.

15. An image reader according to claim 12 comprising:

a protection cover for covering said display unit.

16. An image reader according claim 12 comprising:

an operating section provided near one edge of the operating surface of said housing and used for an inputting operation.

17. An image reader according to claim 12 comprising:

a instructing unit for indicating a direction when an image is to be displayed on the display of said display unit; and a display control unit for controlling the displaying direction of the image on said display unit according to contents of an instruction from said instructing unit.

18. An image reader according to claim 12 comprising:

a display control unit for dividing an image displayed by said display unit with a ratio of N:M (N+M=1) and displaying each of the divided images with a different contraction ratio or enlargement ratio.

19. An image reader according to claim 12 comprising:

a display control unit for displaying a whole or a portion of an image with the same, contracted or enlarged size as compared to the size of the original image displayed by said display unit by overlapping on the other image(s).

20. An image reader according to claim 12 comprising:

a display control unit for displaying in an array of a plurality of entire images or a portion of the image with the same, contracted or enlarged size as compared to the original size of the image displayed by said display unit.

21. An image reader according to claim 12 comprising:

a display control unit for displaying an arbitrary area of a document image with an enlarged or a contracted size as compared to the original size of the image displayed by said display unit.

22. An image reader according to claim 12 comprising:

a display control unit for displaying in an array of images displayed by said display unit which images are rotated or inverted in a plurality of directions;

a selecting unit for selecting any one image from the displayed rotated or inverted images; and a right posture correcting unit for converting the orientation of the read image according to the orientation of the image selected by said selecting unit.

23. An image reader according to claim 12 comprising:

a text portion determining unit for determining a text portion of the image;

a rotation direction detecting unit for detecting a direction of rotation of an image from a character image for the text portion determined by said text portion determining unit; and a display control unit for displaying the image as a properly oriented image on the display of said display unit according to a result of detection by said rotation direction detecting unit.

24. An image reader according to claim 12 comprising:

a classifying unit for classifying a plurality of images read by said image reading unit according to prespecified items for classification;

a selecting unit for selecting any of the items for classification; and a display control unit for displaying the images corresponding to the item for classification selected by said selecting unit.

* * * * *